(12) United States Patent
Prest et al.

(10) Patent No.: US 12,265,670 B2
(45) Date of Patent: Apr. 1, 2025

(54) ELECTRONIC DEVICE WITH GLASS ENCLOSURE

(71) Applicant: Apple Inc., Cupertino, CA (US)

(72) Inventors: Christopher D. Prest, San Francisco, CA (US); Peter N. Russell-Clarke, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/516,903

(22) Filed: Nov. 2, 2021

(65) Prior Publication Data

US 2022/0057885 A1 Feb. 24, 2022

Related U.S. Application Data

(63) Continuation of application No. 16/542,235, filed on Aug. 15, 2019, now Pat. No. 11,175,769.
(Continued)

(51) Int. Cl.
*G06F 3/041* (2006.01)
*G06F 1/16* (2006.01)
(Continued)

(52) U.S. Cl.
CPC .......... *G06F 3/0416* (2013.01); *G06F 1/1626* (2013.01); *G06F 1/1643* (2013.01);
(Continued)

(58) Field of Classification Search
CPC ...... G06F 1/163; G06F 1/1626; G06F 1/1684; G06F 3/147; G06F 3/044; G06F 3/011;
(Continued)

(56) References Cited

U.S. PATENT DOCUMENTS

| | | |
|---|---|---|
| 4,106,839 A | 8/1978 | Cooper |
| 4,256,412 A | 3/1981 | Tybus et al. |
| (Continued) | | |

FOREIGN PATENT DOCUMENTS

| | | |
|---|---|---|
| CN | 101087500 | 12/2007 |
| CN | 101350849 | 1/2009 |
| (Continued) | | |

OTHER PUBLICATIONS

Author Unknown, "Improved Touchscreen Products," Research Disclosure, Kenneth Mason Publications, Hampshire, UK, GB, vol. 428, No. 53, Dec. 1, 1999.
(Continued)

*Primary Examiner* — Dong Hui Liang
(74) *Attorney, Agent, or Firm* — Brownstein Hyatt Farber Schreck, LLP

(57) ABSTRACT

An electronic device includes a six-sided glass enclosure defining an interior volume and comprising a first glass member and a second glass member. The first glass member defines at least a portion of a first major side of the six-sided glass enclosure, at least a portion of a peripheral side of the six-sided glass enclosure, a first region along the peripheral side and having a first thickness, and a second region along the peripheral side and having a second thickness different from the first thickness. The second glass member is attached to the first glass member and defines at least a portion of a second major side of the six-sided glass enclosure. The electronic device further includes a touchscreen display within the interior volume and positioned adjacent at least a portion of each of the six sides of the six-sided glass enclosure.

20 Claims, 92 Drawing Sheets

Related U.S. Application Data

(60) Provisional application No. 62/764,908, filed on Aug. 16, 2018, provisional application No. 62/737,833, filed on Sep. 27, 2018.

(51) Int. Cl.
  G06F 3/0488 (2022.01)
  G06F 3/04883 (2022.01)
  H04R 1/02 (2006.01)
  H04R 1/40 (2006.01)
  H04R 3/00 (2006.01)
  H04R 3/12 (2006.01)
  G04G 17/08 (2006.01)
  G04G 21/08 (2010.01)
  H04B 1/3827 (2015.01)

(52) U.S. Cl.
  CPC .......... G06F 1/1652 (2013.01); G06F 1/1656 (2013.01); G06F 1/1688 (2013.01); G06F 3/04883 (2013.01); H04R 1/028 (2013.01); H04R 1/403 (2013.01); H04R 1/406 (2013.01); H04R 3/005 (2013.01); H04R 3/12 (2013.01); G04G 17/08 (2013.01); G04G 21/08 (2013.01); G06F 2203/04102 (2013.01); H04B 1/3827 (2013.01); H04R 2499/11 (2013.01)

(58) Field of Classification Search
  CPC ............. G06F 3/04817; G06F 3/04883; G06F 3/0488; G06F 3/04842; G06F 3/017; G06F 3/0481; G06F 3/04845; G06F 3/048; G06F 3/041; G06F 3/03547; G06F 3/0485; G06F 3/0412; G06F 3/016; G06F 2203/04808; G04G 17/08; G04G 17/02; G04G 17/04; G04G 17/045; G04G 21/00
  See application file for complete search history.

(56) References Cited

U.S. PATENT DOCUMENTS

| | | | |
|---|---|---|---|
| 4,855,174 | A | 8/1989 | Kamamoto et al. |
| 4,989,622 | A | 2/1991 | Kozuka et al. |
| 5,055,347 | A | 10/1991 | Bacon, Jr. |
| 5,512,374 | A | 4/1996 | Wallace et al. |
| 6,061,104 | A | 5/2000 | Evanicky et al. |
| 6,093,887 | A | 7/2000 | Ponto et al. |
| 6,189,938 | B1 | 2/2001 | Nakadaira et al. |
| 6,278,873 | B1 | 8/2001 | Itakura et al. |
| 6,288,330 | B1 | 9/2001 | Chen |
| 6,359,768 | B1 | 3/2002 | Eversley et al. |
| 6,392,873 | B1 | 5/2002 | Honda |
| 6,424,338 | B1 | 7/2002 | Anderson et al. |
| 6,442,826 | B1 | 9/2002 | Staudt et al. |
| 6,473,069 | B1 | 10/2002 | Gerpheide |
| 6,483,024 | B1 | 11/2002 | Smithson et al. |
| 6,589,891 | B1 | 7/2003 | Rast |
| 6,654,256 | B2 | 11/2003 | Gough |
| 6,671,160 | B2 | 12/2003 | Hayden |
| 6,940,731 | B2 | 9/2005 | Davis et al. |
| 6,996,425 | B2 | 2/2006 | Watanabe |
| 7,048,242 | B2 | 5/2006 | Oddsen, Jr. |
| 7,436,653 | B2 | 10/2008 | Yang et al. |
| 7,491,900 | B1 | 2/2009 | Peets et al. |
| 7,586,753 | B2 | 9/2009 | Lu |
| 7,604,377 | B2 | 10/2009 | Yu et al. |
| 7,755,913 | B2 | 7/2010 | He |
| 7,829,812 | B2 | 11/2010 | Tolbert et al. |
| 7,920,904 | B2 | 4/2011 | Kim et al. |
| 7,986,525 | B2 | 7/2011 | Wang |
| 8,066,233 | B2 | 11/2011 | Fujikawa et al. |
| 8,092,897 | B2 | 1/2012 | Honma et al. |
| 8,101,859 | B2 | 1/2012 | Zadesky |
| 8,164,898 | B2 | 4/2012 | Lin et al. |
| D660,193 | S | 5/2012 | Neuner |
| 8,195,244 | B2 | 6/2012 | Smoyer et al. |
| 8,199,488 | B2 | 6/2012 | Zou et al. |
| 8,358,513 | B2 | 1/2013 | Kim et al. |
| 8,396,521 | B2 | 3/2013 | Horimoto et al. |
| 8,456,847 | B2 | 6/2013 | Hwang et al. |
| 8,509,863 | B2 | 8/2013 | Vedurmudi et al. |
| 8,553,907 | B2 | 10/2013 | Thomason et al. |
| 8,558,977 | B2 | 10/2013 | Gettemy et al. |
| 8,587,935 | B2 | 11/2013 | Lee |
| 8,654,524 | B2 | 2/2014 | Pance et al. |
| 8,665,236 | B2 | 3/2014 | Myers |
| 8,675,359 | B2 | 3/2014 | Chen |
| 8,681,115 | B2 | 3/2014 | Kurita |
| 8,744,529 | B2 | 6/2014 | Freund et al. |
| 8,773,848 | B2 | 7/2014 | Russell-Clarke et al. |
| 8,824,140 | B2 | 9/2014 | Prest et al. |
| 8,974,924 | B2 | 3/2015 | Weber et al. |
| 8,975,540 | B2 | 3/2015 | Mareno et al. |
| 9,007,748 | B2 | 4/2015 | Jarvis |
| 9,086,748 | B2 | 7/2015 | Nam et al. |
| 9,124,676 | B2 | 9/2015 | Allore et al. |
| 9,135,944 | B2 | 9/2015 | Jenks |
| 9,162,519 | B2 | 10/2015 | Suehiro et al. |
| 9,173,306 | B2 | 10/2015 | Lim et al. |
| 9,192,072 | B2 | 11/2015 | Shin et al. |
| 9,203,463 | B2 | 12/2015 | Asrani et al. |
| 9,218,116 | B2 | 12/2015 | Benko et al. |
| 9,250,659 | B2 | 2/2016 | Tsai et al. |
| 9,390,869 | B2 | 7/2016 | Lee et al. |
| 9,429,997 | B2 | 8/2016 | Myers et al. |
| 9,448,631 | B2 | 9/2016 | Winter et al. |
| 9,489,054 | B1 | 11/2016 | Sumsion et al. |
| 9,532,723 | B2 | 1/2017 | Kim et al. |
| 9,621,218 | B1 | 4/2017 | Glickman et al. |
| 9,642,241 | B2 | 5/2017 | Huitema et al. |
| 9,654,164 | B2 | 5/2017 | Irci et al. |
| 9,693,473 | B2 | 6/2017 | Hibino et al. |
| 9,740,237 | B2 | 8/2017 | Moore et al. |
| 9,804,635 | B2 | 10/2017 | Kim et al. |
| 9,826,649 | B2 | 11/2017 | Narajowski et al. |
| 9,898,903 | B2 | 2/2018 | Khoshkava et al. |
| 9,939,784 | B1 * | 4/2018 | Berardinelli ...... H04M 1/72412 |
| 9,955,603 | B2 | 4/2018 | Kiple et al. |
| 10,013,075 | B2 | 7/2018 | Shipman |
| 10,042,442 | B2 | 8/2018 | Kwak |
| 10,110,267 | B2 | 10/2018 | Kim et al. |
| 10,321,590 | B2 | 6/2019 | Cater et al. |
| 10,424,765 | B2 | 9/2019 | Hwang et al. |
| 10,468,753 | B2 | 11/2019 | Kim et al. |
| 10,656,714 | B2 | 5/2020 | Ligtenberg et al. |
| 10,705,570 | B2 | 7/2020 | Kuna et al. |
| 10,871,828 | B2 | 12/2020 | Ligtenberg et al. |
| 10,915,151 | B2 | 2/2021 | Silvanto et al. |
| 10,983,570 | B1 | 4/2021 | Files et al. |
| 11,099,649 | B2 | 8/2021 | Ligtenberg et al. |
| 11,379,010 | B2 | 7/2022 | Kuna et al. |
| 2002/0006687 | A1 | 1/2002 | Lam |
| 2002/0072335 | A1 | 6/2002 | Watanabe |
| 2002/0130981 | A1 | 9/2002 | Ma et al. |
| 2004/0190239 | A1 | 9/2004 | Weng |
| 2005/0140565 | A1 | 6/2005 | Krombach |
| 2006/0203124 | A1 | 9/2006 | Park et al. |
| 2007/0195495 | A1 | 8/2007 | Kim et al. |
| 2007/0229702 | A1 | 10/2007 | Shirono et al. |
| 2007/0287512 | A1 | 12/2007 | Kilpi et al. |
| 2008/0018475 | A1 | 1/2008 | Breed et al. |
| 2008/0084384 | A1 | 4/2008 | Gregorio et al. |
| 2008/0174037 | A1 | 7/2008 | Chen |
| 2008/0309640 | A1 | 12/2008 | Hong et al. |
| 2009/0003141 | A1 * | 1/2009 | Ozawa ................... G04G 21/04 368/294 |
| 2009/0041984 | A1 | 2/2009 | Mayers et al. |
| 2009/0219156 | A1 | 9/2009 | August et al. |
| 2009/0278688 | A1 | 11/2009 | Tuttle |
| 2009/0295943 | A1 | 12/2009 | Kim et al. |
| 2009/0298547 | A1 | 12/2009 | Kim et al. |
| 2010/0061044 | A1 | 3/2010 | Zou et al. |

(56) References Cited

U.S. PATENT DOCUMENTS

| | | |
|---|---|---|
| 2010/0091442 A1 | 4/2010 | Theobald et al. |
| 2010/0105452 A1 | 4/2010 | Shin et al. |
| 2010/0137043 A1 | 6/2010 | Horimoto et al. |
| 2010/0151925 A1 | 6/2010 | Vedurmudi et al. |
| 2010/0157515 A1 | 6/2010 | Tseng et al. |
| 2010/0265182 A1 | 10/2010 | Ball et al. |
| 2010/0302016 A1 | 12/2010 | Zaborowski et al. |
| 2010/0308998 A1 | 12/2010 | Hesch, Jr. et al. |
| 2010/0315399 A1 | 12/2010 | Davis et al. |
| 2011/0038114 A1 | 2/2011 | Pance et al. |
| 2011/0047459 A1 | 2/2011 | Van Der Westhuizen |
| 2011/0065479 A1 | 3/2011 | Nader |
| 2011/0091051 A1 | 4/2011 | Thomason et al. |
| 2011/0095994 A1 | 4/2011 | Birnbaum |
| 2011/0205169 A1 | 8/2011 | Yasutake et al. |
| 2011/0292579 A1 | 12/2011 | Koga |
| 2012/0009983 A1 | 1/2012 | Mow et al. |
| 2012/0069517 A1 | 3/2012 | Prest et al. |
| 2012/0088072 A1 | 4/2012 | Pawloski et al. |
| 2012/0094594 A1 | 4/2012 | Rofougaran et al. |
| 2012/0097412 A1 | 4/2012 | Wennemer et al. |
| 2012/0175165 A1 | 7/2012 | Merz et al. |
| 2012/0212424 A1 | 8/2012 | Sharma et al. |
| 2012/0236477 A1 | 9/2012 | Weber |
| 2012/0268412 A1 | 10/2012 | Cruz-Hernandez et al. |
| 2012/0274575 A1* | 11/2012 | Solomon ............... G06F 3/0488 345/1.3 |
| 2012/0327008 A1 | 12/2012 | Kurita |
| 2013/0051000 A1 | 2/2013 | Yu et al. |
| 2013/0076649 A1* | 3/2013 | Myers ............... G06F 3/0488 361/679.01 |
| 2013/0188366 A1* | 7/2013 | Russell-Clarke ....... B24B 7/241 65/36 |
| 2013/0273295 A1 | 10/2013 | Kenney et al. |
| 2013/0308282 A1 | 11/2013 | Shin et al. |
| 2014/0015773 A1 | 1/2014 | Loeffler |
| 2014/0031093 A1 | 1/2014 | Song et al. |
| 2014/0139450 A1* | 5/2014 | Levesque ............ G06F 1/1692 345/173 |
| 2014/0253487 A1 | 9/2014 | Bezinge et al. |
| 2014/0288438 A1* | 9/2014 | Venkatraman ....... A61B 5/1123 600/483 |
| 2014/0298478 A1* | 10/2014 | Kim ...................... G06F 3/0483 726/26 |
| 2014/0311767 A1 | 10/2014 | Merz et al. |
| 2014/0320344 A1 | 10/2014 | Sanderovich et al. |
| 2014/0320435 A1 | 10/2014 | Modarres et al. |
| 2014/0347799 A1 | 11/2014 | Ono et al. |
| 2014/0368455 A1 | 12/2014 | Croisonnier et al. |
| 2015/0001104 A1 | 1/2015 | Kim et al. |
| 2015/0062419 A1 | 3/2015 | Hooton et al. |
| 2015/0090571 A1 | 4/2015 | Leong et al. |
| 2015/0109223 A1 | 4/2015 | Kessler et al. |
| 2015/0124401 A1 | 5/2015 | Prest et al. |
| 2015/0171916 A1 | 6/2015 | Asrani et al. |
| 2015/0183185 A1 | 7/2015 | Chang |
| 2015/0185946 A1 | 7/2015 | Fourie |
| 2015/0255853 A1 | 9/2015 | Kwong et al. |
| 2015/0364820 A1 | 12/2015 | Dong et al. |
| 2016/0029899 A1* | 2/2016 | Kim ..................... H04W 68/005 455/414.1 |
| 2016/0034042 A1* | 2/2016 | Joo ..................... G02B 27/0093 345/633 |
| 2016/0055729 A1 | 2/2016 | Maddox et al. |
| 2016/0064820 A1 | 3/2016 | Kim et al. |
| 2016/0098016 A1* | 4/2016 | Ely ......................... G04C 3/04 368/308 |
| 2016/0098107 A1 | 4/2016 | Morrell et al. |
| 2016/0103544 A1 | 4/2016 | Filiz et al. |
| 2016/0147257 A1 | 5/2016 | Yamazaki |
| 2016/0254587 A1 | 9/2016 | Jung et al. |
| 2016/0255944 A1* | 9/2016 | Baranski ............... A44C 5/2071 |
| 2016/0270247 A1 | 9/2016 | Jones et al. |
| 2016/0308563 A1 | 10/2016 | Ouyang et al. |
| 2016/0316574 A1 | 10/2016 | Chang et al. |
| 2016/0327980 A1 | 11/2016 | Farahani et al. |
| 2016/0327986 A1 | 11/2016 | Farahani et al. |
| 2017/0010771 A1 | 1/2017 | Bernstein et al. |
| 2017/0038793 A1 | 2/2017 | Kallman |
| 2017/0048495 A1 | 2/2017 | Scalisi et al. |
| 2017/0060201 A1 | 3/2017 | Prather et al. |
| 2017/0094804 A1 | 3/2017 | Brodsky et al. |
| 2017/0104261 A1 | 4/2017 | Wong et al. |
| 2017/0230073 A1 | 8/2017 | Youn et al. |
| 2017/0264008 A1 | 9/2017 | Ying et al. |
| 2017/0264722 A1 | 9/2017 | Zhong |
| 2017/0303048 A1 | 10/2017 | Hooton et al. |
| 2018/0020208 A1 | 1/2018 | Woo et al. |
| 2018/0026341 A1 | 1/2018 | Mow et al. |
| 2018/0026353 A1 | 1/2018 | Tseng et al. |
| 2018/0077328 A1 | 3/2018 | Park et al. |
| 2018/0090847 A1 | 3/2018 | Romano et al. |
| 2018/0198212 A1 | 7/2018 | Rodriguez |
| 2018/0210515 A1 | 7/2018 | Lyles et al. |
| 2018/0213660 A1 | 7/2018 | Prest et al. |
| 2018/0284845 A1 | 10/2018 | Honma et al. |
| 2019/0020365 A1 | 1/2019 | Ouyang et al. |
| 2019/0083715 A1 | 3/2019 | Redmond et al. |
| 2019/0090806 A1 | 3/2019 | Clavelle et al. |
| 2019/0103682 A1 | 4/2019 | Thai et al. |
| 2019/0128669 A1 | 5/2019 | Nobayashi et al. |
| 2019/0312334 A1 | 10/2019 | Shin et al. |
| 2019/0361543 A1 | 11/2019 | Zhang |
| 2019/0377385 A1 | 12/2019 | Bushnell |
| 2020/0057525 A1 | 2/2020 | Prest et al. |
| 2020/0058992 A1 | 2/2020 | Wu et al. |
| 2020/0073445 A1 | 3/2020 | Kuna et al. |
| 2020/0076056 A1 | 3/2020 | Froese et al. |
| 2020/0076057 A1 | 3/2020 | Leutheuser et al. |
| 2020/0076058 A1 | 3/2020 | Zhang et al. |
| 2020/0278747 A1 | 9/2020 | Ligtenberg et al. |
| 2020/0314567 A1 | 10/2020 | Shriner et al. |
| 2020/0328499 A1 | 10/2020 | O'Driscoll et al. |
| 2020/0409023 A1 | 12/2020 | Kazuo et al. |
| 2021/0149458 A1 | 5/2021 | Silvanto et al. |
| 2021/0167487 A1 | 6/2021 | Vanna et al. |
| 2021/0234403 A1 | 7/2021 | Ku et al. |
| 2021/0353226 A1 | 11/2021 | Hiemstra et al. |
| 2022/0004837 A1 | 1/2022 | Perkins et al. |
| 2022/0006176 A1 | 1/2022 | Froese et al. |
| 2022/0317740 A1 | 10/2022 | Kuna et al. |
| 2022/0326777 A1 | 10/2022 | Ligtenberg et al. |
| 2023/0161390 A1 | 6/2023 | Silvanto et al. |
| 2023/0333600 A1 | 10/2023 | Kuna et al. |
| 2023/0333658 A1 | 10/2023 | Ligtenberg et al. |

FOREIGN PATENT DOCUMENTS

| | | |
|---|---|---|
| CN | 101753655 | 6/2010 |
| CN | 102159045 | 8/2011 |
| CN | 102405453 | 4/2012 |
| CN | 202281978 | 6/2012 |
| CN | 202735925 | 2/2013 |
| CN | 102984904 | 3/2013 |
| CN | 103168280 | 6/2013 |
| CN | 203054674 | 7/2013 |
| CN | 103327758 | 9/2013 |
| CN | 103390793 | 11/2013 |
| CN | 203416294 | 1/2014 |
| CN | 103681061 | 3/2014 |
| CN | 103777765 | 5/2014 |
| CN | 104427048 | 3/2015 |
| CN | 104582379 | 4/2015 |
| CN | 104742308 | 7/2015 |
| CN | 105228966 | 1/2016 |
| CN | 105892568 | 8/2016 |
| CN | 107221506 | 9/2017 |
| CN | 107275751 | 10/2017 |
| CN | 107317121 | 11/2017 |
| CN | 107534223 | 1/2018 |
| CN | 107735903 | 2/2018 |
| CN | 207216299 | 4/2018 |
| CN | 108400425 | 8/2018 |

(56) References Cited

FOREIGN PATENT DOCUMENTS

| | | |
|---|---|---|
| CN | 108594622 | 9/2018 |
| CN | 108594623 | 9/2018 |
| CN | 208385608 | 1/2019 |
| CN | 109546295 | 3/2019 |
| CN | 109980332 | 7/2019 |
| CN | 112532263 | 3/2021 |
| CN | 112799294 | 5/2021 |
| EP | 2565742 | 3/2013 |
| EP | 2843501 | 3/2015 |
| EP | 2993730 | 3/2016 |
| EP | 3144768 | 3/2017 |
| EP | 3438786 | 2/2019 |
| GB | 2516439 | 1/2015 |
| GB | 2529885 | 3/2016 |
| JP | S58151619 | 9/1983 |
| JP | H61039144 | 2/1986 |
| JP | H05022023 | 1/1993 |
| JP | H09232849 | 9/1997 |
| JP | H10102265 | 4/1998 |
| JP | H63249697 | 10/1998 |
| JP | 2001216077 | 8/2001 |
| JP | 20023431 | 11/2002 |
| JP | 2004272690 | 9/2004 |
| JP | 2006243812 | 9/2006 |
| JP | 2007072375 | 3/2007 |
| JP | 2011014149 | 1/2011 |
| JP | 2011159276 | 8/2011 |
| JP | 2011239139 | 11/2011 |
| JP | 2011248888 | 12/2011 |
| JP | 2011249126 | 12/2011 |
| JP | 2012/019526 | 1/2012 |
| JP | 2012027592 | 2/2012 |
| JP | 2012222553 | 11/2012 |
| JP | 2013508818 | 3/2013 |
| JP | 2014501070 | 1/2014 |
| JP | 2014078240 | 5/2014 |
| JP | 2014512879 | 5/2014 |
| JP | 2014186075 | 10/2014 |
| JP | 2015031952 | 2/2015 |
| JP | 2019537909 | 12/2019 |
| KR | 20110049416 | 5/2011 |
| KR | 20110076951 | 7/2011 |
| KR | 20130096048 | 8/2013 |
| KR | 20140017420 | 2/2014 |
| KR | 20150012312 | 2/2015 |
| KR | 20160019833 | 2/2016 |
| KR | 20160052275 | 5/2016 |
| KR | 20160134504 | 11/2016 |
| KR | 20180025126 | 3/2018 |
| KR | 20190118095 | 10/2019 |
| TW | 201129285 | 8/2011 |
| TW | 201532835 | 9/2015 |
| TW | 201701119 | 1/2017 |
| WO | WO00/14826 | 3/2000 |
| WO | WO2009/002605 | 12/2008 |
| WO | WO2009/033616 | 3/2009 |
| WO | WO2009/049331 | 4/2009 |
| WO | WO2009/129123 | 10/2009 |
| WO | WO2011/130849 | 10/2011 |
| WO | WO2012/006152 | 1/2012 |
| WO | WO2012/129247 | 9/2012 |
| WO | WO2014/037945 | 3/2014 |
| WO | WO2014/149172 | 9/2014 |
| WO | WO2014/182392 | 11/2014 |
| WO | WO2015/153701 | 10/2015 |
| WO | WO2016/039803 | 3/2016 |
| WO | WO2016/053901 | 4/2016 |
| WO | WO2016/168432 | 10/2016 |
| WO | WO2018/013573 | 1/2018 |
| WO | WO2018/090295 | 5/2018 |
| WO | WO2018/142132 | 8/2018 |

OTHER PUBLICATIONS

Author Unknown, "Smart Watch—New Fashion Men/women Bluetooth Touch Screen Smart Watch Wrist Wrap Watch Phone," https://www.fargoshopping.co.ke/, pages, Mar. 2016.

Kim et al., "Ultrathin Cross-Linked Perfluoropolyether Film Coatings from Liquid $CO_2$ and Subsequent UV Curing," Chem. Matter, vol. 22, pp. 2411-2413, 2010.

* cited by examiner

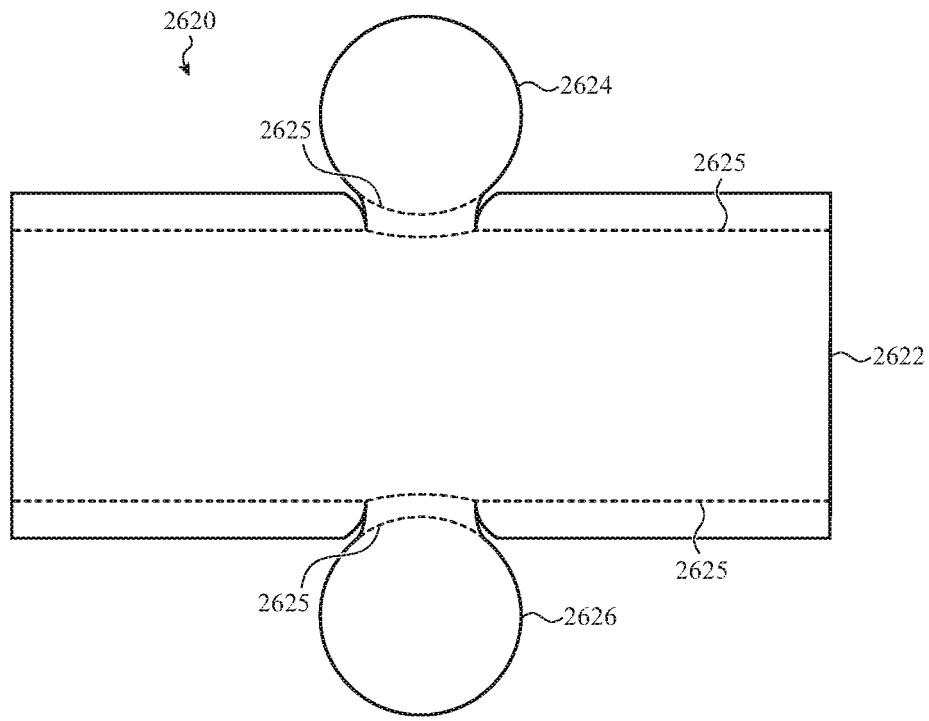
FIG. 26D
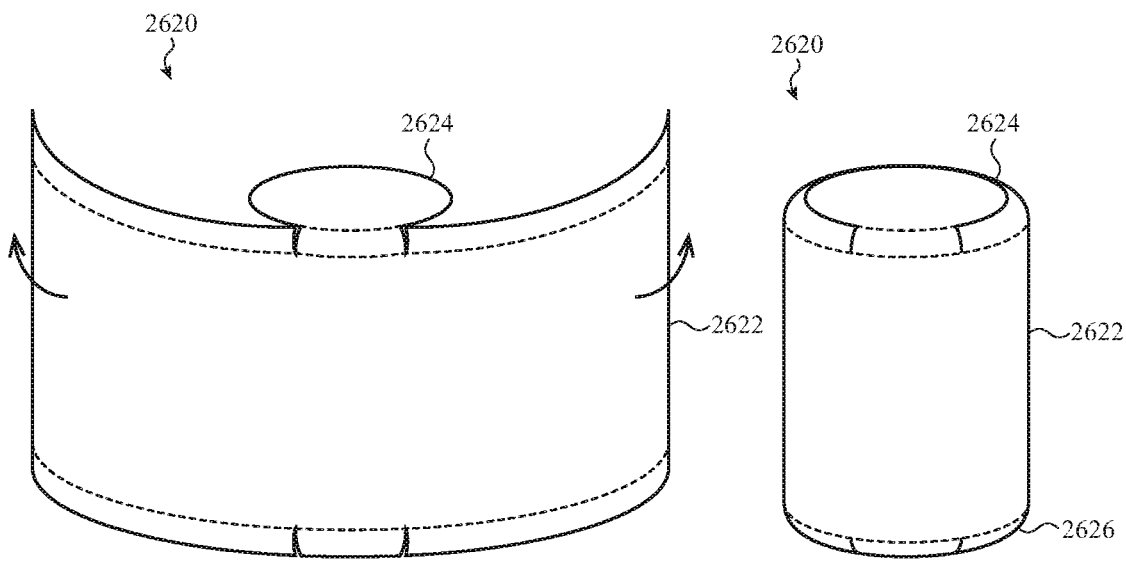
FIG. 26E  FIG. 26F

ELECTRONIC DEVICE WITH GLASS ENCLOSURE

CROSS-REFERENCE TO RELATED APPLICATION(S)

This application is a continuation patent application of U.S. patent application Ser. No. 16/542,235, filed Aug. 15, 2019 and titled "Electronic Device with Glass Enclosure," which is a nonprovisional patent application of and claims the benefit of U.S. Provisional Patent Application No. 62/764,908, filed Aug. 16, 2018 and titled "Electronic Device with Glass Enclosure" and U.S. Provisional Patent Application No. 62/737,833, filed Sep. 27, 2018 and titled "Electronic Device with Glass Enclosure," the disclosures of which are hereby incorporated herein by reference in their entireties.

FIELD

The described embodiments relate generally to electronic devices, and more particularly to electronic devices with glass enclosures.

BACKGROUND

Modern consumer electronic devices take many shapes and forms, and have numerous uses and functions. Smartphones, notebook computers, and tablet computers, for example, provide various ways for users to interact with other people, as well as access information, work, play games, and so forth. Such devices use enclosures to house delicate electrical components, to allow a user to easily interact with and use the device, and to provide a desired shape, form factor, and overall appearance of the device. Enclosures for electronic devices may be formed in various ways and using various materials. For example, enclosures may be formed of plastic or metal.

SUMMARY

An electronic device includes a six-sided glass enclosure defining an interior volume and comprising a first glass member and a second glass member. The first glass member defines at least a portion of a first major side of the six-sided glass enclosure, at least a portion of a peripheral side of the six-sided glass enclosure, a first region along the peripheral side and having a first thickness, and a second region along the peripheral side and having a second thickness different from the first thickness. The second glass member is attached to the first glass member and defines at least a portion of a second major side of the six-sided glass enclosure. The electronic device further includes a touchscreen display within the interior volume and positioned adjacent at least a portion of each of the six sides of the six-sided glass enclosure. The second thickness may be greater than the first thickness, and the second region may define at least a portion of a corner region of the six-sided glass enclosure. The first glass member may further define an input region along an exterior surface of the peripheral side and having a surface texture that is different from an area surrounding the input region.

The electronic device may further include a force-sensing system configured to detect a deformation of the first region and, in response to detecting the deformation of the first region, change an operation of the electronic device.

The peripheral side may be a first peripheral side, and the first glass member may further define at least a portion of a second peripheral side of the six-sided glass enclosure, the second peripheral side extending parallel to the first peripheral side, The first glass member may further define a third region along the second peripheral side and having a third thickness, and a fourth region along the second peripheral side and having a fourth thickness that is different from the first thickness.

An electronic device includes an enclosure defining two major sides and four peripheral sides, the enclosure comprising a first glass member defining a first wall defining a first major side of the two major sides and a second wall defining a first portion of a first peripheral side of the four peripheral sides and having a first tapered edge. The enclosure may further comprise a second glass member defining a third wall defining a second major side of the two major sides, the second major side opposite the first major side, and a fourth wall defining a second portion of the first peripheral side and having a second tapered edge overlapping and attached to the first tapered edge. The electronic device may further include a touch-sensitive display assembly attached to an interior surface of the enclosure and configured to display graphical outputs visible through at least a portion of each of the two major sides and at least a portion of each of the four peripheral sides of the enclosure, and detect touch inputs applied to the enclosure. The first tapered edge may be bonded to the second tapered edge with glass frit.

The touch-sensitive display assembly may include a flexible display component defining a third tapered edge and a fourth tapered edge overlapping and attached to the third tapered edge. The enclosure may define an opening having a first opening portion through the first major side, a second opening portion through a second peripheral side of the four peripheral sides, and a third opening portion through the second major side. The electronic device may further include a speaker within the enclosure and configured to emit sound through the opening.

An electronic device includes an enclosure defining an interior volume and comprising a first glass member defining a first wall defining a first major side of the enclosure and a second wall defining a first portion of a peripheral side of the enclosure and having a first curved and tapered region. The enclosure may further include a second glass member defining a third wall defining a second major side of the enclosure and a fourth wall defining a second portion of the peripheral side of the enclosure and having a second curved and tapered region, the second curved and tapered region overlapping and attached to the first curved and tapered region. The electronic device may further include a flexible display member defining a first planar portion configured to display graphical outputs visible through the first major side, a second planar portion configured to display graphical outputs visible through the second major side, and a curved portion configured to display graphical outputs visible through the peripheral side.

The enclosure may define an opening having a first opening portion through the first major side, a second opening portion through the peripheral side, and a third opening portion through the second major side. The opening may be a first opening, the peripheral side may be a first peripheral side, and the enclosure may further define a second opening having a fourth opening portion through the first major side, a fifth opening portion through a second peripheral side, and a sixth opening portion through the second major side.

The electronic device may further include a first speaker within the interior volume and configured to emit sound through the first opening, and a second speaker within the interior volume and configured to emit sound through the second opening. The electronic device may select one of the first speaker or the second speaker for sound output based at least in part on an orientation of the device.

The electronic device may further include a first microphone within the interior volume and configured to detect sound through the first opening, and a second microphone within the interior volume and configured to detect sound through the second opening. The electronic device may select one of the first microphone or the second microphone for sound detection based at least in part on the orientation of the device.

An electronic device includes an enclosure comprising a monolithic glass member defining at least a portion of each of a first wall defining a first major surface of the enclosure, a second wall defining a second major surface of the enclosure, and four peripheral walls defining four peripheral surfaces of the enclosure. The electronic device may also include a display within the enclosure and adjacent at least a portion of the first wall and at least a portion of a first peripheral wall of the four peripheral walls, and a touch sensing system within the enclosure and configured to detect touch inputs applied to the enclosure.

The monolithic glass member may define an opening in a second peripheral wall of the four peripheral walls, and the enclosure may further include a cap within the opening and attached to the monolithic glass member. The cap may fully occlude the opening. The cap may partially occlude the opening, and a portion of an input device extends through the opening.

BRIEF DESCRIPTION OF THE DRAWINGS

The disclosure will be readily understood by the following detailed description in conjunction with the accompanying drawings, wherein like reference numerals designate like structural elements, and in which:

FIGS. 26D-26F depict another example multi-sided display.

DETAILED DESCRIPTION

Figure 1A:
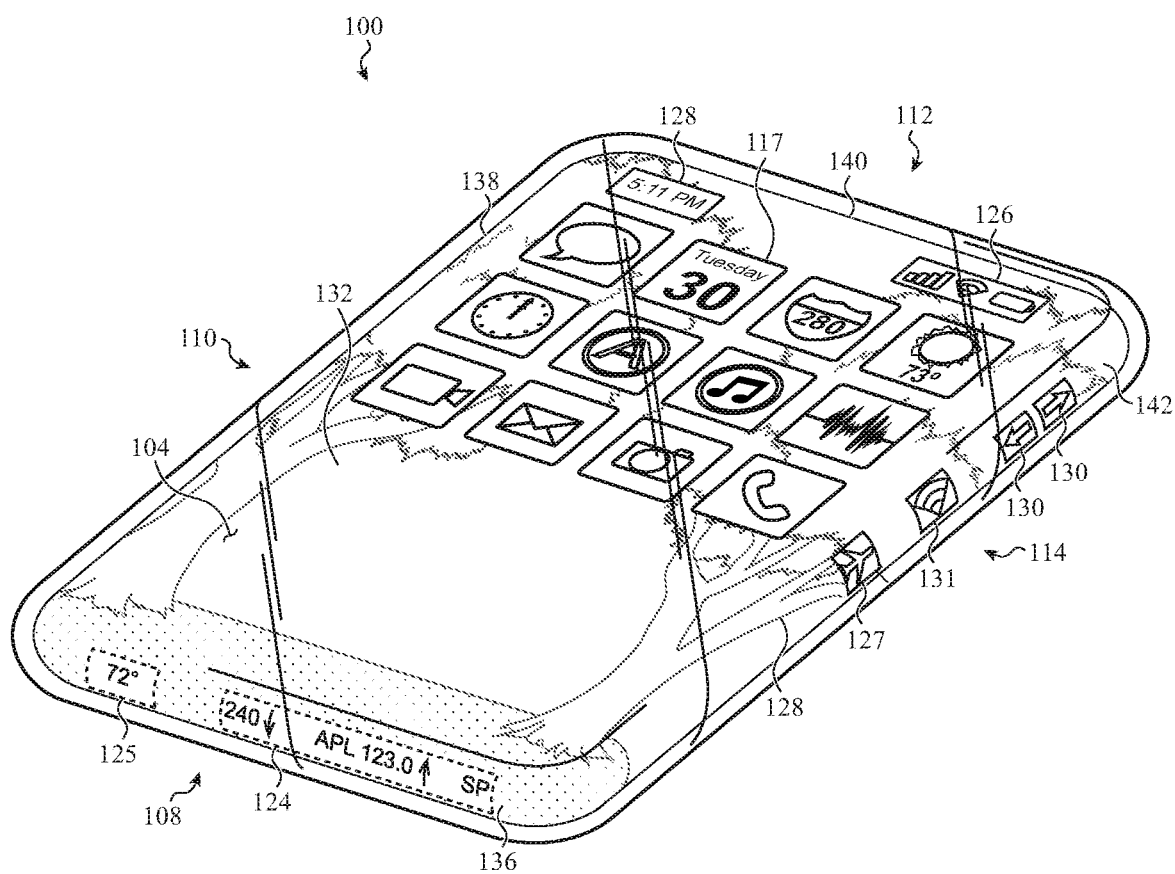
FIGS. 1A-1B depict an example electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments described herein are generally directed to electronic devices, such as smartphones and tablet computers, having enclosures that are formed from glass. Conventionally, glass has been used in such devices to provide a transparent window over a touchscreen on a front of the device. Described herein, however, are electronic devices with enclosures that use glass to define multiple sides of the enclosure. For example, an enclosure that takes the general form of a rectangular prism may include a glass front, a glass back, and one or more glass sides. In some cases, substantially the entire enclosure (e.g., all exterior surfaces of the enclosure) is formed of glass, including the front, back, and all sides of the enclosure. In such cases, the enclosure may appear visually and tactilely seamless, such that the entire enclosure may appear to be formed from a single piece of glass (even though it may be formed from multiple separate pieces attached together).

Enclosures having glass defining multiple sides of the enclosure may facilitate or enable numerous additional functions and uses that are not realized with conventional enclosures. For example, glass backs and glass sides may be transparent, allowing the electronic device to include additional displays that are viewable through the sides and/or the back. Moreover, the side- and back-viewable displays may be made touch and/or force sensitive using touch- and/or force-sensing systems, effectively turning the side and back surfaces into additional input devices or surfaces with which a user may interact to control the electronic device.

The physical distinctions between the front, back, and side surfaces of the glass enclosures may indicate functional distinctions of the touchscreens, or display regions, corresponding to those surfaces. For example, while a front-facing touchscreen may present or define a main display region (e.g., for displaying application windows, games, grids of selectable icons), a side-facing touchscreen may display an auxiliary display region (e.g., for displaying affordances that control functions of the electronic device such as speaker volume, ring/silent, screen brightness, or the like). A back surface may display an additional auxiliary display region, which may include different content than the front or side surface(s). For enclosures having alternative shapes, such as cylinders or triangular prisms, the distinct sides and/or surfaces of those enclosures may indicate or suggest similar functional distinctions. The physical distinctions between the various surfaces may thus help to indicate functional distinctions between the user interfaces or affordances presented on the corresponding displays.

While the physical distinctions between the surfaces can be used to define or delineate functionally different regions of the device, an enclosure with multiple glass sides (and displays that are visible through the multiple glass sides) may also be used to erase or blend the distinctions between the various surfaces of the device. For example, under certain conditions, such a device may display graphical outputs (e.g., images, videos, etc.) that span multiple displays and sides of the device. For example, a single displayed graphical output (e.g., image, user interface, etc.) may wrap or extend over a front side, one or more peripheral sides, and a back side of the device, thus contributing to the unified appearance of the multiple sides. As another example, a primary user interface may extend over a front side, one or more peripheral sides, and a back side of the device (or, in the context of a cylindrical enclosure, the primary user interface may extend around the round cylindrical wall of the enclosure). This may allow icons to move across multiple surfaces when swiped, and may even allow icons or other graphical outputs to appear as a ribbon-like user interface that wraps around the device. For example, a user interface may be continuously scrollable in a left-right direction such that an icon or other graphical output may be scrolled off of a front side, over a peripheral side and on to a back side. If the user interface is further scrolled, the icon or other graphical output may be scrolled over another peripheral side to return to the front side. Similar scrolling effects may be realized in other directions as well (e.g., up-down, diagonally, etc.), producing a continuous scroll phenomenon around the entire device. In the case of a cylindrical enclosure, for example, the user interface may continuously scroll around the cylindrical wall. Accordingly, while in some cases the various surfaces of a device may be used to help distinguish different areas (e.g., based on the type of graphical outputs or functions provided on those areas), an enclosure with multiple transparent glass sides or surfaces, and corresponding displays, may also minimize such distinctions to form a functionally and visually unified display region that spans multiple surfaces.

As noted above, in some cases, all or substantially all of the exterior surfaces of an enclosure may be formed from glass, and may further include a display region associated with substantially all of the exterior surfaces. In such cases, distinctions between the top and bottom or front and back of the device may effectively disappear. For example, where a device includes transparent glass surfaces and corresponding displays for both the front and back surfaces, either surface may be used as a primary interface surface at any given time, effectively eliminating the traditional notion of a physical "front" and a "back" of the device. Indeed, the "front" and "back" of the device may be defined not by any particular physical characteristic of the device itself, but rather by which surface is facing a user or being interacted with at a given time (or by the content that is being presented on a particular face or faces).

Figure 1B:
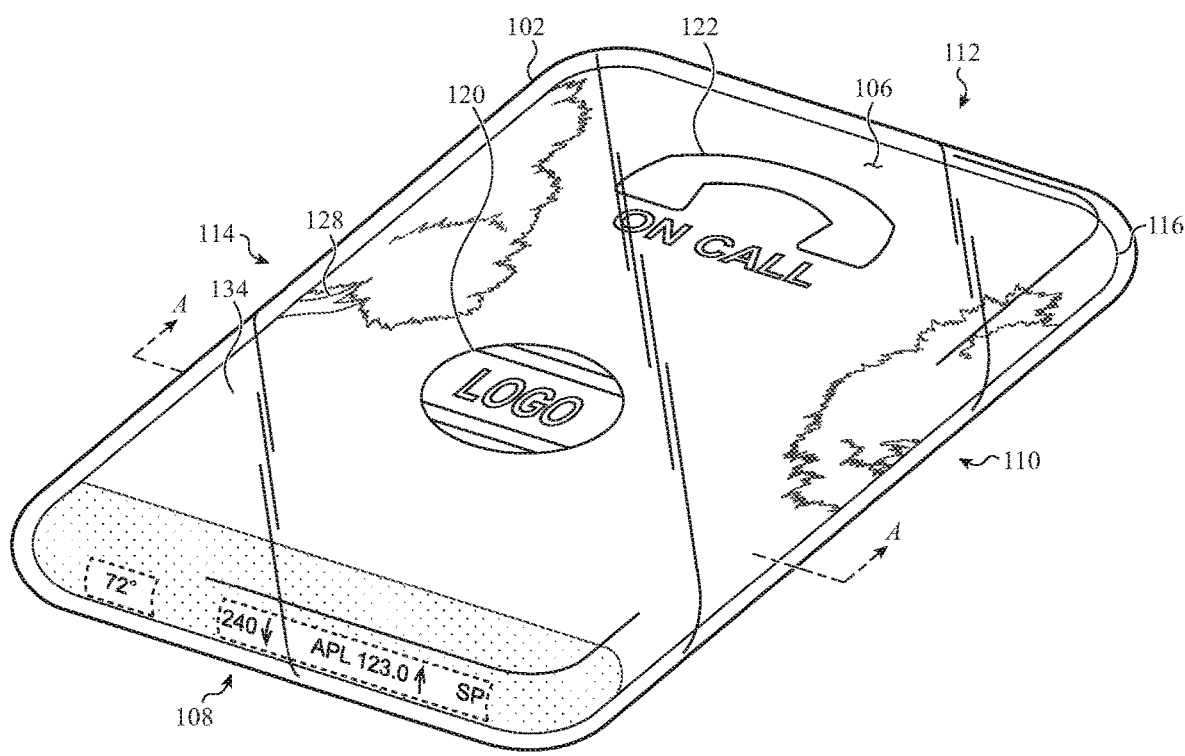

FIGS. 1A-1B show front and back views of an example electronic device 100 in accordance with the concepts described herein. The electronic device 100 may include an enclosure 102 formed of glass. The enclosure 102 may define a first major side 104 (e.g., resembling a conventional "front" of the device), a second major side 106 (e.g., resembling a conventional "back" of the device), and first, second, third, and fourth peripheral sides 108, 110, 112, 114, respectively, all of which may be formed from glass and which may be transparent. The glass enclosure 102 may be formed from a single (e.g., monolithic) glass member or multiple glass members attached together. Techniques for forming such enclosures are described in greater detail herein.

As used herein, the term "monolithic" may be used to refer to a component or object that is formed from a single piece of material, and may have a uniform or substantially uniform material composition throughout. For example, an enclosure member formed of a single, continuous piece of glass with a uniform composition may be referred to as a monolithic enclosure member. A monolithic component may include chemically strengthened regions, coatings, and other treatments and may still be considered to have a substantially uniform material composition. Monolithic components or objects may also be referred to herein as unitary components or objects. By contrast, non-monolithic structures may include those formed by bonding two separate components together (e.g., with a distinct material, such as an adhesive).

The electronic device 100 may also include a display 116 within the enclosure 102. The display 116 may display graphical output that is visible through the first and second major sides 104, 106 and the peripheral sides of the enclosure 102. For example, the display 116 may include a first major display side 132 (visible through the first major side 104 of the enclosure 102), a second major display side 134 (FIG. 1B, visible through the second major side 106 of the enclosure 102), and first, second, third, and fourth peripheral display sides 136, 138, 140, 142 (visible through the first, second, third, and fourth peripheral sides 108, 110, 112, 114, respectively).

The display 116 may include a single display member (e.g., a flexible substrate or display component, or a stack-up of flexible layers) that is wrapped or folded to define surfaces that direct images through all the sides of the enclosure. In another example, the display 116 may include multiple display members or panels that are assembled or fitted together to produce a substantially omni-directional visual output. The electronic device 100 may also include touch- and/or force-sensing systems associated with, on, beneath, and/or integrated into any or all of the sides of the enclosure, thus allowing any or all of the viewable regions of the display 116 to act as input devices (e.g., touchscreens) with which a user can control and/or interact with the electronic device 100.

In order to produce a device with multiple displays viewable through multiple transparent sides—including embodiments where displays are visible through each of the six main sides of the device—the enclosure 102 must be sufficiently transparent and visually seamless to facilitate adequate visibility and to reduce or eliminate optical disturbances or artifacts. Thus, the enclosure 102 may be formed using techniques that reduce the number and/or visibility of seams between different glass components, and that reduce or eliminate visible physical structures, frames, and/or stiffeners, that are visible through the glass. For example, glass components that define three, four, five, or even six of the main sides of the device may be used to help increase the number of walls that are defined by a single, monolithic glass structure. Moreover, where glass members must be joined together, the seams may be formed and bonded in a way that reduces the visibility of the seams. Other techniques for forming, reinforcing, stiffening, and/or assembling the device 100 (and the enclosure 102 more particularly) are discussed herein.

Because substantially the entire enclosure 102 is transparent, the display 116, and more particularly graphical outputs displayed by the display 116, may be viewed through any surface of the enclosure 102. Moreover, by virtue of the display 116 being visible through each of the sides of the enclosure 102, the display 116 may be essentially the only component of the device that is visible through the sides of the enclosure 102. This may provide a distinctive aesthetic appearance, whereby the display 116 appears suspended within a solid glass body. In some cases, the enclosure 102 may be configured so that when the display 116 is active, the glass enclosure 102 appears to vanish, such that the device appears to be a display with no external enclosure. Moreover, due to the symmetry of the enclosure 102 and the omni-directional visual output that may be facilitated by the display 116, the electronic device 100 may appear to lack constraints on how the device may be handled and interacted with. For example, there may be no dedicated or visually distinguishable "front" or "top" of the device. Further, as described herein, the device may dynamically change its operation based on how it is handled and/or being used, allowing the device to provide the same functionality and user experience no matter how the device is handled.

FIGS. 1A-1B show the display 116 displaying various graphical outputs, with the different sides of the enclosure 102 defining or suggesting differences in the type or function of graphical output displayed on the various sides. For example, FIG. 1A shows a first graphical output being displayed through the first major side 104, a second graphical output being displayed through the first peripheral side 108, and a third graphical output being displayed through the fourth peripheral side 114. As shown, the first graphical output may be a main page of a graphical user interface (GUI) of the device 100, which may display multiple icons 117 that a user may select to launch applications, programs, or the like. The second graphical output is shown displaying other information, in this case a region or window 124 showing updates on stock prices, and a region or window 125 showing weather data. The third graphical output includes affordances that may control device functions, such as speaker volume affordances 130, a WiFi affordance 131, and an "airplane mode" affordance 127. Affordances may control device functions and may also provide information about the status of the device and/or the device function that is controlled by an affordance. For example, the WiFi affordance 131 may allow a user to activate or deactivate a wireless radio, and may also have a color that indicates the status of the wireless radio (e.g., a blue color indicating that the radio is active and a yellow color indicating that the radio is inactive). Any of the graphical outputs on these display regions may be non-moving (e.g., static images), or they may be dynamic (e.g., animated icons, scrolling text, or other moving/changing images). It will be understood that these particular graphical outputs, and their relative appearances and locations on the display 116, are examples, and other graphical outputs may be displayed on these (or other) regions of the device.

Though the display 116 may be or may appear to be continuous across adjacent surfaces, the display regions may be distinguishable by a user as having different functional purposes based on the physical distinctions between the various sides of the enclosure. For example, a user may easily differentiate between the types of functions and information presented through the first major side 104 and the fourth peripheral side 114 based on the physical distinctiveness of those surfaces. However, while different functional regions may be physically differentiated by the various sides of the device, the continuity of the display between the various display regions reduces visual boundaries between the regions and produces a more integrated display appearance.

The appearance of continuity between display regions may be enhanced by images (e.g., background images) that span multiple display regions or sides of the device. For example, a single, continuous background image may extend across two, three, four, five, or all six of the sides of the device. For example, the single background image in FIGS. 1A-1B includes a tree 128 that extends across multiple display regions. More particularly, the tree 128 extends from the first major side 104, over the fourth peripheral side 114, and onto the second major side 106 (FIG. 1B). Other aspects or displayed items of the background image may extend across other sides, and indeed a single, seamless image may be presented that extends over multiple sides of the device. Displaying a continuous background image in this fashion may further the appearance of a single, continuous display. At the same time, displaying distinct graphical outputs on each side of the device, such as the icons 115 and affordances 130, leverages the physical distinctions between the various sides to reinforce the concept of distinct functional and/or informational regions being afforded on different sides of the device.

While in some cases the side surfaces may be used to define distinct functional display regions (as described in greater detail herein), the device 100 may selectively join or unify functional display regions to eliminate functional distinctions and use a greater amount of the display for a single purpose. For example, when the device 100 is being used to display a movie, the peripheral sides of the device 100 may display a video image or a border around the video image, and other graphical outputs may therefore be removed from the peripheral sides. As another example, if the device 100 is being used to show thumbnails of photographs, the displayed thumbnails may extend onto the peripheral sides of the enclosure 102 (and may be scrollable over the peripheral and main sides of the enclosure 102), making essentially the entire device (or at least 5 sides of the device) into a single functional display region. The continuity of the display 116 across various surfaces (e.g., surfaces corresponding to the main and peripheral sides of the enclosure 102) may thus be dynamically changed to suit various contexts and functions of the device, and distinct functional regions may be created or eliminated based on the context of the device.

FIG. 1B shows another view of the device 100, with the second major side 106 facing up. Due to the symmetrical nature of the enclosure 102 and the omni-directional display 116, the second major side 106 may visually indistinguishable from the first major side 104. Nevertheless, in some cases (such as a dynamic determination that the device 100 is being held by a user such that the second major side 106 is the back of the device 100), the second major side 106 may be used to display different graphical outputs than the first major side 104. For example, as shown in FIG. 1B, the second major side 106 displays graphical outputs including a logo 120 and a device status identifier 122. These graphical outputs may be selected in response to the device 100 determining that the first major side 104 is being used as a primary interface surface for the device 100, and they may change based on the changing status of the device. For example, the "on call" device status identifier 122 shown in FIG. 1B may change to an "available" status indicator upon termination of a voice call. Similarly, all of the graphical outputs on the second major side 106 may be replaced with a primary user interface screen upon determination that a user has flipped the device in his or her hand and has begun using the second major side 106 as the primary interface surface of the device.

As suggested above, because both the first and second major sides 104, 106 may be associated with a display, either side may serve as a primary or main interface surface of the device 100. The side that serves as the primary interface surface may be dynamically selected in any suitable way. In some cases the physical orientation or a physical relationship between the device 100 and another object (e.g., a user) may determine which side will display the primary interface surface. For example, a biometric sensing system (e.g., a face recognition system) may determine which major side is being viewed by a user, and the device 100 may establish that major side as the primary interface surface. As another example, a touch sensing system (optionally along with accelerometers, gyroscopes, or the like) may determine how a device is being held in a user's hand, and establish the side that is not occluded by a user's grip as the primary interface surface. In other cases, the primary interface surface may alternate between the major sides on a time-based schedule (e.g., switching at a set interval). In yet other cases, the side that acts as the primary interface surface may be selected by a user, and the selection may persist until the user changes the selection or allows the device to automatically determine which major side to designate as the primary interface surface. In yet other cases, the side that acts as the primary interface surface may be determined by an active application or function. For example, in a device with a speaker and/or microphone on only one side, that side may be selected as the primary interface surface when a voice calling application or function is active. That same device, however may allow either main side to be designated as the primary interface surface when an internet browser application is active.

In order to facilitate use of the device 100 in multiple orientations (e.g., such that the device has no dedicated top or front, and the active "front" of the device 100 can be dynamically determined), hardware components of the device 100 may be arranged symmetrically about the device 100. For example, as described herein, both of the major sides 104, 106 of the device 100 may include a speaker and a microphone that are configured to output and capture audio, respectively, based on the particular side that is being used as the front or primary interface surface of the device 100. In some cases, each major side 104, 106 has a speaker and a microphone at each end (e.g., corresponding to a conventional top and bottom of the device 100) so that the device has no distinct top or bottom, and can be rotated 180 degrees while still maintaining full functionality. That is, not only can either major side 104, 106 be dynamically selected as the "front" of the device 100, but either end of the device 100 can be dynamically selected as the "top" of the device. In this way the device 100 may provide substantially identical functionality no matter which side is facing the user and which side is oriented as a "top" of the device. Examples of symmetrical hardware arrangements are discussed herein. Further, while the foregoing example relates to symmetrically positioned speakers and microphones, other hardware may also be arranged to facilitate the orientation independent usability of the device, such as cameras, projectors, flashes, sensors, etc.

Figure 2:
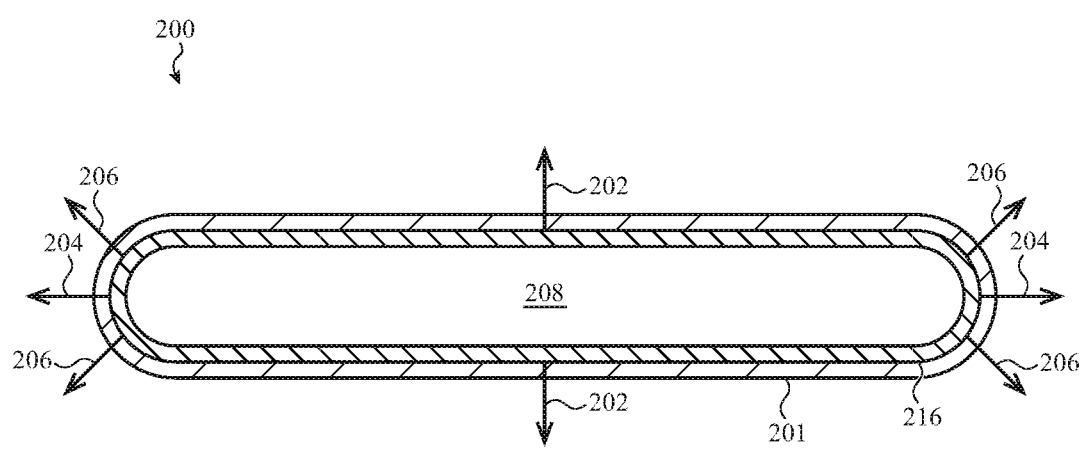
FIG. 2 depicts a cross-sectional view of another example electronic device.

FIG. 2 shows a cross-sectional view of a device 200, which may be an embodiment of the device 100 described herein, as viewed along line A-A in FIG. 1B. FIG. 2 shows representative components within the interior volume of an enclosure 201 of the device 200. The enclosure 201 may be similar and/or identical to the enclosure 102 described with respect to FIGS. 1A-1B. As described above, the enclosure 201 may define an interior volume, and a display 216 (which may be the same as or similar to the display 116 in FIGS. 1A-1B) may be positioned in the interior volume and visible through the sides of the enclosure 201. FIG. 2 illustrates how light (e.g., corresponding to images produced by the display 216) may be emitted and visible through multiple sides and portions of the enclosure 201. For example, arrows 202 indicate light and/or images being displayed through the major sides of the enclosure 201, while arrows 204 indicate light and/or images being displayed through peripheral sides of the enclosure 201. Further, light and/or images may be displayed through corner or transition regions between the major and peripheral sides of the enclosure 201, as shown by arrows 206.

As shown, the display 216 may conform to and optionally contact the inside surface of the enclosure 201. For example, the shape of the interior surface of the enclosure 201 may be substantially identical to the shape of the exterior-facing surface of the display 216. In other cases, all or portions of the display 216 may be offset from the inside surface of the enclosure 201. For example, some or all of the display 216 may be set apart from the inside surface by an air gap. As another example, a transparent material (e.g., a liquid, transparent film, adhesive, or other suitable material or component) may be positioned between the inside surface of the enclosure 201. Such interstitial materials may be part of a touch and/or force sensing system. Display components and touch and/or force sensing systems may be at least partially integrated, structurally and/or functionally, to define a touchscreen display assembly. The display 216 may be a touchscreen display assembly, or a portion thereof. Indeed, any display or display component described herein may be integrated with touch and/or force sensing systems to define a touchscreen display assembly.

The device 200 may also include internal device components 208, which are within the interior volume of the enclosure 201 and are at least partially surrounded by the display 216. The internal device components 208 may include various interconnected components, including but not limited to circuit boards, processors, memory, sensors, cameras, batteries, wireless (e.g., inductive) charging components, wires, and structural frames and/or supports. Example arrangements and techniques for assembling these internal device components 208 within an interior volume of a glass enclosure 201 are described herein.

Cross-hatching in FIG. 2, and in any cross-sectional views herein, is used to identify boundaries, borders, and/or interfaces between various components and/or members. Cross-hatching does not necessarily indicate or suggest that any component or member is formed of or includes any particular material, and different cross-hatching patterns, when applied to different components or members, does not necessarily indicate that those components or members are formed of different materials. For example, different cross-hatching patterns may be applied to two different glass members that are formed of glass having identical compositions.

Figure 3:
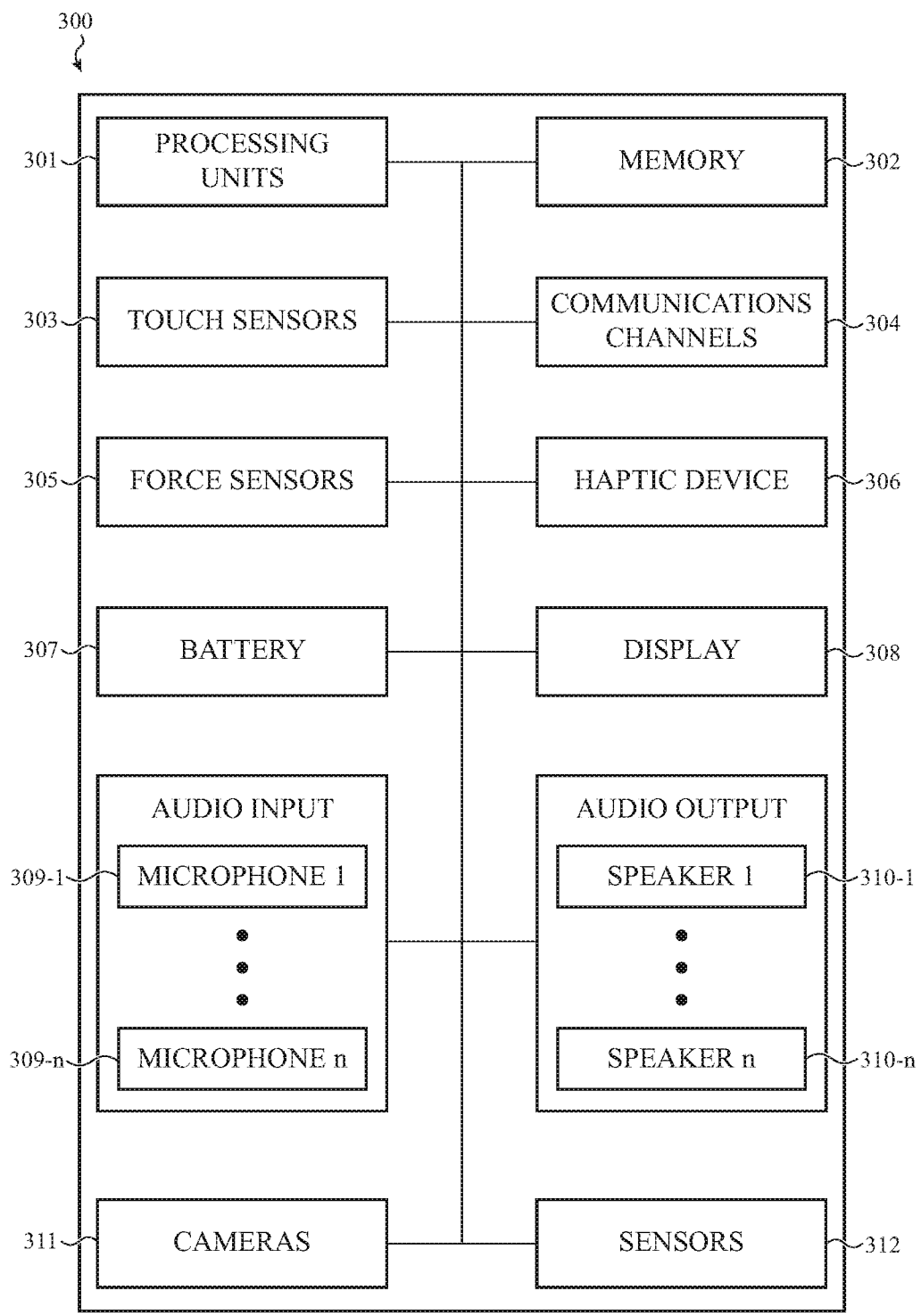
FIG. 3 depicts a schematic diagram another example electronic device.

FIG. 3 depicts an example schematic diagram of an electronic device 300. The electronic device 300 may represent the electronic device 100, and it may also apply to any electronic device described herein. The device 300 includes one or more processing units 301 that are configured to access a memory 302 having instructions stored thereon. The instructions or computer programs may be configured to perform one or more of the operations or functions described with respect to the device 300. For example, the instructions may be configured to control or coordinate the operation of one or more displays 308, one or more touch sensors 303, one or more force sensors 305, one or more communication channels 304, one or more microphones 309, one or more speakers 310, one or more cameras 311, one or more sensors 312, and/or one or more haptic feedback devices 306.

The processing units 301 of FIG. 3 may be implemented as any electronic device capable of processing, receiving, or transmitting data or instructions. For example, the processing units 301 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 302 can store electronic data that can be used by the device 300. For example, a memory can store electrical data or content such as, for example, audio and video files, images, documents and applications, device settings and user preferences, timing and control signals or data for the various modules, data structures or databases, and so on. The memory 302 can be configured as any type of memory. By way of example only, the memory can be implemented as random access memory, read-only memory, Flash memory, removable memory, or other types of storage elements, or combinations of such devices.

The touch sensors 303 may detect various types of touch-based inputs and generate signals or data that are able to be accessed using processor instructions. The touch sensors 303 may use any suitable components and may rely on any suitable phenomena to detect physical inputs. For example, the touch sensors 303 may be capacitive touch sensors, resistive touch sensors, acoustic wave sensors, or the like. The touch sensors 303 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The touch sensors 303 may be integrated with or otherwise configured to detect touch inputs applied to any portion of the device 300. For example, the touch sensors 303 may be configured to detect touch inputs applied to any portion of the device 300 that includes a display (and may be integrated with a display). In some cases, as described herein, that may include substantially the entire exterior surface of the device 300, such as where the device 300 includes a substantially omni-directional display arrangement. More particularly, the touch sensors 303 may be configured to detect touch inputs applied to one or both of the major sides and one, two, three, or four of the peripheral sides of an electronic device (e.g., the device 100). The touch sensors 303 may operate in conjunction with the force sensors 305 to generate signals or data in response to touch inputs.

The force sensors 305 may detect various types of force-based inputs and generate signals or data that are able to be accessed using processor instructions. The force sensors 305 may use any suitable components and may rely on any suitable phenomena to detect physical inputs. For example, the force sensors 305 may be strain-based sensors, piezoelectric-based sensors, piezoresistive-based sensors, capacitive sensors, resistive sensors, or the like. The force sensors 305 may include any suitable components for detecting force-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The force sensors 305 may be used in conjunction with various input mechanisms to detect various types of inputs. For example, the force sensors 305 may be used to detect presses or other force inputs that satisfy a force threshold (which may represent a more forceful input than is typical for a standard "touch" input). Like the touch sensors 303, the force sensors 305 may be integrated with or otherwise configured to detect force inputs applied to any portion of the device 300. For example, the force sensors 305 may be configured to detect force inputs applied to any portion of the device 300 that includes a display (and may be integrated with a display). In some cases, as described herein, that may include substantially the entire exterior surface of the device 300, such as where the device 300 includes a substantially omni-directional display arrangement. The force sensors 305 may operate in conjunction with the touch sensors 303 to generate signals or data in response to touch- and/or force-based inputs.

The device 300 may also include one or more haptic devices 306. The haptic device 306 may include one or more of a variety of haptic technologies such as, but not necessarily limited to, rotational haptic devices, linear actuators, piezoelectric devices, vibration elements, and so on. In general, the haptic device 306 may be configured to provide punctuated and distinct feedback to a user of the device. More particularly, the haptic device 306 may be adapted to produce a knock or tap sensation and/or a vibration sensation. Such haptic outputs may be provided in response to detection of touch and/or force inputs, and may be imparted to a user through the exterior surface of the device 300 (e.g., via a glass or other surface that acts as a touch- and/or force-sensitive display or surface).

The one or more communication channels 304 may include one or more wireless interface(s) that are adapted to provide communication between the processing unit(s) 301 and an external device. In general, the one or more communication channels 304 may be configured to transmit and receive data and/or signals that may be interpreted by instructions executed on the processing units 301. In some cases, the external device is part of an external communication network that is configured to exchange data with wireless devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any conventional communication interfaces.

As shown in FIG. 3, the device 300 may include a battery 307 that is used to store and provide power to the other components of the device 300. The battery 307 may be a rechargeable power supply that is configured to provide power to the device 300 while it is being used by the user.

The device 300 may also include one or more displays 308. As described herein, the displays may be configured to display graphical output any or all of the sides of the device 300. The one or more displays 308 may be coupled together or otherwise arranged and controlled to provide coordinated graphical outputs. For example, adjacent displays 308 (or, in cases where a single display member is folded, adjacent edges of a single display member) may be configured to appear as a single seamless display region. In such cases, the graphical output of the one or more displays 308 may be coordinated so that each display (or portion thereof) displays a portion of a single graphical output or graphical region. This may produce the appearance of a single, seamless display even when a graphical output extends across a seam between two displays. Further, the displays 308 may be configured so that the device 300 may be used in multiple orientations, as described herein. The displays 308 may use any suitable display technology, including liquid crystal displays (LCD), an organic light emitting diodes (OLED), active-matrix organic light-emitting diode displays (AMOLED), or the like.

The device 300 may also provide audio input functionality via one or more microphones 309. The microphones 309 may capture sound for voice calls, video calls, audio recordings, video recordings, and the like. In cases where the device 300 is configured to be used in multiple orientations, while providing substantially identical functionality regardless of its orientation, the audio input functionality may be provided by multiple microphones 309. The multiple microphones may be positioned on or in the device 300 so that regardless of how the device is being held, a microphone is positioned in a suitable location to capture audio. For example, a device 300 may include four microphones, each positioned so that if the device 300 is held to a user's ear in a manner that is traditional for a telephone call, a microphone is positioned near the user's mouth. As another example, a device may include two microphones, one positioned on each of the shorter peripheral sides, which may also result in a microphone being positioned near a user's mouth regardless of how the device is held. Example positions for multiple microphones are discussed herein.

The device 300 may also provide audio output functionality via one or more speakers 310. The speakers 310 may produce sound from voice calls, video calls, streaming or local audio content, streaming or local video content, or the like. Similar to the microphones that provide audio input functionality, in cases where the device 300 is configured to be used in multiple orientations while providing substantially identical functionality regardless of its orientation the audio output functionality may be provided by multiple speakers 310. The multiple microphones may be positioned on or in the device 300 so that regardless of how the device is being held, a speaker is positioned in a suitable location to produce audio for a user. For example, a device 300 may include four speakers, each positioned so that if the device 300 is held to a user's ear in a manner that is traditional for a telephone call, a speaker is positioned near the user's ear. As another example, a device may include two speakers, one positioned on each of the shorter peripheral sides, which may also result in a speaker being positioned near a user's ear regardless of how the device is held. Example positions for multiple speakers are discussed herein.

The device 300 may also include one or more cameras 311. Similar to the audio input and output functionality, multiple cameras 311 may be used so that a camera is suitably positioned regardless of how the device is being held. For example, substantially identical cameras may be positioned on each major side of the device, and optionally two cameras may be positioned on each major side (e.g., one near the traditional "top" of the device and one near the traditional "bottom"). The one or more cameras 311 may capture still or video images that are stored on the device 300. The one or more cameras 311 may also include cameras or other image sensors for a biometric sensing system (e.g., a face recognition system).

The device 300 may also include one or more additional sensors 312 to receive inputs (e.g., from a user or another computer, device, system, network, etc.) or to detect any suitable property or parameter of the device, the environment surrounding the device, people or things interacting with the device (or nearby the device), or the like. For example, a device may include accelerometers, temperature sensors, position/orientation sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like. Such sensors and/or input devices may be configured and/or positioned to function effectively regardless of the position or orientation in which the device 300 is held, as described above with respect to the speakers 310 and microphones 309.

To the extent that multiple functionalities, operations, and structures described with reference to FIG. 3 are disclosed as being part of, incorporated into, or performed by the device 300, it should be understood that various embodiments may omit any or all such described functionalities, operations, and structures. Thus, different embodiments of the device 300 may have some, none, or all of the various capabilities, apparatuses, physical features, modes, and operating parameters discussed herein.

Figure 4A:
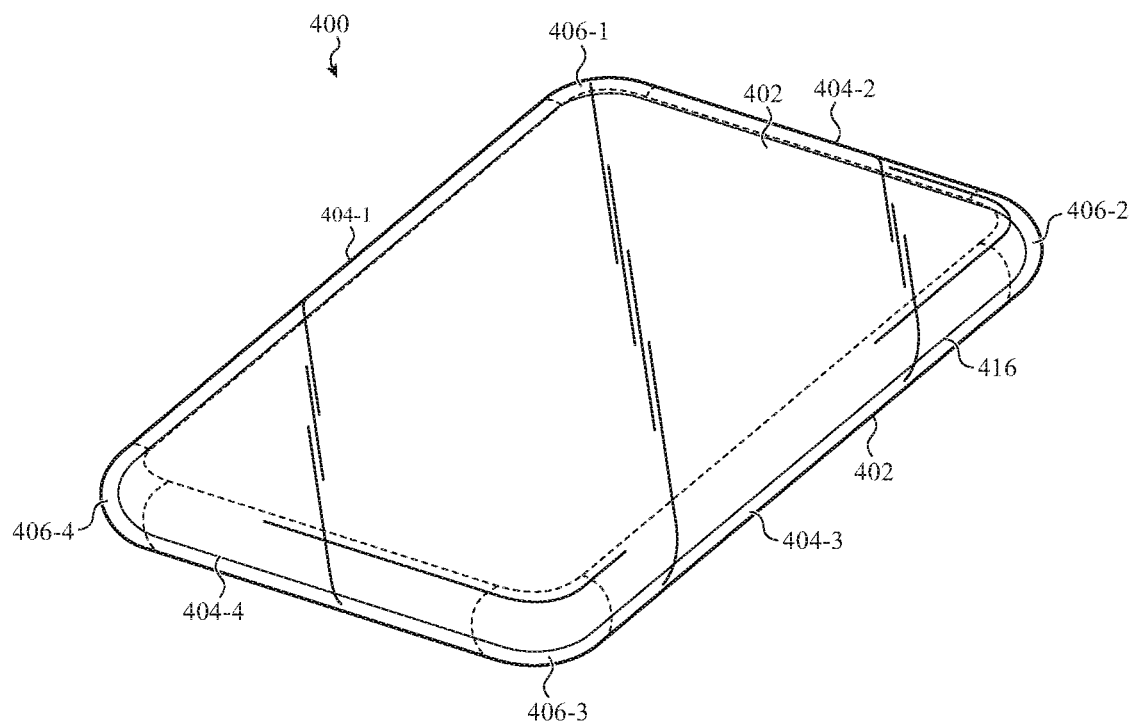
FIGS. 4A-4B depict an example electronic device having distinct display regions.
Figure 4B:
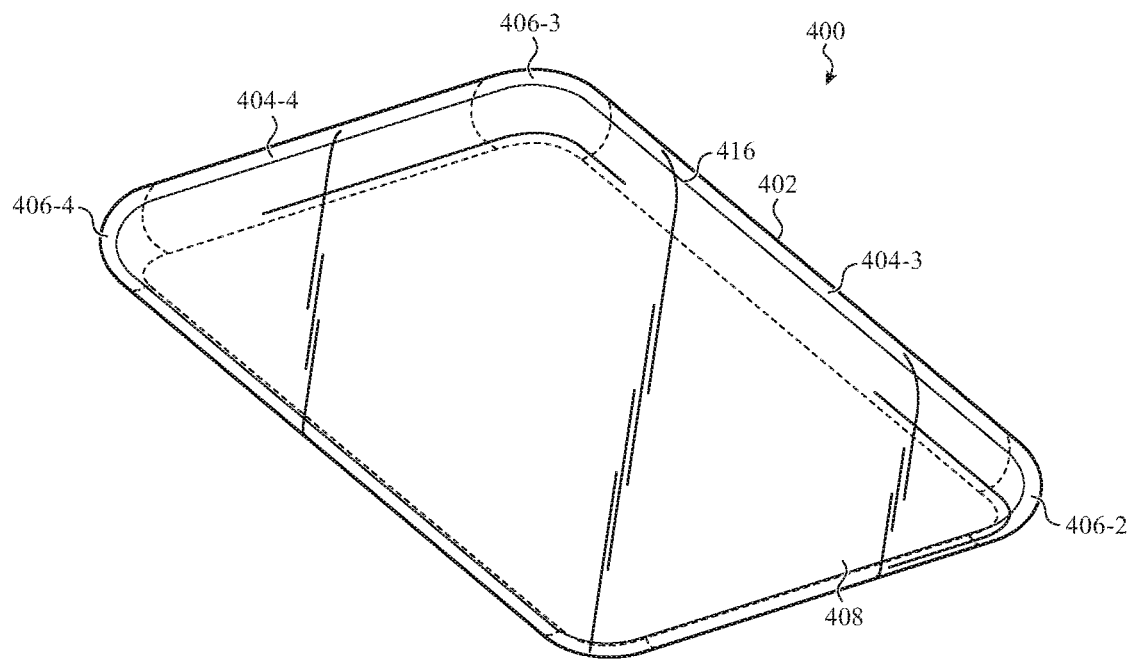

As noted above, the display of a device (e.g., the display 116 of the device 100) may be functionally (e.g., programmatically) segmented into various display regions, which may correspond to different physically distinct sides, surfaces, or portions of the enclosure (e.g., the enclosure 102). FIGS. 4A-4B are top and bottom perspective views, respectively, of a device 400, showing example display regions. (The device 400 may be an embodiment of the device 100 in FIGS. 1A-1B, and may include or incorporate any or all aspects of that device.)

The device 400 includes an enclosure 401, a first main display region 402, peripheral display regions 404-1 through 404-4, and corner display regions 406-1 through 406-4. The device 400 may also include a second main display region 408 (FIG. 4B), which may be opposite the first main display region 402. The display regions in FIGS. 4A-4B are shown on the exterior surface of the enclosure 401 (which may be an embodiment of the enclosure 102), as the graphical outputs produced by an underlying display (e.g., the display 116, FIGS. 1A-1B) may be visible through those surfaces of the device 400.

These display regions may generally correspond to the physical sides and corners of the enclosure 401. For example, each region may be primarily viewable through a portion of the enclosure 401 that is physically identifiable or recognizable as a different side. In some cases, as shown and described in greater detail herein, the boundaries of the display regions may correspond to or follow the actual physical geometry of the enclosure 401. For example, the first main display region 402 may correspond to a substantially planar segment of a display 416 (which may be an embodiment of the display 116 in FIGS. 1A-1B) that underlies a substantially planar first major side of the enclosure 401, while the peripheral display regions 404 may correspond to curved (or flat) portions of the display 416 that underlie or are adjacent the curved peripheral sides of the enclosure 401. In some cases, the boundaries of the display regions shown in FIGS. 4A-4B may be adjusted or changed (or eliminated) based on the context or operational state of the device, as described herein. Moreover, these display regions may be functional and/or programmatic in nature, and as such may not correspond to any seams, borders, or other physical or visible delineations in the enclosure 401 itself.

As noted above, the various display regions may be used to define regions of distinct types of content, such as with the first main display region 402 displaying a graphical output corresponding to a primary graphical user interface, and a peripheral display region (e.g., 404-3) displaying a graphical output including affordances and basic device information. Of course, as noted above, these display regions may be combined (e.g., the boundaries between them may be removed or ignored) to produce unified display regions that span multiple sides of the device 400.

The corner display regions 406 may also be functionally distinct from other display regions. For example, the corner display regions 406 may be used to display graphical outputs that provide additional information about the device or any operational aspect or state of the device. In some cases, the corner display regions 406 may display a color from a color gradient (e.g., from green to yellow to red) to signify the battery level or signal strength of the device (or to signify any other suitable value or parameter, such as weather, temperature, remaining time on a timer, or the like). In other cases, the corner display regions 406 may display affordances that may control some aspect of the device (e.g., to answer or terminate a call, change speaker volume, change power or display settings, or the like).

Figure 4C:
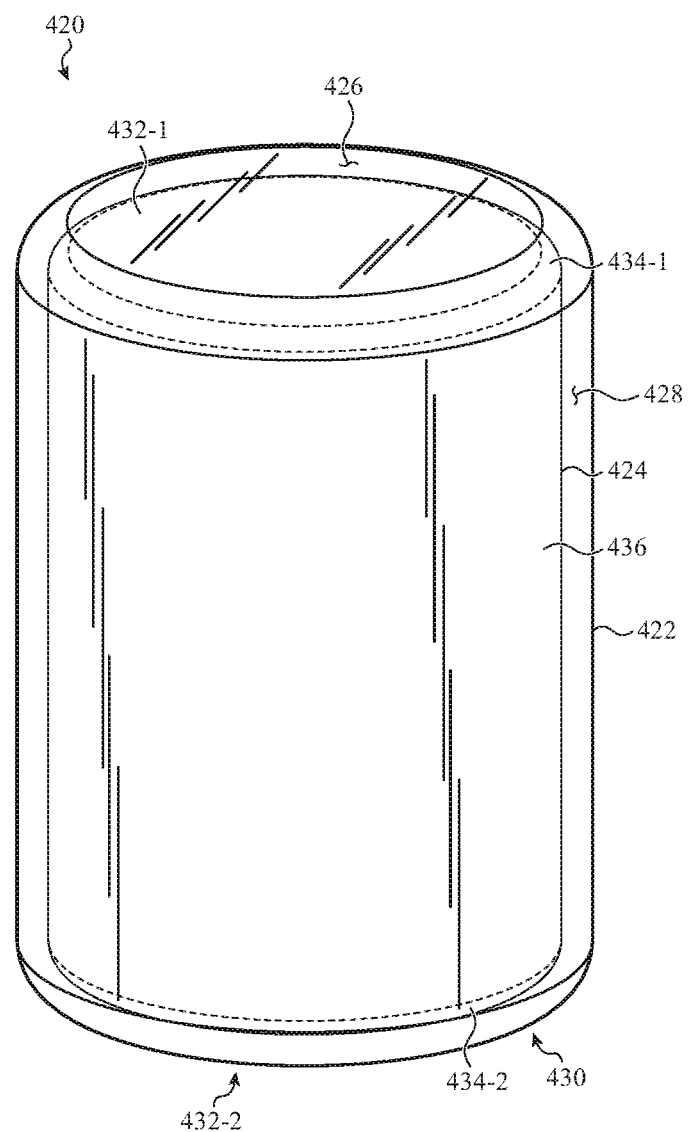
FIGS. 4C-4E depict example electronic devices.
Figure 4D:
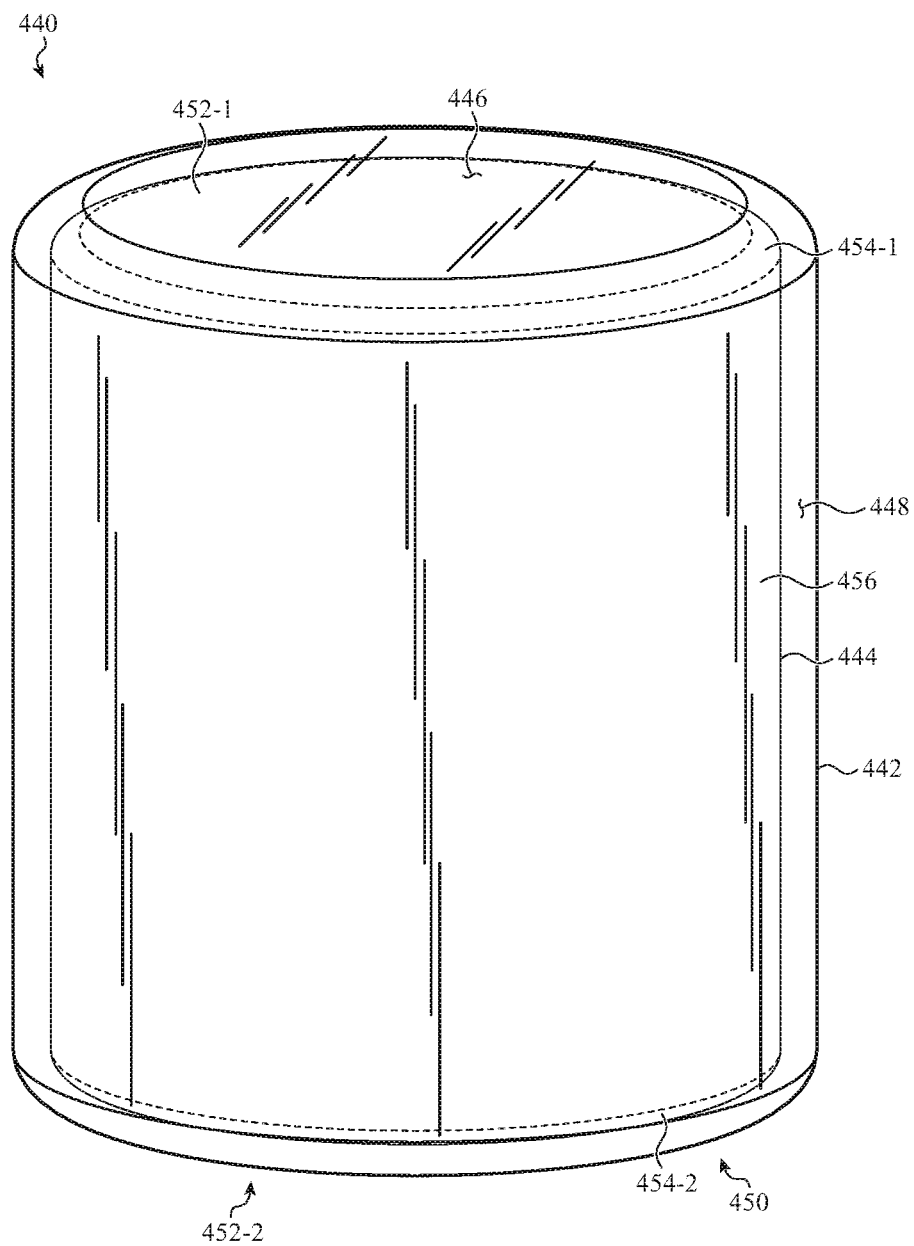
Figure 4E:
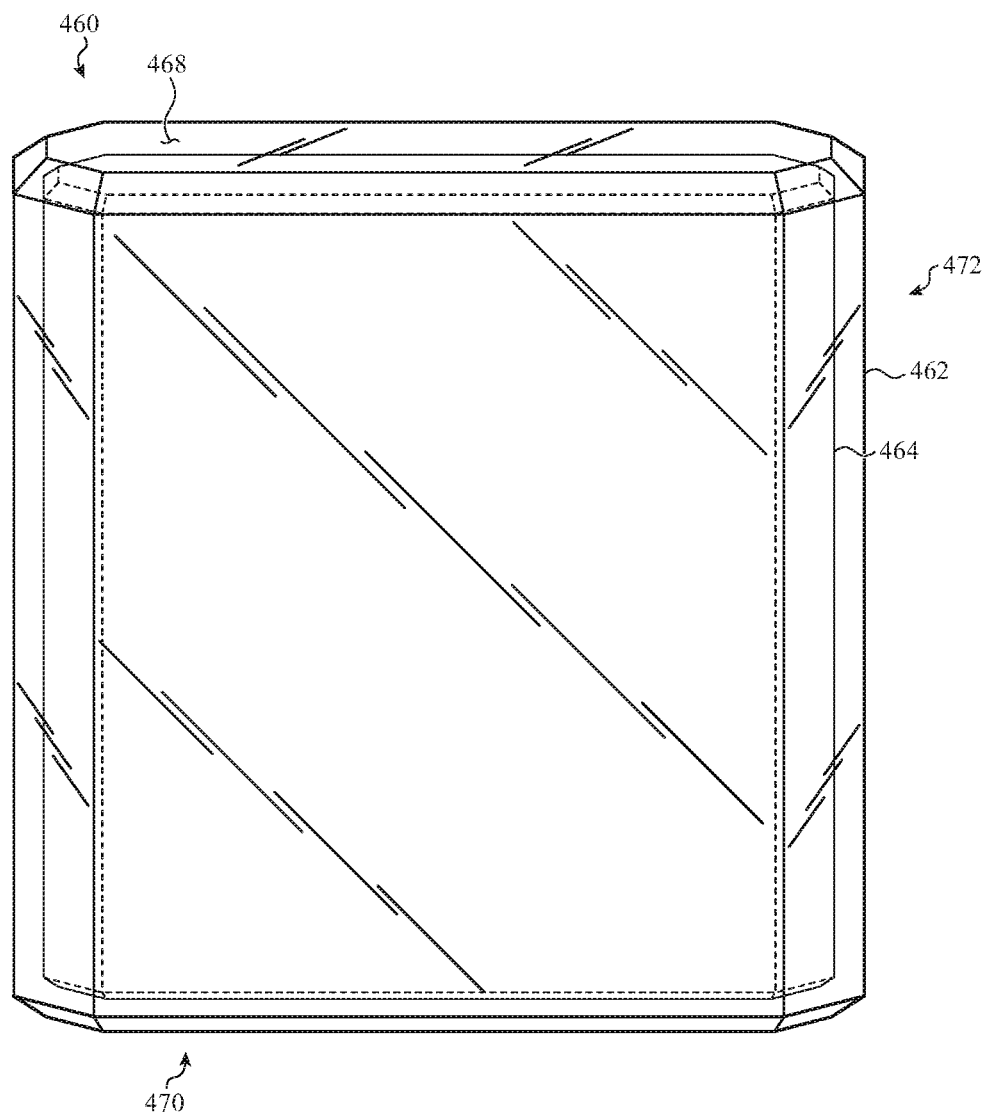

FIGS. 4A-4B illustrate different display regions in a device that resembles a rectangular prism with rounded sides. However, similar concepts may be applied to devices and/or enclosures of other shapes as well. FIGS. 4C-4E show example devices of various other shapes and/or configurations, and which may use glass enclosures and displays that are viewable through multiple sides and/or surfaces of the enclosure.

FIG. 4C is a perspective view of a device 420 having a generally cylindrical enclosure 422. The enclosure 422 may be formed of glass, as described with respect to other enclosures herein, and may be transparent along all or substantially all of the surfaces. Due to the cylindrical shape of the enclosure 422, the enclosure may not have six separate sides, as may be the case with substantially rectangular enclosures, but instead may have two circular bases 426, 430 and a cylindrical wall 428, all or a subset of which may be transparent or substantially transparent. Thus, FIG. 4C illustrates an example device that is transparent on all sides, even though the geometry of the enclosure may be considered to have fewer than six distinct sides.

Similar to the device 400, described above, the device 420 may have a display 424 with display regions that correspond to or are otherwise distinguishable based on the geometry of the enclosure 422. For example, the device 400 may include a main display region 436 that extends completely or substantially completely around the circumference of the cylindrical wall portion of the device 400. The device 400 may also include peripheral display regions 434-1, 434-2, and base display regions 432-1, 432-2. The different display regions of the device 400 may correspond to distinctive physical features of the enclosure 422, such as the physically different surface regions defined by the cylindrical wall, the bases, and the curved transition between the cylindrical wall and the bases. Further, as described above, the physical distinctions between the surface regions may reinforce or indicate different functional areas of the device 420. For example, affordances such as volume controls, ring/mute affordances, WiFi affordances, and the like, may be displayed on one or both of the peripheral display regions 434-1, 434-2, while the main display region 436 may display a main page of a GUI, and the base display regions 432-1, 432-2 display informational content such as stock tickers, time and date, weather information, and the like.

FIG. 4D is a perspective view of a device 440 having an enclosure 442 in the shape of an elliptic cylinder. The enclosure 442 may be formed of glass, as described with respect to other enclosures herein, and may be transparent along all or substantially all of the surfaces. The enclosure 442 may have two elliptical bases 446, 450 and a cylindrical wall 448, all or a subset of which may be transparent or substantially transparent.

Similar to the device 400, described above, the device 420 may have a display 444 with display regions that correspond to or are otherwise distinguishable based on the geometry of the enclosure 442. For example, the device 440 may include a main display region 456 that extends completely or substantially completely around the circumference of the cylindrical wall portion of the device 440. The device 440 may also include peripheral display regions 454-1, 454-2, and base display regions 452-1, 452-2. The different display regions of the device 440 may correspond to distinctive physical features of the enclosure 442, such as the physically different surface regions defined by the cylindrical wall, the elliptical bases, and the curved transition between the cylindrical wall and the elliptical bases. Further, as described above, the physical distinctions between the surface regions may reinforce or indicate different functional areas of the device 440. For example, affordances such as volume controls, ring/mute affordances, WiFi affordances, and the like, may be displayed on one or both of the peripheral display regions 454-1, 454-2, while the main display region 456 may display a main page of a GUI, and the base display regions 452-1, 452-2 display informational content such as stock tickers, time and date, weather information, and the like.

FIG. 4E is a perspective view of a device 460 having an enclosure 462 in the shape of an octagonal prism. The enclosure 462 may be formed of glass, as described with respect to other enclosures herein, and may be transparent along all or substantially all of the surfaces. The enclosure 462 may have two octagonal bases 468, 470, and a main wall 472 that includes eight segments or facets, each corresponding to one of the sides of the octagonal bases. Like the other enclosures described herein, all or a subset of the sides and bases may be transparent or substantially transparent.

Similar to the device 400, described above, the device 460 may have a display 464 with display regions that correspond to or are otherwise distinguishable based on the geometry of the enclosure 462. For example, the display 464 may have a display region corresponding to each facet or segment of the main wall 472, as well as a display region corresponding to each of the octagonal bases. Accordingly, as described above, the physical distinctions between the various sides and facets of the enclosure 462 may reinforce or indicate different functional areas of the device 460. For example, affordances such as volume controls, ring/mute affordances, WiFi affordances, and the like, may be displayed on the display regions corresponding to the smaller facets of the main wall 472, while the display regions corresponding to the larger facets of the main wall 472 may display a main page of a GUI, and the display regions corresponding to the octagonal bases of the enclosure 462 may display informational content such as stock tickers, time and date, weather information, and the like.

While FIGS. 4C-4E show enclosures having various shapes that differ from the generally rectangular prism shapes shown in other figures, it will be understood that the concepts described with respect to enclosures of one shape may be applied to enclosures of any other shape shown herein. For example, while FIGS. 6A-9B and 10A-15 include enclosures having substantially cuboid shapes to illustrate techniques of joining glass components together, the same techniques may be applied to join glass components of enclosures of other shapes, such as triangular prisms, cylinders, or any other shape.

In FIGS. 1A-1B, the device 100 is shown without any openings or apertures through the enclosure 102 to allow for speaker outputs, charging ports, physical buttons/switches, or the like. Moreover, these figures show the device 100 without any openings through the display 116 to allow for speaker openings, charging ports, camera lenses, light projectors/flashes, or the like. In such cases, the device 100 may include systems that provide these types of functionalities without requiring openings in the display 116 and/or the enclosure 102. For example, sound (e.g., for videos, telephone calls, or the like) may be produced by piezoelectric or other acoustic actuators inside the display 116 that transmit sound through the enclosure 102, optionally using the enclosure 102 as a sound-producing component (e.g., as a speaker diaphragm). The device 100 may also include wireless charging components within (e.g., surrounded by) the interior volume defined by the display 116, facilitating device charging through the display and the enclosure and obviating the need for charging ports. The display 116 may also include transparent areas (or areas that can be either an active display area or a transparent area) that may be aligned with internal cameras, projectors, flashes, or other optical components to allow such components to receive and/or transmit light through the enclosure 102.

The foregoing figures illustrate several examples of devices in which a glass enclosure provides visibility through all of its sides to a display that displays graphical output through all of the major sides of the enclosure. In some cases, advantages and benefits of glass enclosures may be realized in embodiments where not every side is transparent and associated with a display, however. In some cases, only two, three, four, or five of the sides of the enclosure may be transparent and associated with an underlying display. For example, a device may have transparent first and second major sides (e.g., sides 104, 106 in FIG. 1A, which may correspond to front and back sides of a device) and transparent second, third, and fourth peripheral sides (e.g., sides 110, 112, 114 in FIG. 1A), while the first peripheral side (e.g., side 108 in FIG. 1A), which may act as or appear to be the "bottom" of the device, may not have an associated display and/or may not be transparent. As another example, both the first peripheral side 108 (e.g., the "bottom" of the device) and the third peripheral side 112 (e.g., the "top" of the device) may lack an associated display and/or may not be transparent. In such cases, the sides that lack a display or that are not transparent may be used to hide seams between enclosure components and/or incorporate opaque regions (e.g., masks), openings for chargers, speakers, microphones, cameras, or the like.

Moreover, while some embodiments of the described devices are capable of use in multiple different orientations (e.g., allowing either major side to act as the front, and either of the short sides of the device to act as the top), other configurations may maintain some fixed cardinality. For example, in some cases, a speaker is located proximate one end of the device (e.g., a "top") and a microphone is located proximate an opposite end (e.g., a "bottom"), similar to conventional telephones. In such cases, certain functions (e.g., voice communications in which a device is held adjacent a user's head) may require that the device be held or used in a certain orientation.

As noted above, a device with transparent sides may use an enclosure formed entirely or partially of glass (or other suitable materials, as described below). For a device with multiple sides formed of transparent glass (e.g., three, four, five, or six sides), assembling an enclosure by attaching distinct glass panels together may not produce an enclosure of suitable strength and/or transparency. For example, the enclosure may require internal structures to ensure proper alignment between the various panels and to join the panels. Moreover, the seams between adjacent panels may interfere with the visibility of the underlying displays. In order to avoid these and other potential drawbacks, a glass enclosure may be formed using various techniques that may reduce or minimize the number or visibility of seams or joints between glass components while producing a suitably strong enclosure to protect the internal components of the electronic device and otherwise be sufficiently resistant to breakage or damage.

The glass enclosures described herein may be formed of any suitable glass, including soda lime glass, aluminosilicate glass, borosilicate glass, chemically strengthened glass, or any other suitable type of glass. Other transparent materials may be used to form enclosures that may be used with devices as described herein, such as polymers, sapphire, transparent ceramics, fused quartz, or the like.

Figure 5A:
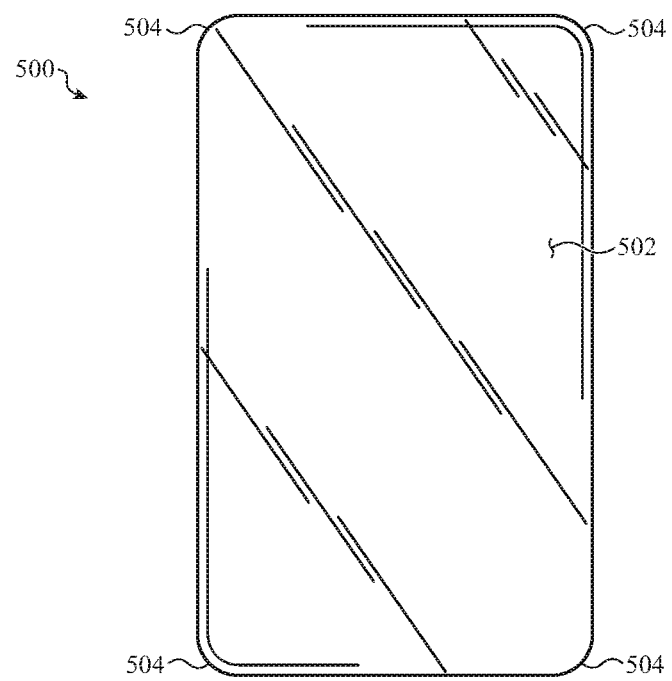
FIGS. 5A-5B depict an example glass enclosure for an electronic device.
Figure 5B:
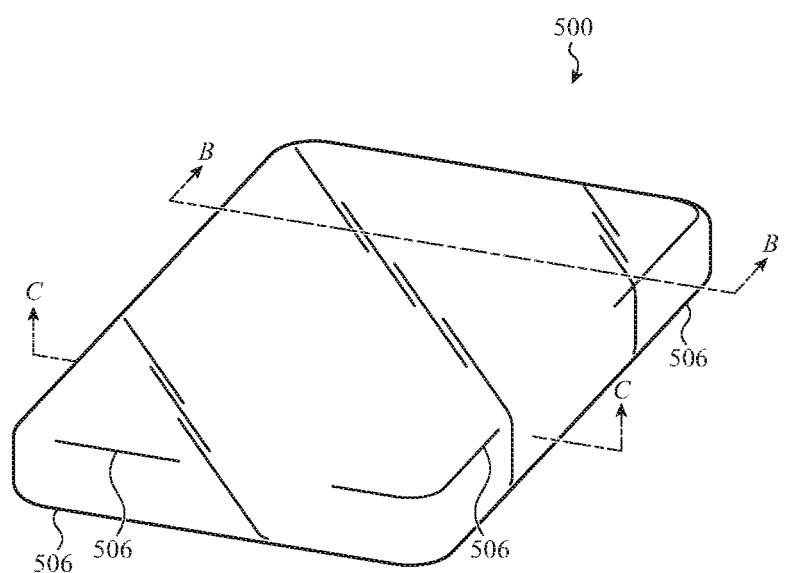

FIGS. 5A and 5B are front and perspective views, respectively, of a glass enclosure 500 for an electronic device. The glass enclosure 500 may define substantially all of the exterior surfaces of the electronic device. For example, the glass enclosure 500 is shown as defining six sides, corresponding to the first and second major sides and the four peripheral sides, as described above with respect to FIG. 1A. The glass enclosure 500 may define an interior volume in which components of the electronic device are received (e.g., processors, memory, display(s), battery, sensors, cameras, circuitry, and the like). For clarity and ease of reference, the glass enclosure 500 is shown in a simplified shape as compared to the enclosures shown in FIGS. 1A-1B. However, it will be understood that the shape of the glass enclosure 500 is merely for illustration, and that the glass enclosure 500 may represent other enclosure shapes and configurations, including enclosures with continuous contoured corners (e.g., including the corners 504 between two peripheral sides, as well as the corners 506 between a major side and a peripheral side).

FIGS. 6A-15 illustrate various ways in which a six-sided glass enclosure 500 may be formed. These configurations may help produce enclosures that are particularly suited to provide multiple transparent side walls through which displays can be viewed and interacted with. For example, these configurations may position seams or joints between various glass members or components in locations where they are less visible or otherwise less likely to interfere with viewing and interacting with an underlying display. Moreover, these configurations may aid in the assembly of components within the interior volume of the enclosure by forming parting lines and/or openings in suitable locations to allow for components to be inserted in the enclosure during or after the enclosures are assembled or bonded.

In FIGS. 6A-15, where two or more glass components are joined, they may be attached to one another in any suitable manner. For example, glass components may be joined together using glass frit bonding, adhesive, epoxy, fusion bonding (e.g., laser welding), ultrasonic welding, or any other suitable joining technique or medium. In some cases, the glass components may have interlocks or other engagement structures that mechanically engage to retain components together. Such engagement structures may be used instead of or in addition to other joining techniques (e.g., frit bonding, fusion bonding, adhesive bonding, and so on). Several examples of joints between different glass components are described herein with respect to FIGS. 6A-15. As noted, any of these techniques may be used singly or in various combinations to join components shown in the following figures. For example, in some cases additive manufacturing (e.g., 3-D printing) may be In some cases, instead of joining two or more pre-formed enclosure components to form the enclosure, the enclosure material may be formed using additive manufacturing and/or three dimensional printing processes, such as selective laser sintering, stereolithogrophy, or the like. In some cases, the enclosure may be formed around internal components of a device. For example, internal electrical components may positioned in an additive manufacturing apparatus, and all or part of an enclosure may formed around the electrical components, thereby at least partially enclosing the electrical components within the enclosure. Subsequent processing steps may then be performed with respect to the device, including polishing, lapping, or otherwise processing the resultant enclosure, forming openings in the enclosure, and the like.

Any of the techniques described herein for forming enclosures may be used singly or in various combinations. For example, additive manufacturing (e.g., 3-D printing) may be used to form an entire seamless enclosure. In other cases, additive manufacturing may be used to form two or more enclosure components that may subsequently be joined together (e.g., with frit bonding, adhesive, or the like) to form the enclosure. Other techniques are also contemplated.

Figure 6A:
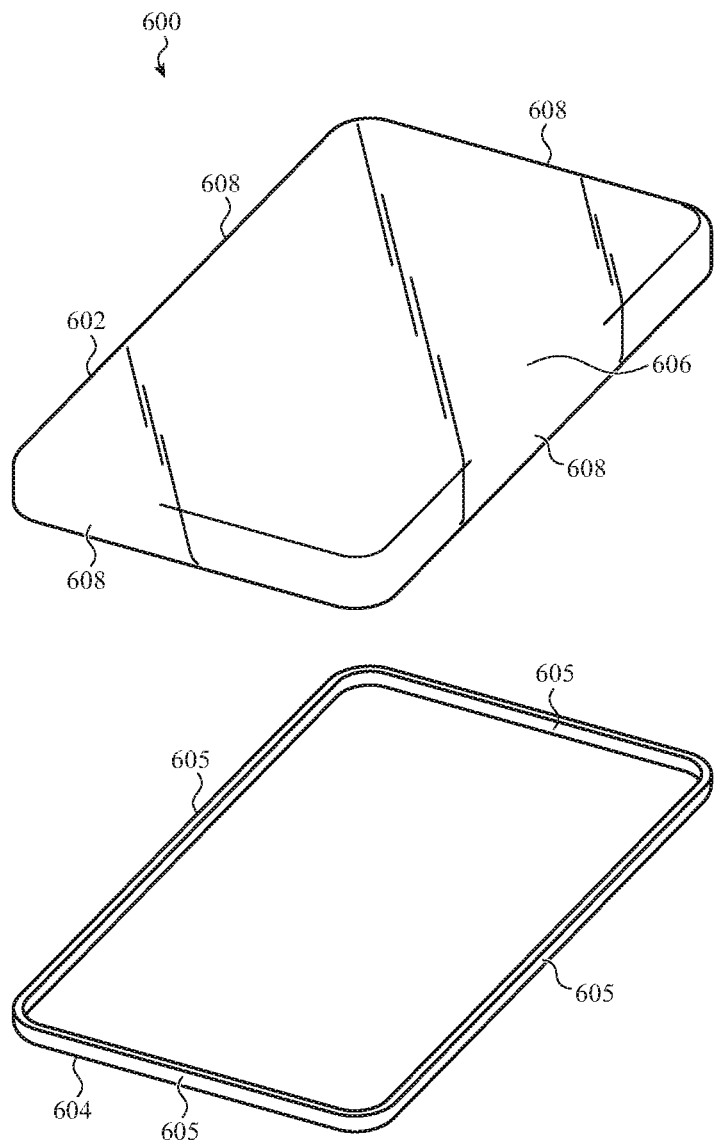
FIGS. 6A-6E depict an example multi-part glass enclosure for an electronic device.
Figure 6B:
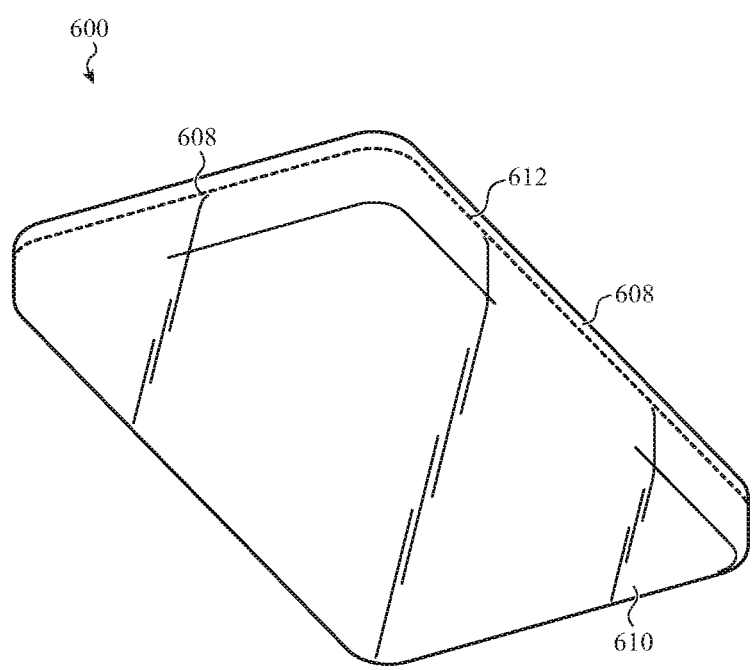

FIGS. 6A-6B show perspective views of an enclosure 600, with FIG. 6A showing the enclosure 600 in an unassembled state, and FIG. 6B showing the enclosure 600 in an assembled state. The enclosure 600 includes a first glass member 602 and a second glass member 604, either or both of which may be monolithic glass members. The first glass member 602 defines a first major side 606 (e.g., a transparent front portion) and substantially all of the peripheral sides 608 of the enclosure 600. The first glass member 602 thus defines substantially all of five sides of both the exterior surface of the enclosure 600 and of an interior cavity or volume in which internal components of a device may be positioned.

The second glass member 604 defines a second major side 610 (e.g., a transparent back portion) of the enclosure 600. When the first glass member 602 and the second glass member 604 are joined, the sides 605 of the second glass member 604 may define a portion of the peripheral sides 608 of the enclosure 600. As shown in FIG. 6B, when joined, a seam 612 may be formed between the first glass member 602 and the second glass member 604. Because the first glass member 602 defines substantially all of the peripheral sides of the enclosure (e.g., substantially all of each peripheral side, extending from the first major side almost the entire way to the second major side), the seam 612 may be positioned away from the middle of the peripheral sides. This configuration may place the seam 612 out of the main viewing area of any displays that may be viewable through the peripheral sides. In some cases, as described with respect to FIG. 21C, the joining regions of the first and second members 602, 604 may be mitered or angled, so that the seam 612 is not visible on the peripheral sides, but rather is positioned directly on the corner between the peripheral sides 608 and the second major side 610 of the enclosure 600. As noted above, the first and second glass members 602, 604 may be joined using any suitable technique, including techniques that hide or otherwise minimize the visibility of the seam 612.

Figure 6C:
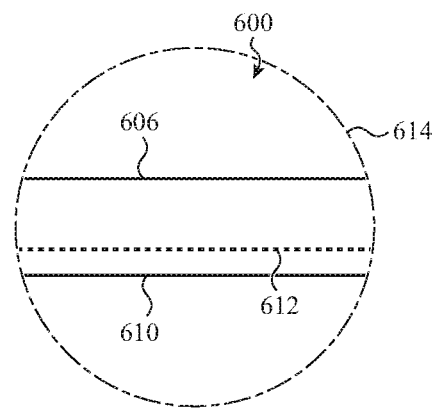
Figure 6D:
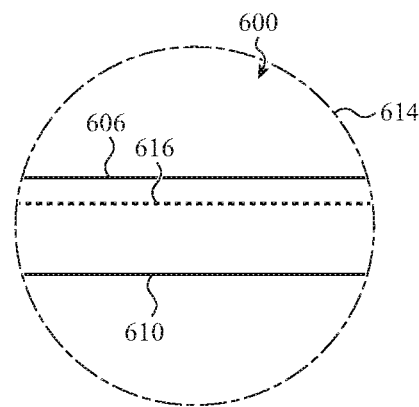
Figure 6E:
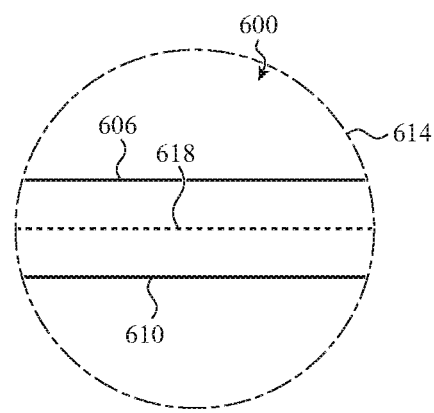

FIG. 6C is a detail view of a peripheral side of the enclosure 600, corresponding to the area 614 in FIG. 6B. As shown in FIG. 6C, the seam 612 is located closer to the second major side 610 than the first major side 606. FIG. 6D is a detail view, corresponding to the area 614, of another example embodiment of the enclosure 600, in which a seam 616 is located closer to the first major side 606 than the second major side 610. FIG. 6E is a detail view, corresponding to the area 614, of another example embodiment of the enclosure 600, in which a seam 618 is substantially equidistant from the first major side 606 and the second major side 610. The positioning of the seam may be determined based on any suitable factors or considerations, such as positioning displays and/or display regions, locations of seams in the underlying displays, and the like. As noted above and described in greater detail herein, techniques for hiding or reducing the visibility of a seam (e.g., the seams 612, 616, 618) may be used, including contoured or angled joint surfaces, transparent bonding materials, post-bonding finishing and/or polishing, or the like.

Figure 7A:
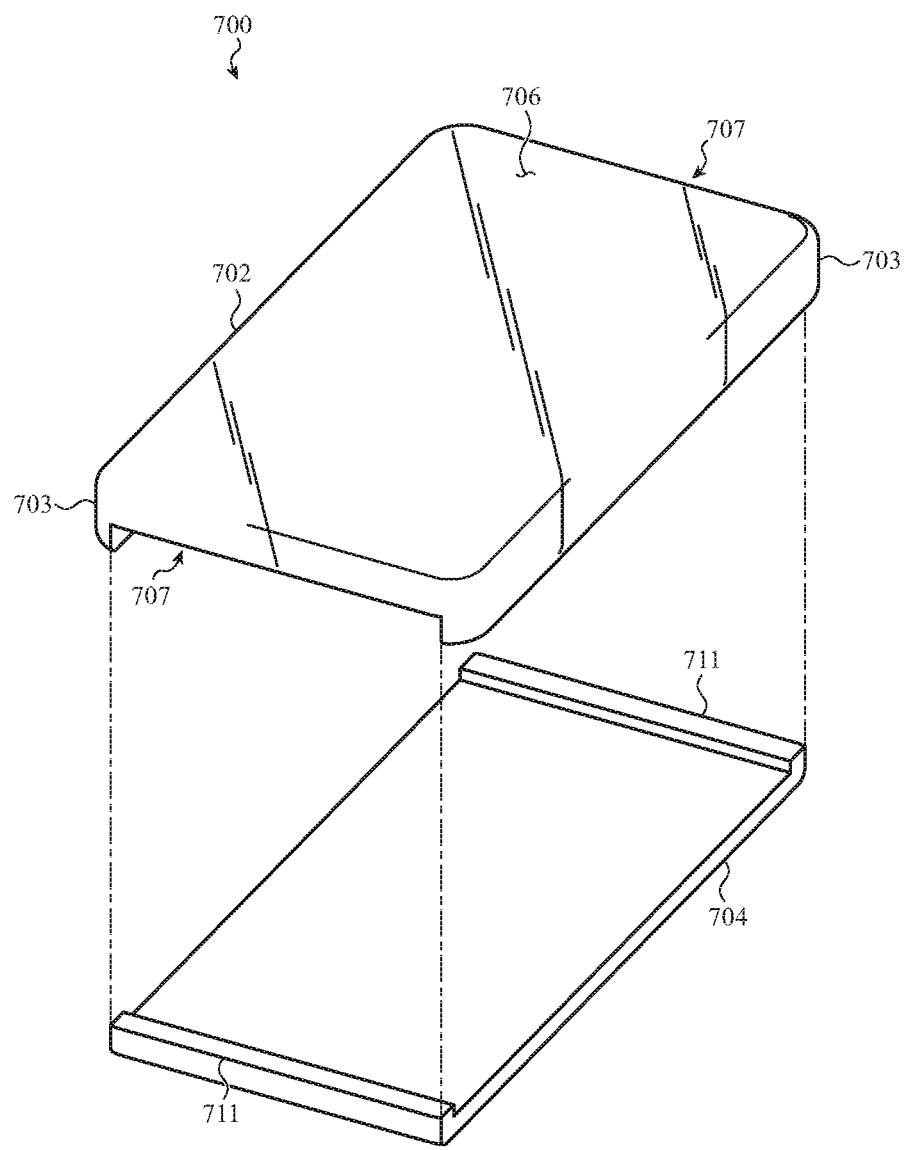
FIGS. 7A-7B depict another example multi-part glass enclosure for an electronic device.
Figure 7B:
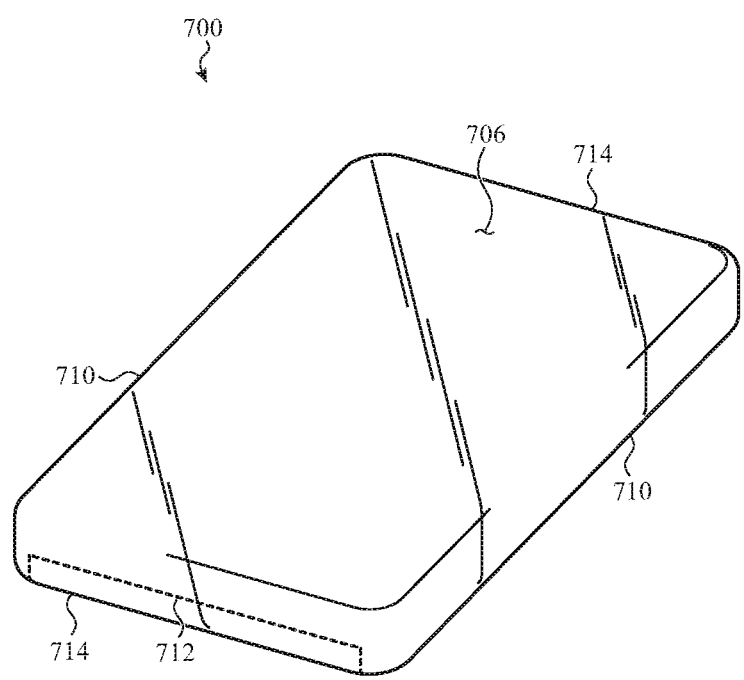

FIGS. 7A-7B show perspective views of an enclosure 700, with FIG. 7A showing the enclosure 700 in an unassembled state, and FIG. 7B showing the enclosure 700 in an assembled state. The enclosure 700 includes a first glass member 702 and a second glass member 704 (either or both of which may be monolithic glass members). The first glass member 702 defines a first major side 706 and includes walls or portions 703 that define substantially all of two substantially parallel peripheral sides (sides 710, FIG. 7B). The first glass member 702 may define none of or only a small portion of the other two peripheral sides (sides 714, FIG. 7B), thus defining notches 707 that receive corresponding walls 711 of the second glass member 704. The walls 711 of the second glass member 704 thus define substantially all of the remaining peripheral sides 714 (FIG. 7B) of the assembled enclosure 700.

The shapes of the first and second glass members 702, 704, and in particular the configuration in which each member defines substantially all of two opposite side walls, results in a seam 712 that does not follow a single linear path. Moreover, on each side of the enclosure 700, the seam 712 is positioned proximate to a corner of the enclosure 700 rather than extending through a middle of the surface or otherwise being positioned along a surface or wall through which a display is configured to be viewed. Furthermore, both the first and the second glass members 702, 704 each define substantially all of three adjacent of the sides of the enclosure 700. Thus, a single, unbroken glass component (e.g., the first glass member 702) may define the first major side 706 and the two peripheral sides 710 on opposite sides of the first major side 706. In embodiments where displays are viewable through each of these sides, the continuous configuration of the sides (e.g., having no seams) may help provide clear, undistorted, uninterrupted viewing and/or interaction surfaces.

The enclosure 700 may be used in embodiments where displays are viewable through only three sides of the enclosure 700 (e.g., a front side and two peripheral sides, corresponding to the sides that are defined by a monolithic piece of glass), as all of the seams may be placed outside of the viewable regions of the front- and side-facing displays. Moreover, because each of the glass members defines at least two opposite (optionally parallel) peripheral walls extending from the main portion of the glass member, both glass members may be stiffer and/or stronger than a simple, substantially featureless sheet.

Figure 8A:
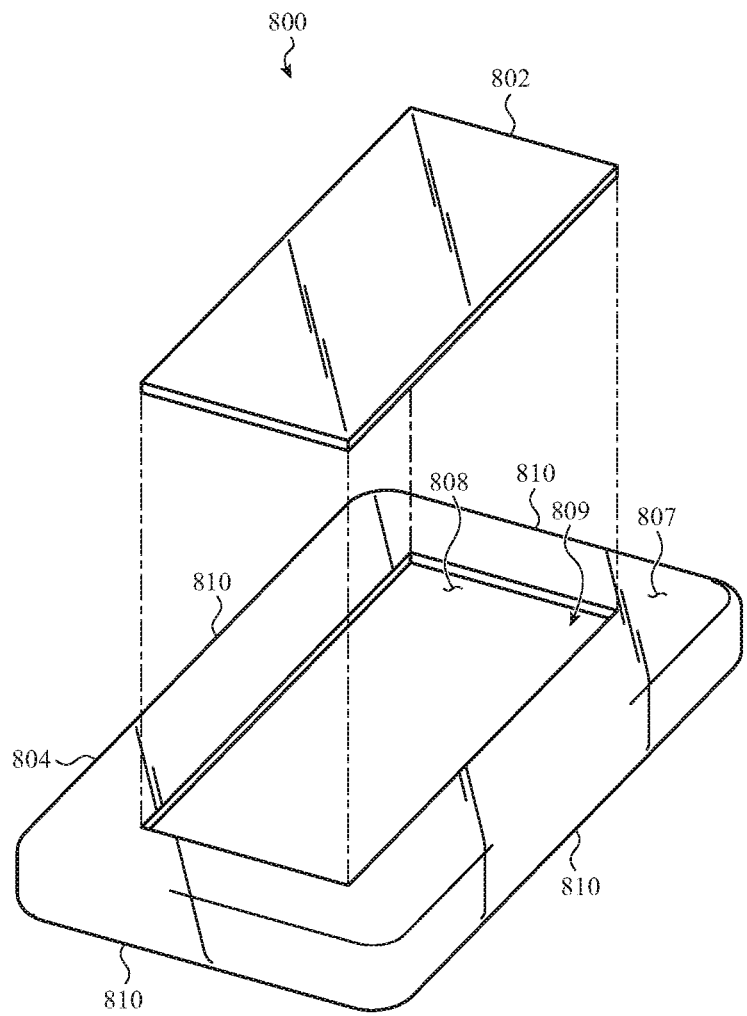
FIGS. 8A-8B depict another example multi-part glass enclosure for an electronic device.
Figure 8B:
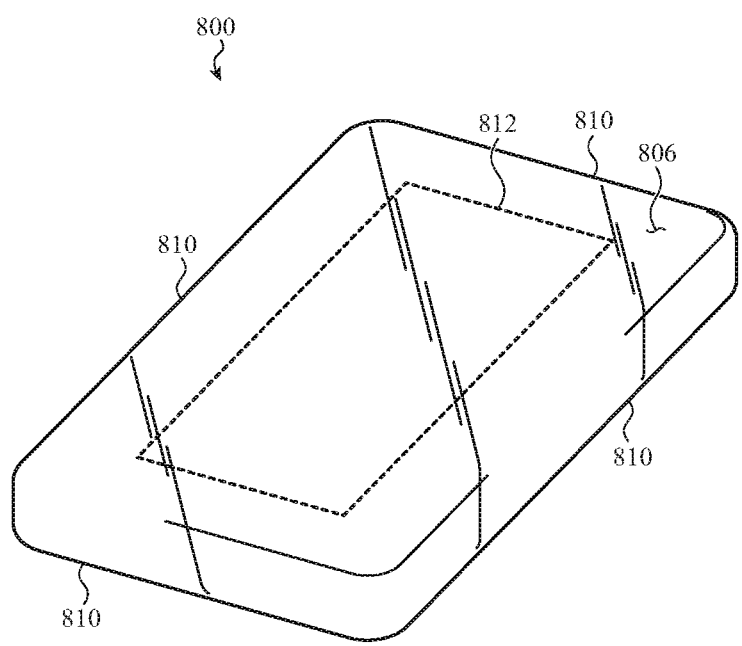

FIGS. 8A-8B show perspective views of an enclosure 800, with FIG. 8A showing the enclosure 800 in an unassembled state, and FIG. 8B showing the enclosure 800 in an assembled state. The enclosure 800 includes a first glass member 802 and a second glass member 804 (either or both of which may be monolithic). The first glass member 802 may be a substantially flat and/or featureless sheet that forms a portion of a first major side 806 (FIG. 8B). The second glass member 804 defines a second major side 808 and walls that define the peripheral sides 810 of the enclosure 800. The second glass member 804 also defines a portion 807 of the first major side 806. Thus, the portion 807 of the second glass member 804 may define an opening 809 that is configured to receive the first glass member 802 (e.g., the first glass member 802 may be positioned in the opening 809 and secured to the second glass member 804).

As shown in FIG. 8B, once assembled together, the enclosure 800 may have a seam 812 where the first and second glass members 802, 804 were joined together. Because the seam 812 may be inset from the corners of the first major side 806, the first major side may not be associated with an underlying display, and instead the second major side 808, defined by the second glass member 804, may be used as the primary interface and display surface of a device that uses the enclosure 800. In other cases, a display may be associated with a portion of the first major side 806 that does not include the seam, such as a peripheral area or a central area. In yet other cases, a first display may extend around the interior surface of the enclosure 800 and is visible through the first main side 806, the peripheral sides 810, and the peripheral portion 807 of the second glass member 804, while a second display having substantially the same size and shape of the first glass member 802 is beneath and visible through the second glass member 802.

Figure 9A:
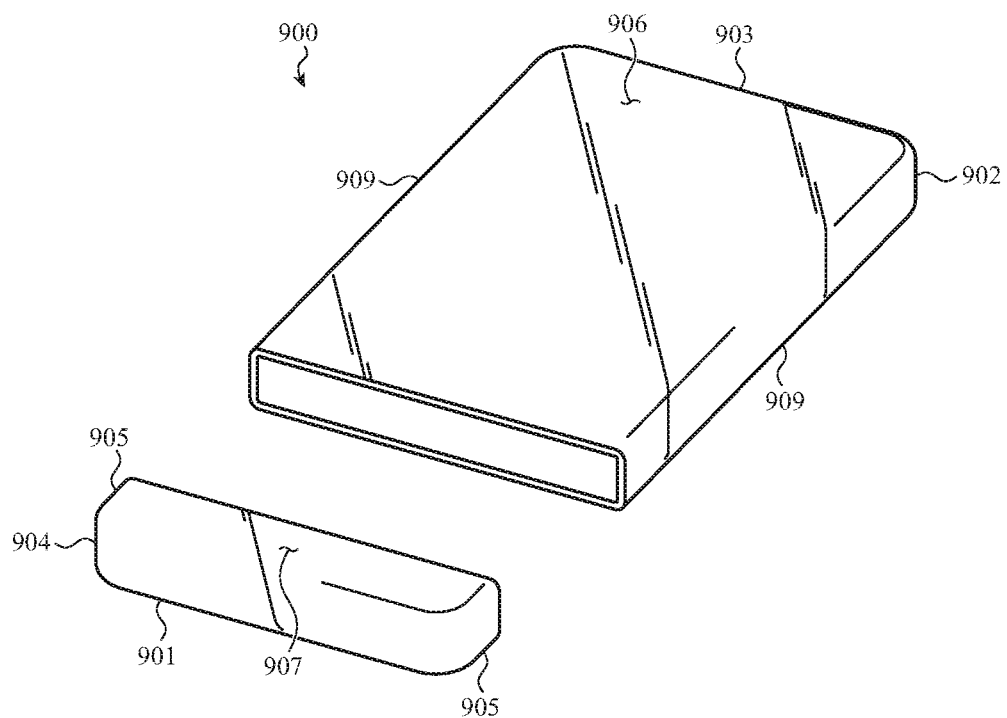
FIGS. 9A-9B depict another example multi-part glass enclosure for an electronic device.
Figure 9B:
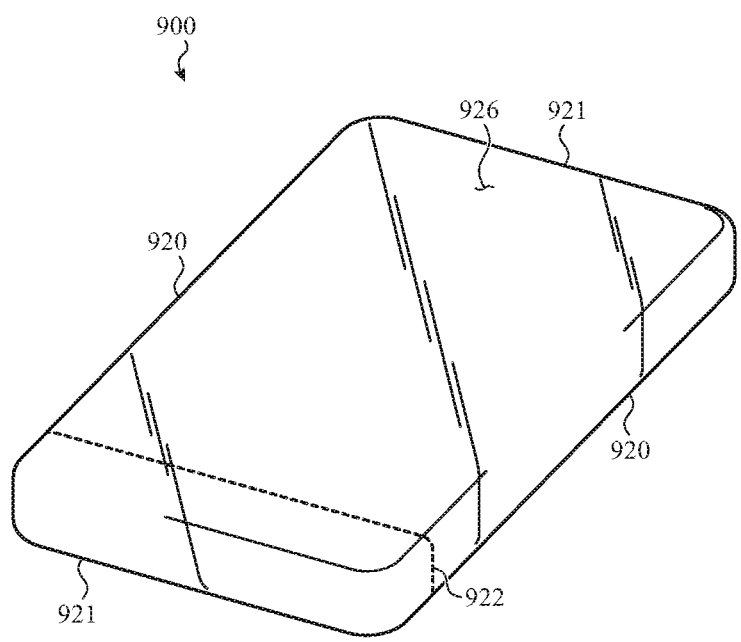

FIGS. 9A and 9B show perspective views of an enclosure 900, with FIG. 9A showing the enclosure 900 in an unassembled state, and FIG. 9B showing the enclosure 900 in an assembled state. The enclosure 900 includes a first glass member 902 and a second glass member 904 (either or both of which may be monolithic). The first glass member 902 may define a wall 906 that forms a portion (and in some cases substantially all) of a first major side 926 (FIG. 9B) and an opposite wall that defines a portion of a second major side opposite (e.g., parallel to) the first major side 926. The first glass member 902 may also include walls 909 that form a portion of two peripheral sides 920 (FIG. 9B), and a wall 903 that defines all of another peripheral side 921 (FIG. 9B) of the enclosure 900. The second glass member 904 may have a similar shape as the first glass member 902, and may include walls 905 that form another portion of two peripheral sides 920 (FIG. 9B), and a wall 901 that defines all of another peripheral side 921 (FIG. 9B) of the enclosure 900. Both the first and second glass members 902, 904 may define a portion of an interior cavity or volume in which components of an electronic device may be positioned.

The first and second glass members 902, 904 may be coupled to one another to form the complete enclosure 900, which may produce a seam 922 (FIG. 9B) that extends around the enclosure 900. In some cases, displays within the enclosure 900 may be positioned so that that seam does not extend over active display regions. For example, a device using the enclosure 900 may include displays that are visible through only the walls of the first glass member 902, and thus the seam 922 may not be visible or may not interfere with viewing the displays. In such cases, some or all of the second glass member 904 may be masked, painted, coated, or otherwise made opaque or translucent to cover or occlude underlying components, such as charging components, communication ports, wires, flex circuits, audio ports, cameras, projectors, sensors, or the like.

As shown in FIG. 9A, the first and second glass members 902, 904 each define a certain proportion of the outer surface of the enclosure 900. The sizes of these members in FIG. 9A, however, are merely exemplary, and they may have other dimensions and thus make up different proportions of the outer surface of the enclosure 900. For example, the first and second glass members 902, 904 may each define substantially half of the outer surface of the enclosure 900, resulting in a seam 922 that substantially bisects the enclosure 900. Other configurations are also contemplated.

As shown in FIG. 9A, the first and second glass members 902, 904 may be coupled to one another along a butt joint, where substantially perpendicular faces of glass are placed in contact or in proximity to one another and bonded, adhered, fused, or otherwise secured to one another. Other types of joints for attaching the first and second glass members 902, 904 are also contemplated, as described with respect to FIGS. 19A-20B.

Figure 9C:
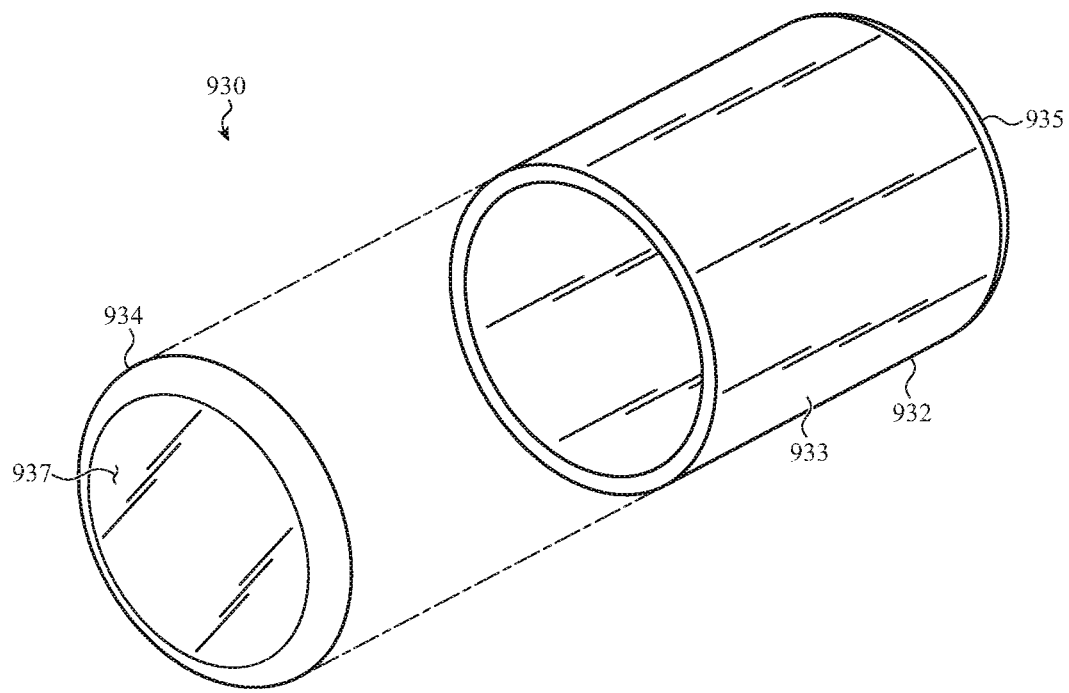
FIGS. 9C-9D depict another example multi-part glass enclosure for an electronic device.
Figure 9D:
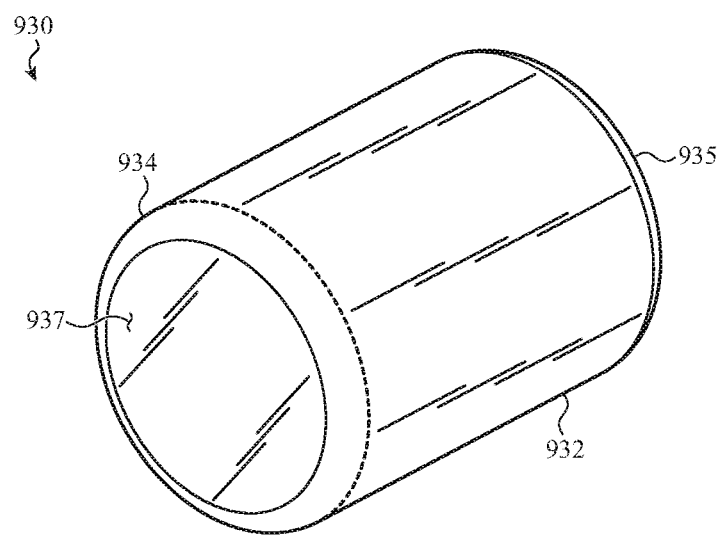

FIGS. 9C-9D show perspective views of an enclosure 930, with FIG. 9C showing the enclosure 930 in an unassembled state, and FIG. 9D showing the enclosure 930 in an assembled state. While the shape of the enclosure 900 is or resembles a rectangular prism, the enclosure 930 is substantially cylindrical, and may correspond to or be an embodiment of the enclosure 422 of FIG. 4C. The enclosure 930 includes a first glass member 932 and a second glass member 934. The first glass member 932 may be substantially cylindrical and may define all or substantially all of a cylindrical wall 933 and a base 935 of the enclosure 930. The second glass member 934 may form define another base 937 of the enclosure, and may define part of the cylindrical wall 933. Both the first and second glass members 932, 934 may define a portion of an interior cavity or volume in which components of an electronic device may be positioned.

The first and second glass members 932, 934 may be coupled to one another to form the complete enclosure 930, which may produce a seam 936 (FIG. 9D) that extends around the enclosure 930. As shown in FIG. 9C, the first and second glass members 932, 934 each define a certain proportion of the outer surface of the enclosure 930. The sizes of these members in FIG. 9C, however, are merely exemplary, and they may have other dimensions and thus make up different proportions of the outer surface of the enclosure 930. For example, the first and second glass members 932, 934 may each define substantially half of the outer surface of the enclosure 930, resulting in a seam 936 that substantially bisects the enclosure 930. Other configurations are also contemplated.

Similar to the discussion with respect to FIG. 9A, the first and second glass members 932, 934 may be coupled to one another along a butt joint, where substantially perpendicular faces of glass are placed in contact or in proximity to one another and bonded, adhered, fused, or otherwise secured to one another. Other types of joints for attaching the first and second glass members 932, 934 are also contemplated, as described with respect to FIGS. 19A-20B.

Figure 10A:
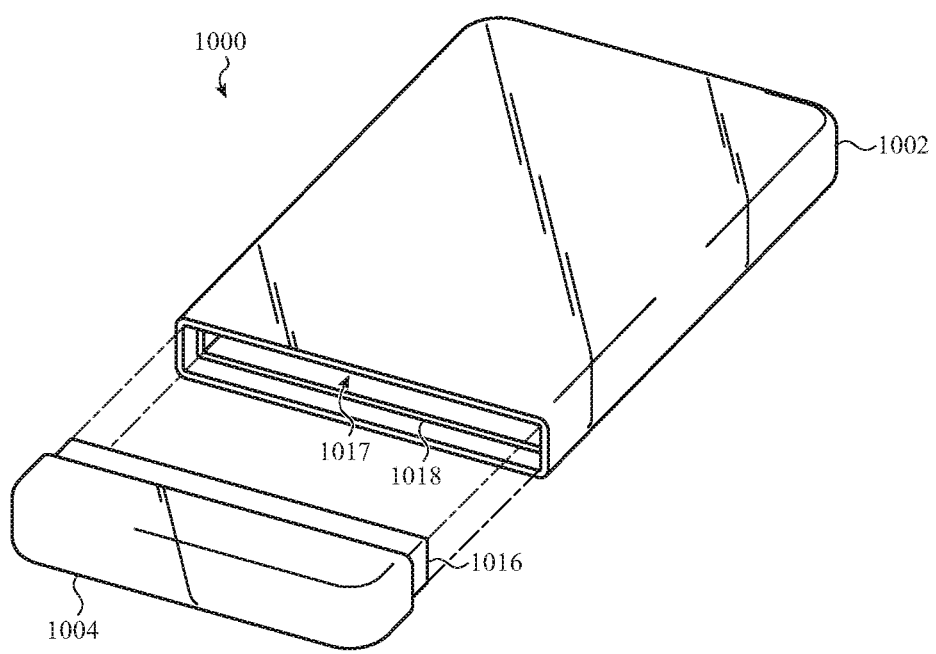
FIGS. 10A-10B depict another example multi-part glass enclosure for an electronic device.
Figure 10B:
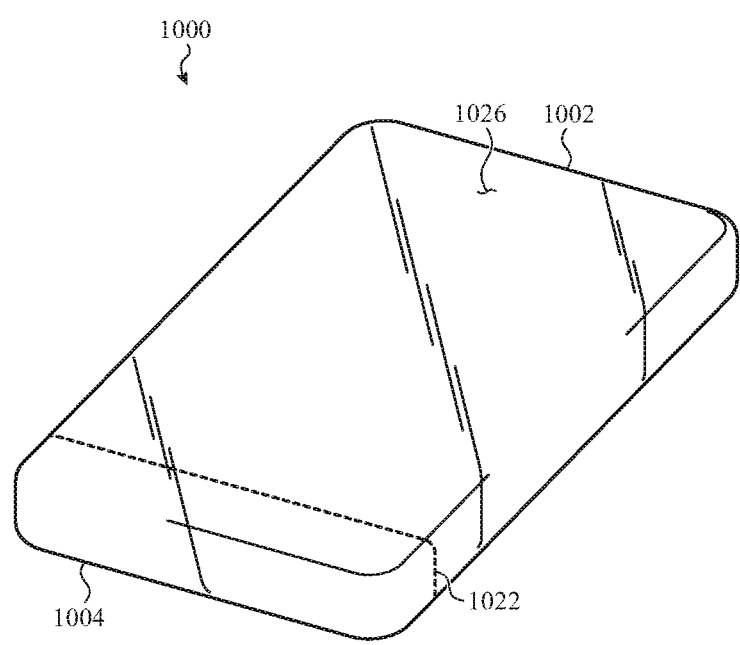

FIGS. 10A-10B show perspective views of an enclosure 1000, with FIG. 10A showing the enclosure 1000 in an unassembled state, and FIG. 10B showing the enclosure 1000 in an assembled state. The enclosure 1000 includes a first glass member 1002 and a second glass member 1004, which may be substantially similar to the first and second glass members 902, 904 in FIGS. 9A-9B. However, the second glass member 1004 may include a ledge 1016 (which may be a segment of glass having a reduced thickness relative to an adjacent portion of the second glass member 1004) that is received within the first glass member 1002. The first glass member 1002 may define a reduced thickness region 1018 around the opening of an aperture 1017, and the ledge 1016 may be received on and/or contact the reduced thickness region 1018. Once assembled, the first and second glass members 1002, 1004 may be joined using any suitable technique to define an enclosure that appears substantially similar to the enclosure shown in FIGS. 9A-9B. Moreover, the first and second glass members 1002, 1004 may define substantially continuous and/or planar exterior and interior surfaces in the regions of the ledge 1016 and the reduced thickness region 1018. More particularly, the ledge 1016 and reduced thickness region 1018 may be configured and sized so that, when assembled, the wall thickness of the first and second glass members 1002, 1004 in the area of the seam 1022 is substantially constant and there is no ledge or discontinuity on the inner and/or exterior surfaces where the two members meet.

Figure 11A:
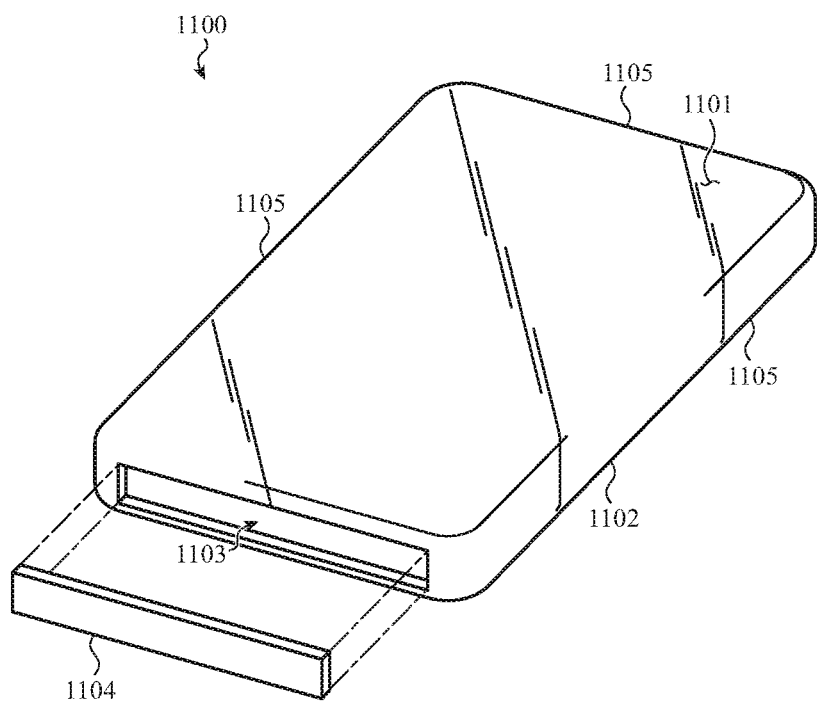
FIGS. 11A-11B depict another example multi-part glass enclosure for an electronic device.
Figure 11B:
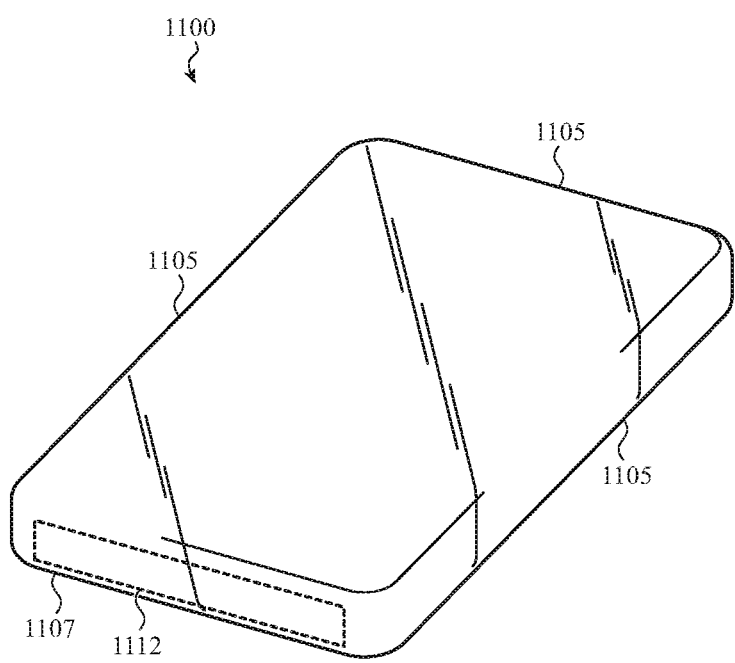

FIGS. 11A-11B show perspective views of an enclosure 1100, with FIG. 11A showing the enclosure 1100 in an unassembled state, and FIG. 11B showing the enclosure 1100 in an assembled state. The enclosure 1100 includes a first glass member 1102 and a second glass member 1104 (either or both of which may be monolithic). The first glass member 1102 may define a first major side 1101 and a second major side (opposite and/or parallel to the first major side), as well as all or substantially all of three peripheral sides 1105 of the enclosure 1100. The first glass member 1102 may define an opening 1103 at an end of the enclosure, and a second glass member 1104 may be coupled to the first glass member 1102 to close or cover the opening 1103 (and optionally seal the enclosure) and define a fourth peripheral side 1107 of the enclosure 1100.

The second glass member 1104 may be inserted into the opening 1103 such that end portions of the first glass member 1102 define part of the fourth peripheral side 1107 (as shown in FIG. 11B), and a seam 1112 is positioned on the fourth peripheral side 1107. In other embodiments, it may abut the first glass member 1102 such that sides of the second glass member 1104 define portions of the first and second major sides and the peripheral sides 1105 of the enclosure. In some cases, the first and/or second glass members 1102, 1104 may be configured so that a seam is positioned on or along a rounded corner or region between the sides defined by the first glass member 1102 and the fourth peripheral side 1107 defined by the second glass member 1104. The enclosure 1100 may be used in embodiments where there is no display visible through the peripheral side 1107. In such cases, the seam between the first and second glass members 1102, 1104 may have little or no effect on the visibility of the displays within the enclosure 1100, as the seam may not overlie or otherwise interrupt a viewing surface. Moreover, as noted above, the second glass member 1104 (and optionally part of the first glass member 1102 proximate the second glass member 1104) may be masked, painted, coated, or otherwise made opaque or translucent to cover or occlude underlying components, such as charging components, communication ports, wires, flex circuits, audio ports, cameras, projectors, sensors, or the like.

Figure 12A:
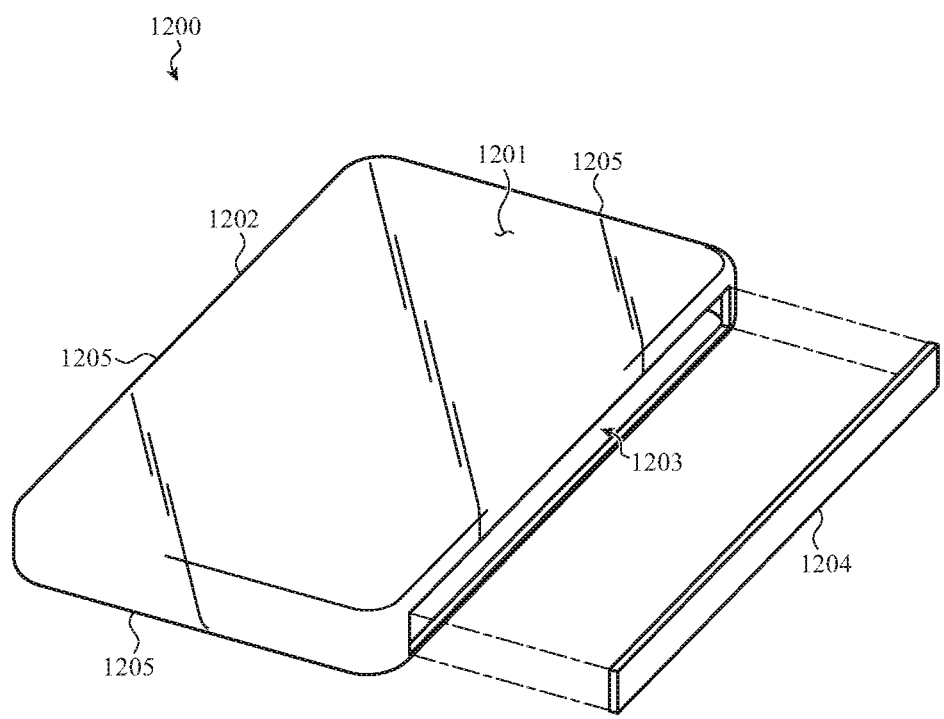
FIGS. 12A-12B depict another example multi-part glass enclosure for an electronic device.
Figure 12B:
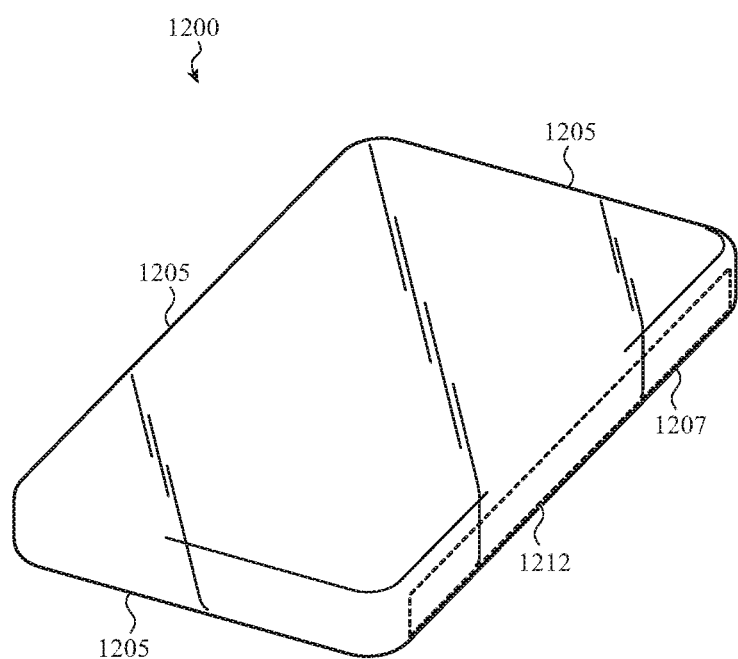

FIGS. 12A-12B show perspective views of an enclosure 1200, with FIG. 12A showing the enclosure 1200 in an unassembled state, and FIG. 12B showing the enclosure 1200 in an assembled state. The enclosure 1200 includes a first glass member 1202 and a second glass member 1204 (either or both of which may be monolithic). The first glass member 1202 may define a first major side 1201 and a second major side (opposite and/or parallel to the first major side), as well as all or substantially all of three peripheral sides 1205 of the enclosure 1200. The first glass member 1202 may define an opening 1203 at an end of the enclosure, and a second glass member 1204 may be coupled to the first glass member 1202 to close or cover the opening 1203 (and optionally seal the enclosure) and define a fourth peripheral side 1207 of the enclosure 1200. The enclosure 1200 is similar to the enclosure 1100, but instead of the opening being positioned along a short side of the enclosure (as in the enclosure 1100), the enclosure 1200 has its opening positioned along a long side of the enclosure 1200. This configuration may provide a larger opening for inserting electronic device components, such as displays, display assemblies, batteries, processors, and the like.

Similar to the description relating to the enclosure 1100, the second glass member 1204 may be inserted into the opening 1203 such that end portions of the first glass member 1202 define part of the fourth peripheral side 1207 (as shown in FIG. 12B), and a seam 1212 is positioned on the fourth peripheral side 1207. In other embodiments, it may abut the first glass member 1202 such that sides of the second glass member 1204 define portions of the first and second major sides and the peripheral sides 1205 of the enclosure. In some cases, the first and/or second glass members 1202, 1204 may be configured so that a seam is positioned on or along a rounded corner or region between the sides defined by the first glass member 1202 and the fourth peripheral side 1207 defined by the second glass member 1204.

FIGS. 10A-12B describe enclosures in which a first glass member that defines the major sides of the enclosure has one open end, and a second glass member is attached to the first glass member to define one of the peripheral sides of the enclosure. In some cases, multiple ends of the first glass member are open, and multiple second glass members may be attached to the first glass member to enclose the enclosure and define the peripheral sides of the enclosure. For example, the first glass member may resemble a tube or other hollow structure with two opposing open ends. Two second glass members (which may be similar or identical the single-instances of the second glass members shown in FIGS. 10A-12B) may be attached to the first glass member to define opposite peripheral sides of the enclosure.

Figure 13A:
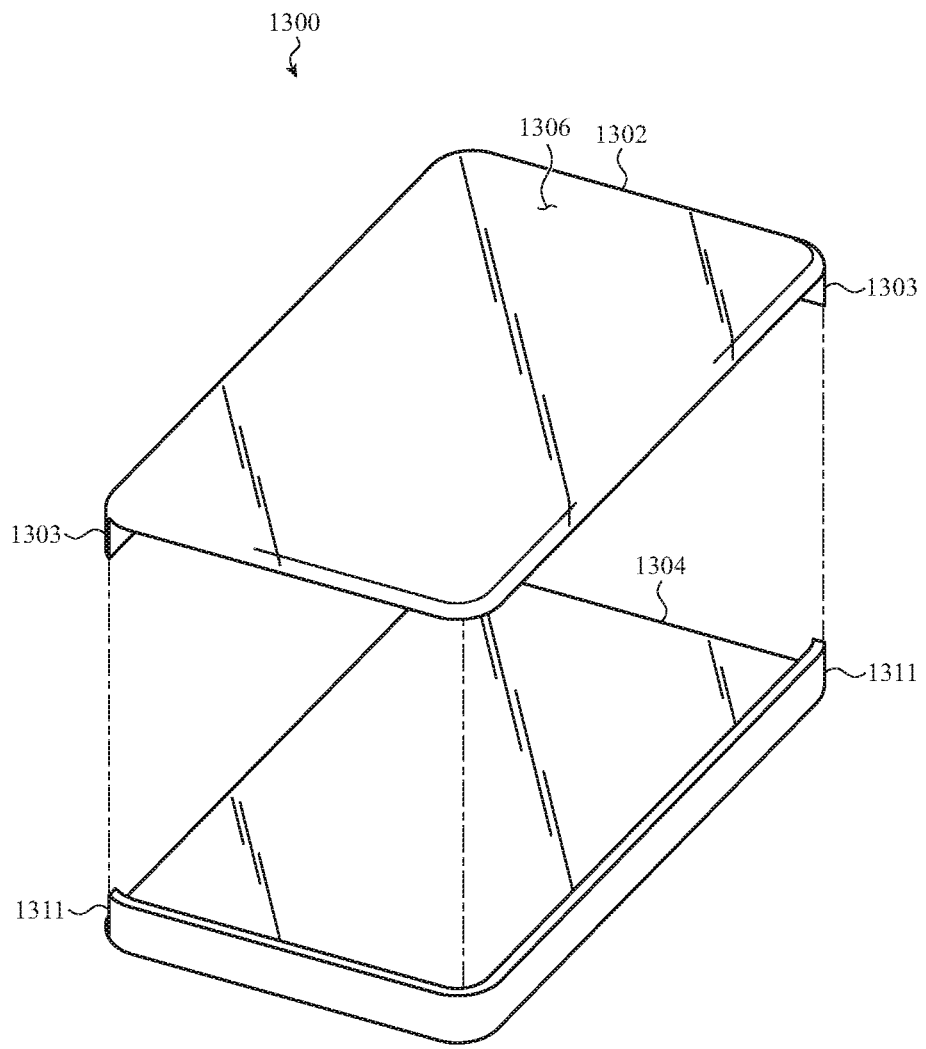
FIGS. 13A-13B depict another example multi-part glass enclosure for an electronic device.
Figure 13B:
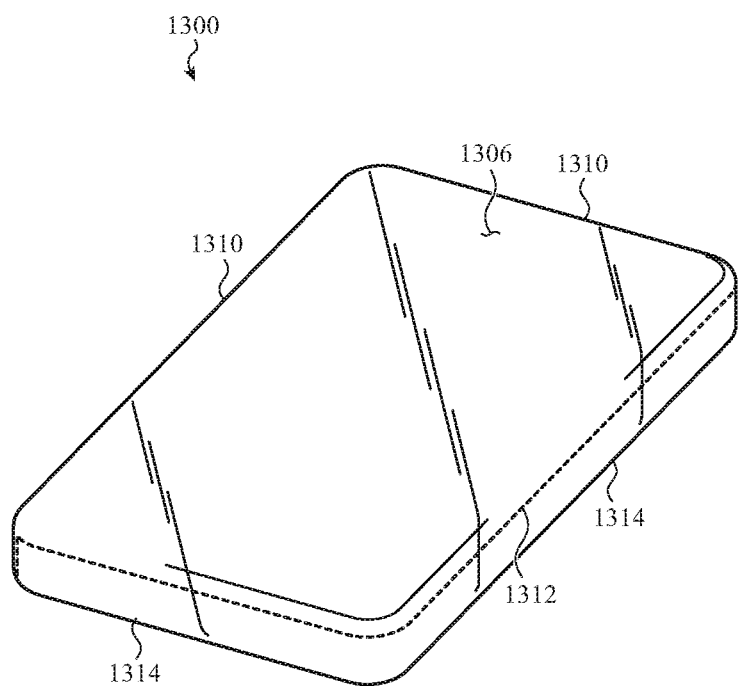

FIGS. 13A-13B show perspective views of an enclosure 1300, with FIG. 13A showing the enclosure 1300 in an unassembled state, and FIG. 13B showing the enclosure 1300 in an assembled state. The enclosure 1300 includes a first glass member 1302 and a second glass member 1304 (either or both of which may be monolithic). The first glass member 1302 defines a first major side 1306 and includes walls or portions 1303 that define substantially all of two adjacent peripheral sides (sides 1310, FIG. 13B). The first glass member 1302 may define none of or only a small portion of the other two peripheral sides (sides 1314, FIG. 13B). The walls 1311 of the second glass member 1304 thus define substantially all of the remaining peripheral sides 1314 (FIG. 13B) of the assembled enclosure 1300.

Similar to the enclosure 800 described with reference to FIGS. 8A-8B, the shapes of the first and second glass members 1302, 1304 result in a seam 1312 (FIG. 13B) that does not follow a single linear path. Moreover, on each side of the enclosure 1300, the seam 1312 is positioned proximate to a corner of the enclosure 1300 rather than extending through a middle of the surface or otherwise being positioned along a surface or wall through which a display is configured to be viewed.

Figure 14A:
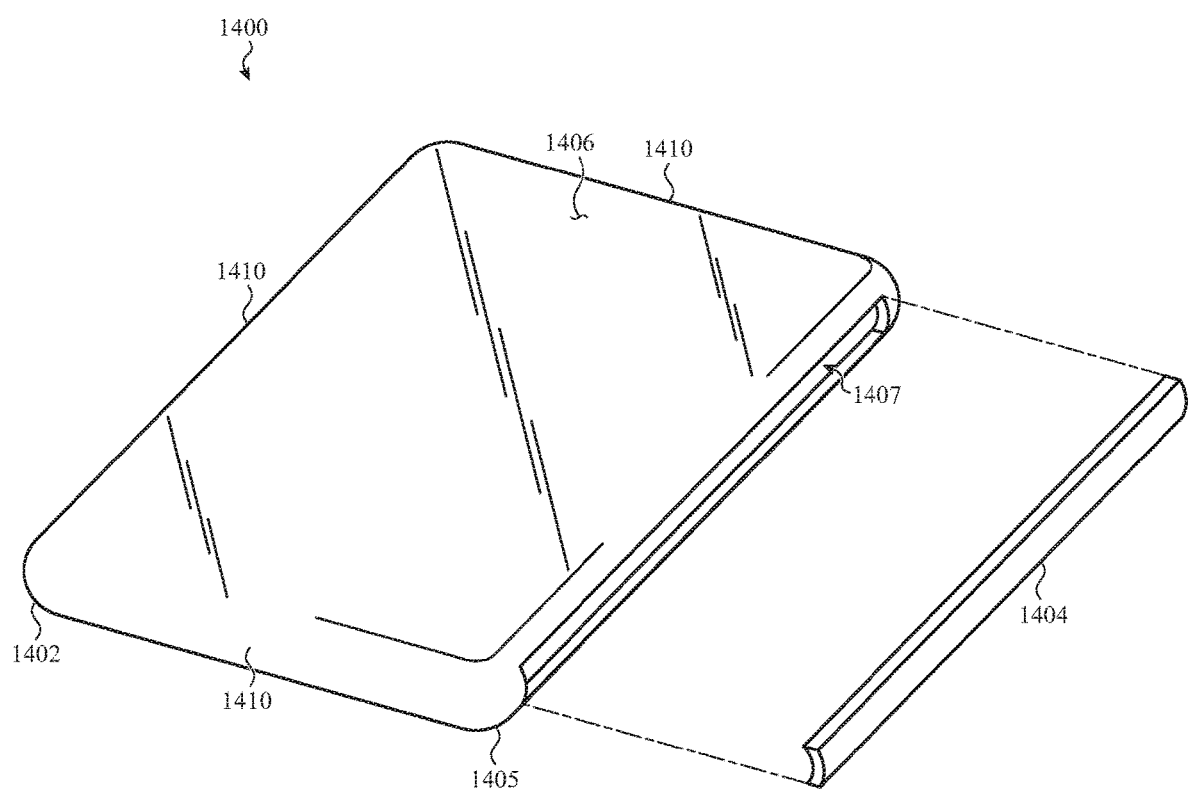
FIGS. 14A-14B depict another example multi-part glass enclosure for an electronic device.
Figure 14B:
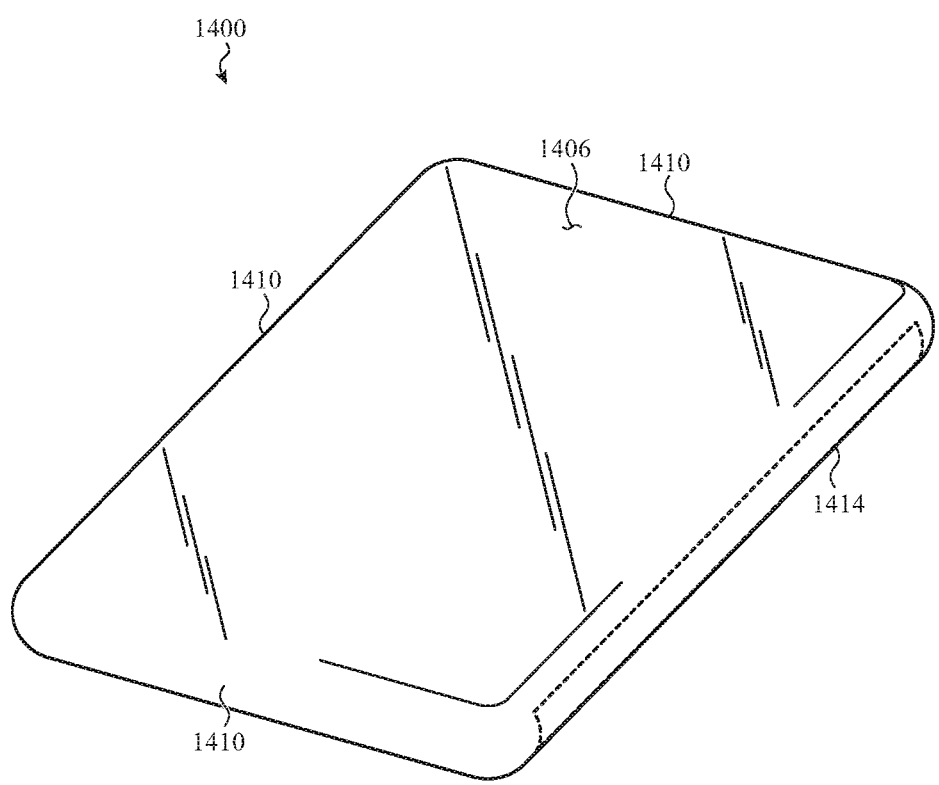

FIGS. 14A-14B show perspective views of an enclosure 1400, with FIG. 14A showing the enclosure 1400 in an unassembled state, and FIG. 14B showing the enclosure 1400 in an assembled state. The enclosure 1400 includes a first glass member 1402 and a second glass member 1404 (either or both of which may be monolithic). The first glass member 1402 defines a first major side 1406 and a second major side opposite the first major side 1406, and includes walls defining all of at least three peripheral sides 1410, and a wall 1405 defining a portion of a fourth peripheral side 1414 (FIG. 14B). The wall 1405 defines a slot or opening 1407 through which components of the electronic device may be introduced into the interior volume defined (at least partially) by the first glass member 1402.

The second glass member 1404 may be received in the opening 1407 or otherwise attached to the first glass member 1402 to cover the opening 1407 and, with the wall 1405, fully define the fourth peripheral wall 1414 of the enclosure 1400. As shown, the wall 1405 has a contoured or rounded exterior surface. The second glass member 1404 may have a contoured or rounded exterior surface that substantially matches the shape of the wall 1405. Accordingly the wall 1405 and the second glass member 1404 may define a single substantially continuous curved surface or profile along the fourth peripheral wall 1414.

Figure 15:
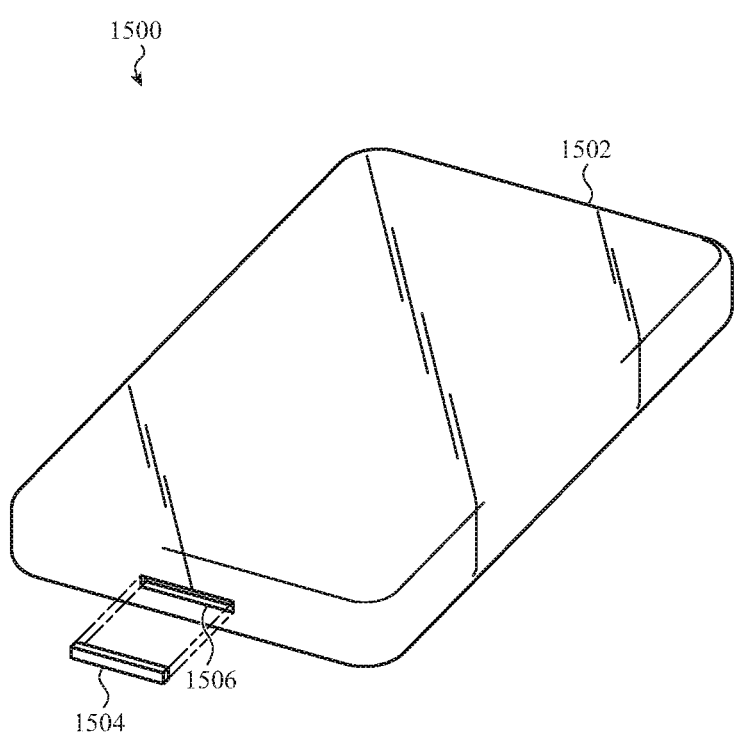
FIG. 15 depicts another example multi-part glass enclosure for an electronic device.

FIG. 15 shows a perspective view of an example enclosure 1500. The enclosure 1500 includes a glass member 1502 (e.g., a monolithic or unitary glass member) that defines substantially all sides and exterior surfaces of the enclosure 1500. The glass member 1502 defines an opening or slot 1506 through one of its peripheral sides. Whereas the slot or opening 1407 in FIGS. 14A-14B is positioned along a long side of the enclosure 1400 and extending substantially the entire length of the side (e.g., 80%, 90%, 95%, or 99% of the length of the peripheral side 1414), the slot 1506 is substantially smaller than the peripheral side in which it is positioned. For example, the slot 1506 may be less than 50% of the length of the peripheral side in which it is positioned (optionally less than 40%, less than 30%, or less than 20%). The slot 1506 may be selected based on the size of the largest component to be inserted into the glass member 1502, thus allowing device components to be positioned in the interior volume of the glass member 1502. As described herein, components may be folded, compressed, or otherwise deformed while being passed through the slot 1506, and then unfolded, uncompressed, or otherwise expanded after being positioned within the interior volume of the glass member 1502.

The enclosure 1500 also includes a cap or plug 1504 that is inserted in the slot 1506 or otherwise coupled to the glass member 1502 to occlude or otherwise close the slot 1506 (and optionally seal the enclosure 1500). The plug 1504 may define a portion of the peripheral side of the enclosure 1500 in which the slot 1506 is positioned. The plug 1504 may be any suitable material, including glass, rubber, polymer, metal, or the like. In some cases, the plug 1504 may include or accommodate electrical contacts to act as a charging and/or communication interface for a device that uses the enclosure 1500. The plug 1504 may also define an opening to allow access to a charging and/or communication port, a speaker, a microphone, or any other component that may be positioned within the enclosure 1500. The plug 1504 may be securely or permanently attached to the enclosure 1500 (e.g., via adhesive, fusion bonding, mechanical interlocks, etc.), or it may be removable. Where the plug 1504 is removable, it may cover or be aligned with a receptacle for a subscriber identity module (SIM) card, a memory card (e.g., a secure digital (SD) card), or the like. The plug 1504 may thus be removed (without damaging the plug 1504 and/or the enclosure 1500) to allow cards or other components to be inserted into and/or removed from the receptacle within the enclosure 1500.

Figure 16A:
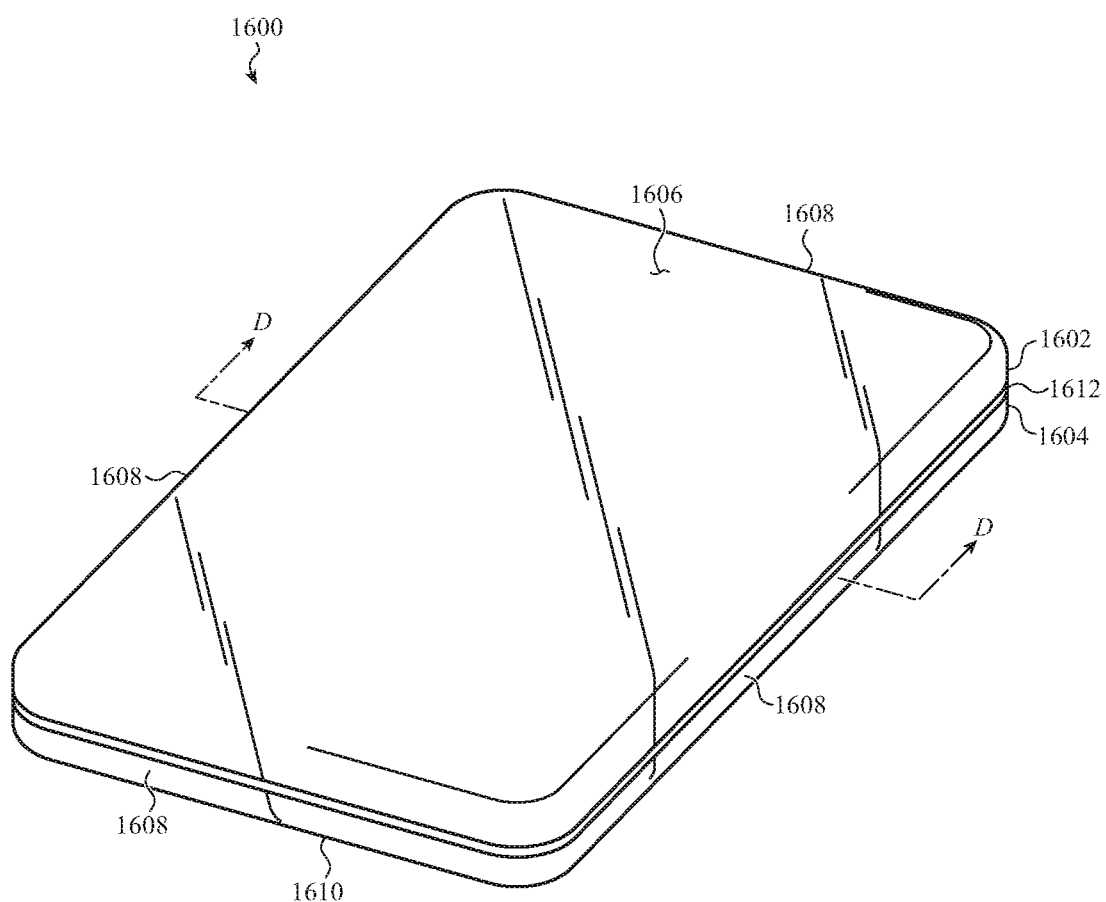
FIG. 16A depicts another example multi-part glass enclosure for an electronic device.

FIG. 16A shows a perspective view of an example enclosure 1600. The enclosure 1600 may include a first glass member 1602 and a second glass member 1604. The first glass member 1602 defines a first major side 1606 and a portion of each of the peripheral sides 1608 of the enclosure 1600. The second glass member 1604 defines a second major side 1610 and another portion of each of the peripheral sides 1608. The enclosure 1600 also includes an intermediate member 1612 between the first and second glass members 1602, 1604. The intermediate member 1612 may be metal, plastic, glass, or another suitable material, and may serve as a structural member of the device and may facilitate bonding between the first and second glass members 1602, 1604. Alternatively, the intermediate member may be cosmetic, and may contribute little or no structural strength or rigidity to the enclosure. The first and second glass members 1602, 1604 may be secured to the intermediate member 1612 in any suitable way, including mechanical interlocks, adhesives, epoxies, ultrasonic welding, frit bonding, or the like.

The first and second glass members 1602, 1604 and the intermediate member 1612 thus cooperate to define the peripheral sides 1608 of the enclosure 1600, and each of the first and second glass members 1602, 1604 at least partially defines an interior cavity (e.g., defining a base or bottom surface, corresponding to the major side, and four walls extending from the base or bottom surface around a periphery of the base).

Figure 16B:
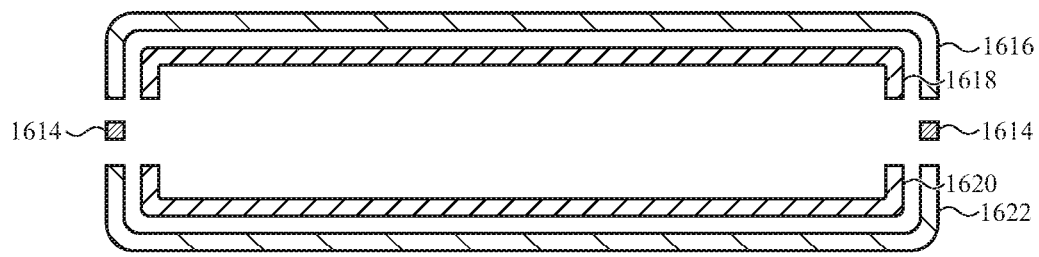
FIGS. 16B-16C depict cross-sectional views of the glass enclosure of FIG. 16A.
Figure 16C:
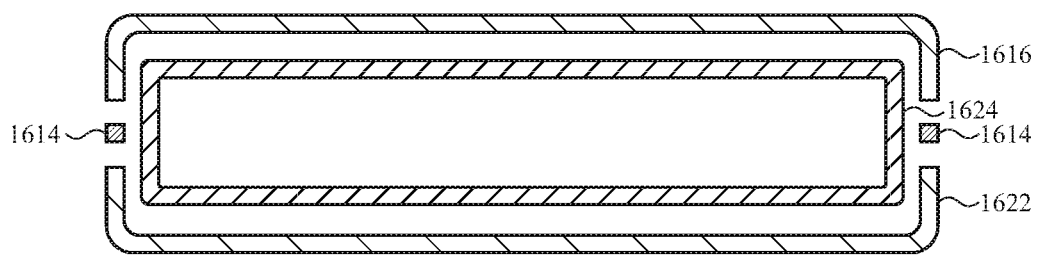

FIGS. 16B-16C show partial cross-sectional views of various embodiments of devices using enclosures such as the enclosure 1600 of FIG. 16A (e.g., viewed along line D-D in FIG. 16A). More particularly, FIGS. 16B-16C show example configurations of glass members and intermediate members that define an enclosure, and display members that may be positioned within an interior volume of the enclosure. FIG. 16B, for example, shows how a display formed of two display members 1618, 1620 may be positioned relative to first and second glass members 1616, 1622 (which may be substantially similar to the first and second glass members 1602, 1604, FIG. 16A). In particular, a first display member 1618 may substantially conform to or otherwise have a similar shape as the interior surface of the first glass member 1616. Similarly, a second display member 1620 may substantially conform to or otherwise have a similar shape as the interior surface of the second glass member 1622. Accordingly, the display members 1618, 1620 each produce graphical outputs that may be visible through a major side and a portion of the peripheral sides of the enclosure. The first and second display members 1618, 1620 may or may not extend past an intermediate member 1614 (which may be substantially similar to the intermediate member 1612, FIG. 16A), but in any event the intermediate member 1614 may occlude or cover any gaps or seams between the display members 1618, 1620.

FIG. 16C shows another example embodiment in which a single display member 1624 (which may be defined by a single layer or multiple layers) may be positioned within the enclosure. Apart from the display member 1624, the embodiment shown in FIG. 16C may include the same enclosure components as the embodiment shown in FIG. 16B. The single display member 1624 may be a single substrate (or a stack of substrates) that is folded or otherwise formed to produce graphical outputs that are visible through at least the first and second major sides and the peripheral sides of the enclosure. Example display members having such configurations are described herein. While a portion of the display member 1624 may be positioned behind the intermediate member 1614, the intermediate member 1614 may block or occlude the graphical output displayed on that portion of the display member 1624.

Figure 17A:
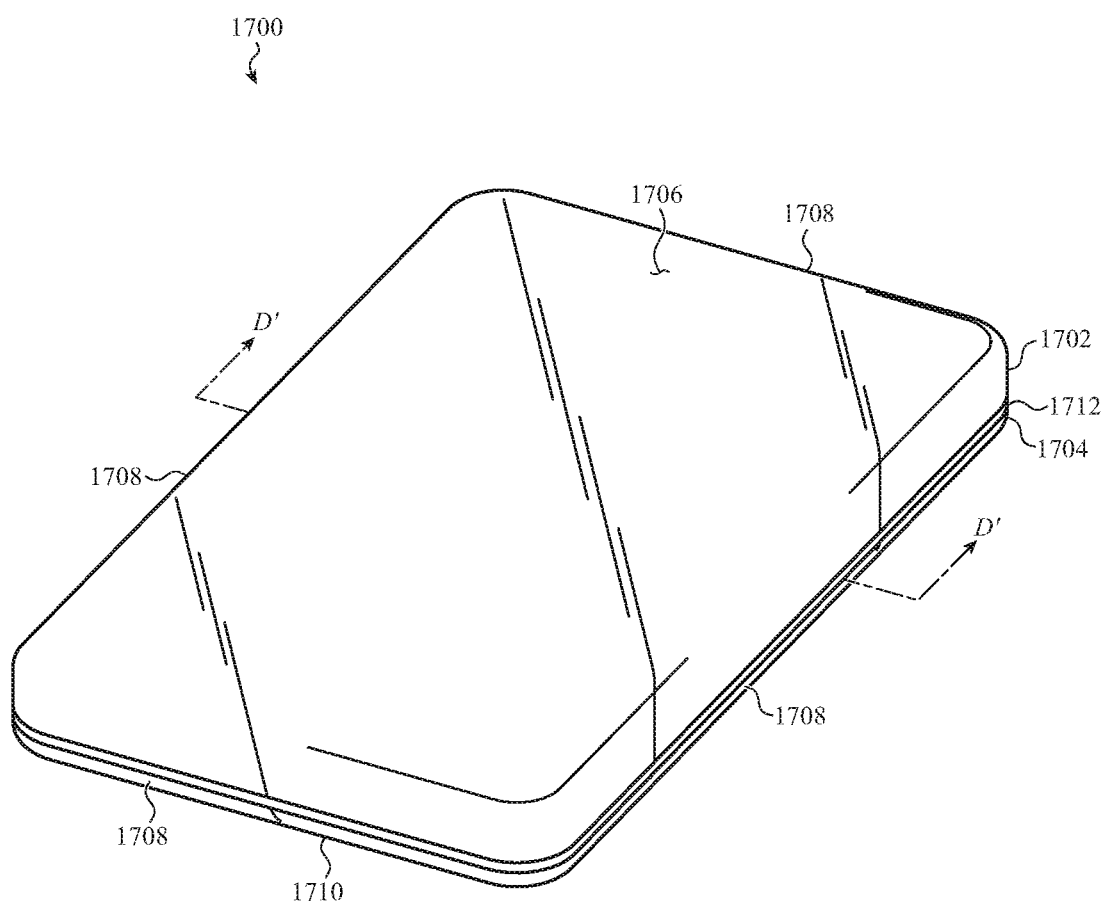
FIG. 17A depicts another example multi-part glass enclosure for an electronic device.

FIG. 17A shows a perspective view of an example enclosure 1700. The enclosure 1700 may include a first glass member 1702 and a second glass member 1704. The first glass member 1702 defines a first major side 1706 and a portion of each of the peripheral sides 1708 of the enclosure 1700. The second glass member 1704 defines a second major side 1710 and another portion of each of the peripheral sides 1708. The enclosure 1700 also includes an intermediate member 1712 between the first and second glass members 1702, 1704. The intermediate member 1712 may be metal, plastic, glass, or another suitable material, and may serve as a structural member of the device and may facilitate bonding between the first and second glass members 1702, 1704. Alternatively, the intermediate member may be cosmetic, and may contribute little or no structural strength or rigidity to the enclosure. The first and second glass members 1702, 1704 may be secured to the intermediate member 1712 in any suitable way, including mechanical interlocks, adhesives, epoxies, ultrasonic welding, frit bonding, or the like.

The first and second glass members 1702, 1704 and the intermediate member 1712 thus cooperate to define the peripheral sides 1708 of the enclosure 1700, and each of the first and second glass members 1702, 1704 at least partially defines an interior cavity (e.g., defining a base or bottom surface, corresponding to the major side, and four walls extending from the base or bottom surface around a periphery of the base).

The enclosure 1700 may be similar to the enclosure 1600 in FIG. 16A, except that the intermediate member 1712 is not positioned along a middle of the peripheral sides. Rather, the intermediate member 1712 is offset from the middle (or centerline) of the peripheral sides. For example, as shown in FIG. 17A, the first glass member 170 may define substantially all of each peripheral side 1708 of the enclosure (or at least one of the peripheral sides), and the second glass member 1704 may define a smaller portion of the peripheral sides of the enclosure (e.g., less than half, and optionally none). While FIG. 17A shows the intermediate member 1712 closer to the back of the enclosure 1700 (e.g., the second major side 1710), other embodiments may have the intermediate member 1713 positioned closer to the front of the enclosure 1700 (e.g., closer to the first major side 1706).

Figure 17B:
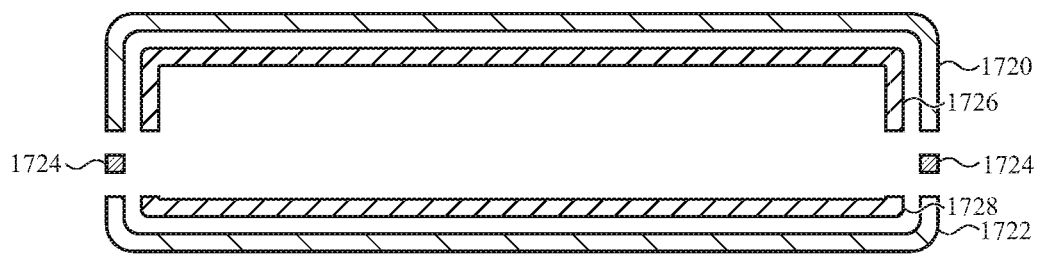
FIGS. 17B-17D depict cross-sectional views of the glass enclosure of FIG. 17A.
Figure 17C:
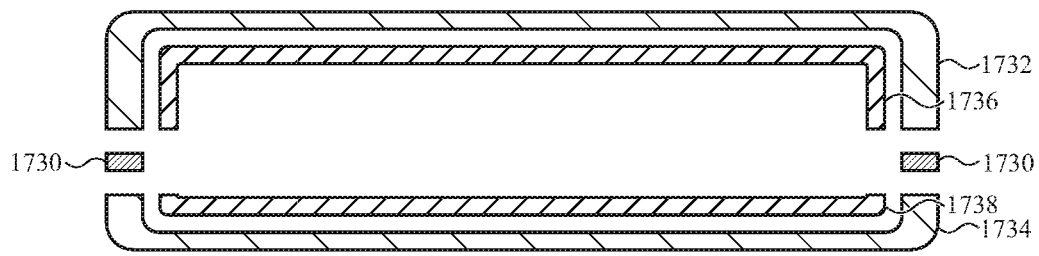
Figure 17D:
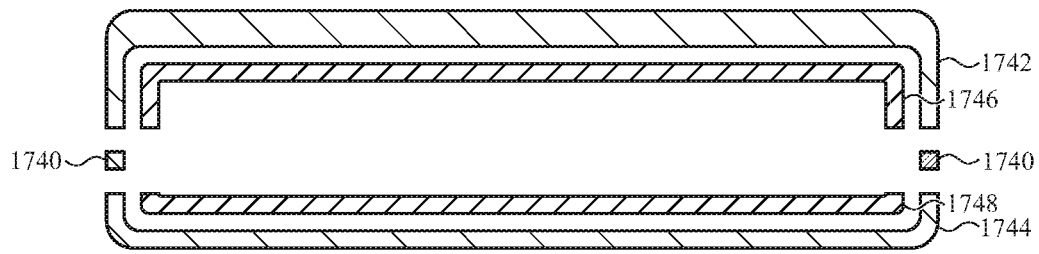

FIGS. 17B-17D show partial cross-sectional views of various embodiments of devices using enclosures such as the enclosure 1700 of FIG. 16A (e.g., viewed along line D'-D' in FIG. 17A). More particularly, FIGS. 17B-17D show example configurations of glass members and intermediate members that define an enclosure, and display members that may be positioned within an interior volume of the enclosure. FIG. 17B, for example, shows how a display formed of two display members 1726, 1728 may be positioned relative to first and second glass members 1720, 1722 (which may be substantially similar to the first and second glass members 1702, 1704, FIG. 17A). In particular, a first display member 1726 may substantially conform to or otherwise have a similar shape as the interior surface of the first glass member 1720. Similarly, a second display member 1728 may substantially conform to or otherwise have a similar shape as the interior surface of the second glass member 1722. Accordingly, the display members 1726, 1728 each produce graphical outputs that may be visible through a major side and a portion of the peripheral sides of the enclosure. The first and second display members 1726, 1728 may or may not extend past an intermediate member 1724 (which may be substantially similar to the intermediate member 1712, FIG. 17A), but in any event the intermediate member 1724 may occlude or cover any gaps or seams between the display members 1726, 1728. In some cases, the second display member 1728 may be omitted, and/or any portion of either of the display members 1726, 1728 that is visible through the peripheral sides of the enclosure may be omitted.

FIG. 17B also further illustrates how the first glass member 1720 may define a greater amount of the peripheral sides of the enclosure than the second glass member 1722, and how the intermediate member 1724 may be offset from a centerline of the enclosure. For example, the second glass member 1722 may define less than half, and optionally none of the peripheral sides.

FIG. 17C shows another example embodiment in which a first glass member 1732 defines a greater amount of the peripheral sides of the enclosure than a second glass member 1734. In this example, the portions of the first and second glass members 1732, 1734 that define the peripheral sides of the enclosure may have a different (e.g., larger) thickness than other portions of the first and second glass members 1732, 1734 (e.g., than the portions defining the first and second major surfaces of the enclosure). The intermediate member 1730 (which may be otherwise similar to the intermediate element 1712, FIG. 17A) may also have a larger dimension (e.g., a thickness) to accommodate the larger portions of the first and second glass members 1732, 1734. Like the embodiment shown in FIG. 17B, first and second display members 1736, 1738 may substantially conform to or otherwise have a similar shape as the interior surfaces of the first and second glass members 1732, 1734, and may be visible through the peripheral sides. As noted above, in some cases the second display member 1738 may be omitted, as may be the portion(s) of the display member(s) that are visible through the peripheral sides of the device.

FIG. 17D shows another example embodiment in which a first glass member 1742 defines a greater amount of the peripheral sides of the enclosure than a second glass member 1744. In this example, the portions of the first and second glass members 1742, 1744 that define the peripheral sides of the enclosure may have a different thickness (e.g., smaller) than other portions of the first and second glass members 1742, 1744 (e.g., than the portions defining the first and second major surfaces of the enclosure). More particularly, as shown, the peripheral sides of the enclosure are thinner than a portion of the first glass member 1742 that defines a first major side of the enclosure. The embodiment shown in FIG. 17D may also include an intermediate member 1740, which may be the same as or similar to the intermediate member 1712 in FIG. 17A (or any other intermediate member described herein).

Like the embodiment shown in FIG. 17B, first and second display members 1746, 1748 may substantially conform to or otherwise have a similar shape as the interior surfaces of the first and second glass members 1742, 1744, and may be visible through the peripheral sides. As noted above, in some cases the second display member 1748 may be omitted, as may be the portion(s) of the display member(s) that are visible through the peripheral sides of the device.

The foregoing enclosures include examples in which multiple enclosure members (e.g., glass enclosure members) may be attached together to define an enclosure that may have substantially all of its exterior surfaces of glass. Each enclosure described above defines an interior volume or cavity in which electronic device components may be positioned (e.g., displays, batteries, processors, memory, circuit boards, sensors, microphones, cameras, projectors, and the like). The multi-piece construction of these enclosures may facilitate assembly and manufacture of devices, as components may be positioned in or on a first of the glass members prior to another glass member being attached to the first glass member. Once the multiple glass members are attached to one another, the enclosure may completely or substantially completely enclose the electronic device components and may produce an enclosure in which substantially all of the exterior surfaces are glass.

Electronic devices, such as smartphones, tablet computers, and other small and/or handheld devices, may be subject to impacts, drops, and other potentially damaging events. Accordingly, the enclosures described herein may be configured with variable thickness walls to help increase the strength, durability, crack resistance, or other physical properties, in certain areas of the enclosures. The variable thickness walls may also be used to produce different regions that have different flexibilities or stiffnesses for user-interface purposes. For example, the first and second major sides of an enclosure may be thinner than the corner regions to allow the first and second major sides to flex more when a user touches or presses on those sides (e.g., when interacting with a touch- and/or force-sensitive display), thereby providing a tactile feel that is similar to or evokes the sensation of pushing a button. Similarly, some or all of the peripheral sides of an enclosure may be thinner than the corner regions of the enclosure to allow greater flex along the peripheral sides. Flexible peripheral sides may provide a tactile feedback or sensations to a user when they select (e.g., press) an affordance that is displayed on a side-visible display (e.g., a volume button similar to the buttons shown in FIG. 1A).

Figure 18:
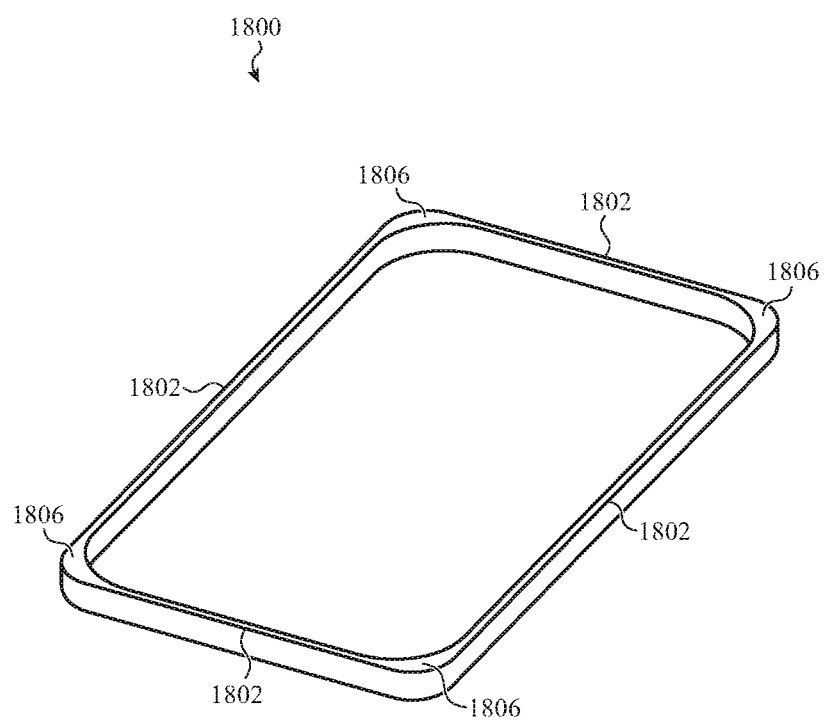
FIG. 18 depicts an example enclosure member with varying wall thicknesses.

FIG. 18 shows a cross-sectional view of an example enclosure 1800, viewed along line C-C in FIG. 5B, in which the walls of the enclosure at the corner regions 1806 have a greater thickness than the walls 1802 at the peripheral sides of the enclosure 1800. By increasing the thickness of the walls at the corners, stresses or forces from impacts (e.g., from the device being dropped) may be less likely to break, crack, or otherwise damage the glass of the enclosure 1800. The thickest portion of the corner regions 1806 may be any suitable thickness, such as about 3 mm, 2.5 mm, 2.0 mm, 1.5 mm, 1.0 mm, 0.5 mm, or any other suitable dimension. The walls of the enclosure 1800 (e.g., a central region of any of the peripheral sides or the first or second major sides) may have a different thickness, which may be about 2.0 mm, 1.5 mm, 1.0 mm, 0.5 mm, 0.25 mm, or any other suitable dimension. While the walls are shown having an increased thickness only at the corner regions 1806, other portions of the enclosure 1800 may have increased thicknesses as well, and the particular shape of the walls at the corner regions 1806 may also be modified from what is shown in FIG. 18.

Figure 19:
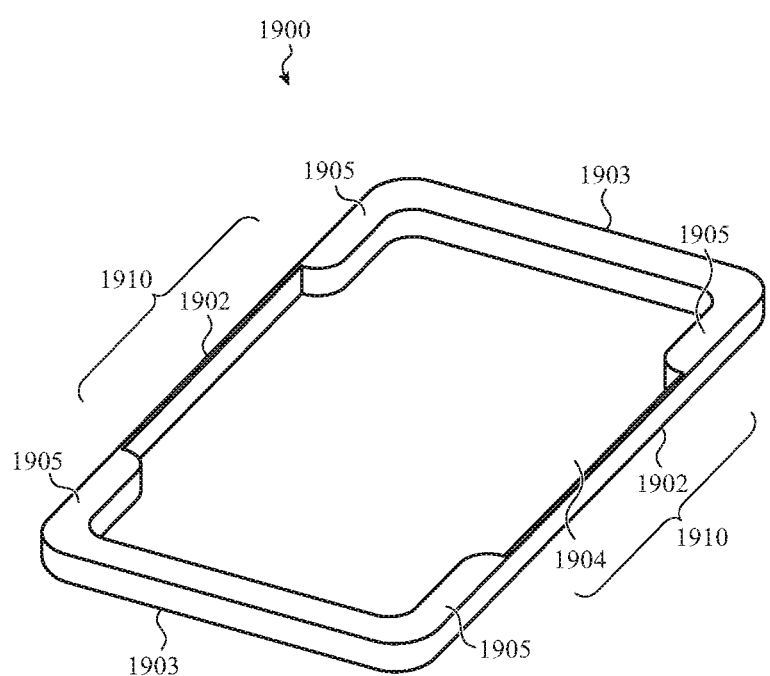
FIG. 19 depicts another example enclosure member with varying wall thicknesses.

FIG. 19 shows a cross-sectional view of another example enclosure 1900, viewed along line C-C in FIG. 5B, in which the enclosure 1900 has regions of different thicknesses. For example, the enclosure 1900 defines a major side 1904 (which may correspond to a first or second major surface as described herein), and peripheral sides 1902 and 1903. The peripheral sides 1903 may have an increased thickness relative to another portion of the enclosure 1900, such as the regions 1910 of the peripheral sides 1902. The region of increased thickness may extend along a complete length of the peripheral sides 1903 and along part of the peripheral sides 1902 (e.g., the regions 1905). In this way, the peripheral sides 1903 and the corners of the enclosure 1900 may be strengthened, relative to sides of a lesser thickness, while other regions of the enclosure 1900 (e.g., the regions 1910 of the peripheral sides 1902 and optionally the wall defining the major side 1904) may be thinner to provide other advantages, such as flexibility, transparency, optical clarity, or the like. In some cases, the peripheral sides 1903 and the regions 1905 of the peripheral sides 1902 may have substantially the same thickness. In other cases, the peripheral sides 1903 and the regions 1905 of the peripheral sides 1902 have different thicknesses from one another.

In some cases, thinner regions 1910 of the peripheral sides 1902 be deformable and/or deflectable in response to an application of a force-based input. For example, the user may be able to squeeze the enclosure 1900 and/or press on the regions 1910 of the peripheral sides in a manner that deforms and/or deflects one of the peripheral sides 1902. This deformation and/or deflection may be sensed by a force sensing system within the enclosure 1900 (e.g., a capacitive-based force sensing system, or the like). If the input satisfies a threshold force or deflection, the device may register that an input has occurred and change or control the operation of the device accordingly. For example, a force-based input on one or both of the peripheral sides 1902 (which causes a deformation or deflection of the glass) may cause the device to silence a ringer or alarm, change a volume of the device, activate or deactivate a display, or the like. The force-sensing system that detects deformation and/or deflection of the peripheral sides 1902 may be used to detect inputs to affordances that are displayed on or otherwise viewable through a peripheral side, such as the speaker volume affordances 130 (FIG. 1A).

FIG. 19 shows a cross-sectional view of the enclosure 1900. The full enclosure may be formed by attaching two glass members together. For example, the cross-section shown in FIG. 19 may be half of the enclosure 1900, and the other half may be substantially identical to the half shown in FIG. 19. The two halves may be attached to one another to form the complete enclosure by any suitable technique, including glass frit bonding, adhesives, laser welding, ultrasonic welding, glass fusion processes, or mechanical interlocking. In some cases, the two members that define the enclosure 1900 are not identical. For example one of the members may define more of (or all of) the peripheral side walls. Attachment techniques (and enclosure member configurations) that may be used to form the enclosure 1900 include those described herein with respect to FIGS. 21A-21F.

Figure 20A:
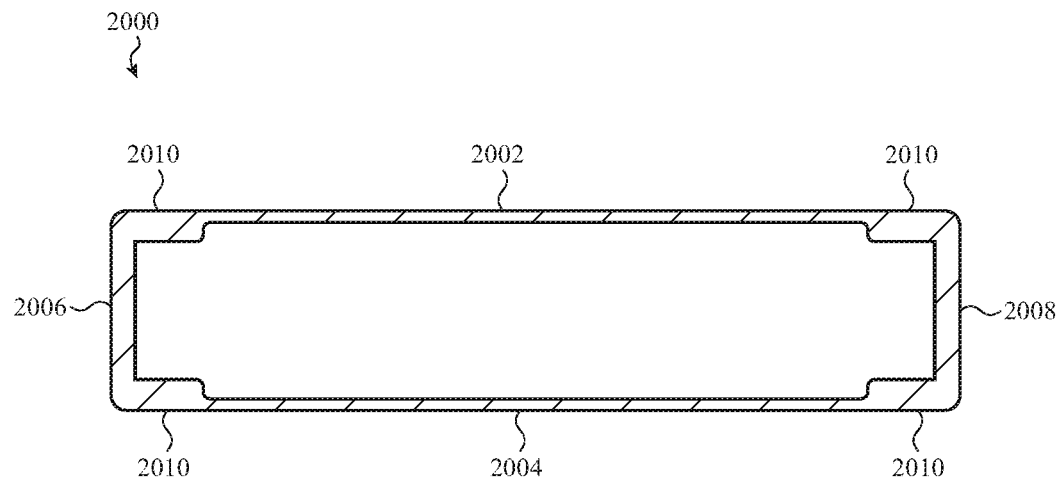
FIG. 20A depicts a cross-sectional view of an example enclosure member with varying wall thicknesses.

FIG. 20A shows a cross-sectional view of another example enclosure 2000, viewed along line B-B in FIG. 5B, in which the enclosure 2000 has regions of different thicknesses. The enclosure 2000 may include walls defining first and second major sides 2002, 2004, and walls defining first and second peripheral sides 2006, 2008. The corner or transition region 2010 between the major sides 2002, 2004 and the peripheral sides 2006, 2008 may have an increased thickness relative to the main (e.g., central or middle) regions of the major and peripheral sides. The increased thickness in these regions may increase the strength, stiffness, rigidity, or other physical property of the enclosure 2000 while still leaving large areas of the major sides and peripheral sides, which may be display and/or interface surfaces, more flexible, more optically clear, or the like.

Figure 20B:
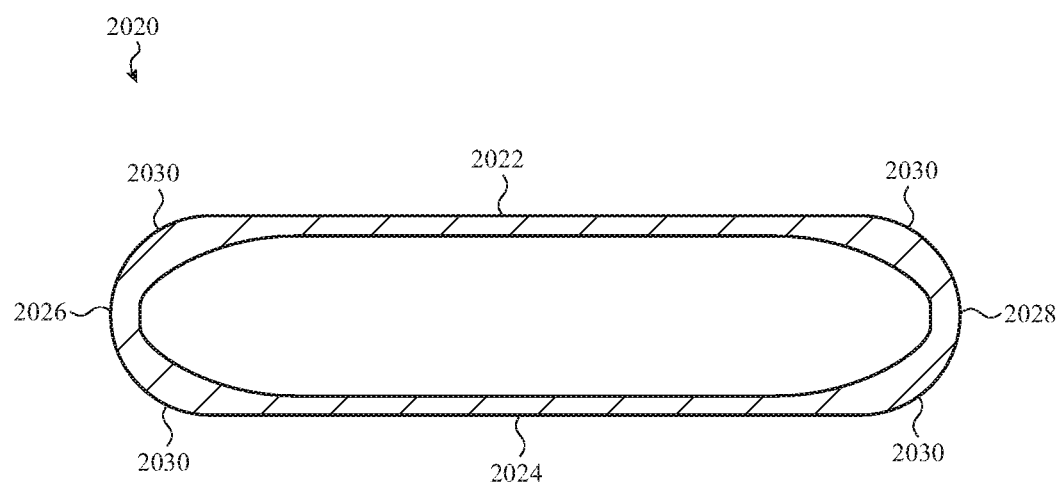
FIG. 20B depicts a cross-sectional view of another example enclosure member with varying wall thicknesses.

FIG. 20A shows an enclosure with a substantially rectangular cross-section. However, the same and/or similar principles may be used in enclosures of different shapes. FIG. 20B, for example, shows a cross-sectional view of another example enclosure 2020, viewed along line B-B in FIG. 5B, in which the enclosure 2020 has regions of different thicknesses. The enclosure 2020 has a more rounded or contoured shape and, in particular, has rounded or contoured transitions or corners between its first and second major sides 2022, 2024 and adjacent peripheral sides 2026, 2028. Further, the regions of greater thickness 2030 (located at the corners or transitions between the first and second major sides 2022, 2024 and adjacent peripheral sides 2026, 2028) may have smooth or contoured transitions between the areas of different thicknesses.

Other configurations of variable-thickness enclosures are also possible. Moreover, any of the variable thickness configurations described herein may be present in an enclosure of any construction. For example, the configurations shown in FIGS. 18-20B may be incorporated in any of the enclosure constructions described with respect to FIGS. 6A-15.

The foregoing figures depict various examples of enclosures that have at least two glass members joined together to form the enclosure and define substantially all of the exterior surfaces of the enclosure. As noted above, the various glass members may be joined to one another using various different joint geometries and attachment techniques. More particularly, the interfacing portions of the glass members may have various complementary mating geometries such as butt joints, miter joints, scarf joints, interlocking structures, complementary protrusions and recesses, and the like. Such joints may imbue the enclosure with desired properties, such as increased strength (e.g., resistance to becoming unjoined, increased overall enclosure strength), decreased joint visibility, increased interfacing surface area (e.g., for increased adhesive), and the like. Moreover, the joints may be configured so that the seam between two glass members is in a preferred location, such as at a corner or transition between a major side and a peripheral side, where the seam may be less likely to occlude or interfere with the visibility of displays that are visible through those sides.

Figure 21A:
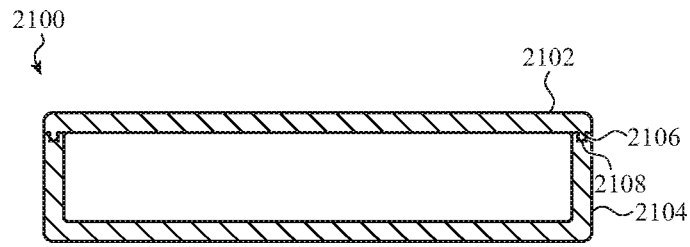
FIGS. 21A-21F depict cross-sectional views of example joint configurations for joining enclosure members.

FIGS. 21A-21F show cross-sectional views of example enclosures, viewed along line B-B in FIG. 5B, showing various example joint configurations between two glass members. FIG. 21A, for example, shows an enclosure 2100 that includes a first glass member 2102, which may include a wall defining a first major side of the enclosure 2100, and a second glass member 2104, which may include walls defining a second major side and peripheral sides of the enclosure 2100. The first glass member 2102 may include or define a protrusion 2106 (which may be formed by molding, machining, or any other suitable technique) that is received in a corresponding recess 2108 in the second glass member 2104. The protrusion 2106 and recess 2108 may be configured as a post and hole, a ridge and a channel, or any other suitable geometry. Where the protrusion 2106 and recess 2108 are configured as a post and a hole, they may be round, square, triangular, or any other suitable shape. As shown, the first glass member 2102 includes the protrusion 2106 and the second glass member 2104 includes the recess 2108, though these positions may be reversed.

FIG. 21A shows one particular location of the protrusion 2106 and the recess 2108 (e.g., with sides of the first glass member 2102 exposed and defining a portion of the peripheral sides of the enclosure 2100), though this is merely one example configuration of the joint structure in a glass enclosure. In other cases, complementary protrusions and recesses may be used in other locations and/or positions. For example, the first and second glass members 2102, 2104 may be configured so that the seam is positioned on or around the first major side, rather than on the peripheral sides as shown (e.g., so that sides of the second glass member 2104 are exposed and define a portion of the first major side). Moreover, in cases where the enclosure does not have the exact shape shown in FIG. 21A, such as enclosures with rounded peripheral sides that do not include any planar portions, a protrusion and receptacle joint may be configured differently than what is shown in FIG. 21A. It will be understood that this type of joint may be used to join glass members of various different shapes and configurations and in various different locations without departing from the scope of the instant description. For example, this joint may be used to join any of the glass members described with respect to FIGS. 6A-20B.

Figure 21B:
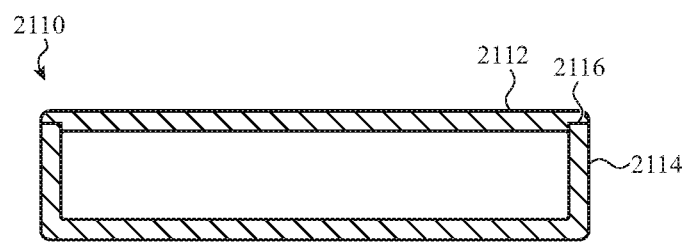

FIG. 21B shows an enclosure 2110 with another example joint configuration between a first glass member 2112 and a second glass member 2114, in which the first glass member 2112 defines a recess 2116, similar to a rabbet joint, that receives a portion of the second glass member 2114 therein. The second glass member 2114 may maintain a constant thickness in the area of the joint, or it may include a tapered or reduced-thickness area that is received in the recess 2116. As noted above, though FIG. 21B shows a joint at one particular location (e.g., at a corner or transition between a major side and a peripheral side), a similar joint may be used in other locations and/or between other glass members. For example, the recess may be formed in the second glass member 2114 rather than the first glass member 2102, and the joint may be formed so that the seam is on the major side instead of the peripheral side as shown.

Figure 21C:
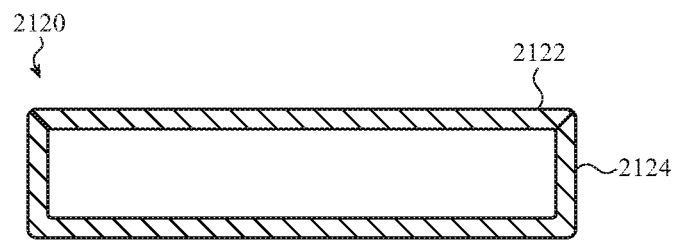

FIG. 21C shows an enclosure 2120 with another example joint configuration between a first glass member 2122 and a second glass member 2124, in which the first and second glass members are mitered or angled to form a diagonal or angled interface between the first glass member 2122 and the second glass member 2124. The mitered joint may increase the surface area of the interfacial surfaces as compared to other joints, and as such may be stronger than other joints. Moreover, the mitered joint may allow the seam of the joint to be positioned at or along the corner or transition between a major side and a peripheral side, which may reduce the visibility of the seam itself as well as optical interference that may be noticed when viewing an underlying display through the interfacial surfaces of a joint.

Figure 21D:
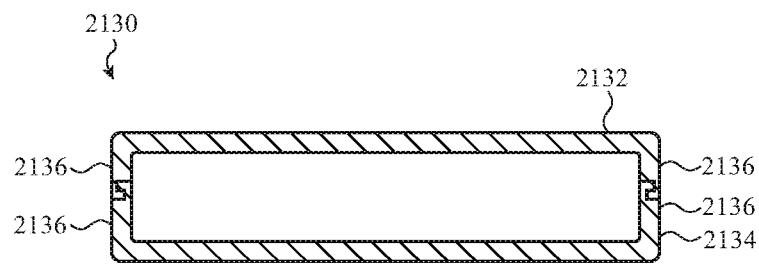

FIG. 21D shows an enclosure 2130 with another example joint configuration between a first glass member 2132 and a second glass member 2134, in which both the first and second glass members 2132, 2134 include walls 2136 that define a portion of the peripheral sides of the enclosure. In this example, the walls 2136 of both the first and second glass members 2132, 2134 include or define interlocking structures that mechanically engage one another to retain the first and second glass members 2132, 2134 to one another. The interlocking structures may include undercuts, curved or rounded undercuts, threads, lips, ledges, dovetails, interference fits, or other mechanical configurations that, when engaged with one another, retain the glass members together.

Figure 21E:
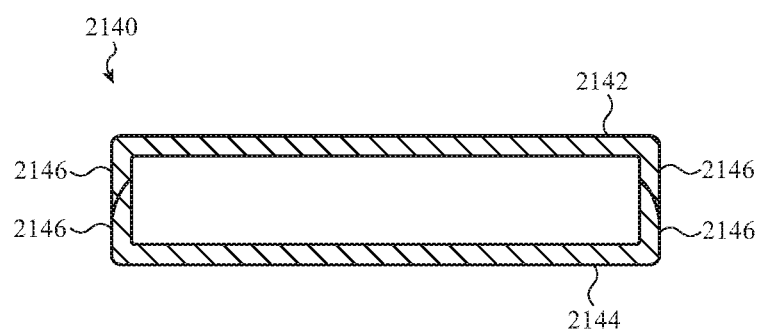

FIG. 21E shows an enclosure 2140 with another example joint configuration between a first glass member 2142 and a second glass member 2144, in which both the first and second glass members 2142, 2144 include walls 2146 that define a portion of the peripheral sides of the enclosure. In this example the walls 2146 of both the first and second glass members 2142, 2144 include or define curved surfaces, similar to a scarf or splice joint. The curved surfaces may produce a mechanically strong joint while also reducing optical artifacts of the joint or even enhancing the optical properties of the glass enclosure relative to an underlying display. For example, the curved surfaces may produce a desired lensing effect (or have little or no lensing) so that, despite viewing a display through the interfacial surfaces of the joint, an underlying display may appear undistorted from multiple viewing angles.

Figure 21F:
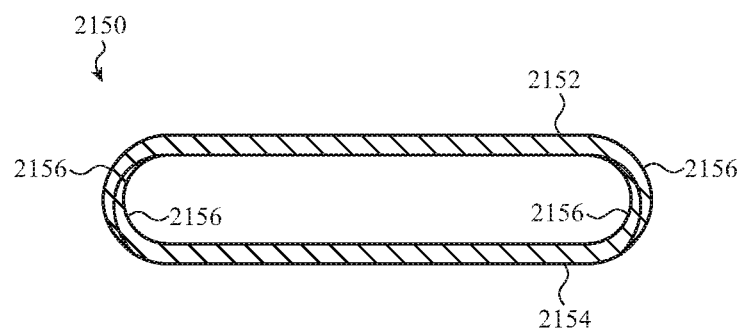

FIGS. 21A-21E show examples of enclosures that have substantially flat or planar major sides and peripheral sides. As noted above, any of these joints may be used with enclosures of different shapes or geometries, including enclosures that have curved or rounded major and/or peripheral sides or the like. FIG. 21F shows an enclosure 2150 that has peripheral sides that have a continuous curve extending from a first major side to a second major side. The enclosure 2150 uses a joint configuration similar to that shown in FIG. 21E. For example, portions of the first and second glass members 2152, 2154 that define the peripheral walls have tapered regions 2156 (e.g., tapered edges) that overlap one another. The tapers of these members may be configured so that the overall thickness of the enclosure 2150 remains substantially constant, even across the joint region where the members overlap. In some cases, the tapers are configured so that the overall thickness of the enclosure 2150 remains substantially constant across the overlapping region and the regions of the enclosure adjacent the overlapping region (e.g., allowing for the enclosure to have different thicknesses elsewhere). By maintaining a constant thickness, the walls that define the peripheral sides may provide improved optical clarity, as compared to a peripheral wall of variable thickness, to provide clear viewing of underlying displays or other optical components.

The tapered regions 2156 (e.g., tapered edges) may also provide an interlocking structure that provides a mechanical engagement that retains the first and second glass members 2152, 2154 to one another. In particular, the shape of the first glass member 2152 may be configured to receive and retain (and optionally compress) the tapered regions 2156 of the side walls of the second glass member. During assembly, the first glass member 2152 may be expanded or bent to allow the side walls of the second glass member 2154 to be positioned inside the side walls of the first glass member 2152. The pressure of the side walls of the first glass member 2152 on the side walls of the second glass member 2154 in the area of the tapered regions 2156, as well as the shapes of the tapered regions 2156, may mechanically retain the second glass member 2154 to the first glass member 2152.

Figure 22A:
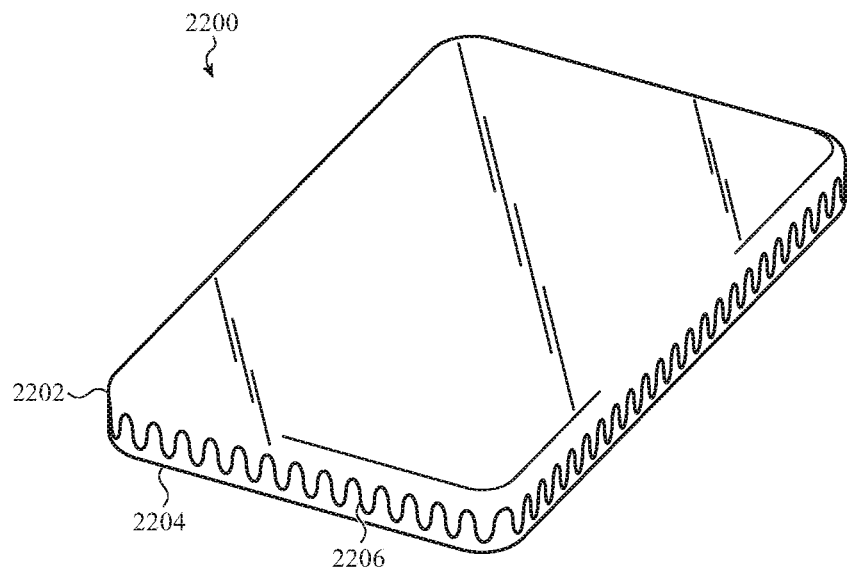
FIGS. 22A-22B depict example interlocking joint configurations for joining enclosure members.
Figure 22B:
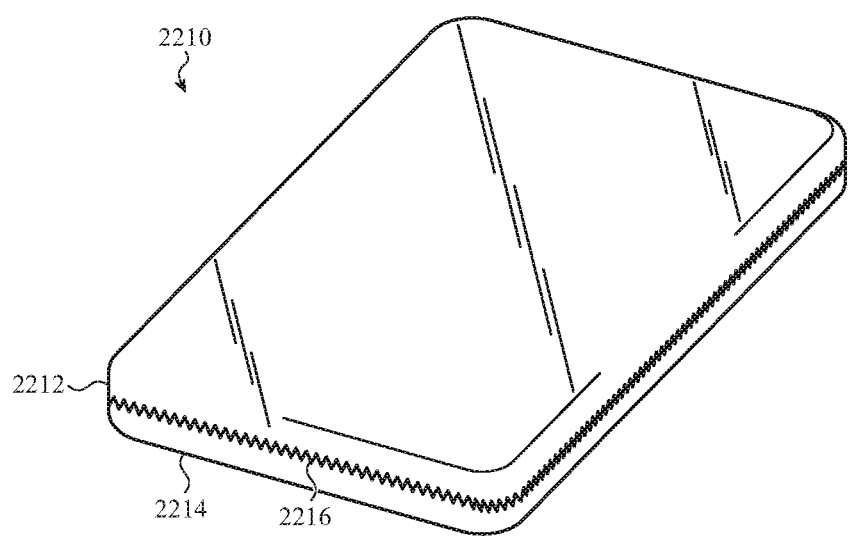

FIGS. 22A-22B show additional examples of joint configurations between first and second glass members. For example, FIG. 22A shows a perspective view of an enclosure 2200 that includes a first glass member 2202 joined to a second glass member 2204. The peripheral sides of the first and second glass members 2202, 2204 each have complementary scalloped (or other interdigitated) structures that define a non-linear seam 2206 around the peripheral sides of the enclosure 2200. The scalloped structures and the resulting non-linear seam 2206 may reduce the visibility of the seam between the two glass members 2202, 2204 by producing a more irregular shape that is less visually noticeable. Additionally, the scalloped structures may provide an increased joining surface area as compared to a straight or linear joint, which may consequently increase the strength of the joint between the first and second glass members 2202, 2204.

FIG. 22B shows a perspective view of another example enclosure 2210 that includes a first glass member 2212 joined to a second glass member 2214. The peripheral sides of the first and second glass members 2212, 2214 each have complementary toothed structures that define a non-linear seam 2216 around the peripheral sides of the enclosure 2210. The toothed structures may function substantially similarly to the scalloped structures in FIG. 22A, and may provide similar properties (e.g., increased strength and reduced visibility as compared to a straight joint).

In each of the foregoing examples, the glass members may be secured to one another in any suitable way. For example, glass members may be secured using adhesive between the joint surfaces of the glass members (e.g., epoxy, glass cement, etc.). Where adhesives are used, they may substantially completely cover the interfacing surfaces, or they may cover only a portion the interfacing surfaces. Glass members may also be secured using glass frit bonding, laser welding, ultrasonic welding, glass fusion processes, or mechanical interlocking alone. Where fusion or melting is used to secure the glass members, the glass may be locally fused at or near the exterior surfaces of a joint. For example, with respect to FIG. 21A, a laser may fuse the glass near the exterior and/or interior surfaces of the glass members in proximity of the joint without reaching all of the interfacial surfaces of the joint (e.g., the protrusion and the recess may not be melted or directly fused during or as a result of the fusion process).

As noted, the securing technique and joint geometry used in a glass enclosure as described herein may be selected to reduce the visibility or detectability of seams between joined glass members. For example, where adhesives, glass frit, or other interstitial materials are included between interfacing surfaces, those materials may have the same or similar refractive index (and/or other optical properties) as the glass members themselves. This may reduce refraction or other optical phenomena that may occur due to the joints. Moreover, the joints, and the glass members more broadly, may be subjected to post-joining operations to further reduce the visibility of the joints, including grinding, lapping, or other material removal operations (e.g., to remove excess glass and/or produce a desired exterior surface profile), polishing, and the like.

Visible seams between glass enclosure members may be undesirable in glass enclosures. For example, as noted above, seams where glass enclosure members are joined and/or overlap one another may optically distort underlying displays, detract from the appearance and/or feel of the device, or otherwise be problematic. In some cases, portions of enclosures may be textured, frosted, bead- or sand-blasted, or otherwise modified to hide or otherwise reduce the visibility of a seam. In some cases, texturing may have both tactile and optical artifacts. For example, a textured region may appear different than a non-textured region, and may also have a different tactile feel than a non-textured region. In some cases, a textured region has a different optical or visual appearance but has substantially the same tactile feel.

Figure 23A:
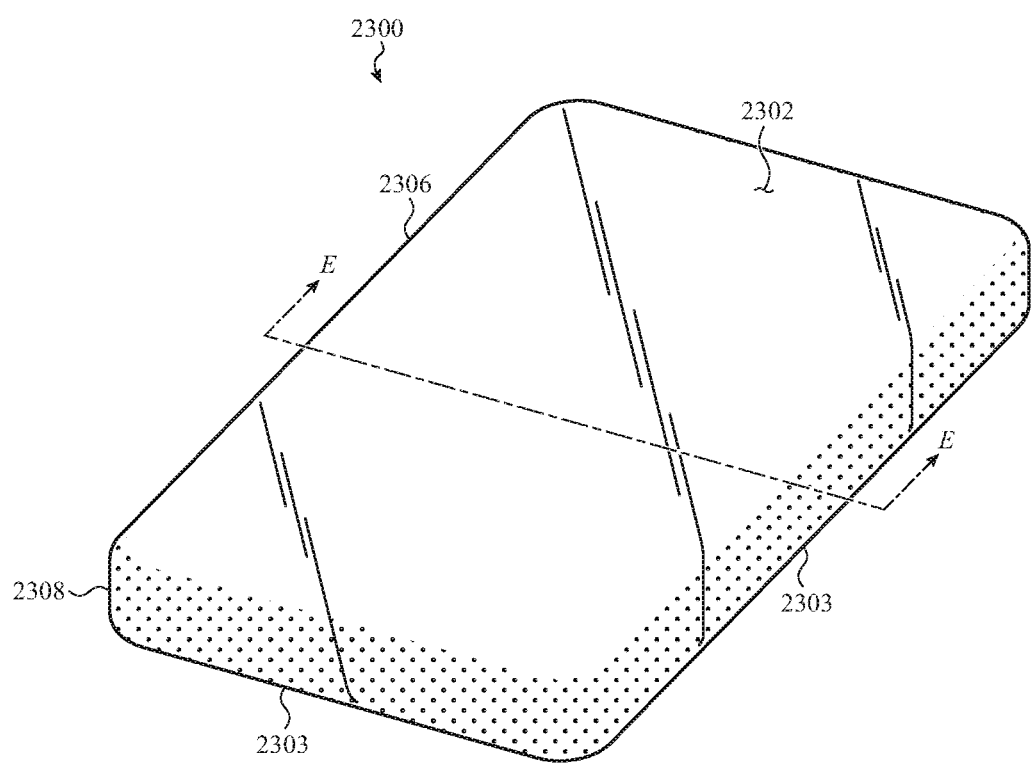
FIGS. 23A-23B depict an example enclosure with a seam between two enclosure members.
Figure 23B:
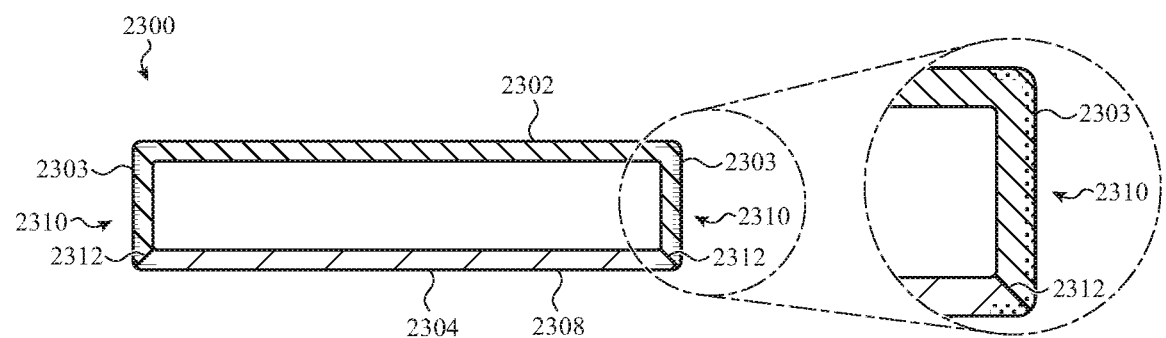

FIG. 23A shows a perspective view of an enclosure 2300, which may be formed of two or more glass members joined together and may define a seam where the glass members meet or overlap. FIG. 23B shows a cross-sectional view of the enclosure 2300, viewed along line E-E in FIG. 23A, showing a first glass member 2306 (which may define a first major side 2302 and at least two of the peripheral sides 2303) joined to a second glass member 2308 (which may define a second major side 2304, FIG. 23B) and defining a seam 2312 therebetween. As shown, the seam 2312 is positioned at a corner or transition between the first major side 2302 and the peripheral sides 2303, though this is merely exemplary.

Figure 23C:
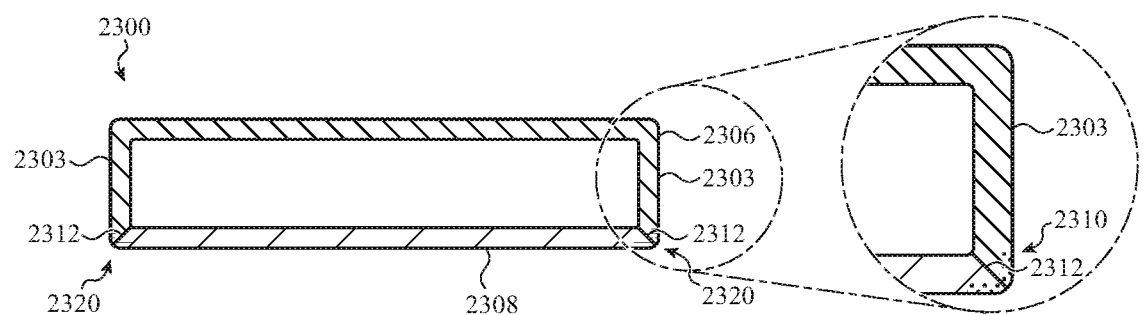
FIG. 23C depicts a cross-sectional view of another example enclosure with a seam between two enclosure members.

The enclosure 2300 includes a textured region 2310. The textured region 2310 may extend along the exterior surface of the enclosure and cover or otherwise obfuscate the seam 2312. As shown, the textured region 2310 covers all of the peripheral sides 2303 and part of the first and second major sides 2302, 2304, though the textured region 2310 may extend over a smaller surface of the enclosure 2300, such as substantially only the area of the seam 2312 and a small surrounding area (e.g., covering the width of the seam and less than 2.0 mm, less than 1.0 mm, or less than 0.5 mm of the material on either side of the seam). FIG. 23C shows another example of the enclosure 2300 in which a textured region 2320 extends over only a portion of the peripheral sides 2303 and a portion of the second glass member 2308. The particular location and extent of a textured region may be selected based on locations of underlying displays. For example, the configuration shown in FIG. 23B may be used for devices that include front- and back-facing displays (e.g., displays visible through the first and second major sides 2302, 2304), and no image-displaying displays that are visible through the peripheral sides 2303 (though non-image forming light may still be visible through the textured peripheral sides 2303). The configuration shown in FIG. 23C, on the other hand, may be used for devices that include displays that are viewable through the peripheral sides 2303.

The textured regions may be formed in any suitable manner. For example, the enclosure 2300 may be subjected to a finishing operation such as grinding, lapping, abrasive-blasting (e.g., sand blasting, bead blasting, or the like), etching (e.g., laser etching, plasma etching, chemical etching, or the like), or any other suitable process. In some cases, the textured region may include or be formed of material that is added to and/or coated on the glass of the enclosure, such as ink, dye, powder, or the like. The textured regions may be tactilely different than non-textured regions, or they may be tactilely indistinguishable from non-textured regions. Also, in FIGS. 23A-23C, the textured regions are shown on the outside or exterior surface of the enclosure 2300, though texturing may also or instead be on the inside of the enclosure (e.g., along an interior surface of the enclosure).

Glass members that form a glass enclosure as described herein may be formed in various ways. FIGS. 24A-25B show two non-limiting examples of methods of forming glass members, such as any of the glass members described herein. While FIGS. 24A-25B show molds having particular shapes, these are merely examples, and molds may have any suitable shape to form any of the foregoing glass enclosure members, or others that are not explicitly illustrated herein.

Figure 24A:
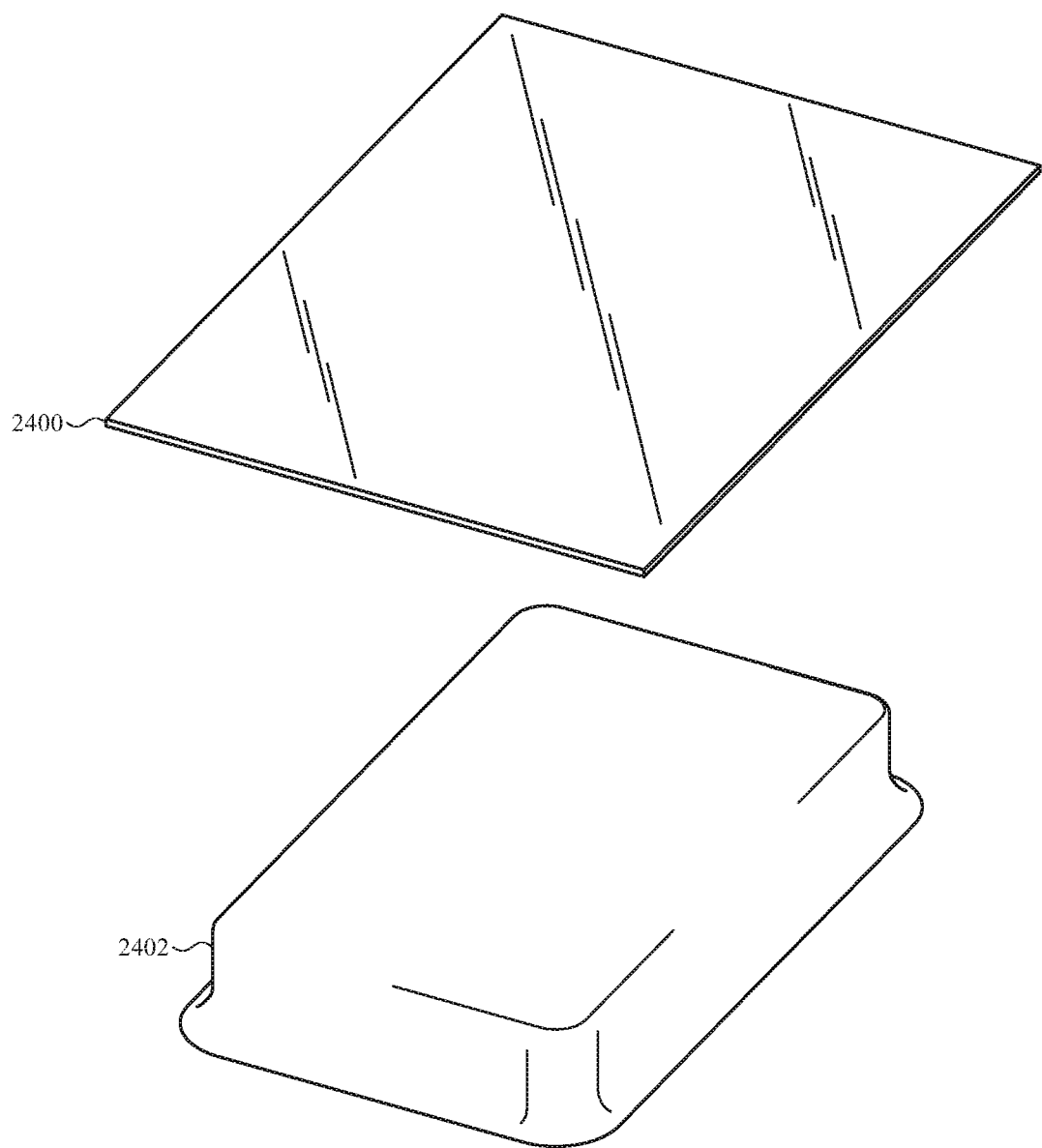
FIGS. 24A-24B depict an example technique for forming glass enclosure members.
Figure 24B:
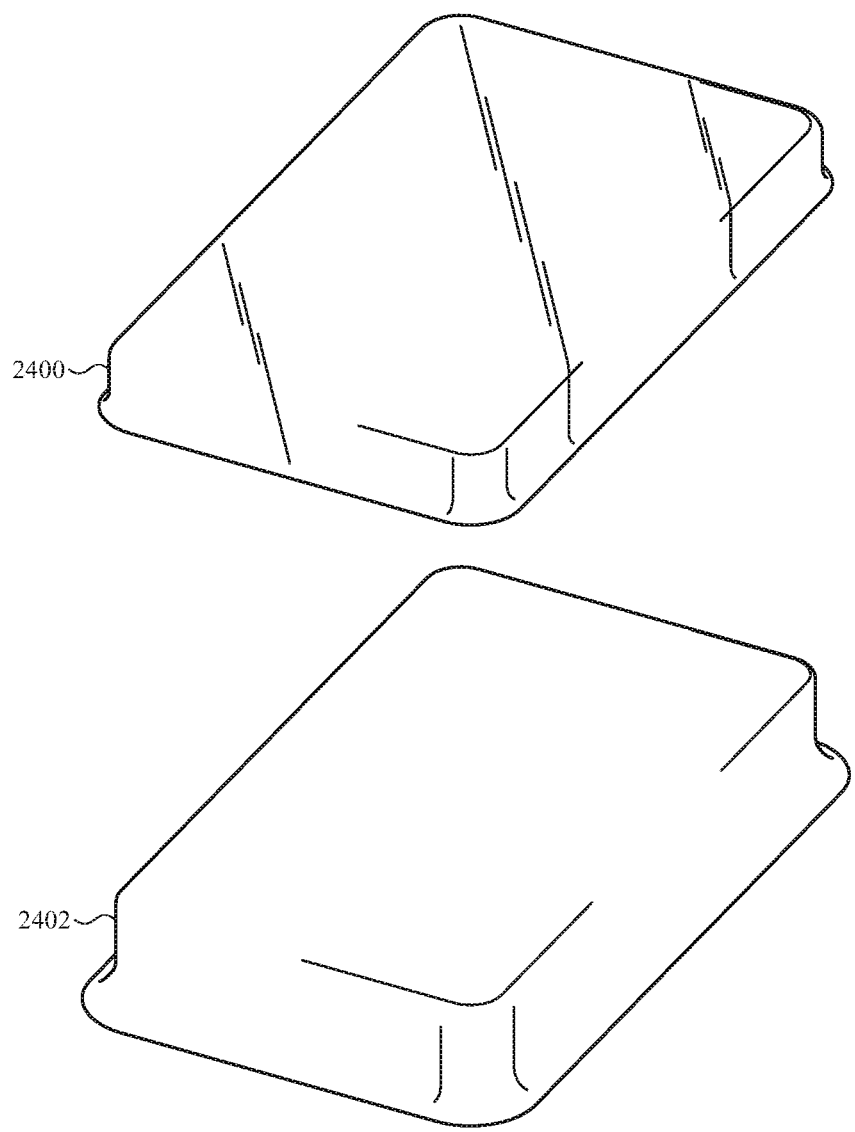

FIGS. 24A-24B illustrates a molding or slumping process by which a glass member is shaped by a mold 2402. In particular, a glass sheet 2400 (FIG. 24A) may be heated (prior to and/or while in contact with the mold 2402) and allowed to conform or slump to the shape of the mold 2402. A second mold may optionally be used to force the glass sheet 2400 against the mold 2402 to conform the glass sheet to the mold. Additionally or alternatively, air pressure differentials may be used to force the glass sheet against the mold (e.g., the mold may include vacuum lines that draw the glass against the mold). The resulting shaped glass member 2404 (FIG. 24B) may be removed from the mold 2402 (FIG. 24B) and optionally subjected to further processing, such as cleaning, texturing, polishing, removing excess material, flashing, or walls, or the like. Multiple molds may be used to make complementary glass members that may then be joined together to form a complete enclosure.

Figure 25A:
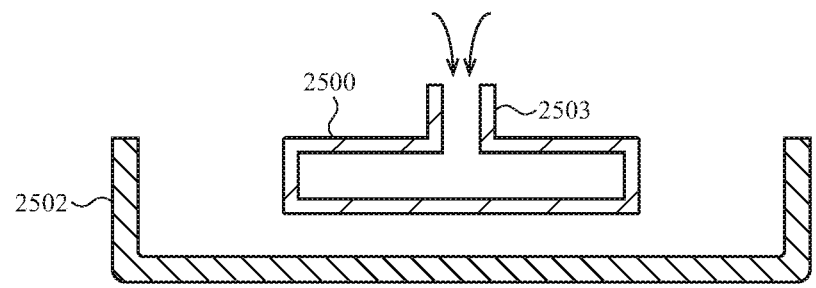
FIGS. 25A-25B depict another example technique for forming glass enclosure members.
Figure 25B:
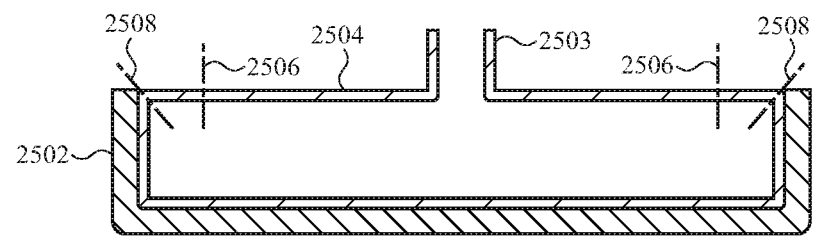

FIGS. 25A-25B illustrate another example process, resembling a blow-molding process, for forming glass members. FIGS. 25A-25B show a representative cross-section of the process that corresponds to a view of an enclosure along line B-B in FIG. 5B. In particular, a glass preform 2500 (or parison) may be heated to or above a softening temperature and placed proximate a mold 2502. A pressure differential between the environment in an interior cavity of the glass preform 2500 and the environment around the glass perform 2500 (e.g., caused by forcing a fluid such as air into the preform 2500 through an inlet 2503 and/or applying a vacuum around the preform 2500) may cause the preform to expand and conform to a shape of the mold 2502. When fully formed, the glass preform 2500 may be formed into an intermediate glass member 2504, which may then be subjected to further processing to form a glass enclosure member as described herein. For example, the inlet 2503 may be removed from the intermediate glass member 2504 to form an enclosure member that defines substantially all of six sides of a glass enclosure. As another example, one or more walls may be entirely or partially removed from the intermediate glass member 2504, such as by cutting along cut lines 2506 or 2508, to form a glass member that may be joined with another glass member to form a complete glass enclosure.

Figure 25C:
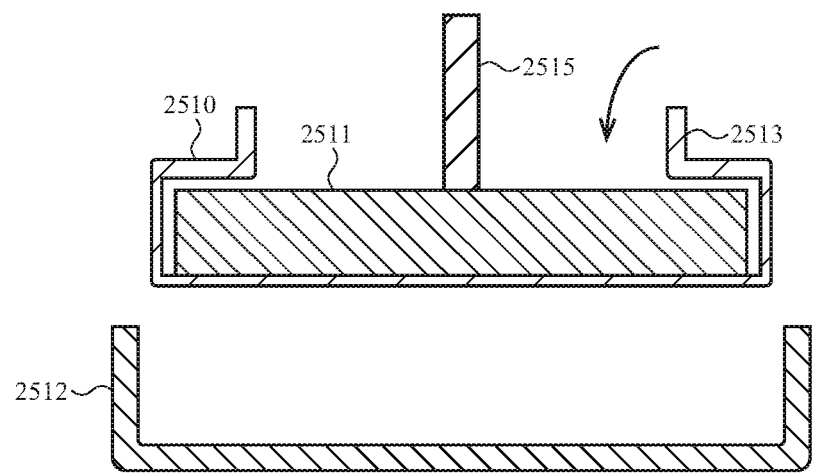
FIGS. 25C-25D depict an example technique for forming a glass enclosure.
Figure 25D:
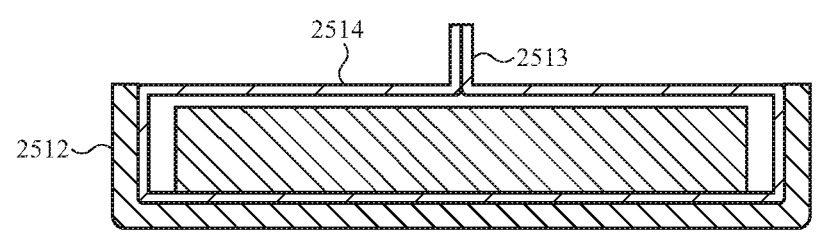

FIGS. 25C-25D illustrate another example process, resembling a blow-molding process, for forming glass members. FIGS. 25C-25D show a representative cross-section of the process that corresponds to a view of an enclosure along line B-B in FIG. 5B. In particular, a glass preform 2510 (or parison) may formed, and device components 2511 may be inserted into the glass preform 2510 through an opening in the glass preform 2510. The device components 2511 may include components such as displays, circuit boards, memory, processors, sensors, charging components, microphones, wireless radios, or any other suitable components to be contained within an enclosure for an electronic device such as a smartphone, tablet computer, smart watch, or the like.

After the device components 2511 are inserted into the glass preform 2510 (and optionally maintained in a particular position relative to the glass preform 2510 by a support mechanism 2515), the glass preform 2510 may be heated to or above a softening temperature and placed proximate a mold 2512. A pressure differential between the environment in an interior cavity of the glass preform 2510 and the environment around the glass perform 2510 (e.g., caused by forcing a fluid such as air into the preform 2510 through an inlet and/or applying a vacuum around the preform 2510) may cause the preform to expand and conform to a shape of the mold 2512. As part of the molding and/or shaping process, portions 2513 of the glass preform 2510 may be drawn together to close the opening through which the device components 2511 were inserted into the glass preform 2510 and form an enclosure 2514 around the device components 2511. After the portions 2513 are drawn together, any remaining glass of the portions 2513 may be ground, machined or otherwise removed to form a substantially smooth and/or featureless surface.

In some cases, the portions 2513 may not be drawn completely together, and instead an opening may remain in the enclosure 2514. The opening may be closed or capped (e.g., with a piece of glass, plastic, metal, etc.), or it may be used as an opening through which a component may extend into the internal volume of the enclosure 2514. For example, a biometric sensor may be positioned at least partially in the remaining opening to both (1) close the opening, and (2) provide a mounting location for the biometric sensor. In other cases, a button, microphone, speaker, crown, or other input or output device may be positioned at least partially in an opening that remains in an enclosure after a molding and/or forming process.

The size and shape of the glass preforms and resulting enclosures in FIGS. 25A-25D, as well as the relative location of the inlets and/or openings on the preforms and enclosures, are merely examples, and other configurations are also contemplated. For example, the inlet and/or opening may be provided along a peripheral side of a preform or enclosure. As one specific example, where an enclosure for a watch is being formed, an opening may be provided along a peripheral side of a glass preform, and device components may optionally be inserted through the opening prior to a molding or forming operation that shapes the preform and/or closes (fully or partially) the opening. If the opening is not fully closed, the opening may be used as an opening for a component of a crown and/or button to enter the interior volume of the enclosure.

FIGS. 24A-25D show several example glass forming processes that may be used to produce glass enclosure members, though other processes are also possible. For example, enclosure members may be formed by joining multiple glass sheets or other sub-members, using adhesives, frit bonding, laser welding, or other attachment techniques, or glass may be extruded to define tube-like enclosure members that may be capped to form a glass enclosure having each side at least partially formed of glass.

One benefit of an enclosure that has multiple sides formed from transparent glass is that displays may be viewable through multiple transparent walls of the enclosure. As described above, this may include displays that are visible through as many as all of the sides of an enclosure (such as through six sides in the case of a substantially rectangular prism, through the bases and cylindrical wall of a cylindrical enclosure, or the like). Conventional flat or planar displays, however, may not be particularly well suited to a device with displays viewable through multiple sides, especially in cases where portions of a display may be rounded or curved (e.g., in the context of an enclosure with rounded peripheral sides), or extend continuously across a bend or corner (e.g., in the area of a corner or transition between a major side and a peripheral side or around a cylindrical wall). FIGS. 26A-32B illustrate various examples of display components that may be used in conjunction with glass enclosures to display images through multiple (e.g. two, three, four, five, or six) sides of the device. These displays may include various combinations of flat and/or planar display members, as well as curved display members. Flat or planar display members may be formed from or include either or both of rigid display components and flexible display components, which may be assembled and/or joined together in various ways to provide display regions that may appear seamless or otherwise continuous even between disparate sides of the device. For example, a flat display member may be formed from or include flexible display components arranged in a flat configuration, or it may be formed from or include a substantially rigid display component. Similarly, a curved display member may be formed from or include flexible display components that are flexed or otherwise forced into a desired curved shape (and optionally held in that shape by a support structure, a portion of an enclosure, or the like), or it may be formed from or include rigid display components that happen to have a curvature.

Figure 26A:
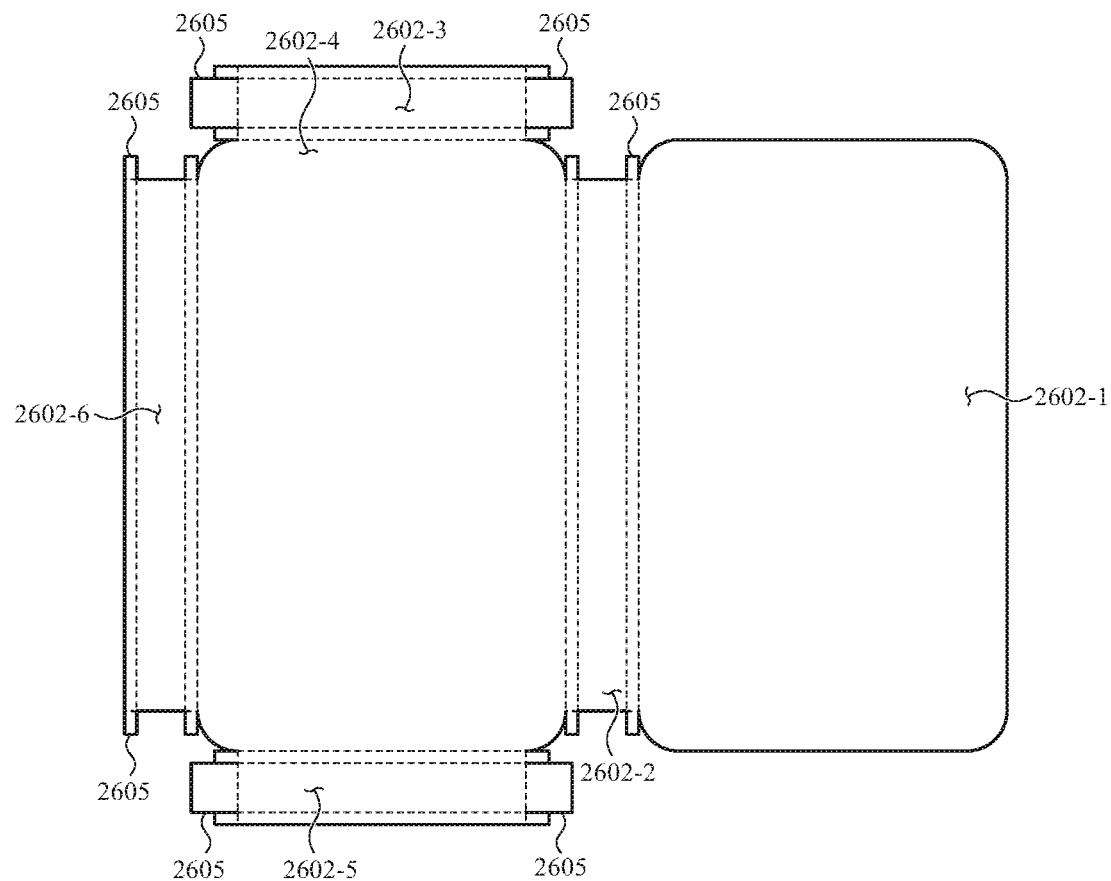
FIGS. 26A-26C depict an example multi-sided display.
Figure 26B:
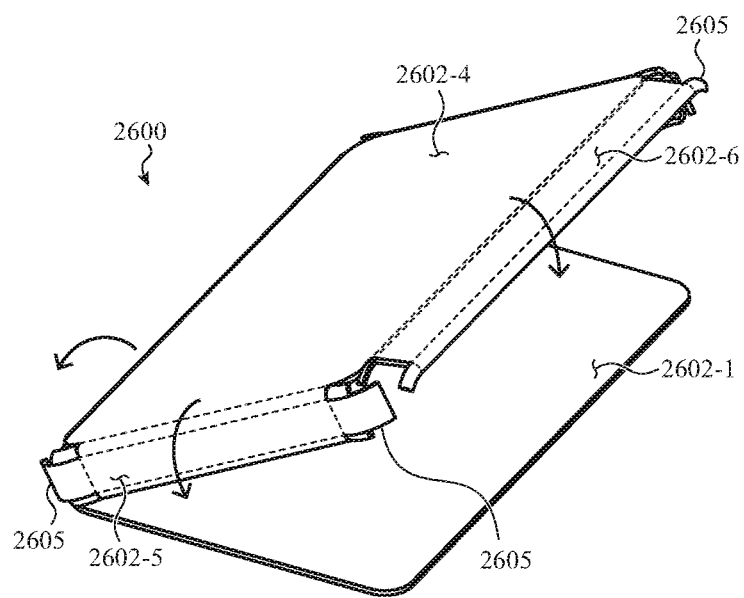
Figure 26C:
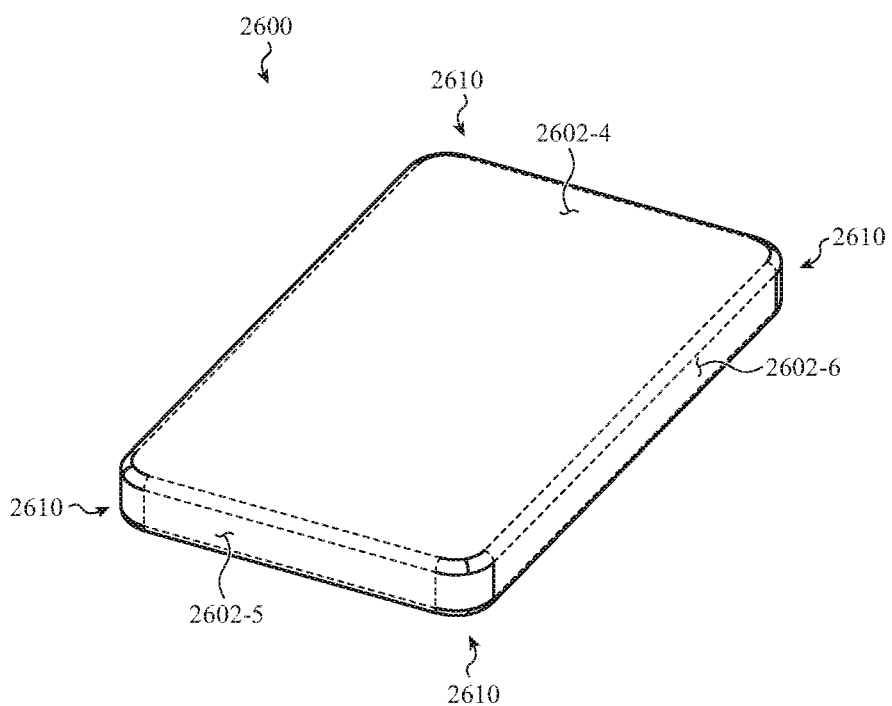

FIGS. 26A-26C show an example display component 2600 that may define six display regions 2602-1-2602-6, one region for each side of a six-sided transparent enclosure (e.g., a rectangular prism). In embodiments where an enclosure includes six sides but not all sides include a display, that corresponding portion of the display component 2600 may be omitted or inoperative. The display component 2600 may be or may include a liquid crystal (LCD) panel, an organic light emitting diode (OLED) panel, active-matrix organic light-emitting diode (AMOLED) panel, or any other suitable component(s) of a display. The display component 2600 may carry or may include light and/or color producing components that are form images.

The display component 2600 may include a material or combination of materials that can be folded or flexed to produce a display that is viewable through multiple sides of an enclosure. For example, FIG. 26A illustrates fold lines 2604 along which the display component 2600 may be folded, flexed, bent, or otherwise formed to define a final shape of the display component 2600 (FIG. 26C) in which each of the six display regions 2602-1 through 2602-6 form an outward-facing side of the display component 2600. As shown, each of the display regions 2602 may be substantially planar, though other shapes and configurations are also possible, including curved and/or rounded configurations.

The display component 2600 may be formed of or include any suitable display technology. For example, it may include a flexible substrate (or stack of substrates or layers) that can be folded from a substantially flat sheet into the configuration shown. In other cases, it may include rigid portions that may be joined by flexible interconnecting members. For example, the segments of the display corresponding to the regions 2602-1 through 2602-6 may be substantially rigid (e.g., not capable of bending more than about 30 degrees without breaking or permanent deformation), while the portions of the display component 2600 corresponding to the fold lines 2604 may be flexible (e.g., segments of the material having a width of about 0.5 mm, 1.0 mm, 1.5 mm, 2.0 mm, or any other suitable dimension, along which the display component 2600 may be folded up to about 90 degrees or more without breaking). The flexible portions may be capable of forming images or they may be non-image-forming interconnects that electrically and physically couple rigid segments together.

While the folded corners or regions are shown as having a particular example radius, this is merely an example, and the radius of curvature (or other geometric characterization of the curve) of the material that is folded, flexed, or bent may be any suitable value that results in a suitable shape without damaging the material. The same or similar principles apply to other flexible display components described herein.

In some cases the display component 2600 may have optional flaps 2605 or extensions (FIGS. 26A-26C) that are positioned at or near the corners between adjacent display regions when the display component 2600 is folded, bent, or otherwise formed into a final shape. When folded, the flaps 2605 may align with an adjacent flap or display region to help reduce or eliminate any gap between portions of the display component 2600. More particularly, the flaps 2605 may have image-forming capabilities, and by aligning the flaps 2605 with one another and/or with other portions of the display component 2600 when the display is formed into its final shape, as shown in FIGS. 26B-26C, discontinuities or blank spaces in the display component 2600 may be reduced or eliminated. This configuration may produce the appearance that the display component 2600 is a single, unified display surface that is extends over multiple sides of a device, rather than individual displays simply placed near each other. While FIGS. 26A-26C show flaps extending from various portions of the display component 2600, similar flaps may be positioned elsewhere on the display component 2600 to help reduce or eliminate visible gaps or seams between display regions.

Whether or not flaps are used, portions of the display component 2600 may be secured to one another after being folded or otherwise formed into a target shape. For example, abutting or overlapping or otherwise adjacent display regions may be adhered to one another (e.g., with epoxy, pressure sensitive adhesive (PSA), heat sensitive adhesive (HSA), or any other suitable bonding agent), mechanically secured (e.g., with interlocking structures), or otherwise structurally secured to maintain the display component 2600 in a desired shape.

FIGS. 26A-26C show an example display component 2600 that may be used in a six-sided transparent enclosure. The structure and techniques described with respect to the display component 2600 may be applicable by analogy to displays for use in enclosures having other shapes. For example, FIGS. 26D-26F show an example display component 2620 that may be used in a cylindrical transparent enclosure, such as the enclosure 422 in FIG. 4C or the enclosure 442 in FIG. 4D (or any other suitably shaped enclosure). The display component 2620 may define a first display region 2622 corresponding to a cylindrical wall of an enclosure, a second display region 2624 corresponding to a first base of the enclosure, and a third display region 2626 corresponding to a second base of the enclosure. The display component 2620 may be or may include a liquid crystal (LCD) panel, an organic light emitting diode (OLED) panel, active-matrix organic light-emitting diode (AMOLED) panel, or any other suitable component(s) of a display. The display component 2620 may carry or may include light and/or color producing components that are form images.

The display component 2600 may include a material or combination of materials that can be folded or flexed to produce a display that is viewable through multiple sides of an enclosure. For example, FIG. 26D illustrates fold lines 2625 along which the display component 2620 may be folded, flexed, bent, or otherwise formed to define a final shape of the display component 2620 (FIG. 26F) in which each of the display regions 2622, 2624, 2626 form an outward-facing side of the display component 2620. As shown, the second and third display regions 2624, 2626 may be substantially planar, while the first display region 2622 is curved into a cylindrical shape. FIG. 26E shows the display component 2620 at an intermediate state during the forming of the display component 2620 into its final shape.

The display component 2620 may be formed of or include any suitable display technology, as described above with respect to the display component 2600 or other display components described herein. Further, the edges of the display component 2620 may be attached or secured to one another using any suitable structure(s) and/or technique(s) described herein, including with overlapping flaps or edge portions of the display component, butt joints, adhesives, interlocking structures, or the like.

Figure 27A:
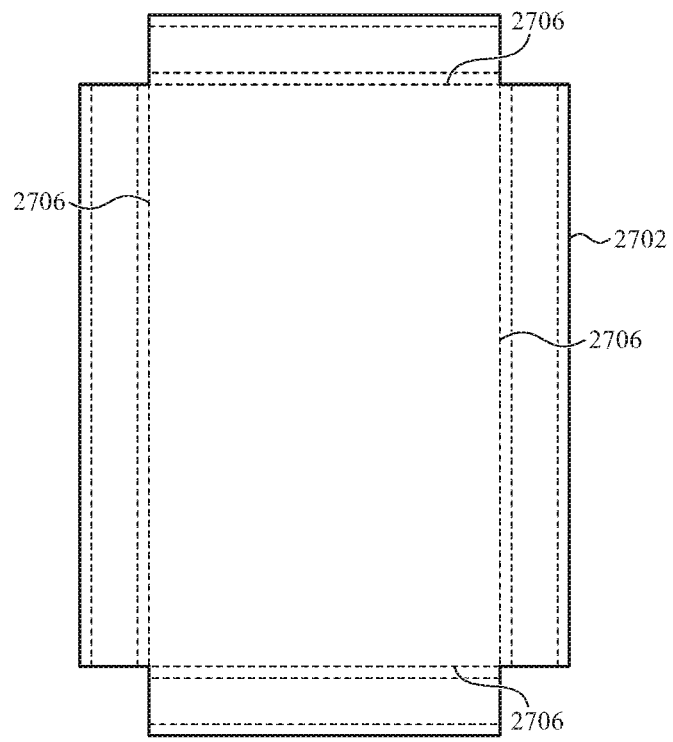
FIGS. 27A-27B depict another example multi-sided display.
Figure 27B:
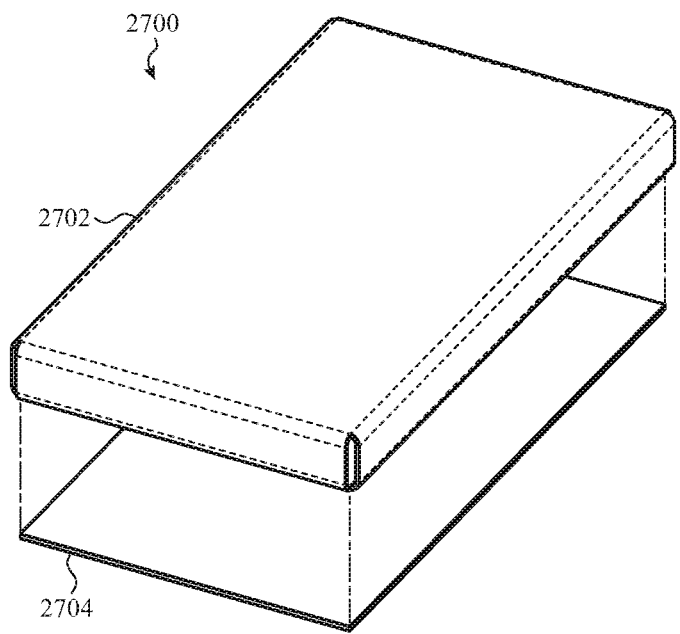

FIGS. 27A-27B show another example display component 2700 that may define six display regions (e.g., one region for each side of a six-sided transparent enclosure). The display component 2700 (FIG. 27B) may include a first display member 2702 and a second display member 2704. Both the first and second display members 2702, 2704 (and indeed any display member described herein) may be or may include a liquid crystal (LCD) panel, an organic light emitting diode (OLED) panel, active-matrix organic light-emitting diode (AMOLED) panel, or any other suitable component(s) of a display (including but not limited to filters, polarizers, films, coatings, and the like). The first display member 2702 may be folded along fold lines 2706 to define five display regions (e.g., corresponding to a first major side and four peripheral sides of an enclosure). Accordingly, the first display member 2702 may include flexible materials, such as electrical interconnects, at least in the region of the fold lines 2706 (with other portions of the display, such as the display regions, being either flexible or rigid, as described above).

The second display member 2704 may be a substantially planar member that defines a display region corresponding to a second major side of an enclosure. After the first display member 2702 is folded as shown in FIG. 27B, the first and second display members 2702, 2704 may be attached to one another (e.g., using adhesives, interlocking structures, or other techniques), or otherwise positioned in an enclosure proximate one another to give the appearance of a continuous display that extends over multiple sides of the device. Also, the first and/or the second display members 2702, 2704 may include flaps or other overlapping structures to eliminate or reduce the appearance of gaps or seams between display regions, as described above.

Figure 28A:
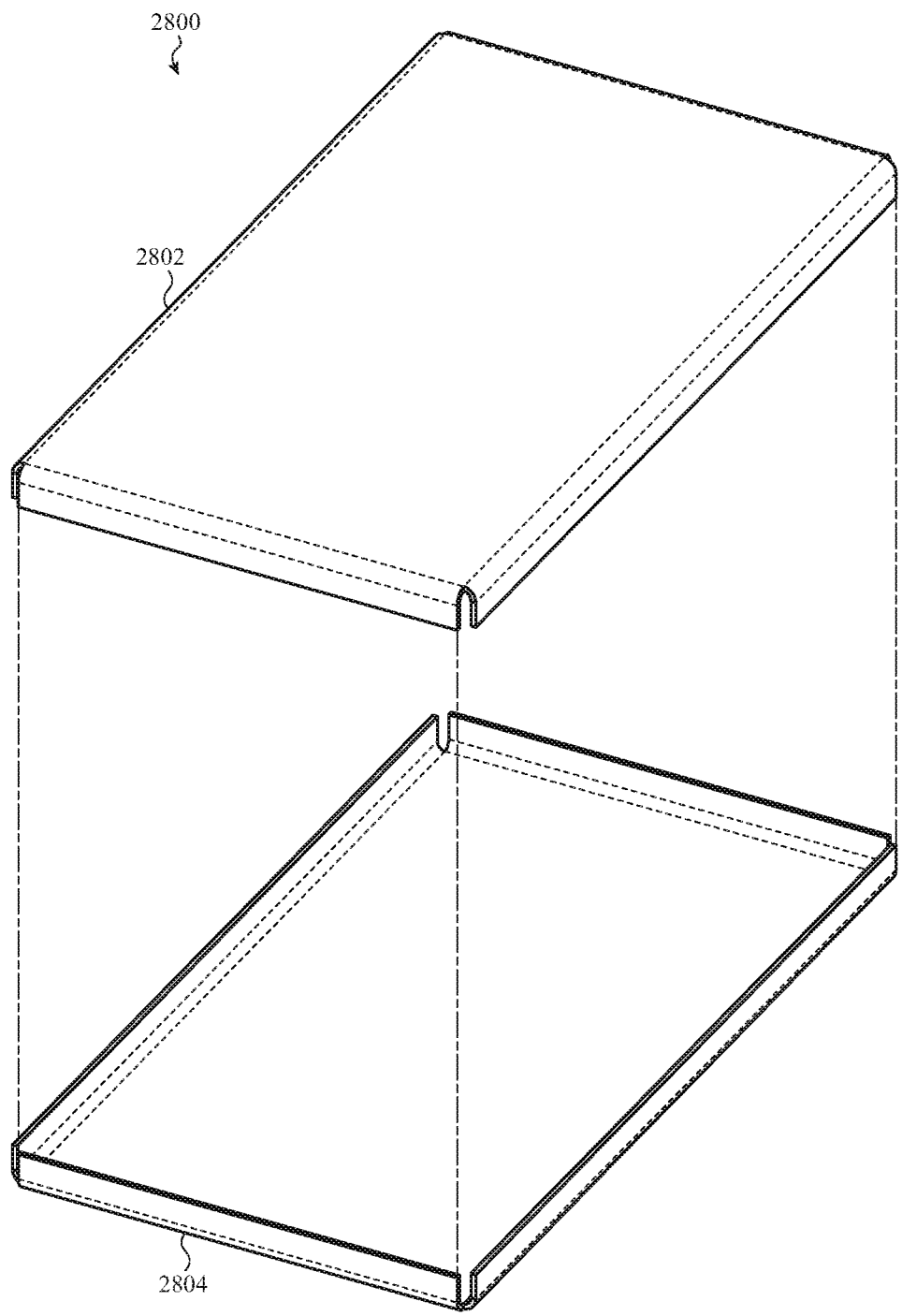
FIGS. 28A-28C depict another example multi-sided display.
Figure 28B:
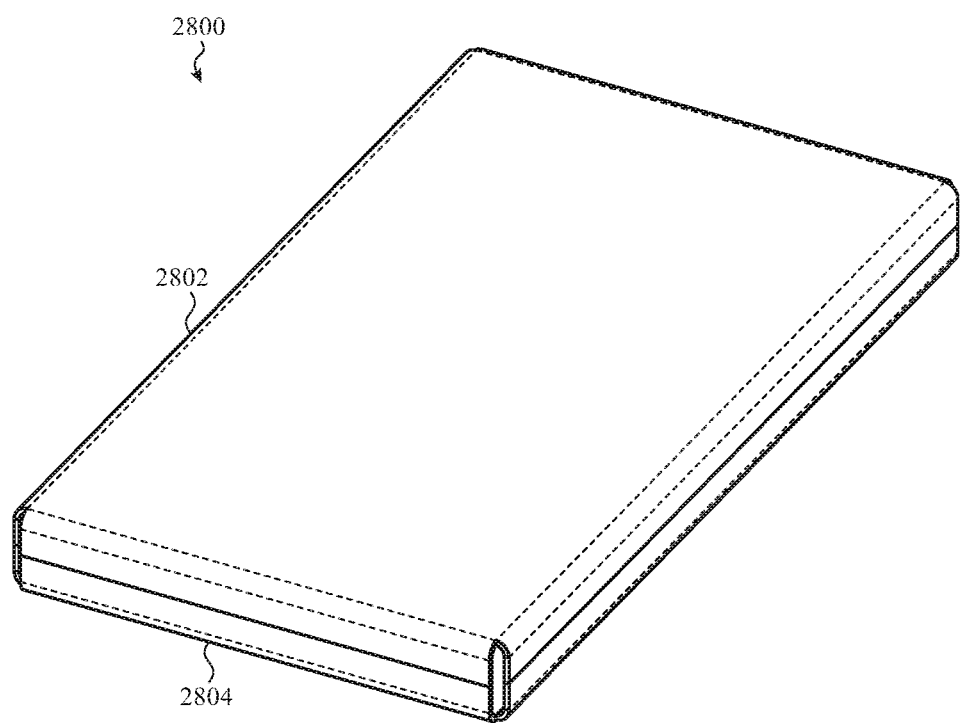
Figure 28C:
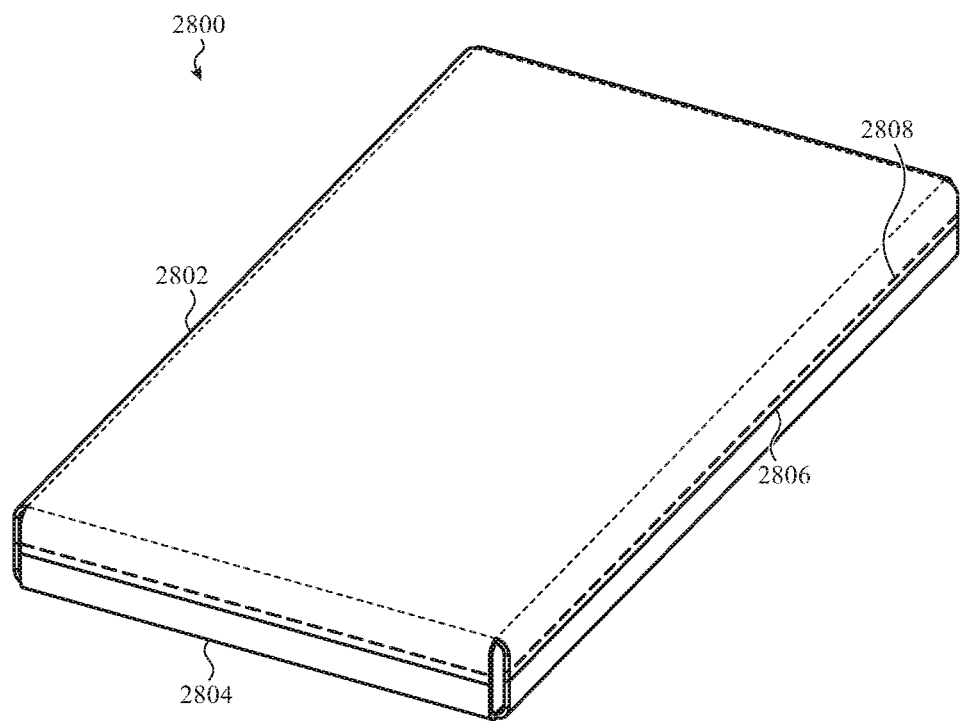

FIGS. 28A-28C show another example display component 2800 that may define six display regions (e.g., one region for each side of a six-sided transparent enclosure). The display component 2800 (FIG. 28B) may include a first display member 2802 and a second display member 2804. Both the first and second display members 2802, 2804 may be or may include a liquid crystal (LCD) panel, an organic light emitting diode (OLED) panel, active-matrix organic light-emitting diode (AMOLED) panel, or any other suitable component(s) of a display. The first and second display members 2802, 2804 each define a major side and a portion of each of the peripheral sides. For example, the first and second display members 2802, 2804 may each define approximately half of a peripheral side. The first and second display members 2802, 2804 may be joined together or otherwise positioned relative to one another to define up to six display regions, each corresponding to and visible through a side of a glass enclosure as described herein.

The first and second display members 2802, 2804 may be formed in a similar manner, and may include similar flexible and/or rigid components, as the first display member 2702 described above. Also, the first and/or the second display members 2802, 2804 may include flaps or other overlapping structures to eliminate or reduce the appearance of gaps or seams between display regions, as described above. The first and/or the second display members 2802, 2804 may be joined to one another using adhesives, interlocking structures, support members or structures, or any other suitable joining or positioning technique.

FIG. 28C shows a perspective view of the display component 2800 after the first and second display members 2802, 2804 have been joined, showing how the first and second display members 2802, 2804 overlap one another along the peripheral side of the display component 2800. For example, the terminal end 2806 of the first display member 2802 may be on the exterior surface of the display component 2800. The terminal end 2808 of the second display member 2804 may be under a portion of the first display member 2802, such that the terminal end 2808 is on the interior surface of the display component 2800. This overlapping configuration may help reduce the appearance of a seam between the display members 2802, and may help reduce discontinuities between images or graphical outputs displayed along the peripheral sides of the display members 2802, 2804.

Figure 29A:
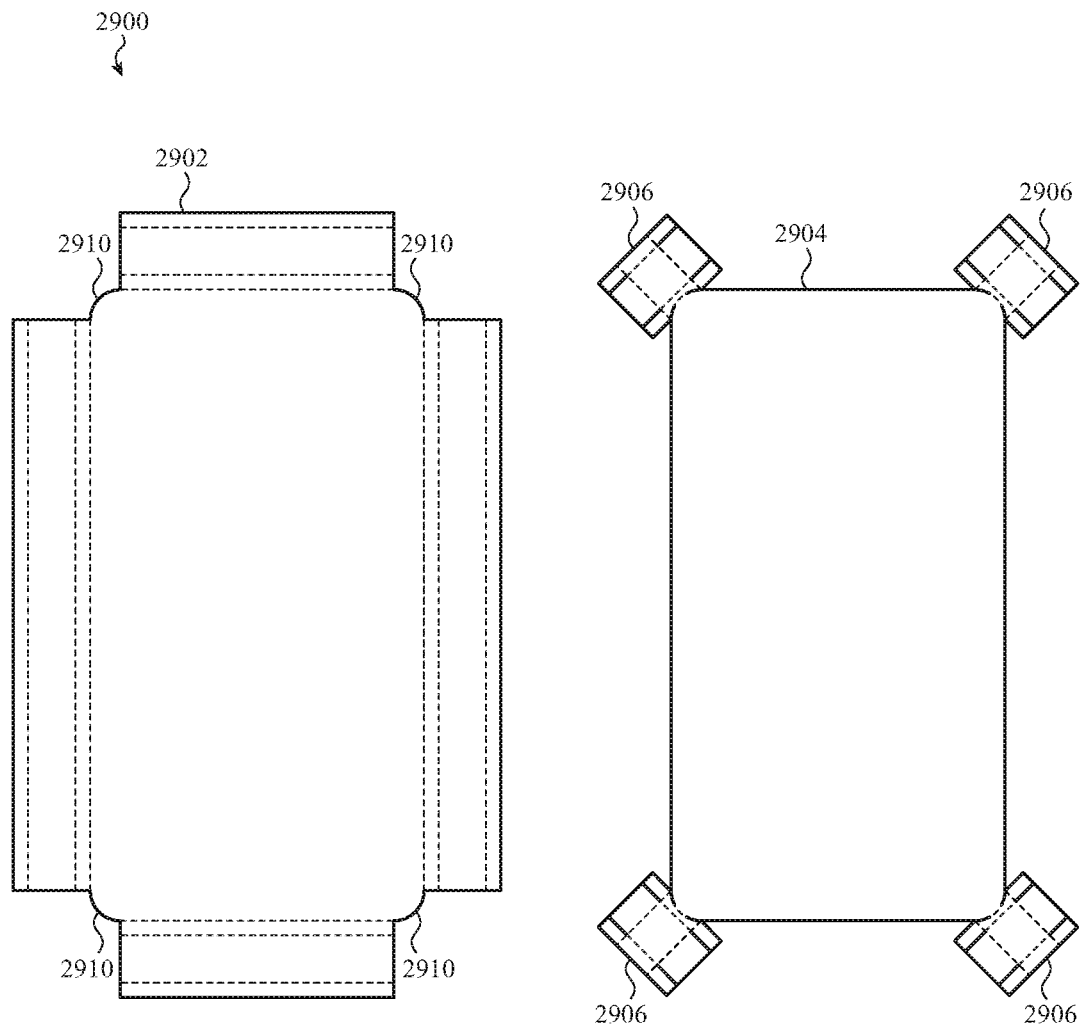
FIGS. 29A-29C depict another example multi-sided display.
Figure 29B:
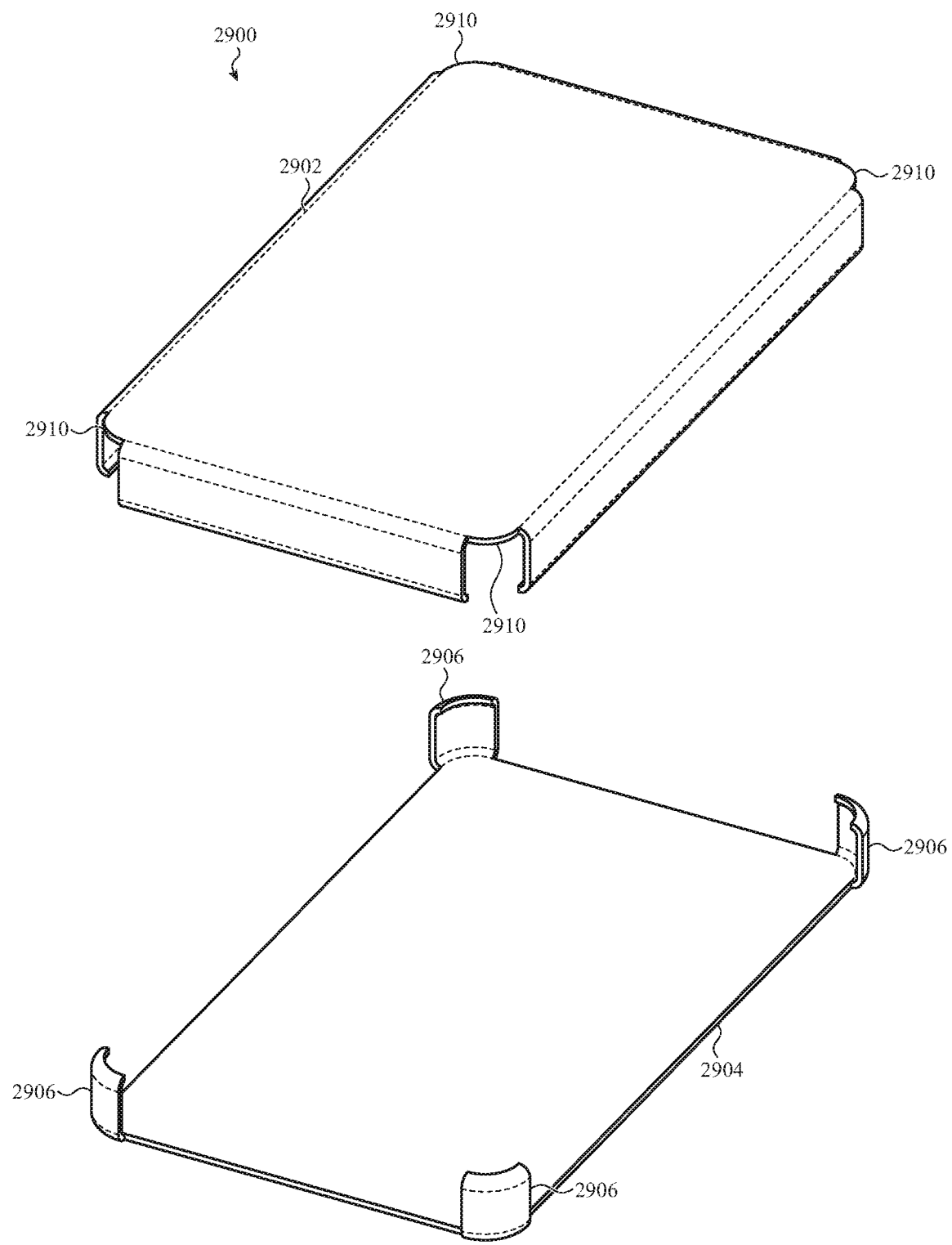
Figure 29C:
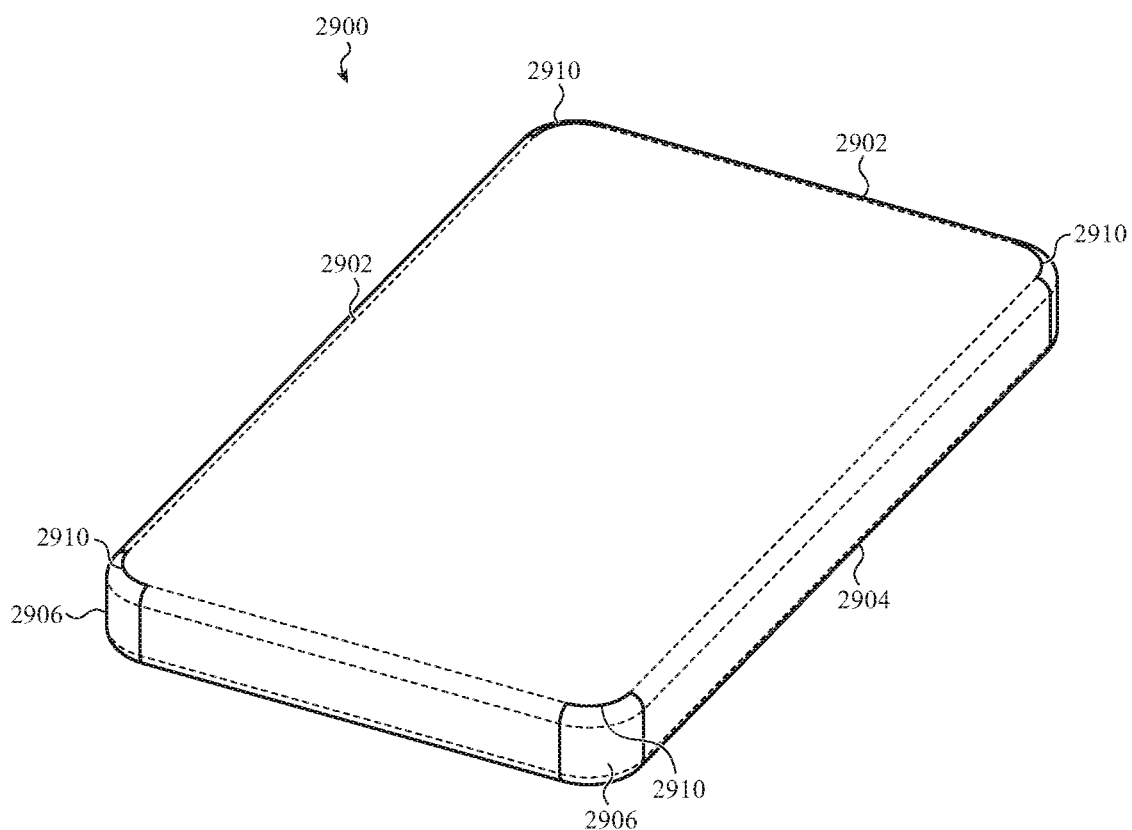

FIGS. 29A-29C show another example display component 2900 that may define six display regions (e.g., one region for each side of a six-sided transparent enclosure). The display component 2900 may include a first display member 2902 and a second display member 2904. Both the first and second display members 2902, 2904 may be or may include a liquid crystal (LCD) panel, an organic light emitting diode (OLED) panel, active-matrix organic light-emitting diode (AMOLED) panel, or any other suitable component(s) of a display. The first display member 2902 defines a major side of the display component 2900 and a portion of four peripheral sides of the display component 2900. The second display member 2904 defines another major side of the display component 2900.

The first display member 2902 also includes curved corner portions 2910, and the second display member 2904 includes tabs 2906. When the first and second display members 2902, 2904 are folded or formed to their final shapes (e.g., by folding along the dotted lines in FIG. 29A), the tabs 2906 and the corner portions 2910 may define curved corner portions between adjacent peripheral sides of the display component 2900, as shown in FIG. 29C. This configuration may be used in conjunction with glass enclosures that have curved or rounded corners.

In some cases, the curved corner portions may also be able to substantially seamlessly display graphical outputs, such as graphical outputs that extend across multiple sides of the device, and the curved corner portions may have substantially the same display properties than the main and peripheral sides of the display. In other cases, the tabs 2906 may have different display properties than other portions of the first and/or second display members. For example, the tabs 2906 may have different pixel configurations (e.g., resolution, pixel size, pixel type, etc.) than the portions of the first and/or second display members that are visible through the major and peripheral sides of an enclosure. In some cases, the tabs 2906 may have the same or similar pixel configurations, but may be programmatically configured to produce lower-resolution images than other portions of the display members, and may even be configured to emit light without any discernable images.

The first and second display members 2902, 2904 may be formed in a similar manner, and may include similar flexible and/or rigid components, as the first display member 2702 described above. Also, the first and/or the second display members 2902, 2904 may include flaps or other overlapping structures to eliminate or reduce the appearance of gaps or seams between display regions (e.g., as described herein with reference to FIGS. 35A-37). The first and/or the second display members 2902, 2904 may be joined to one another using adhesives, interlocking structures, support members or structures, or any other suitable joining or positioning technique.

Figure 30:
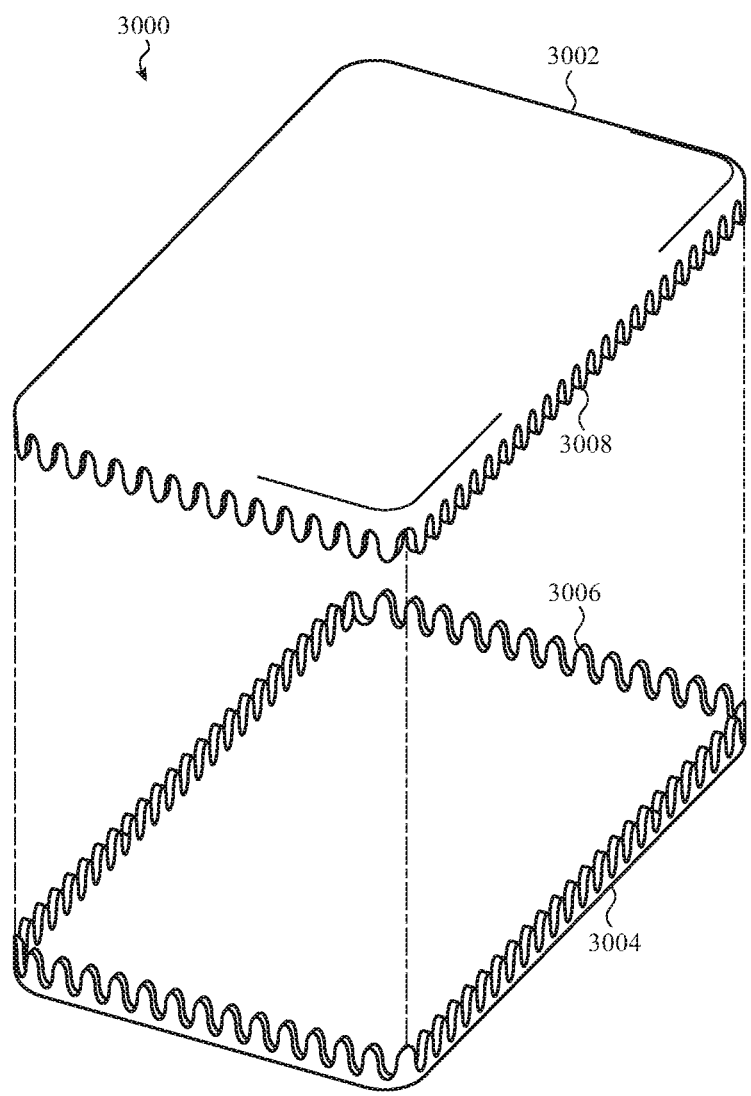
FIG. 30 depicts another example multi-sided display with an irregular joint configuration.

FIG. 30 shows another example display component 3000 that may define six display regions (e.g., one region for each side of a six-sided transparent enclosure). The display component 3000 may include a first display member 3002 and a second display member 3004. Both the first and second display members 3002, 3004 may be or may include a liquid crystal (LCD) panel, an organic light emitting diode (OLED) panel, active-matrix organic light-emitting diode (AMOLED) panel, or any other suitable component(s) of a display. The first display member 3002 defines a major side of the display component 3000 and a portion of four peripheral sides of the display component 3000. The second display member 3004 defines another major side of the display component 3000.

Instead of having elongated straight or linear seams between the first and second display members 3002, 3004, these members may each include a complementary scalloped profile (or other interdigitated shape or structure) that, when the display members 3002, 3004 are joined or otherwise positioned to form the complete display component 3000, define a non-linear, undulating, or curved seam between the two display members. This may reduce the visibility of the seam between the display members, as an irregular seam may be less visually noticeable, or it may be more easily hidden or obfuscated by images displayed on the peripheral sides of the display component 3000.

The first and second display members 3002, 3004 may be formed in a similar manner, and may include similar flexible and/or rigid components, as the first display member 2702 described above. Also, the first and/or the second display members 3002, 3004 may include flaps or other overlapping structures to eliminate or reduce the appearance of gaps or seams between display regions, as described above. The first and/or the second display members 3002, 3004 may be joined to one another using adhesives, interlocking structures, support members or structures, or any other suitable joining or positioning technique.

Figure 31A:
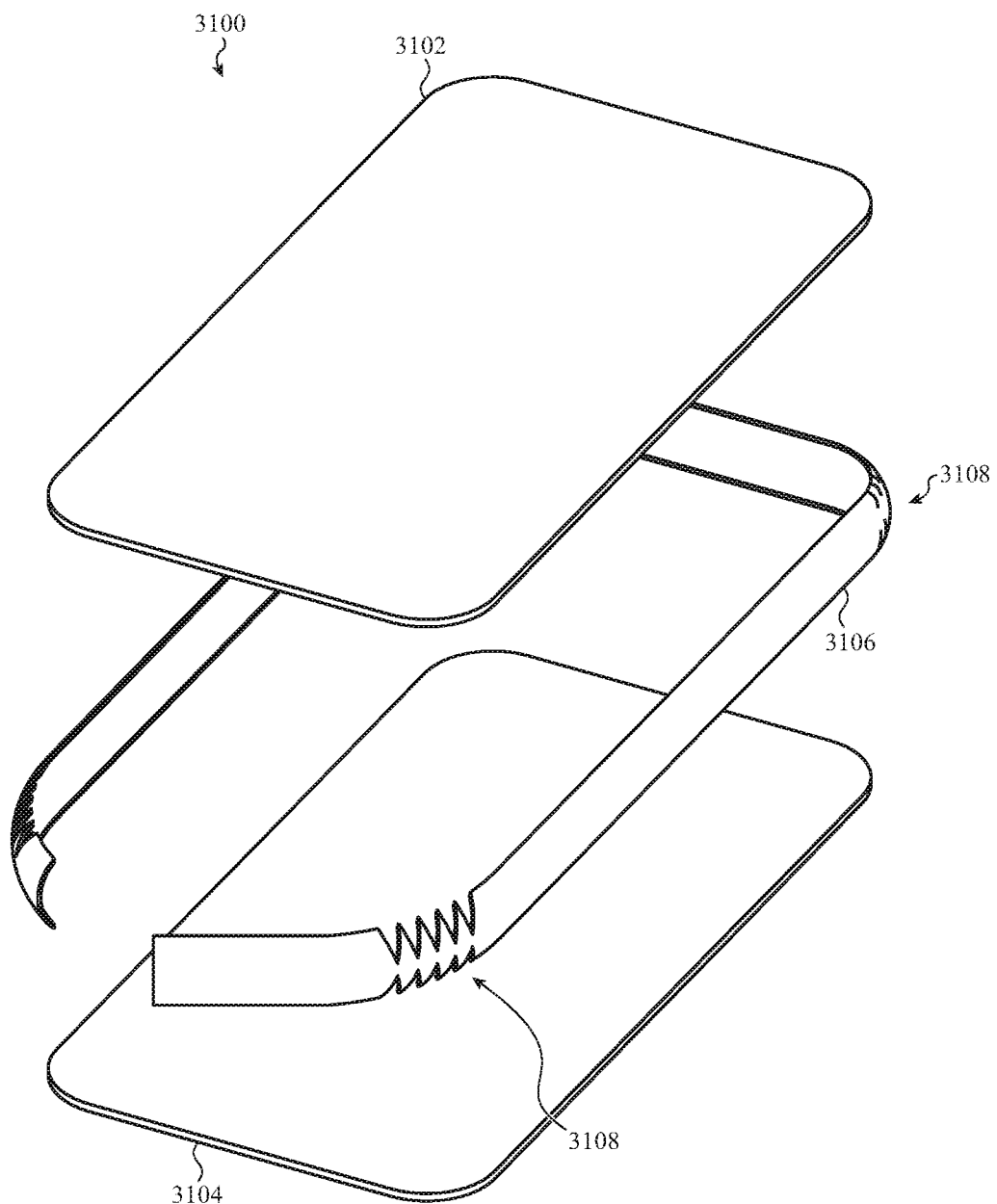
FIGS. 31A-31B depict an example multi-sided display that includes planar and curved display members.
Figure 31B:
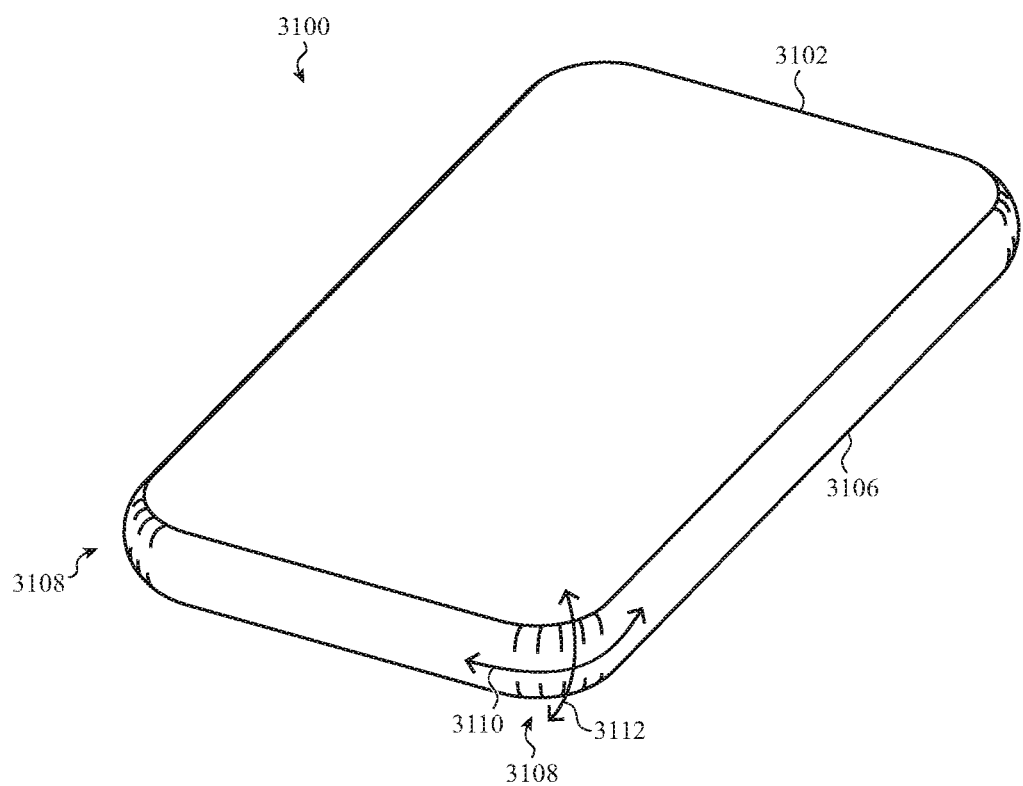

FIGS. 31A-31B show another example display component 3100 that may define six display regions (e.g., one region for each side of a six-sided transparent enclosure). The display component 3100 may use a combination of substantially planar display members and curved display members to form a display component 3100 that includes substantially flat main sides and curved peripheral sides, which may conform to the interior contours of a glass enclosure that includes curved peripheral sides (both along interior and exterior surfaces of the peripheral sides). For example, first and second display members 3102, 3104 may be substantially planar, while a third display member 3106 may be formed into a curved profile that defines a curved profile (e.g., corresponding to a curved peripheral side) and that defines curved profiles around the corners of the first and second display members 3102, 3104 (e.g., the curved corners between the peripheral sides). The first, second, and third display members 3102, 3104, 3106 may be or may include a liquid crystal (LCD) panel, an organic light emitting diode (OLED) panel, active-matrix organic light-emitting diode (AMOLED) panel, or any other suitable component(s) of a display. The first, second, and third display members 3102, 3104, 3106 may be any suitable combination of flexible and/or rigid displays. For example, the first and second display members 3102, 3104 may be more rigid than the third display member 3106.

The third display member 3106 may have cutouts or segmented portions at corner regions 3108 (FIG. 31B) to allow the corner regions 3108 to conform to a curved profile along two directions. For example, the corner regions 3108 may follow a curved path along a direction that is substantially parallel to a plane defined by the first or second major side (arrow 3110), as well as a curve that is substantially perpendicular to the plane defined by the first or second major side (arrow 3112). Accordingly, the corner regions 3108 may resemble a portion of a sphere, rather than a portion of a cylinder. The corner regions 3108 may be configured to display images or colors, or they may be inactive regions that do not emit light or display images.

As noted above, the first, second, and/or third display members 3102, 3104, 3106 may include flaps or other overlapping structures to eliminate or reduce the appearance of gaps or seams between display regions, as described above. The first, second, and/or third display members 3102, 3104, 3106 may be joined to one another using adhesives, interlocking structures, support members or structures, or any other suitable joining or positioning technique.

Figure 32A:
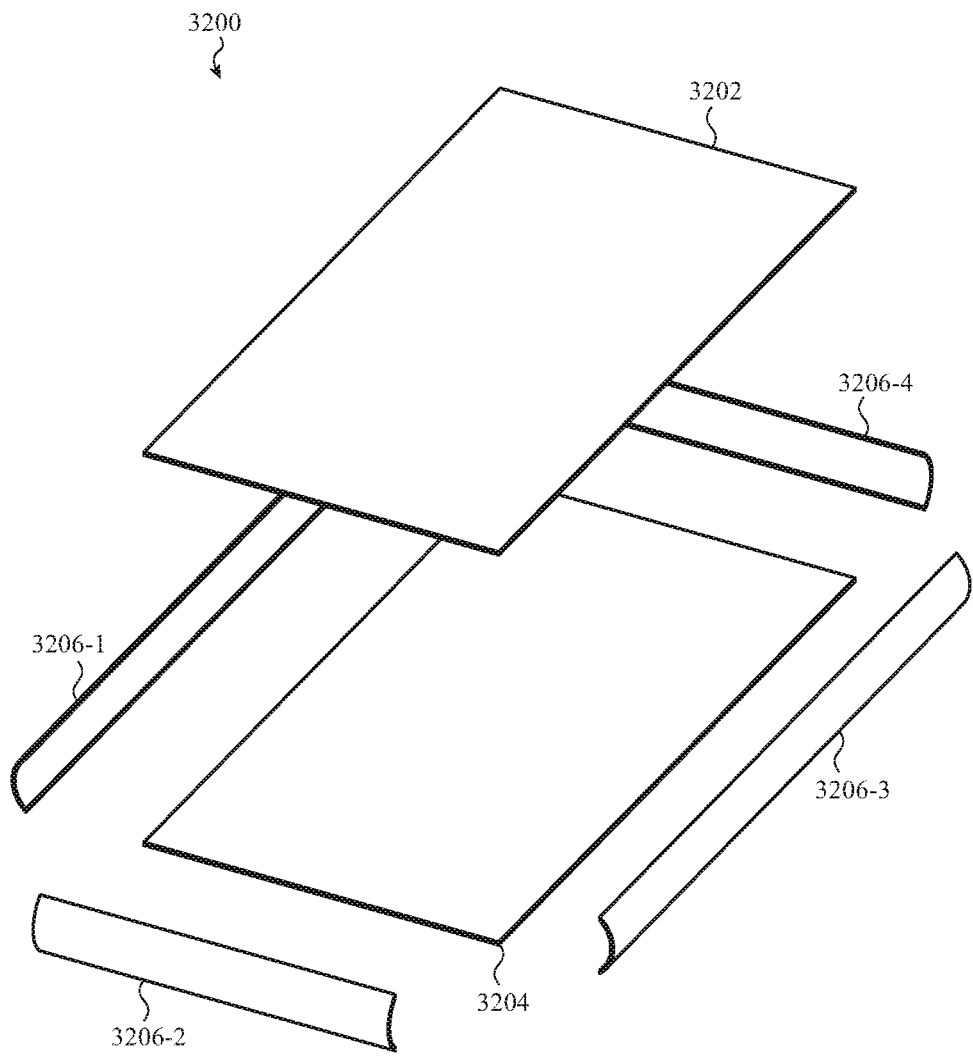
FIGS. 32A-32B depict another example multi-sided display that includes planar and curved display members.
Figure 32B:
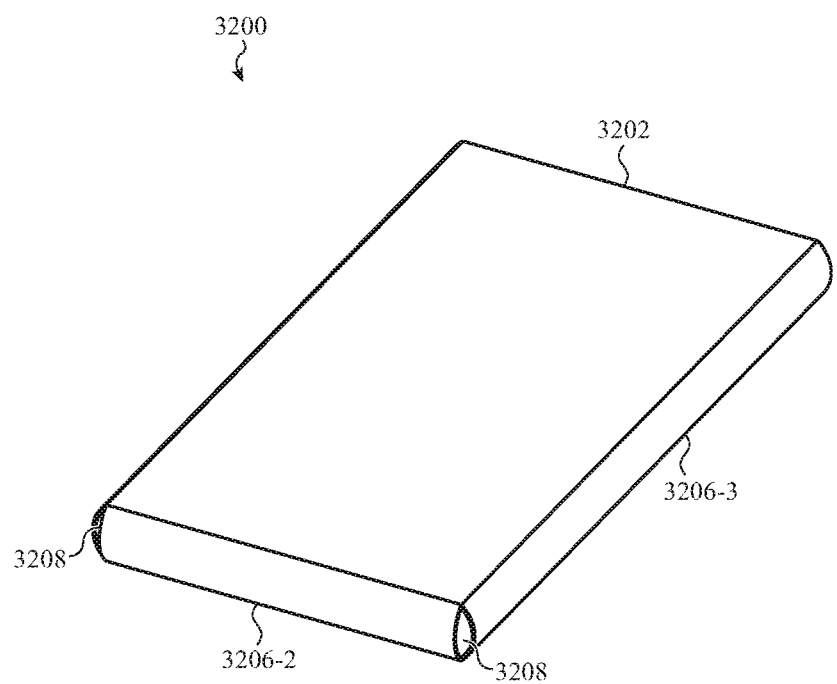

FIGS. 32A-32B show another example display component 3200 that may use a combination of substantially planar displays and curved displays to define six display regions (e.g., one region for each side of a six-sided transparent enclosure) with curved peripheral sides. Similar to the display component 3100, the display component 3200 may be configured to conform to the interior contours of a glass enclosure that includes curved peripheral sides (both along interior and exterior surfaces of the peripheral sides).

With respect to FIG. 32A, first and second display members 3202, 3204 may be or may include substantially planar display members, while third display members 3206-1 through 3206-4 may be formed into a rounded or curved profile. The first, second, and third display members 3202, 3204, 3206 may be or may include a liquid crystal (LCD) panel, an organic light emitting diode (OLED) panel, active-matrix organic light-emitting diode (AMOLED) panel, or any other suitable component(s) of a display. As noted above, the different display members may have different rigidities, such as the first and second display members 3202, 3204 being more rigid than the third display members 3206-1 through 3206-4.

When assembled, the display component 3200 may define open corner regions 3208. Other components, such as other display members (which may have a same or different pixel configuration as other display members of the display component 3200), light sources, or the like, may be positioned in or viewable through the open corner regions 3208. In other cases, they may be inactive regions that do not display images or light, and covers, inks, dyes, or other materials may be used to cover or occlude the openings.

As noted above, the first, second, and/or third display members 3202, 3204, 3206 may include flaps or other overlapping structures to eliminate or reduce the appearance of gaps or seams between display regions, as described above. The first, second, and/or third display members 3202, 3204, 3206 may be joined to one another using adhesives, interlocking structures, support members or structures, or any other suitable joining or positioning technique.

FIGS. 26A-32B describe various example configurations for multi-sided displays. In some cases, where display members are joined or positioned adjacent one another, seams or other artifacts of the joint may be visible. Similarly, glass enclosures that are formed of multiple glass members may have seams where the glass members are joined. In some cases, devices may be configured so that seams of a display component are aligned with seams of the enclosure that contains the display component. For example, the display component 2800 (FIG. 28B) may be used with the enclosure 700 (FIG. 7B), so that the seams that extend along the peripheral sides of the display component 2800 and the enclosure 700 are substantially aligned. This may help hide or minimize the visibility of the seams in the display component 2800, because the seam in the enclosure 700 may cover the seam.

Also, the multi-sided displays described with respect to FIGS. 26A-32B may be configured to conform to and/or contact substantially all of the interior surfaces of the enclosure in which it is positioned. Thus, air gaps between the display surfaces and the interior surfaces of an enclosure may be reduced or eliminated, which may improve the visual appearance of the displays and minimize unused space, among other possible advantages. Finally, it will be understood that in any of the foregoing display components, fewer than six sides may be configured to display images or produce light. For example, in cases where only five or four sides of an electronic device are associated with a display, one or two of the sides of the display components described herein may be omitted or replaced with a component that is not configured to display images or light.

Figure 33:
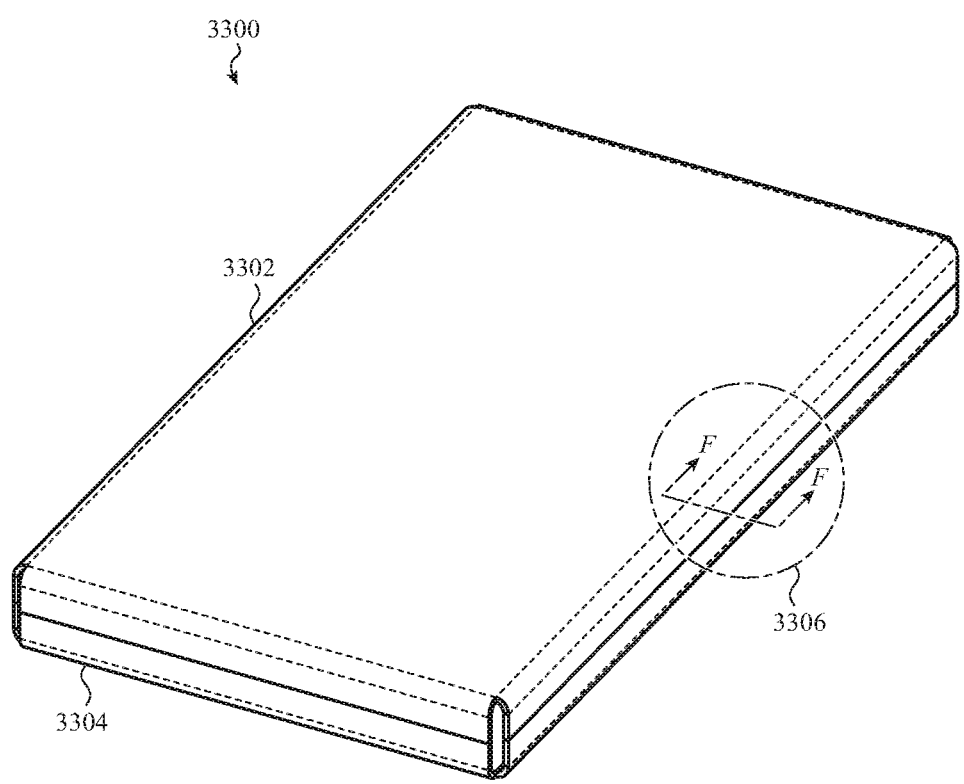
FIG. 33 depicts an example multi-sided display in an assembled configuration.

As described above, display components may comprise multiple display members that are attached to one another to form a single, multi-sided display. Where the display components overlap (and are optionally secured to one another via adhesive or another suitable technique), seams may be formed. In some cases, display components may be attached to one another in a manner that may reduce the visibility of any seams or overlap. FIGS. 33-36B illustrate example configurations of a joint or seam between two display members that may be used with any of the foregoing display components. FIG. 33 shows an example display component 3300, which resembles the display component 2800 (FIG. 28B), and includes a first display member 3302 attached to a second display member 3304.

Figure 34A:
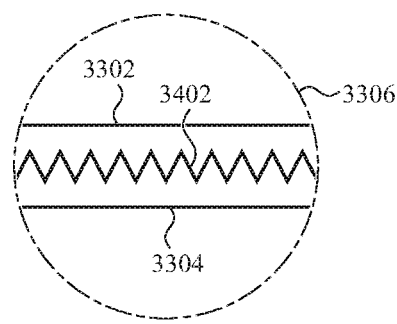
FIGS. 34A-34B depict an example joint configuration between display members.
Figure 34B:
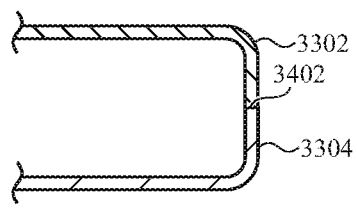

FIGS. 34A-34B show an intersection between the first and second display members 3302, 3304, according to an example joining technique. In particular, FIG. 34A shows a detail view of a peripheral wall of the display component 3300 corresponding to the area 3306 in FIG. 33, and FIG. 34B shows a partial cross-sectional view of the display component 3300, viewed along line F-F in FIG. 33. In this example, the first and second display members 3302, 3304 each define a complementary toothed profile (or other interdigitated profile) along a joining portion or end of the display members. The toothed profiles engage one another to define an irregular seam 3402, which may be less noticeable than (or easier to hide with displayed images or other display techniques) than a single elongated linear seam, as described above. As shown in FIG. 34B, the joining portions of the first and second display members 3302, 3304 may abut one another in a non-overlapping configuration, such that the first display component 3300 maintains a substantially constant thickness across the seam 3402.

Figure 35A:
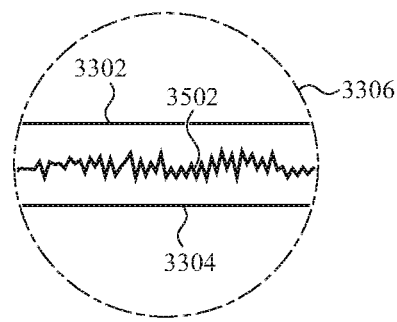
FIGS. 35A-35C depict another example joint configuration between display members.
Figure 35B:
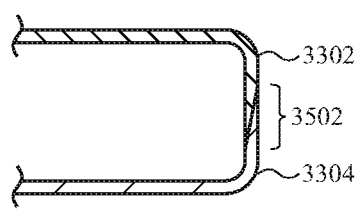
Figure 35C:
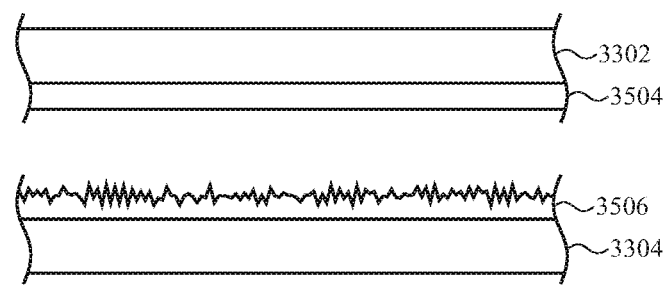

FIGS. 35A-35C show an intersection between the first and second display members 3302, 3304, according to another example joining technique. FIG. 35A shows a detail view of a peripheral wall of the display component 3300 corresponding to the area 3306 in FIG. 33, and FIG. 35B shows a partial cross-sectional view of the display component 3300, viewed along line F-F in FIG. 33. In this example, one or both of the first and second display members 3302, 3304 define a fringed profile along a joining portion or end. The fringed profile includes teeth or tapered shapes that, due to their non-linear or irregular configuration, may help hide or reduce the visibility of the seam 3502 between the first and second display members 3302, 3304. As shown in FIG. 35B, the first and second display members 3302, 3304 may be tapered in an overlapping region that corresponds to the seam 3502. The tapered shapes may avoid or reduce abrupt transitions or discontinuities where one display member overlaps the other. Because abrupt transitions may increase the visibility of the seam by having an inactive edge region of a display member visible to a user, the tapered overlapping region as shown in FIG. 35B may reduce the visibility of the seam 3502. (Where only one of the display members defines a fringed profile, the display member with the fringed profile may overlie the other display member so that the fringed profile defines the exterior or visible surface of the display.)

FIG. 35C shows a partial exploded or unassembled view of the display component 3300, further illustrating how the display members 3302, 3304 may overlap. In particular, the first display member 3302 may have a tapered region 3504 that defines a substantially straight or flat surface at its terminal end (e.g., leading to a sharp edge). Thus, the tapered region 3504 of the first display member 3302 may not have a fringed profile. On the other hand, the second display member 3304 may have a tapered region 3506 that includes the fringed profile. All or part of the tapered region 3506 and/or the fringed profile may be transparent, to allow underlying pixels of the first display member 3302 (e.g., along the tapered region 3504) to be visible through the tapered region 3506 of the second display member 3304. While FIGS. 35A-35C show one example overlapping configuration, other overlapping configurations are also possible, including different amounts of overlap, different taper profiles, overlaps producing non-continuous display seams (e.g., shelfs or steps in the exterior surface of the displays), and the like.

Figure 36A:
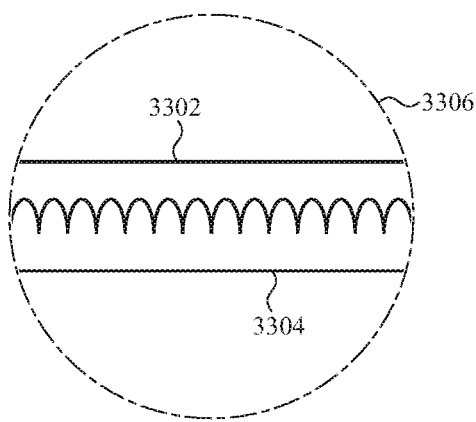
FIGS. 36A-36C depict another example joint configuration between display members.
Figure 36B:
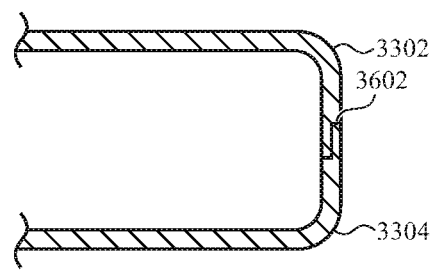
Figure 36C:
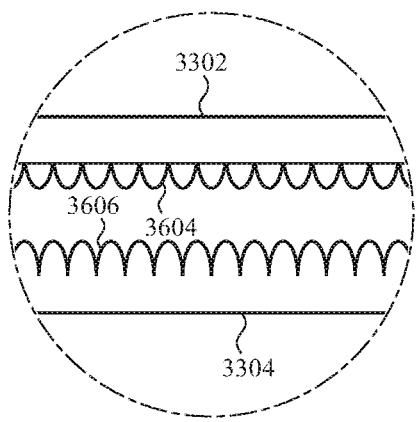

FIGS. 36A-36C show an intersection between the first and second display members 3302, 3304, according to another example joining technique. FIG. 36A shows a detail view of a peripheral wall of the display component 3300 corresponding to the area 3306 in FIG. 33, and FIG. 36B shows a partial cross-sectional view of the display component 3300, viewed along line F-F in FIG. 33. In this example, one or both of the first and second display members 3302, 3304 define a scalloped profile along a joining portion or end. The scalloped profile includes projections that may be arranged in an offset, overlapping configuration to help hide or reduce the visibility of a seam 3602 between the first and second display members 3302, 3304, and/or to otherwise create a secure attachment between the display members. As shown in FIG. 36B, the first and second display members 3302, 3304 may be notched in the area of the seam 3602. The notches may be complementary to allow the first and second display members 3302, 3304 to form a single substantially planar and/or continuous surface on the peripheral side of the display component.

FIG. 36C shows a partial exploded or unassembled view of the display component 3300, further illustrating how the display members 3302, 3304 may overlap when joined using the configuration in FIGS. 36A-36B. As shown, the scalloped profiles may be offset from one another, so that the projections of one of the display members are positioned between two projections on the opposite display member.

Figure 37A:
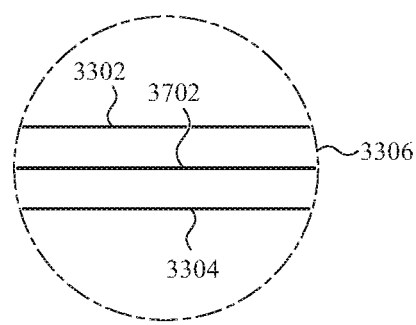
FIGS. 37A-37B depict another example joint configuration between display members.
Figure 37B:
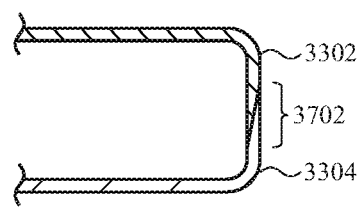

FIGS. 37A-37B show an intersection between the first and second display members 3302, 3304, according to another example joining technique. FIG. 37A shows a detail view of a peripheral wall of the display component 3300, corresponding to the area 3306 in FIG. 33, and FIG. 37B shows a partial cross-sectional view of the display component 3300, viewed along line F-F in FIG. 33. In this example, one or both of the first and second display members 3302, 3304 define a straight or flat surface profile along a joining end of the display members, which may produce a substantially straight or linear seam 3702. As shown in FIG. 37B, the first and second display members 3302, 3304 may be tapered in an overlapping region that corresponds to the seam 3702. As noted above, the tapered shapes as shown in FIG. 37B may avoid or reduce abrupt transitions or discontinuities where one display member overlaps the other, thus reducing the visibility of the seam 3702.

Figure 38:
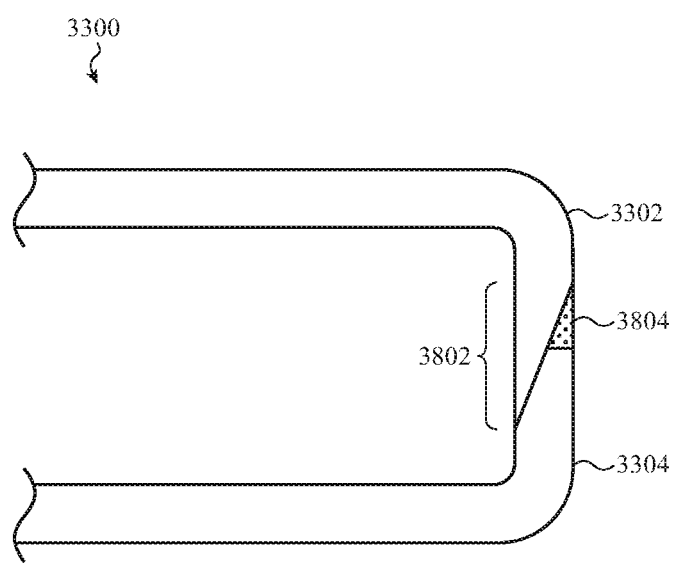
FIG. 38 depicts another example joint configuration between display members.

FIG. 38 shows a partial cross-sectional view of the display component 3300, viewed along line F-F in FIG. 33, according to another example joining method. In this example, similar to the example shown in FIGS. 37A-37B, both the first and the second display members 3302, 3304 are tapered in an overlapping region 3802 that corresponds to a seam between the display members. The second display member 3304 may have a transparent region 3804 in the overlapping region 3802, which may allow images displayed on the portion of the first display member 3302 that underlies the transparent region 3804 to be viewed through the transparent region 3804. More particularly, a tapered region may not have display elements (e.g., pixels) towards the thinnest end of the taper. Accordingly, by including a transparent region 3804 at or proximate the terminal end of the second display member 3304, underlying pixels or image forming components of the first display member 3302 may be visible through the transparent region 3804.

Where display members (or portions of a single display member) overlap or are positioned proximate one another, the overall display may be subjected to a calibration procedure to ensure that images or other graphical outputs that span the seam are continuous and seamless. For example, if overlapping displays are misaligned, a portion of a graphical output displayed on one display member may be shifted relative to another portion of the graphical output displayed on another display member. This may be visually unappealing and may reduce the quality and functionality of the device. Accordingly, after a display or electronic device is assembled using multiple display members (e.g., to form a multi-sided display), a calibration routine may be used to programmatically account for physical misalignments. For example, a test image may be displayed on the display. The test image may span multiple display members and/or extend across any seams, folds, overlaps, or other areas of possible misalignment. An imaging system may capture an image of the displayed test image and determine parameters of misalignment between display members (e.g., misalignment angles, misalignment distances, etc.). The imaging system, or any other appropriate system, may then determine programmatic correction parameters that are provided to the device to alter how graphical outputs are displayed, at least in the region of detected misalignment. The process may then be repeated to determine if additional correction parameters are warranted, or if the display is aligned to within an acceptable range.

The foregoing displays and display members may include or be associated with touch sensing systems and/or force sensing systems. Such systems may include electrode layers, compressible and/or collapsible layers, processors, and any other suitable components, which may be incorporated with (e.g., attached to) the display members themselves, or placed over, under, or otherwise proximate to a display member and/or a wall of an enclosure through which a display member is viewed. As one example, electrode layers that facilitate capacitive touch sensing (using a self-capacitance scheme, a mutual-capacitance scheme, or any other suitable capacitive sensing technique) may be incorporated with any of the foregoing display members, including those that are visible through the major sides of an enclosure and the peripheral sides of an enclosure. Other types of touch sensing and/or force sensing systems may also or instead be used. Assemblies that include display components and touch and/or force sensing components may be referred to as touchscreen display assemblies.

Figure 39:
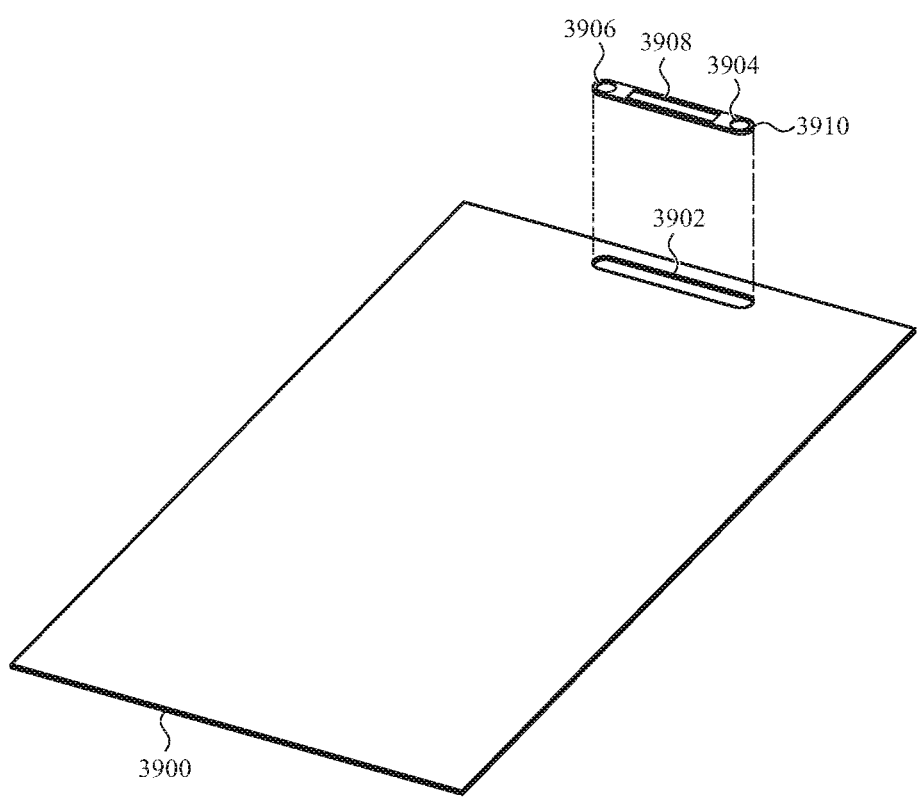
FIG. 39 depicts an example display member with an opening to accommodate electronic device components.

In some cases, electronic device components may require access through a display. For example, cameras, flashes, projectors, microphones, and speakers, among other possible components, may require an opening or other access through the display in order to function effectively. FIG. 39 shows an example display member 3900 (or a portion of a display member) that includes or defines an opening 3902. Device components such as a camera 3906 (or other optical sensor), flash 3910 (or other illuminator or projector, such as a micro-dot projector for facial or other biometric recognition), and an audio component 3908 (such as a microphone, speaker, or the like) may be positioned in or otherwise configured to communicate through the opening 3902. The components may be positioned in a carrier 3904, which may have a size and shape that corresponds to the opening 3902. Alternatively, the carrier 3904 may represent an ink, mask, or other material or component that covers the opening and prevents internal components from being visible through the opening 3902.

While FIG. 39 shows a single opening, in some cases a display may include multiple openings, such as one opening each for the camera 3906, flash 3910, and audio component 3908 (or other components). Moreover, in embodiments where a device includes such components at both ends of a device (e.g., proximate both a top and bottom of the device), the display may include an additional opening and additional corresponding device components, all of which may appear substantially identical to the opening and the components illustrated in FIG. 39 but positioned at a different end of the display member 3900.

Figure 40:
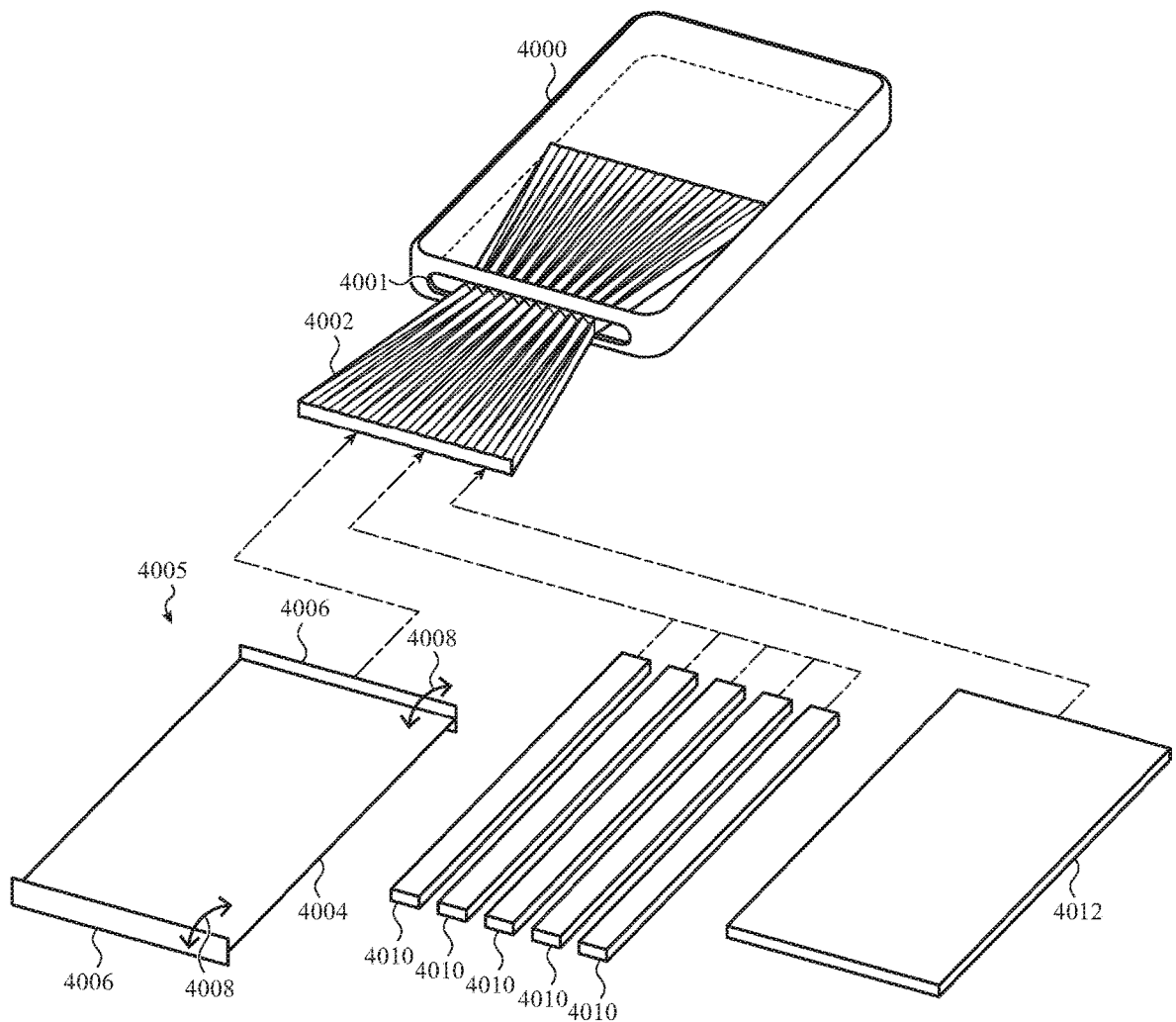
FIG. 40 depicts an example assembly technique for an electronic device.

As described herein, some glass enclosures may be formed to be substantially completely enclosed, and in some cases may be formed so that substantially all of the sides are a single glass component. In such cases, some access must be provided to the interior volume of the enclosure in order to allow internal device components to be inserted into the interior volume. FIG. 40 shows an example assembly process by which internal components may be introduced into an interior volume of a glass enclosure.

In particular, FIG. 40 shows a glass enclosure 4000 that includes an opening 4001 defined in one of the peripheral sides of the glass enclosure 4000. The glass enclosure 4000 may be a monolithic or unitary component (e.g., a single piece of glass that defines at least a portion of each of six sides of the enclosure), or it may have been assembled by joining multiple glass members. As shown in FIG. 40, a flexible display member 4002, which may represent any of the flexible display members shown or described herein, is being collapsed to fit through the opening 4001. Once through the opening 4001, the flexible display member 4002 is un-collapsed or un-folded to an original or desired size and configuration. Multiple display members may be inserted into the glass enclosure 4000 in a similar manner, and positioned at target locations within the glass enclosure 4000 to form a multi-sided display component, such as any of the display components shown or described herein.

In some cases, all of the components of the device are suitably sized and/or shaped to be inserted through the opening 4001, including batteries, processors, circuit boards, memory, sensors, cameras, projectors, microphones, speakers, support frames or structures, and the like. For example, FIG. 40 shows an example support frame 4005 that includes a main strut 4004 and end struts 4006 that can move or flex relative to the main strut 4004 (e.g., along arrows 4008) so that the support frame 4005 may be inserted into the interior volume of the enclosure 4000 through the opening 4001. Once inside the enclosure 4000, the end struts 4006 may be unfolded into their final positions (e.g., perpendicular to the main strut 4004). FIG. 40 also shows example battery modules 4010 that may be sized to fit through the opening 4001. The battery modules 4010 may be connected together once inside the enclosure 4000 to supply power to the electronic device. FIG. 40 also shows a device module 4012, which represents other internal components of a device, such as one or more circuit boards, processors, structural members, frames, audio modules (e.g., speakers, speaker chambers, microphones, transducers), cameras, touch and/or force sensors, wireless charging components, antennas, memory modules, haptic actuators, or the like.

In some cases, electronic devices using enclosures as described herein may include internal structural supports or frames. These supports may provide several functions. For example, they may help provide structural rigidity, stiffness, and/or strength to the device. They may also form mounting surfaces for internal components. They may also define support structures or surfaces on which flexible display members may be placed, and which may impart a shape to flexible display members.

Figure 41:
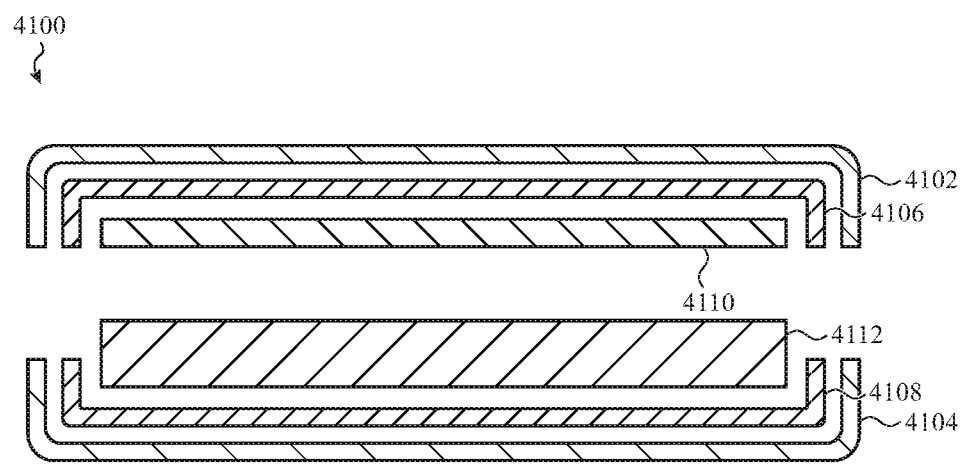
FIG. 41 depicts another example assembly technique for an electronic device.

FIG. 41 shows a cross-sectional exploded view of an example device 4100, showing another technique for assembling and/or arranging device components inside a glass enclosure. The glass enclosure may include a first glass member 4102 and a second glass member 4104, each defining a major side and a portion of the peripheral sides of the enclosure (similar to the enclosure shown in FIG. 16A, above). Before the first and second glass members 4102, 4104 are bonded together or otherwise joined, components may be arranged between the first and second glass members 4102, 4104. For example, the components may be placed in and/or secured to one or both of the first and second glass members 4102, 4104.

As a non-limiting example, a first display member 4106 may be positioned in the partial cavity defined by the first glass member 4102, and optionally secured to the first glass member 4102. The first display member 4106 may be configured to transmit graphical output through all (or in some cases a subset) of the sides of the first glass member 4102. A circuit board 4110 may also be positioned in the partial cavity defined by the first glass member 4102 and below the first display member 4106. The circuit board 4110 may include any or all of the main device components of the device, including processors, structural members, frames, audio modules (e.g., speakers, speaker chambers, microphones, transducers), cameras, touch and/or force sensors, wireless charging components, antennas, memory modules, haptic actuators, or the like.

A second display member 4108 may be positioned in the partial cavity defined by the second glass member 4104, and optionally secured to the second glass member 4104. The second display member 4108 may be configured to transmit graphical output through all (or in some cases a subset) of the sides of the second glass member 4104. A battery 4112 may also be positioned in the partial cavity defined by the second glass member 4104 and above the second display member 4108. The battery 4112, circuit board 4110, and first and second display members 4106, 4108 may be electrically interconnected in any suitable way, and the glass members 4102, 4104 may thereafter be secured to one other to define a device having an enclosure with glass defining substantially all exterior surfaces.

Figure 42A:
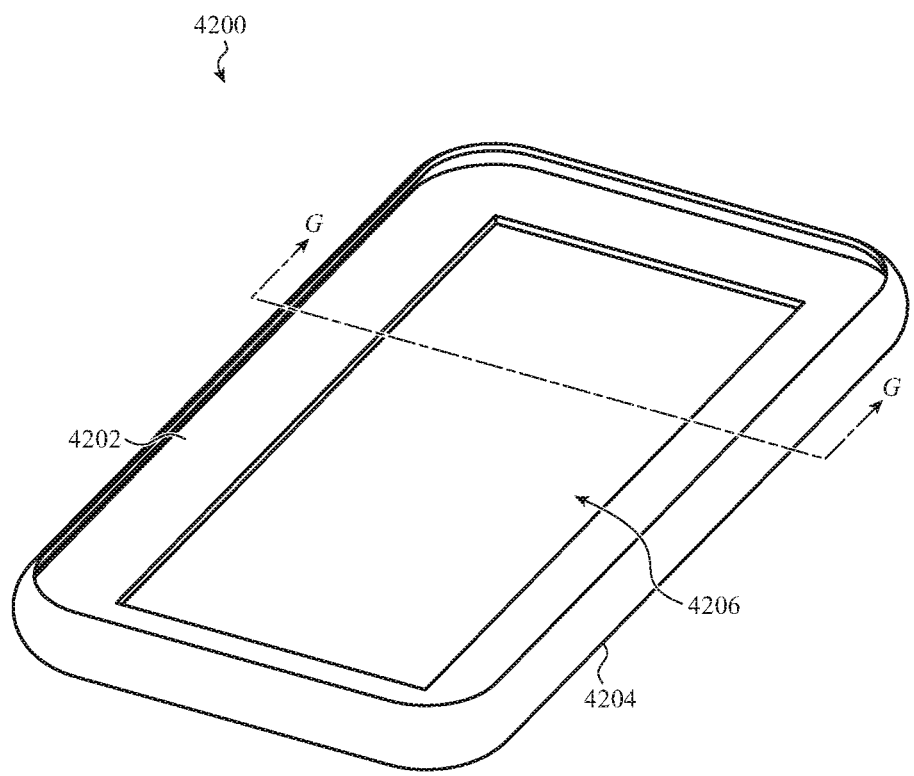
FIGS. 42A-42B depict an example internal support structure for an electronic device.
Figure 42B:
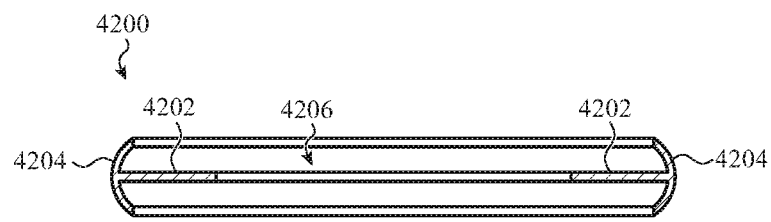

FIG. 42A shows a perspective view of an example support structure 4200 that may be positioned inside an enclosure. FIG. 42B shows a cross-sectional view of the support structure 4200, viewed along line G-G in FIG. 42A. The support structure 4200 includes a frame 4202 and peripheral supports 4204. The peripheral supports 4204 may be curved or otherwise conform to or follow a rounded or curved shape of the interior surface of a peripheral side of an enclosure (e.g., the enclosure 102, FIGS. 1A-1B). A flexible display member (e.g., the third display member 3106, FIG. 31A) may be supported by, and optionally in direct contact with, the peripheral supports 4204. Electronic device components may be coupled to the frame 4202, including but not limited to circuit boards, sensors, processors, memory, batteries, and the like. The frame 4202 may define an opening 4206 that allows components to be placed in the opening and/or allows electrical and/or physical interconnections between components that are on opposite sides of the frame 4202.

All or some of the support structure 4200 may be electrically active or otherwise part of an electrical circuit. For example, the support structure 4200 may be formed from or include conductive materials (e.g., metal, carbon fiber), and may form or be part of an electrical ground for the device. In some cases, all or some of the support structure 4200 may be part of an antenna circuit. For example, portions of the support structure 4200, such as the peripheral supports 4204, may be configured to transmit and/or receive wireless signals (e.g., they may act as a radiator or receiver of radio frequency signals).

The support structure 4200 may be formed of or include any suitable material, such as plastic, carbon fiber, rubber, metal (e.g., aluminum, stainless steel), ceramic, glass, composite materials, or the like. Moreover, the support structure 4200 may be collapsible so that its outer dimensions can be reduced to fit through an opening in an enclosure (e.g., the opening 4001, FIG. 40). For example, the support structure 4200 may be formed of or include flexible materials that allow the peripheral supports 4204, for example, to be folded against the frame 4202. As another example, the support structure 4200 may include hinges, living hinges, or other mechanical joints that allow the support structure 4200 to be at least partially collapsed for insertion into an enclosure and then expanded to a desired final configuration within the enclosure.

Figure 43A:
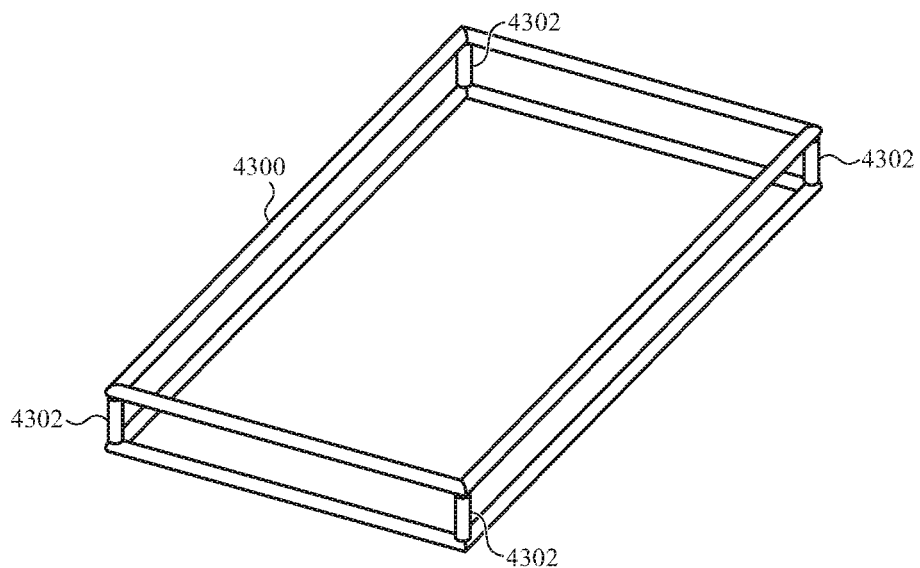
FIG. 43A depicts another example internal support structure for an electronic device.

FIG. 43A shows a perspective view of another example support structure 4300 that may be inserted into or assembled inside of a glass enclosure. The support structure 4300 may be used to support internal electronic device components, and/or to provide structural rigidity, stiffness, and/or strength to the enclosure and the device overall. The support structure 4300 may include a structure of rods, beams, or other elongated members that are coupled to one another to form a substantially rectangular frame. Corner supports 4302 (as well as the remaining portions of the support structure 4300, may have any suitable shape. As shown, they are substantially straight (e.g., linear) rods. In other cases, they may be curved, such as to conform to or track a shape of an interior surface of a glass enclosure. The support structure 4300 may be formed of or include flexible members or materials (or hinges or other structures) to allow the support structure 4300 to be at least partially collapsed for insertion into an enclosure, and then expanded to a desired final configuration within the enclosure. Alternatively, the support structure 4300 may be assembled within an enclosure from constituent components or parts.

Figure 43B:
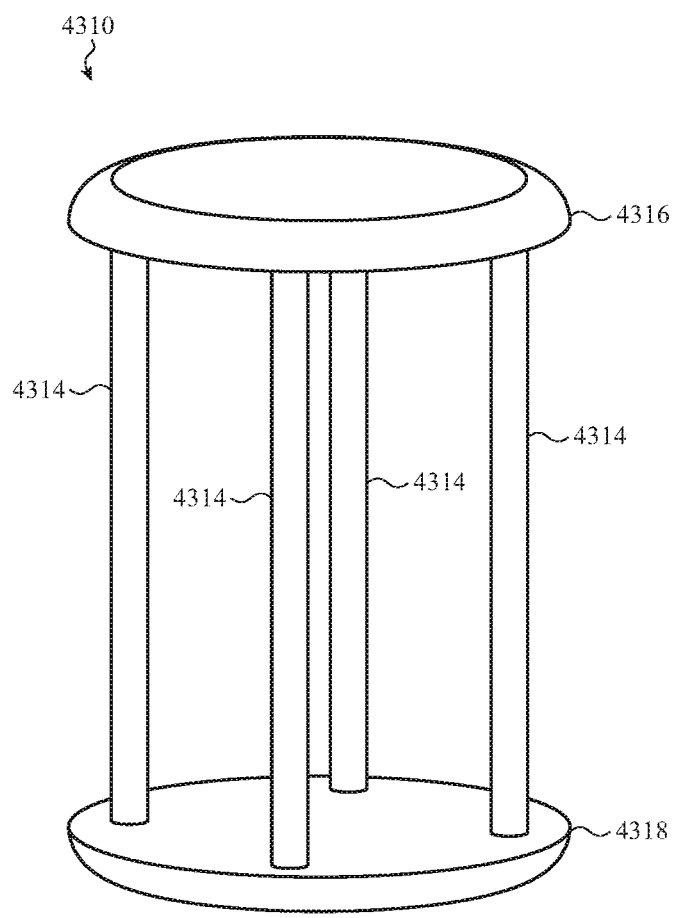
FIG. 43B depicts another example internal support structure for an electronic device.

FIG. 43B is a perspective view of an example support structure 4310 that may be used with a device that has a cylindrical shape (e.g., the device 420, FIG. 4C). The support structure 4310 is similar to the support structure 4300, but has a different form factor to accommodate a differently shaped enclosure.

The support structure 4310 includes support members 4314 and base supports 4316, 4318. A display (e.g., the display 2620, FIGS. 26D-26F) may be supported by, and optionally in direct contact with, the support members 4312. Electronic device components may also be coupled to or supported by the support members 4312, including but not limited to circuit boards, sensors, processors, memory, batteries, and the like. The base supports 4316, 4318 may have a shape corresponding to the bases of a cylindrical enclosure (shown here as circular, but they may have different shapes depending on the particular shape of the enclosure). The base supports 4316, 4318 may support portions of a display that are viewable through the bases of a cylindrical enclosure. The base supports 4316, 4318 may include curved portions that may contact or otherwise provide structural support to a display, and may in fact maintain a display, or a portion thereof, in a particular curved shape. Other aspects of the support structure 4300 described above are likewise applicable to the support structure 4310, including suitable materials and the collapsibility of the support structure for assembly.

Figure 44A:
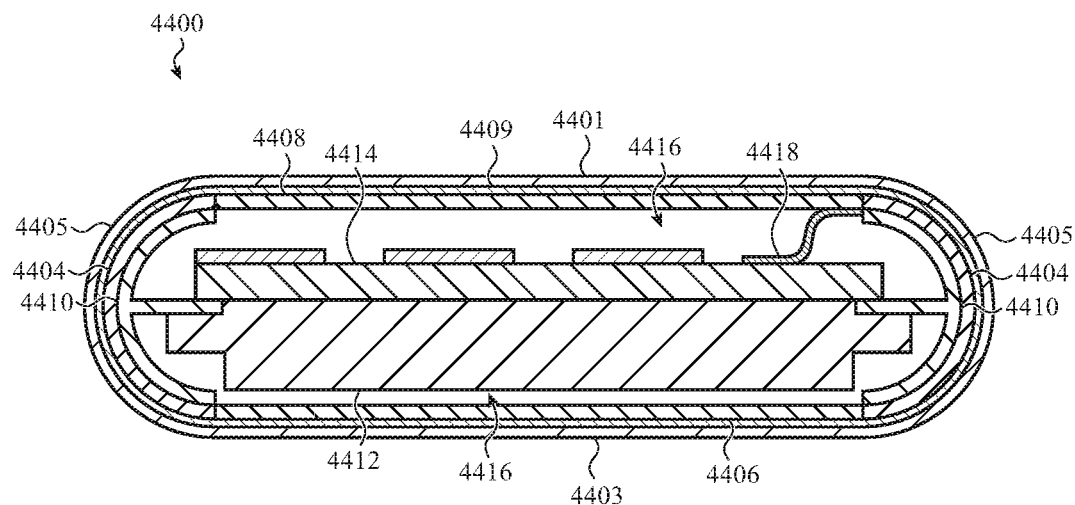
FIGS. 44A-44B depict cross-sectional views of example electronic devices having multi-sided displays and an internal support structure.

FIG. 44A is a representative cross-sectional view of an electronic device 4400, corresponding to a view along line G-G in FIG. 42A, showing one example internal arrangement of components of the device 4400. The device 4400 includes a glass enclosure 4402, which may correspond to any of the enclosures shown or described herein. The glass enclosure 4402 may define first and second major sides 4401, 4403, and peripheral sides 4405. The device 4400 may include a multi-sided display, which may include a first display 4408 (which may be substantially planar) that is visible through the first major side 4401 and a second display 4406 (which may be substantially planar) that is visible through the second major side 4403. The multi-sided display may also include a third display 4404 (similar to the display 3106, FIGS. 31A-31B) that may be curved and is visible through the peripheral sides 4405. The displays 4404, 4406, and 4408 may be rigid or flexible displays, as described herein, and outer surfaces of the displays may be in direct contact with the interior surface of the enclosure 4402 (as shown), or they may be set apart from the enclosure by a void or by another transparent component. Moreover, while shown as three separate display members, the displays 4404, 4406, and 4408 may instead be more or fewer display members (e.g., they may all be part of a single contiguous display member that is folded or otherwise formed to be visible through the major and peripheral sides of the enclosure). Where the displays 4404, 4406, and 4408 are multiple display members, they may be joined together as described herein.

The device 4400 may also include force and/or touch sensing components 4409 between the displays 4404, 4406, 4408 and the glass enclosure 4402 (or otherwise integrated with the displays 4404, 4406, 4408). The force and/or touch sensing components 4409 may include any suitable components that, alone or with other components, facilitate the detection of touch and/or force inputs on the exterior surface of the glass enclosure 4402. The force and/or touch sensing components 4409 may include electrode layers, compliant or compressive layers, capacitive sensing components, resistive sensing components, or the like.

The device 4400 may also include a support structure 4410. The support structure 4410 may resemble the support structure 4200 described with respect to FIGS. 42A-42B. The support structure 4410 may have curved peripheral supports that may support the third display 4404, and in the case where the third display 4404 is a flexible display, may impart a desired shape to the display 4404.

The device 4400 may also include a first module 4414 attached to or otherwise supported by the support structure 4410 on a first side of the support structure 4410, and a second module 4412 attached to or otherwise supported by the support structure 4410 on a second side of the support structure 4410 opposite the first side. The first module 4414 may include circuits, processors, memory, circuit boards, sensors, chipsets, and the like, and the second module 4412 may include batteries (though these are merely example components and positions for such components). One or more of the displays may be coupled to the first module 4414 via a connector 4418. As noted above, these components may be positioned inside the device by inserting them into a substantially completed enclosure (e.g., through an opening in an otherwise enclosed six-sided enclosure) and assembling them while they are inside the enclosure, or by building the enclosure around the components (e.g., by joining two enclosure members together around an already assembled set of internal components.

As shown in FIG. 44A, the device 4400 may include interstitial voids 4416 that are not occupied by device components. These voids 4416 may be filled with air or another gas. In some cases, the air or other gas is at ambient pressure. In other cases, the enclosure 4402 may have a different pressure than the external environment. For example, air or another gas or fluid may be introduced into the voids 4416 at an above-ambient pressure, and the enclosure 4402 may thereafter be sealed to trap the gas or fluid in the enclosure 4402. The internal pressure from the gas may increase the strength, stiffness, rigidity, resistance to damage, or other physical properties of the overall device 4400.

Figure 44B:
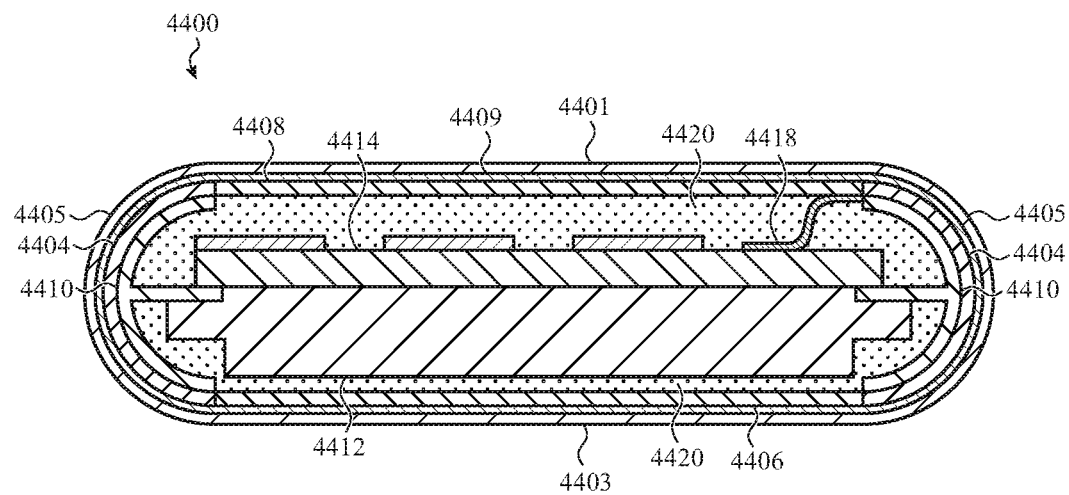

FIG. 44B shows the same cross-section of the device 4400, but instead of a void that is filled with gas at or above an ambient pressure, the void space is at least partially filled with a potting or encapsulating material 4420. The encapsulating material 4420 may be a foam (e.g., an expanding foam), a liquid (e.g., a liquid dielectric), a polymer, or any other suitable material. The encapsulating material 4420 may provide additional structural rigidity, stiffness, and/or strength to the device 4400. For example, the encapsulating material 4420 may apply an outward pressure on the displays that forces the displays against the interior surfaces of the enclosure. The encapsulating material 4420 may also prevent or limit movement of internal components relative to the support structure and/or one another.

As described above, glass enclosures may lack physical buttons, keys, switches, or other physical affordances that may be found on conventional electronic devices. Instead of such physical affordances, devices with glass enclosures as described herein may use other techniques to provide visual and/or tactile queues to a user regarding the location, size, and/or function of certain input regions. One such technique is to form regions of different textures on exterior surfaces of the enclosure.

Figure 45A:
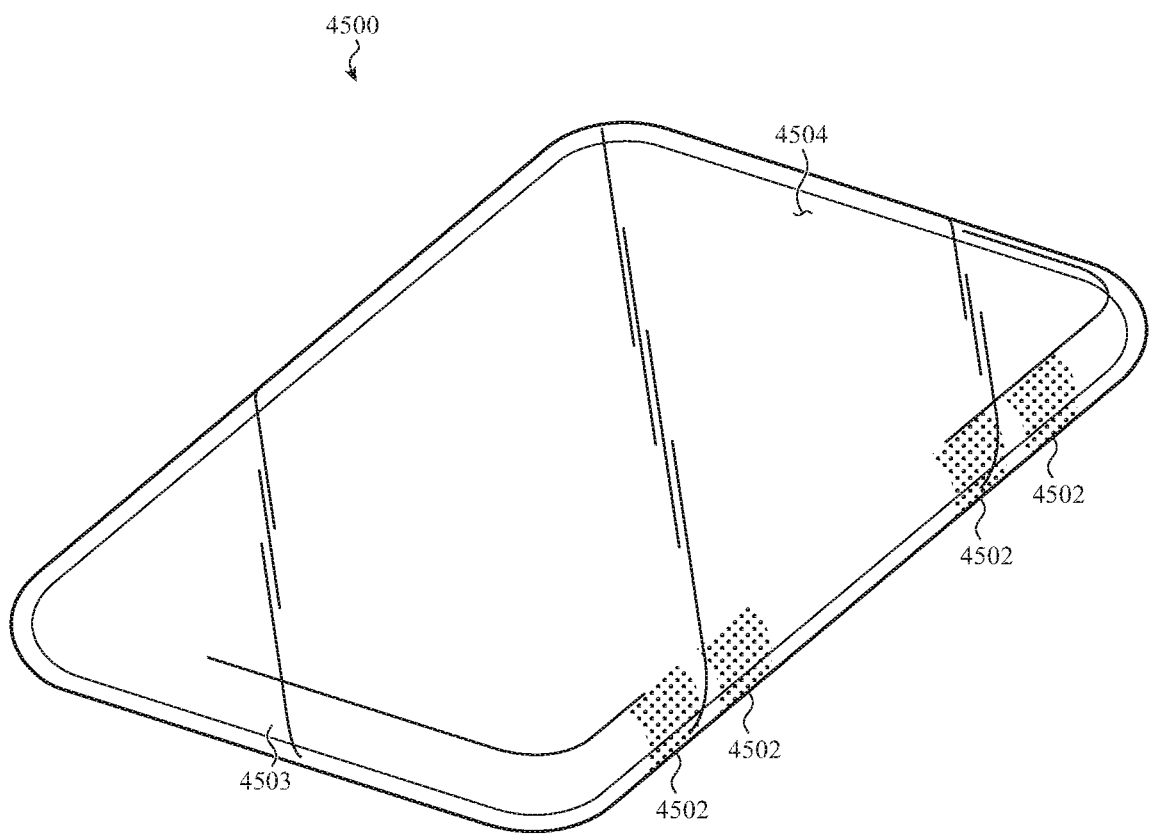
FIG. 45A depicts an example glass enclosure with differently textured regions.

FIG. 45A shows an example glass enclosure 4500 that defines a first major side 4504, a second major side opposite the first major side, and a peripheral side 4503. As noted above, affordances such as volume buttons, power buttons, ring/silent buttons, or the like may be positioned on the peripheral side 4503 of a device enclosure. In order to improve the tactile feel of the affordances, regions 4502 of the peripheral side 4503 that correspond to the affordances may be textured to provide a tactilely detectable difference between the regions 4502 and other surfaces of the enclosure 4500 (e.g., the first and second major sides). The surface texture of the regions 4502 may be formed in any suitable way. For example, the regions 4502 may be abrasive blasted, etched (e.g., chemical etching, laser etching, etc.), ground, lapped, machined, or the like. In some cases, a coating or film may be applied to the peripheral side 4503 to define the regions 4502. Even when the regions 4502 are textured, they may remain sufficiently transparent to allow images or components under the regions 4502 to be visible. In some cases the regions 4502 may be visually indistinguishable (with an unaided eye) from other regions of the enclosure, despite having a different tactile feel. Accordingly, the dynamic nature of a multi-sided, touch- and/or force-sensitive display may be maintained while also adding the advantages of the differences in texture.

In some cases the regions 4502 have a greater surface roughness than other regions of the enclosure 4500, such as the major sides of the enclosure. This may be achieved, for example, using one of the aforementioned texturing processes. In other cases, the regions 4502 may produce different tactile responses using other phenomena, such as using different oleophobic coatings, different insulating or conductive coatings, different glass compositions, or any other suitable technique.

The regions 4502 may correspond to graphical outputs presented on a display underlying the peripheral side 4503, and the regions 4502 may be touch and/or force sensitive (e.g., using touch- and/or force-sensing systems) to detect user selections or actuations of the regions 4502. In other cases, there may be no display under the textured regions 4502. For example, a static image, a light, or another indicator may be positioned below the textured regions 4502 to visually indicate that the regions 4502 are affordances that control an operation or function of a device.

Figure 45B:
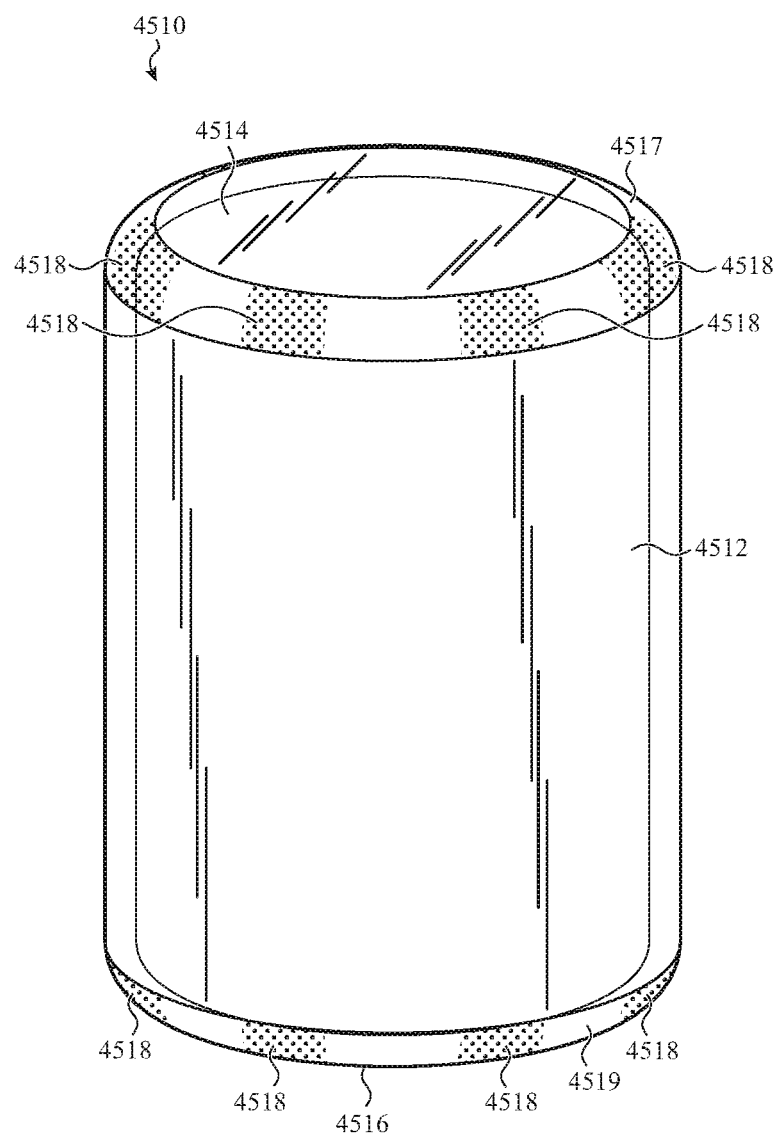
FIG. 45B depicts another example glass enclosure with differently textured regions.

FIG. 45B shows an example glass enclosure 4510 having textured regions similar to those described with respect to the enclosure 4500, but applied to an enclosure having a different shape. In particular, the glass enclosure 4510 has a cylindrical shape (and may be an embodiment of the enclosure 422 shown in FIG. 4C). The enclosure 4510 defines a cylindrical wall 4512 and first and second bases 4514, 4516, respectively. The enclosure 4510 also defines a first curved transition region 4517 between the cylindrical wall 4512 and the first base 4514 and a second curved transition region 4519 between the cylindrical wall 4512 and the second base 4516. As noted above, affordances such as volume buttons, power buttons, ring/silent buttons, or the like may be positioned at various locations on an enclosure. In order to improve the tactile feel of the affordances, regions 4518 of the enclosure 4510 that correspond to the affordances may be textured to provide a tactilely detectable difference between the regions 4518 and other surfaces of the enclosure 4510 (e.g., the cylindrical wall 4512 and the first and second bases 4514, 4516). The surface texture of the regions 4518 may be formed in any suitable way, such as those described above with respect to the regions 4502. Aspects of the regions 4502 described above apply equally or by analogy to the regions 4518, and will not be repeated here.

Figure 46:
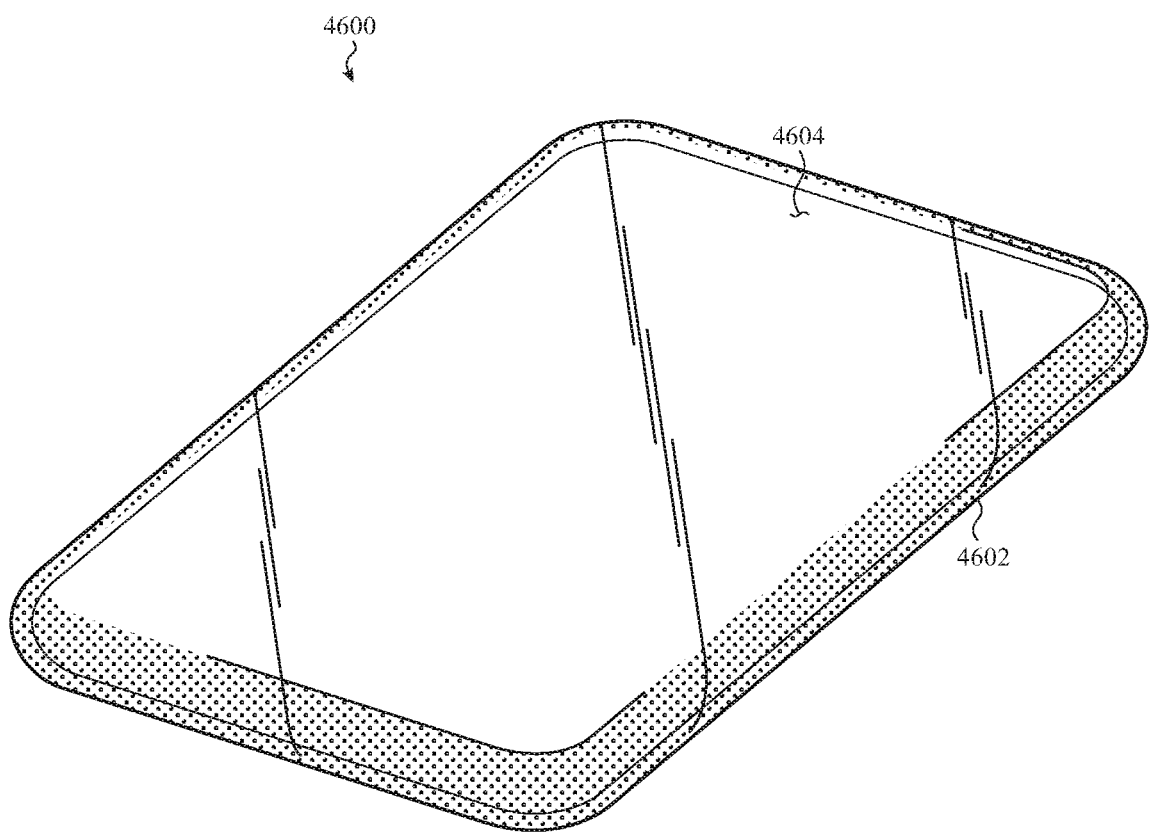
FIG. 46 depicts another example glass enclosure with differently textured regions.

FIG. 46 shows another example enclosure 4600 that has a textured region. In this example, the textured region extends over substantially all of the peripheral sides 4602, and has a different tactile feel than the major sides (e.g., the first major side 4604). As noted above, the textured region along the peripheral sides 4602 may represent any difference in tactile feel between the peripheral sides 4602 and the major sides.

In cases where the peripheral sides are substantially completely textured, the texturing may help to hide or reduce the visibility of seams or discontinuities between enclosure members or display members. Further, in cases where underlying displays are visible through a textured surface, texturing substantially the entire exterior surface of the peripheral wall may reinforce functional distinctions between different display regions. For example, a device may be configured to not use peripheral displays for display of video or photographs (which may be primarily or exclusively viewable via a major side). Thus, visible texturing on the peripheral sides may reinforce the distinction between the types of graphical outputs visible on the peripheral sides (e.g., affordances, weather icons, device status icons, text, etc.) and the types of graphical outputs that may be displayed on the major sides (e.g., primary GUI screens, text input screens, videos, photographs, webpages, etc.).

Figure 47:
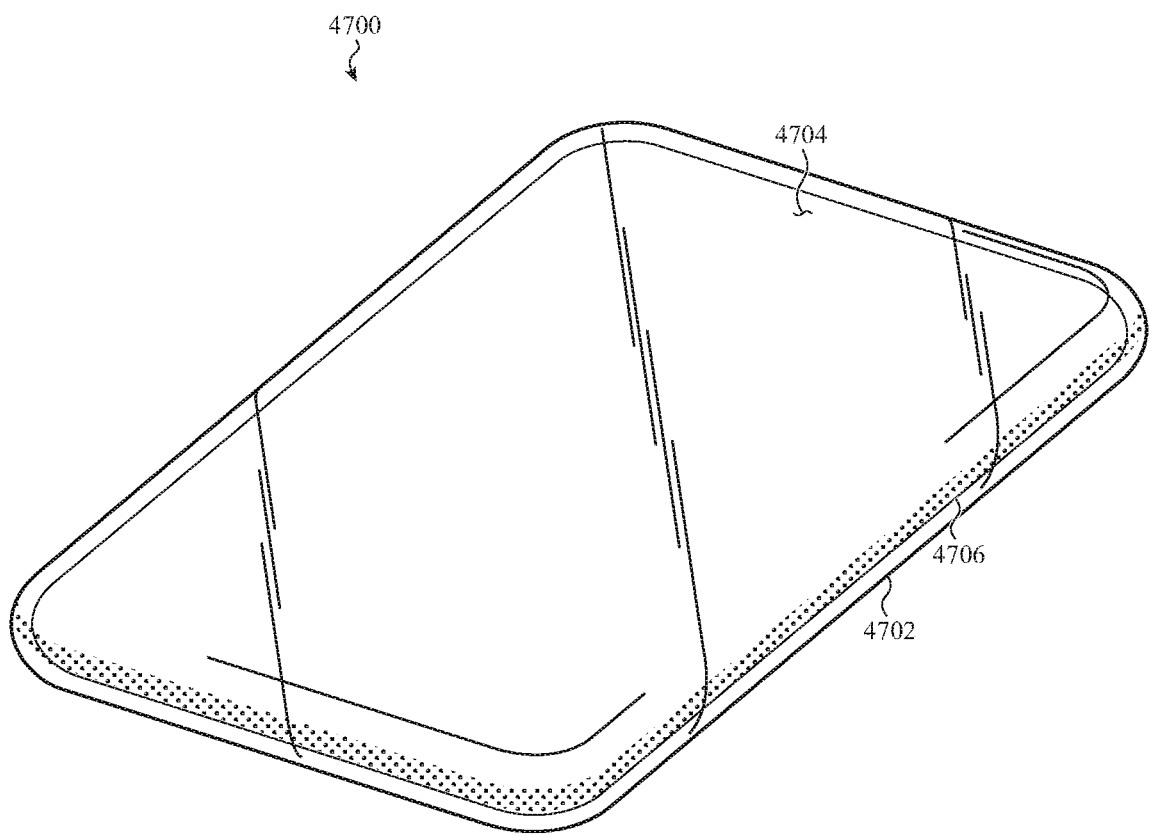
FIG. 47 depicts another example glass enclosure with differently textured regions.

FIG. 47 shows another example enclosure 4700 that has a textured region. In this example, the textured region extends over only a portion of the peripheral sides 4702 of the enclosure 4700. For example, as shown, the textured region 4706 extends at or about a middle of the peripheral sides 4702 of the enclosure 4700 (e.g., a point at approximately 50% of the thickness of the enclosure 4700). As noted above, the texturing may be aligned with or occlude underlying seams or discontinuities between enclosure members or display members.

Figure 48:
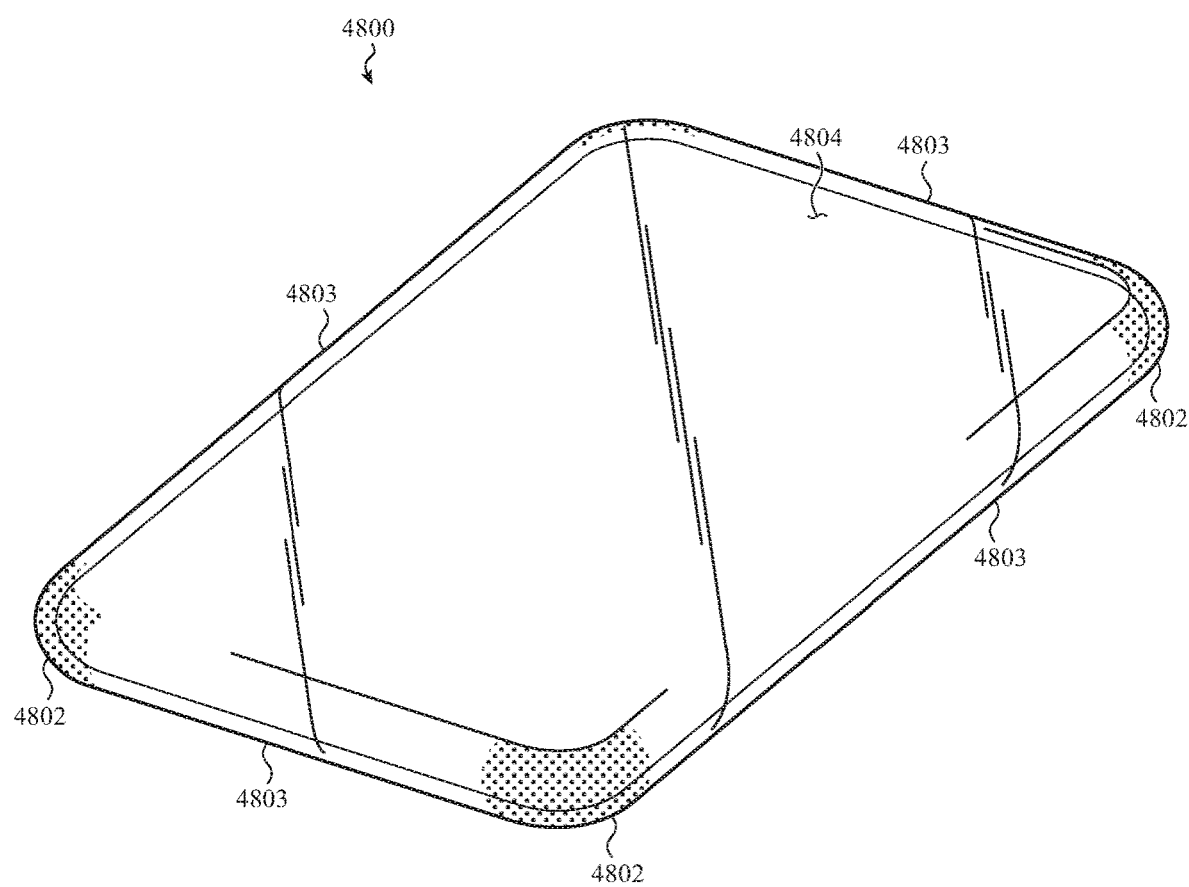
FIG. 48 depicts another example glass enclosure with differently textured regions.

FIG. 48 shows another example enclosure 4800 that has a textured region. In this example, the corner regions 4802 of the enclosure 4800 may be textured or otherwise have a different tactile feel (and optionally different appearance) than other portions of the peripheral sides 4803 and/or the major sides (e.g., the first major side 4804). Texturing the corner regions 4802 may provide similar advantages to those described above, including hiding seams between enclosure members, hiding or covering seams, gaps, or other irregularities between display members, or the like. In some cases, as described herein, corner regions may be associated with light sources that do not or are not intended to form distinct images. These corner-positioned light sources may be simple light sources such as light emitting diodes, or regions of a display that are not sufficiently aligned or configured to produce visually appealing images. In such cases, texturing the corner regions 4802 may diffuse the light produced by the light sources to produce an illumination that appears even or homogenous across the corner. Further, the texturing or other treatment may be sufficiently opaque to occlude any unsightly components, such as gaps, seams, or openings between display members or unaligned portion of display members (such as may occur in the corner regions 3108 of the flexible display member shown in FIGS. 31A-31B.

Figure 49:
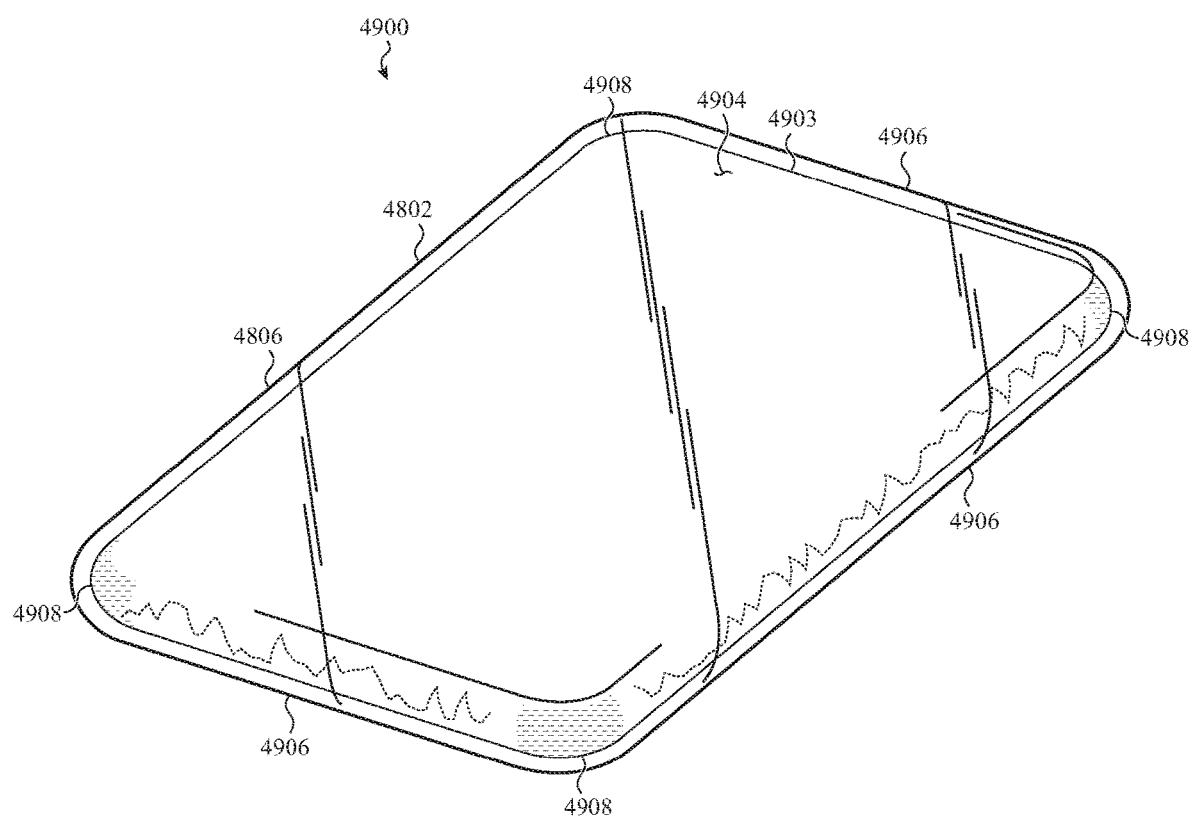
FIG. 49 depicts an example electronic device with a multi-sided display having regions of different resolution.

FIG. 49 shows an example device 4900 that includes a glass enclosure 4902, which defines a first major side 4904 (and a second major side opposite the first major side 4904), and peripheral sides 4906. The device 4900 also includes a multi-sided display 4903 that displays images at least through the major sides and the peripheral sides 4906. The display 4903 may have a first pixel configuration (e.g., resolution, pixel size, pixel type, etc.) along the major sides and the peripheral sides, and a second pixel configuration along the corner regions 4908. For example, the corner regions 4908 may have a lower resolution (e.g., pixels-per-inch) than the portions of the display 4903 that are visible through the major and peripheral sides. In such cases, the corner regions 4908 may be used to display lower-resolution images than other portions of the display, or even to display only colors (e.g., with no discernable image). In yet other examples, the corner regions 4908 may not have a conventional pixelated display, but instead may have a single light emitting diode (LED) or other light source (with optional light diffusers) that simply produces a substantially homogenous output of light.

Different colors may be displayed on the corner regions 4908 for various reasons. For example, different colors may be displayed based on different operational states of the device. White illuminated corner regions 4908 (optionally flashing or pulsing), for example, may indicate an incoming call, text message, or email. Red illuminated corner regions 4908 may indicate that a voice call is currently active. Green illuminated corner regions 4908 may indicate that the device is fully charged, and yellow illuminated corner regions 4908 may indicate that the battery of the device is low. In some cases, the corner regions 4908 are illuminated with a color that is based on what is being displayed on the major or peripheral sides. For example, if a predominantly blue image is being displayed on the first major side 4904, the corner regions 4908 may be illuminated blue. Of course, the foregoing examples are merely illustrative, and other colors may be mapped to these (or other) states or functions.

Figure 50:
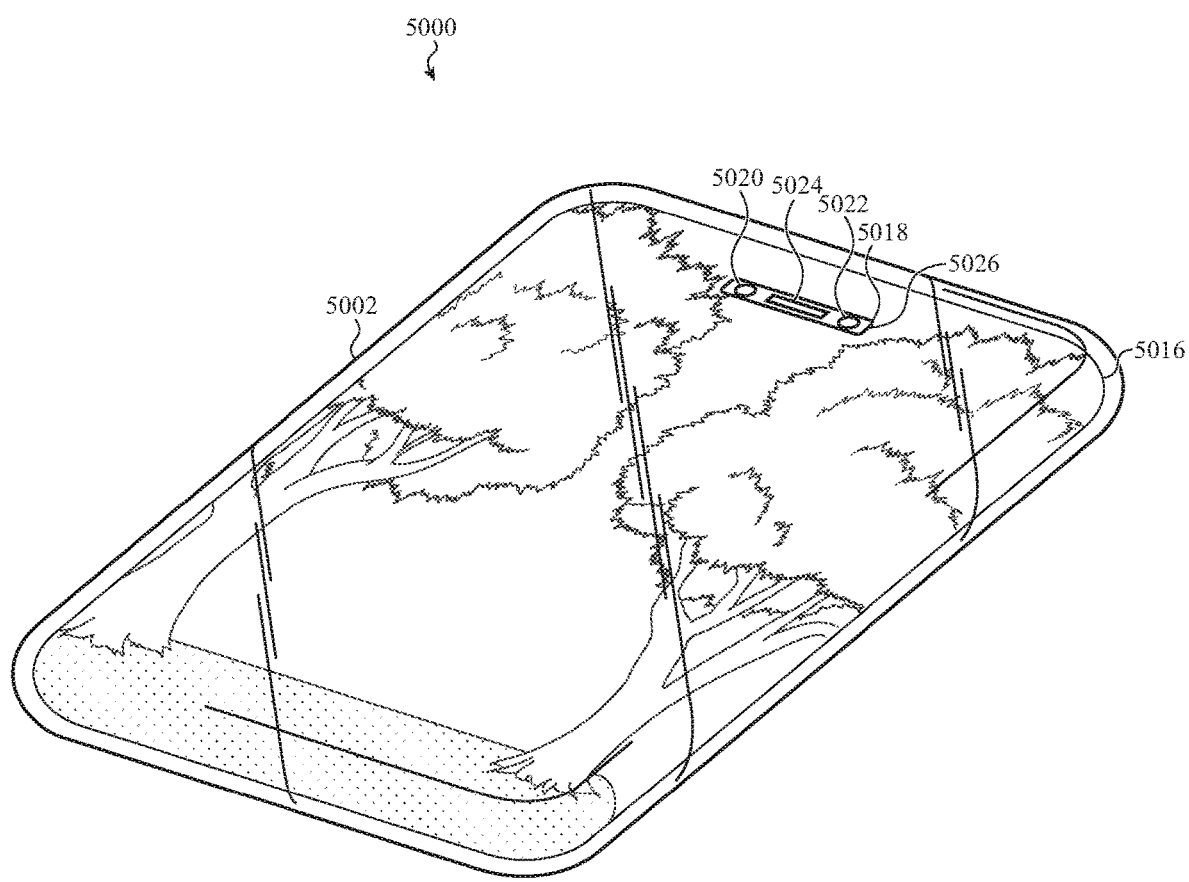
FIG. 50 depicts an example electronic device with an opening in an enclosure.

As described herein, electronic devices such as mobile phones may require or benefit from an optical path between the exterior environment and certain internal components such as cameras, sensors, projectors, flashes, or the like. For example, a camera inside an electronic device housing needs an optical path in order to capture images outside the electronic device. Similarly, an audio opening may be used to allow air to pass between the exterior environment and internal audio components, such as microphones and speakers. Accordingly, an enclosure and/or a display of a device with a glass enclosure as described herein may include one or more apertures or openings, which may facilitate optical communication and sound transmission, as well as other functions such as charging and reception. FIG. 50 depicts an example electronic device 5000 that includes a glass enclosure 5002 and a display 5016 (which may be similar to the corresponding components described with reference to FIGS. 1A-1B). The display 5016 includes or defines an area 5018, which may include one or more openings through a portion of the display 5016 that allows communication of sound and light through the display 5016. The openings may surround or be aligned with components such as one or more cameras (e.g., 5020), projectors (e.g., 5022), audio components (e.g., 5024), biometric sensors, image sensors, and the like. The enclosure 5002 may define an opening 5026 corresponding to and/or aligned with one or more of the components in the area 5018. For example, the opening 5026 may overlie the audio component 5024, such as a microphone, speaker, or both, to allow sound to pass into and/or out of the device 5000 without having to pass through the glass medium of the enclosure 5002. A mesh, screen, or other protective member may be positioned in the opening 5026 to prevent ingress of liquids, dust, or other debris or contaminants.

FIG. 50 shows one area 5018 on one major side of the device. In some cases, a similar or identical area 5018, and similar or identical components associated with that area, may be positioned on an opposite side of the device. Accordingly, either major side of the device 5000 may be used as the primary interface surface at any given time, further reinforcing the symmetrical configuration of the device 5000. FIG. 50 shows the area 5018 located proximate a top of the first major side. In some cases, however, the device 5000 includes two similar or identical areas, along with similar or identical components, on each major side (e.g., proximate the top and bottom, respectively) of each major side. With such an arrangement, the distinction between the top and bottom of the device may further be blurred or erased, as a user can pick up the device 5000 in any manner or orientation and the device 5000 will have appropriately located microphones and speakers (e.g., for voice calls).

Figure 51A:
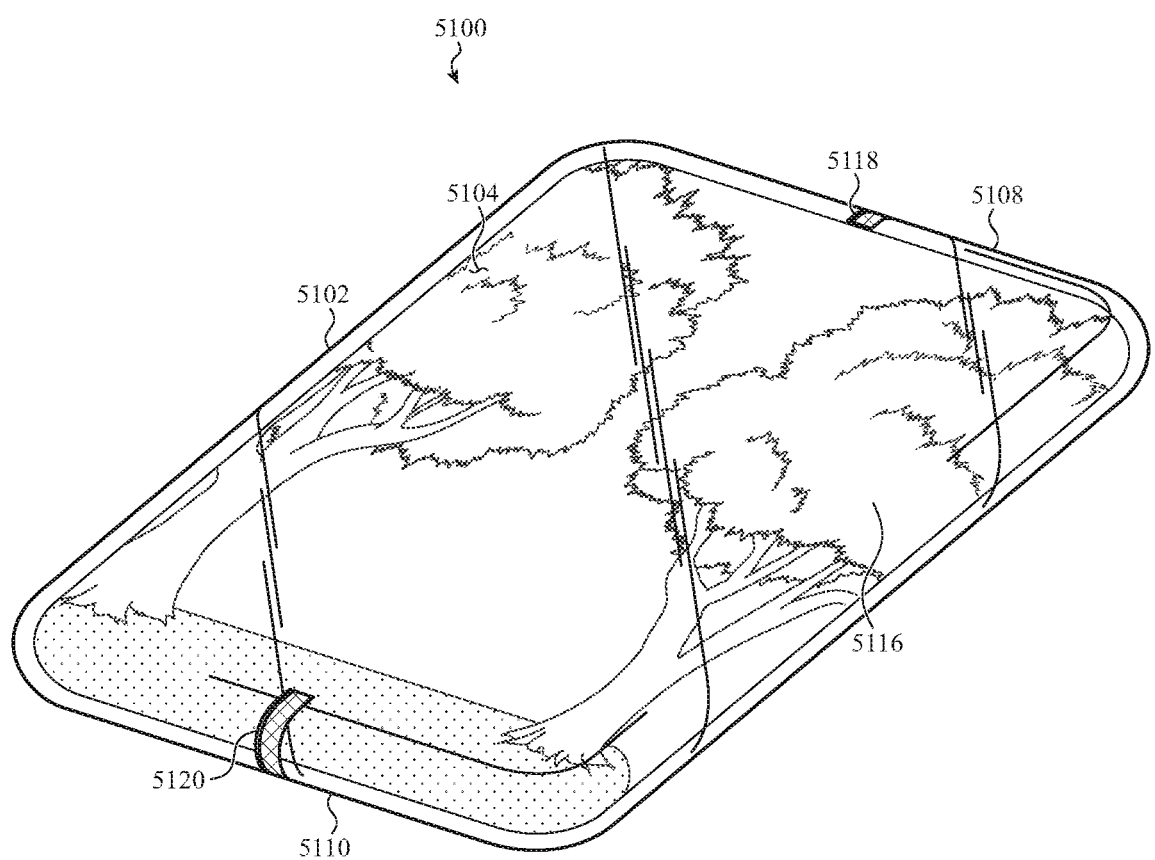
FIGS. 51A-51B depict another example electronic device with openings in an enclosure.
Figure 51B:
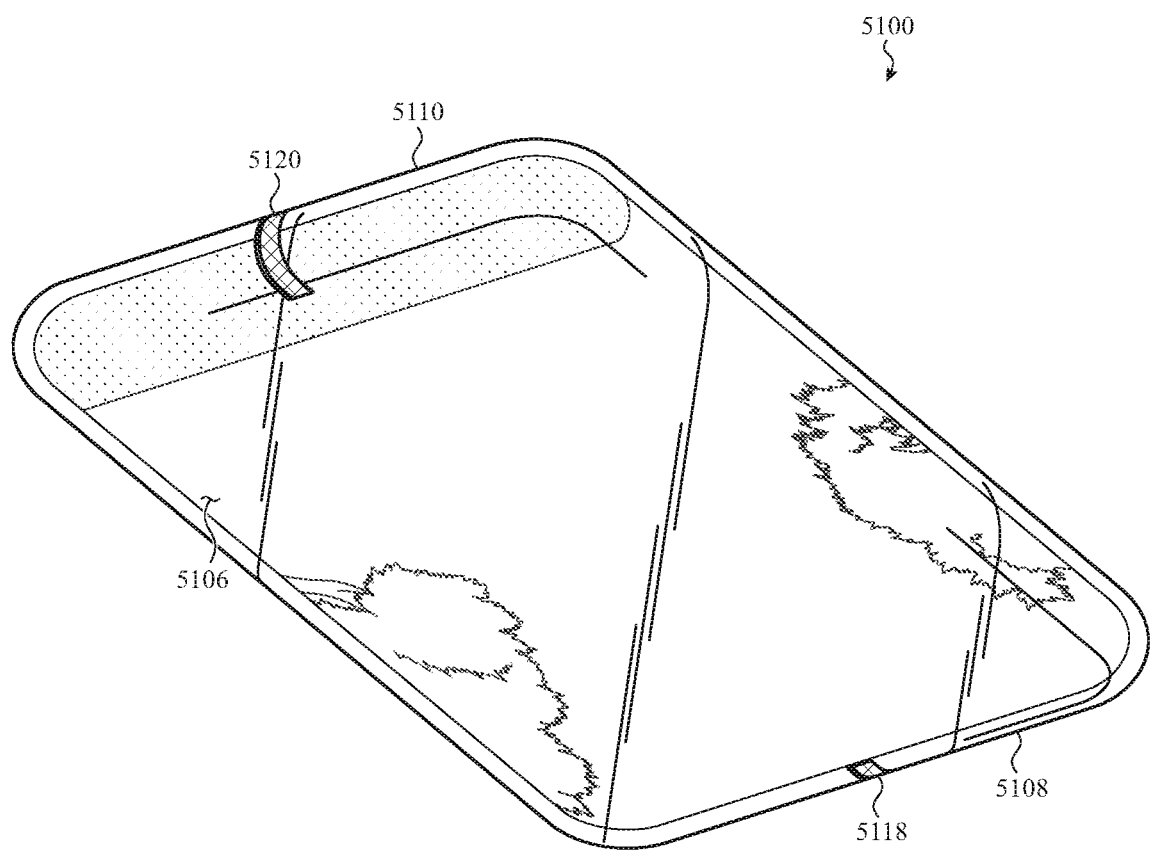

FIGS. 51A-51B depict another example electronic device 5100 that includes a glass enclosure 5102 and a display 5116 (which may be similar to the corresponding components described with reference to FIGS. 1A-1B), showing another example configuration in which openings allow sound and/or light to pass in and out of the enclosure 5102. In particular, an opening 5118 (which may be a continuous channel) may wrap at least partially around the device 5100 from a first major side 5104 to a second major side 5106. For example, the opening 5118 may have a first opening portion through the first major side 5104, a second opening portion through the peripheral side 5108, and a third opening portion through the second major side 5106.

Speakers and/or microphones may be aligned with or otherwise in communication with the opening 5118 to receive and/or emit sounds through the opening 5118. A mesh, screen, or other protective member may be positioned in the opening 5118 to allow sound to enter and escape the enclosure 5102 while also preventing ingress of liquids, dust, or other debris or contaminants into the enclosure 5102. Because the opening 5118 wraps around the enclosure 5102 (e.g., extending along a peripheral side 5108) to form openings in both the first and second major sides 5104, 5106, both the first and second major sides 5104, 5106 may appear visually identical, further blurring or erasing the distinction between the conventional notions of a device with a different front and back.

In some cases, the device 5100 may also include an additional opening 5120, which may be substantially identical to the opening 5118, but positioned on an opposite end of the device 5100 (and optionally extending along a peripheral side 5110). As described above with respect to the openings in FIG. 50, positioning openings 5118 and 5120 proximate both ends of the device 5100 further reinforces the symmetrical appearance and functionality of the device 5100, as the device 5100 may visually appear and functionally operate as though there is no established "top" or "bottom" of the device 5100. Accordingly, the device may provide maximum flexibility in operation and use of the device 5100.

The display 5116 may define or include openings through at least a component of the display 5116 to allow for components to input and/or output light, sound, etc., via the openings 5118, 5120. The openings may be formed in otherwise contiguous surfaces of a display, or they may be formed by leaving gaps at seams or joints between displays or between adjacent portions of a single display. Such openings may correspond to or be aligned with cameras, speakers, microphones, sensors, projectors, flashes, or the like.

As described herein, devices with multi-sided displays that are visible through as many as all sides of the device may be configured to be usable in multiple different orientations. For example, in some conventional devices, the device has a dedicated top, bottom, front, and back. Even in cases where a conventional single-sided display can re-orient its graphical output when a device is rotated between a portrait orientation and a landscape orientation, such devices still have other constraints that limit the availability of the device's functions. For example, the speaker and microphone of a conventional phone are fixed in position, and even a phone with a graphical user interface that can be reoriented (e.g., between landscape and portrait) cannot be conveniently used to make telephone calls in an upside-down orientation, because the microphone and speaker will not be properly aligned with a user's mouth and ear.

Described herein are devices that may substantially lack hardware and/or user-interface cardinality. More particularly, such devices may be able to be picked up and/or held in any orientation, and the device will provide identical or substantially identical functionality. FIGS. 52A-53C illustrate example use cases, demonstrating how a device's user interface may dynamically react and how the symmetrical hardware configuration can provide equivalent functionality regardless of how it is being held or used.

Figure 52A:
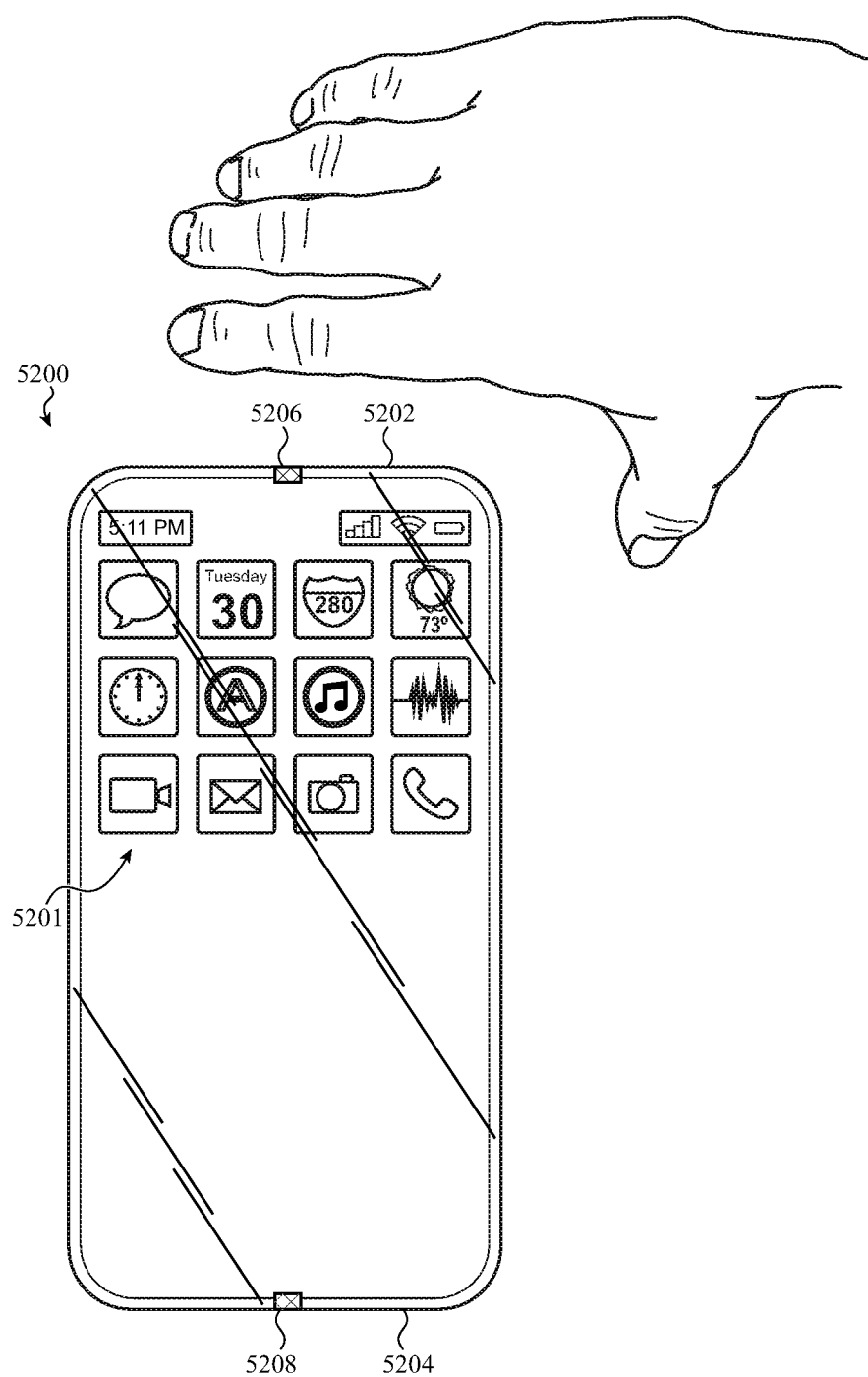
FIGS. 52A-52C depict an example user interaction with a device.

FIG. 52A shows a user about to grasp a device 5200 that is resting on a surface (e.g., a table). As shown, the device 5200 is displaying a user interface 5201 in a particular orientation, with a "top" of the user interface nearest the first side 5202 of the device 5200. As the user picks up the device 5200, the device 5200 detects that it is being held or is being moved in such a way that a second side 5204 corresponds to (or is likely to correspond to) the "top" of the device (as viewed by the user). The device 5200 may detect this situation in any suitable way, such as using an accelerometer, camera, compass, or any other suitable device or combination of devices. More particularly, the device 5200 may use an optical sensing system (such as a biometric sensing system) to detect a relative position and/or orientation of the user's face with respect to the device 5200. The device 5200 may also determine grasp information that is indicative or suggestive of how it is being grasped (e.g., based on the location of a user's fingers, palm, thumb, etc., as determined by touch and/or force sensors), and use the grasp information to determine how to orient the user interface.

Figure 52B:
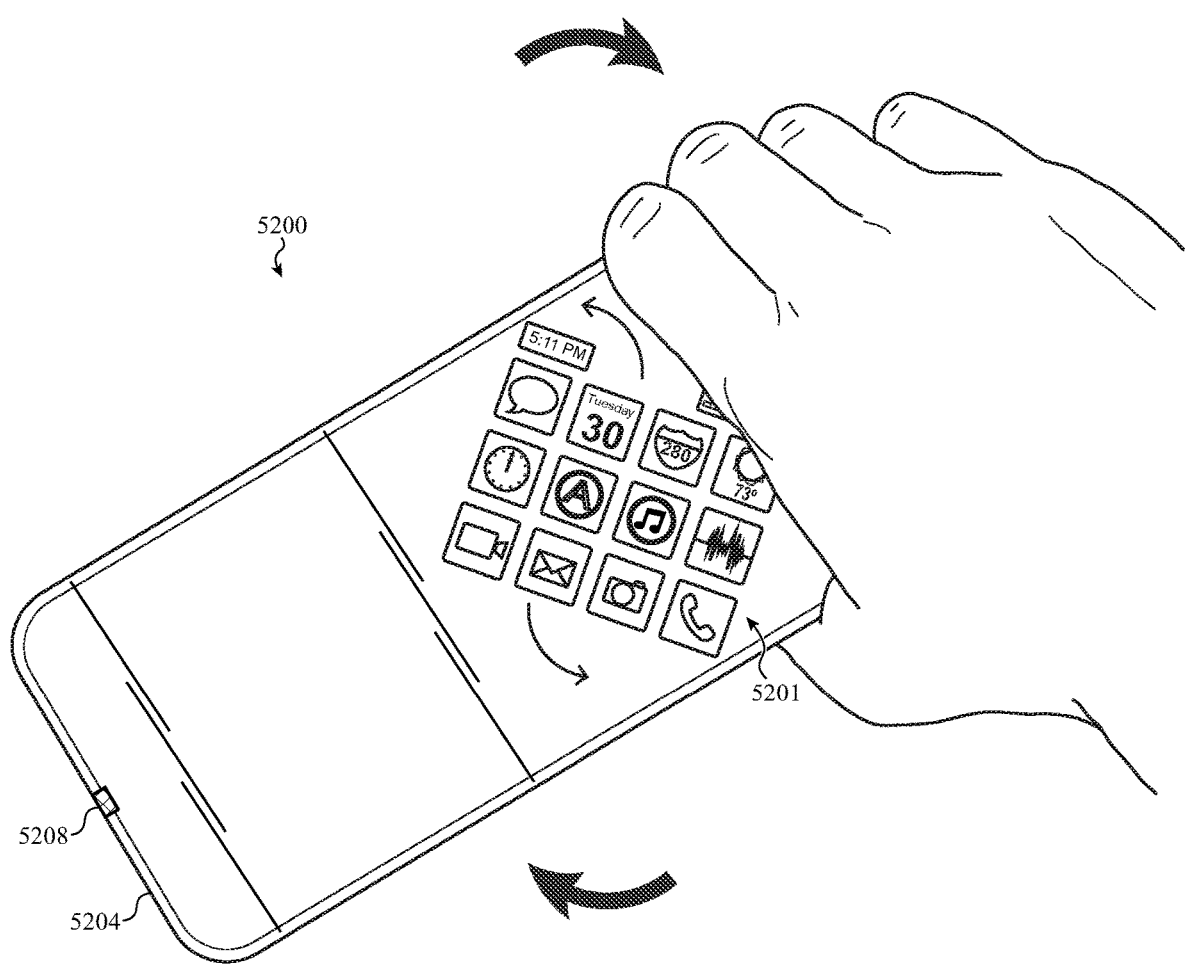
Figure 52C:
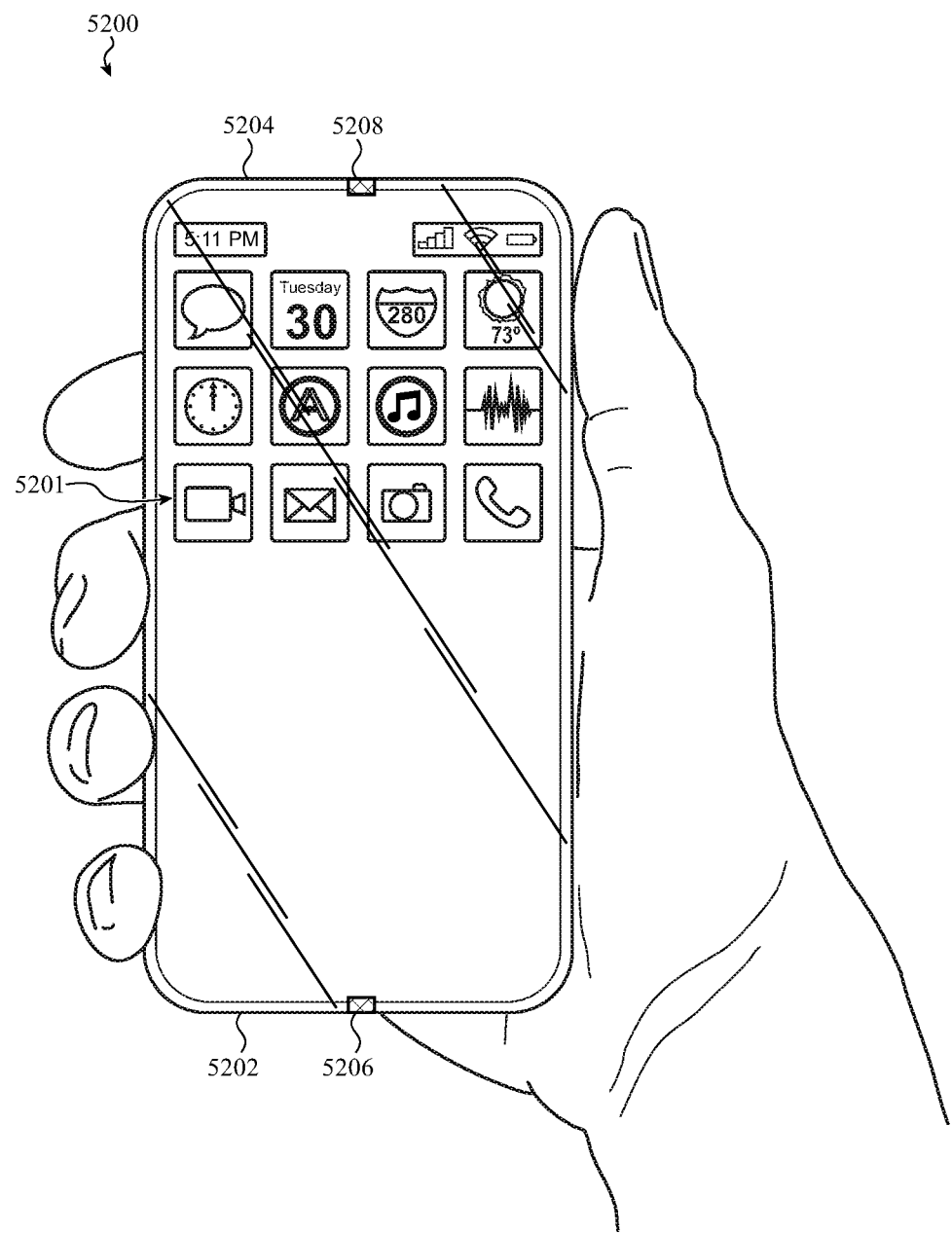

FIG. 52B shows the device 5200 while it is being rotated by the user. As shown, in response to the detection or prediction that the second side 5204 of the device 5200 is acting as the "top" of the device (from the user's perspective), the user interface is rotating to position the top of the user interface proximate the second side 5204 of the device 5200. FIG. 52C shows the device 5200 after the user interface has been repositioned in response to the determined orientation (relative to the user or in absolute terms).

In addition to the reorientation of the user interface in response to how a user is grasping, holding, looking at, or otherwise interacting with a device, the hardware symmetry of the device allows the device to provide identical or substantially identical functionality in any position or orientation. For example, as shown in FIG. 52A, the device 5200 includes a first hardware component 5206 positioned proximate the first side of the device 5202, and a second hardware component 5208 positioned proximate the second side of the device 5204. The first and second hardware components 5206, 5208 may have at least some components in common, or may otherwise provide the same or similar functionality. For example, the first and second hardware components 5206, 5208 may each have a speaker and a microphone to facilitate voice calls via the device 5200 (e.g., to provide audio output to the user's ear and receive audio input from the user's mouth). In FIG. 52A, the first hardware component 5206 is positioned so that, were the user to pick up the device 5200 without rotating the device, the first hardware component 5206 would position a speaker proximate the user's ear and the second hardware component 5208 would position a microphone proximate the user's mouth. As shown in FIG. 52C, the second hardware component 5208 is now positioned at what would be conventionally understood as the "top" of the device (based on the manner in which the device is being used and/or held). Because the first and second hardware components 5206, 5208 may each have a speaker and a microphone, the second hardware component 5208 positions a speaker proximate the user's ear and the first hardware component 5206 positions a microphone proximate the user's mouth.

The device 5200 may also select which hardware components to use and/or activate based on the determined orientation. For example, when the device 5200 determines that the second side 5204 is being used as the conventional "top," and a voice call is active, the device 5200 may activate a speaker associated with the second hardware component 5208 and deactivate a microphone associated with the second hardware component 5208. The device 5200 may also activate a microphone associated with the first hardware component 5206 and deactivate a speaker associated with the first hardware component 5206. In cases where the device 5200 includes different sets of speakers and/or microphones on both major sides of the device, the speakers and/or microphones on the side of the device that is being used as a conventional "back" of the device may be deactivated. In other cases, any microphone that is not positioned immediately proximate the user's mouth (or that would not be the closest to the user's mouth during a conventional voice call) may be activated. Such auxiliary microphones may be used to help pick up the user's voice, and/or to help cancel ambient or other unwanted noise from the primary microphone (e.g., the microphone closest the user's mouth).

Figure 53A:
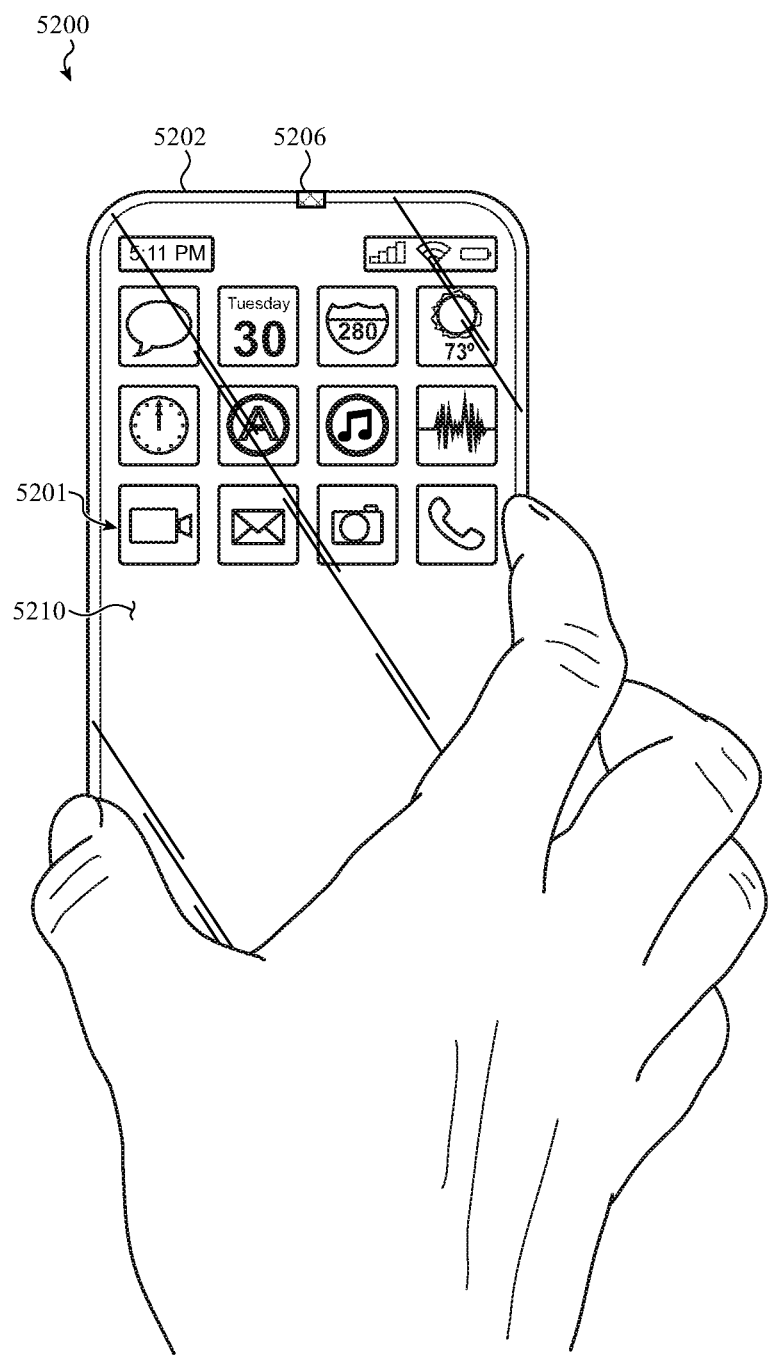
FIGS. 53A-53C depict another example user interaction with the device.
Figure 53B:
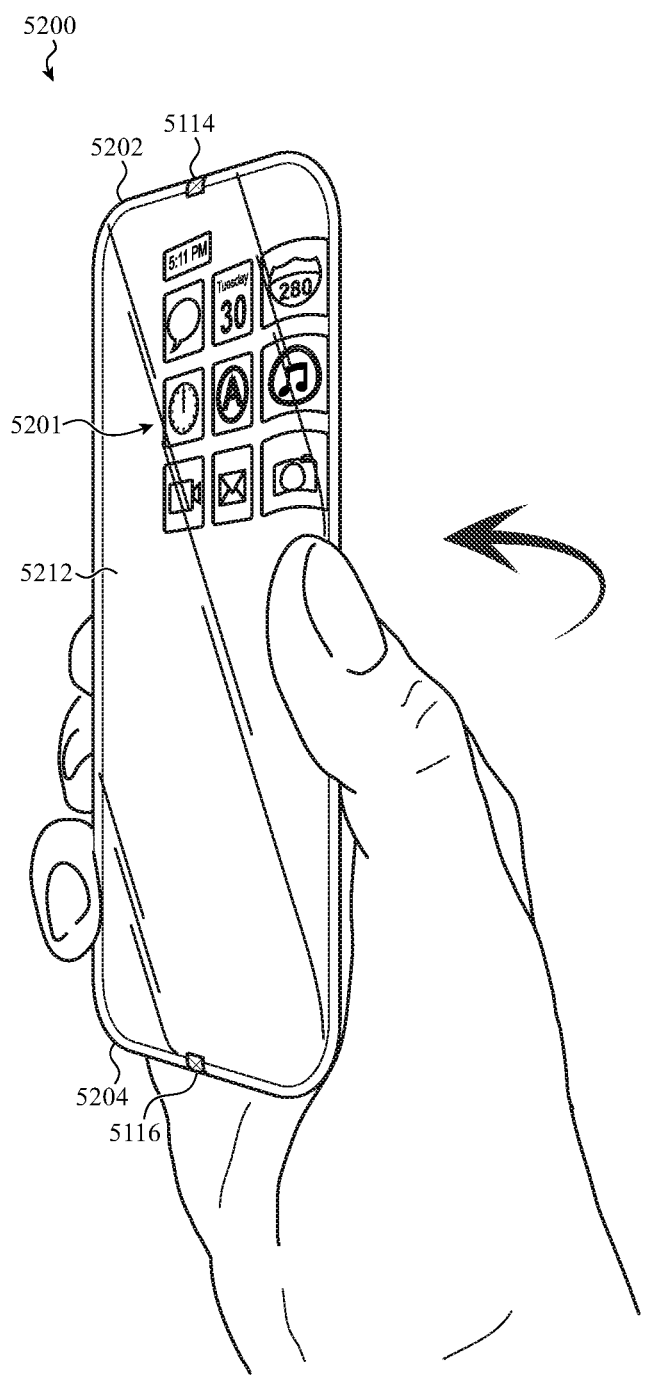
Figure 53C:
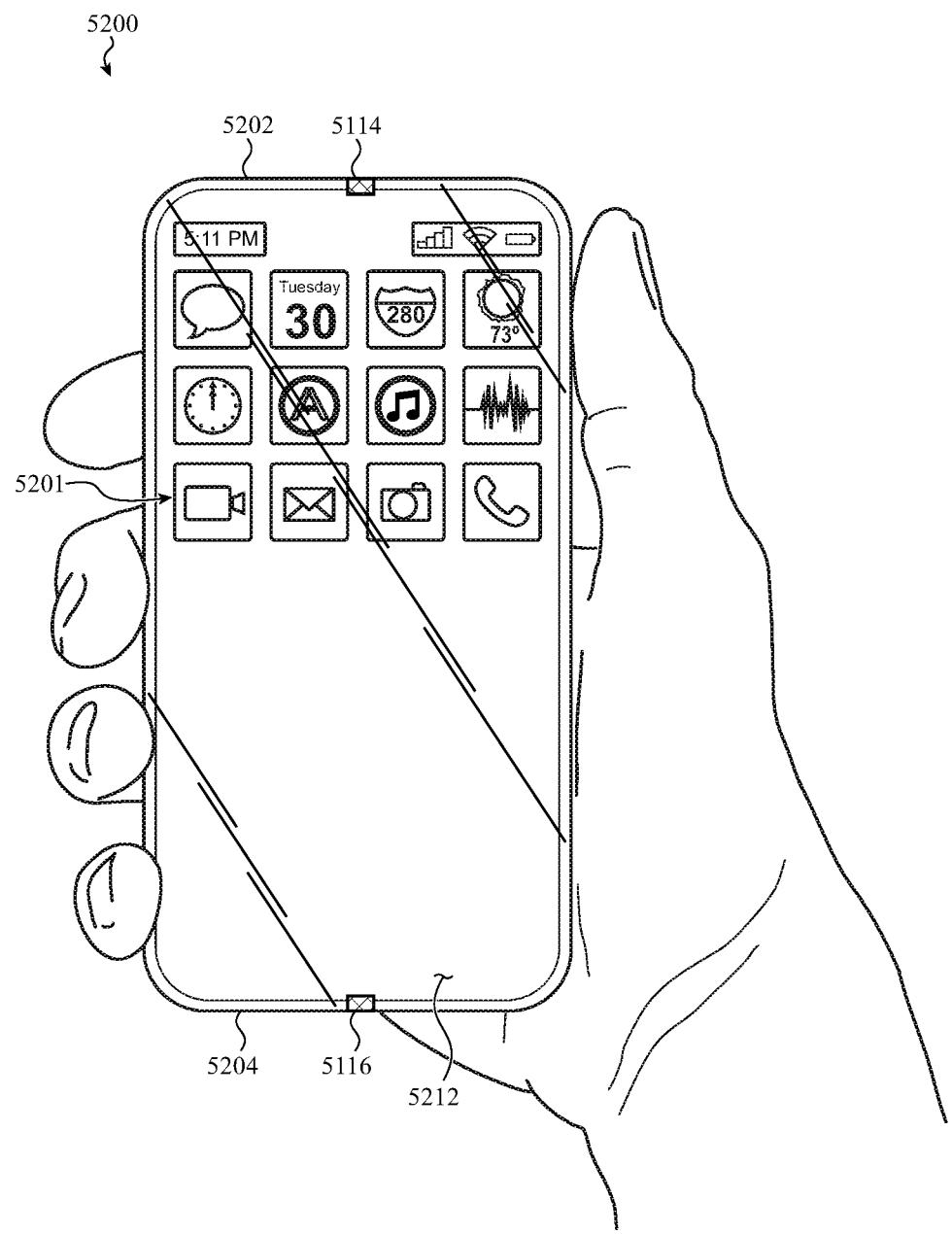

FIGS. 53A-53C illustrate another example of how the device 5200 may provide substantially identical functionality in multiple orientations, showing how the device 5200 may dynamically select a major side to act as the "front" of the device, and how the hardware symmetry of the device 5200 may provide the same functions regardless of which side is acting as the "front" of the device.

FIG. 53A shows the user grasping the device 5200 that is resting on a surface (e.g., a table), prior to changing the orientation of the device 5200. As shown, the device 5200 is displaying the user interface 5201 on a first major side 5210 of the device 5200. As the user picks up the device 5200, the device 5200 detects that it is being held or is being moved in such a way that a second major side 5212 (FIG. 53B) corresponds to (or is likely to correspond to) the "front" of the device (as viewed by the user). The device 5200 may detect this situation in any suitable way, such as using an accelerometer, camera, compass, touch and/or force sensors, or any other suitable device or combination of devices, as described above with respect to FIG. 52A.

FIG. 53B shows the device 5200 while it is being flipped by the user. As shown, in response to the detection or prediction that the second major side 5212 of the device 5200 is acting as the "front" of the device (from the user's perspective), the user interface is translating to position the user interface on the second major side 5212 of the device 5200. FIG. 53C shows the device 5200 after the user interface has been repositioned in response to the determined orientation (relative to the user or in absolute terms).

As discussed with reference to FIGS. 52A-52C, the hardware symmetry of the device 5200 allows the device to provide identical or substantially identical functionality in any position or orientation. For example, as noted above, the device 5200 includes a first hardware component 5206 positioned proximate the first side of the device 5202, and a second hardware component 5208 positioned proximate the second side of the device 5204. As shown in FIGS. 53B-53C, the device 5200 also includes a third hardware component 5214 positioned proximate the first side of the device 5202 and a fourth hardware component 5216 positioned proximate the second side of the device 5204. When the device 5200 determines that the second major side 5212 is being used as the "front" of the device, the device 5200 may select the third and fourth hardware components 5214, 5216 to provide certain functionality, such as audio input and output during voice calls. The first and second hardware components 5206, 5208 may be deactivated or may be used to provide other functionality.

In addition to selecting the third and fourth hardware components 5214, 5216 in response to determining that the second major side 5212 is acting as the "front" of the device 5200, the device 5200 may further select which functionality will be provided by the third and fourth hardware components 5214, 5216 based on which side is being used as the "top" of the device 5200. For example, if the third hardware component 5214 is nearest the "top" of the device 5200, as viewed by the user, the third hardware component 5214 may be selected to provide audio output and the fourth hardware component 5216 may be selected to provide audio input.

While the foregoing descriptions relate to assigning audio input and output functions for voice calls to certain hardware components, this is merely an example of the ways in which a device may assign components of a symmetrical hardware arrangement, and other assignments are possible. For example, in response to determining which major side of a device is acting as a "front" of the device, the device may assign the hardware components associated with the "front" of the device to voice-call type functions (as described above), and may assign the hardware components associated with the "back" of the device to other functions, such as audio output (e.g., using the speakers as stereo speakers for music), audio input for noise cancelling (e.g., using the microphones to capture ambient or other external noise), and the like. Of course, as noted above, such assignments may be dynamically established and may be changed based on changes to the device's orientation and/or how the device is being held or used.

The user interface animations shown in FIGS. 52A-53C are merely for the purposes of illustration. Such animations are not necessarily displayed on the display during the manipulations shown in the figures. They nevertheless illustrate how the device may programmatically reorient itself based on its absolute and/or relative orientation. In some cases, however, the illustrated animations or other animations may be displayed during the manipulations shown (or other manipulations that result in the device re-orienting or re-positioning the user interface).

Figure 54:
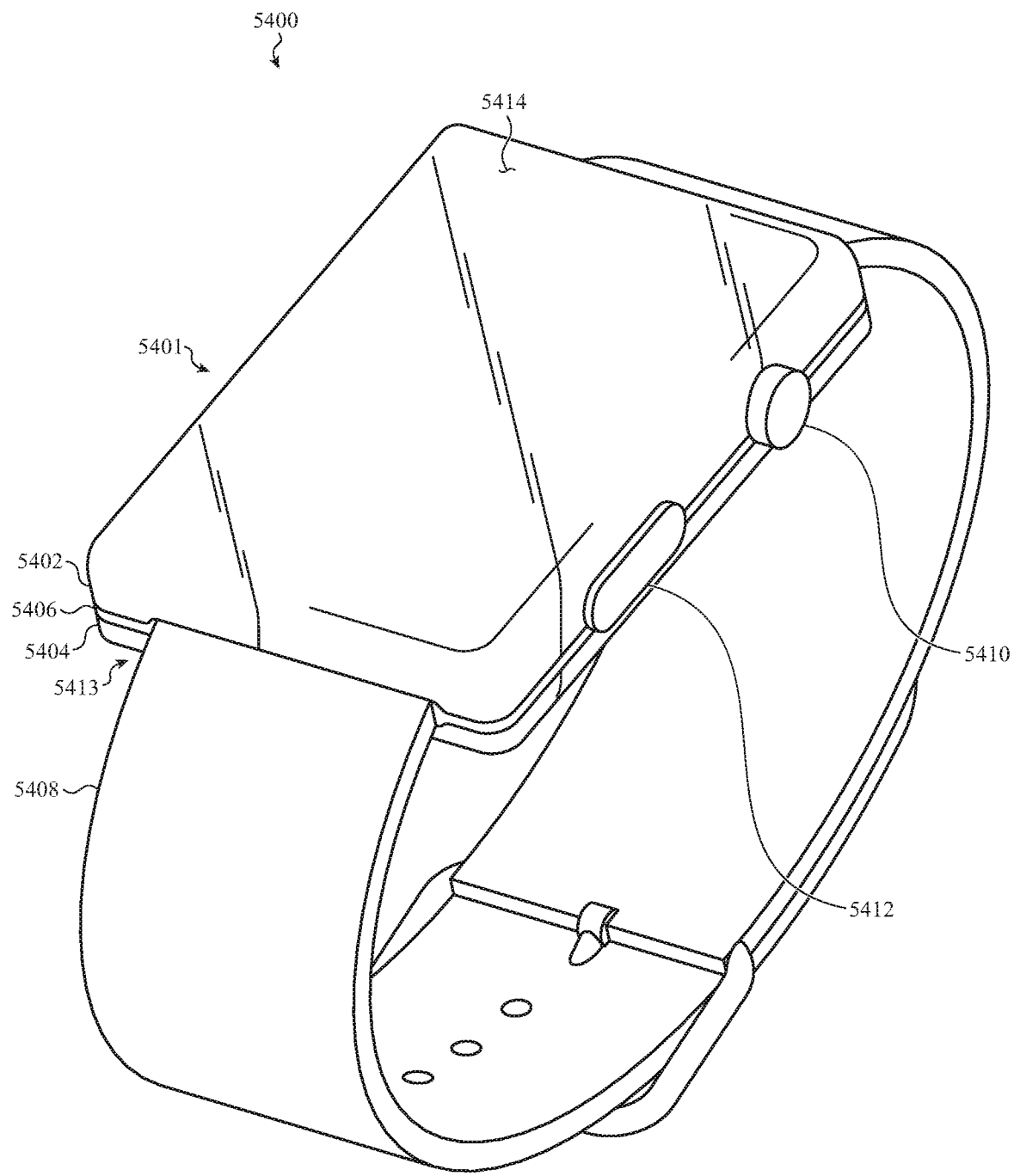
FIG. 54 depicts an example wearable electronic device using a glass enclosure.

The foregoing examples describe enclosure and display technologies as applied to smartphones and tablet computers. However, the features and concepts described herein may be used with other types of electronic devices as well, including but not limited to watches, health and/or biometric monitors, or other portable and/or wearable electronic devices. FIG. 54 illustrates an example wearable electronic device, and specifically a watch 5400, that includes an enclosure 5401 in which a first major side 5414 (e.g., the face of the watch), a second major side 5413 (e.g., the wrist-facing side of the watch), and substantially all of the peripheral sides are glass. The watch 5400 may also include a watch band 5408 attached to the enclosure 5401. The watch band 5408 may be permanently attached to the enclosure 5401, or it may be removable such that it can be replaced and/or swapped with other bands.

The enclosure 5401 may include a first glass member 5402 and a second glass member 5404. The first glass member 5402 defines the first major side 5414 and a portion of each of the peripheral sides of the enclosure 5401. The second glass member 5404 defines the second major side 5413 and another portion of each of the peripheral sides. The enclosure 5401 also includes an intermediate member 5406 between the first and second glass members 5402, 5404. The intermediate member 5406 may be metal, plastic, glass, or another suitable material, and may serve as a structural member of the device and may facilitate bonding between the first and second glass members 5402, 5404. Alternatively, the intermediate member may be cosmetic, and may contribute little or no structural strength or rigidity to the enclosure. The first and second glass members 5402, 5404 may be secured to the intermediate member 5406 in any suitable way, including mechanical interlocks, adhesives, epoxies, ultrasonic welding, frit bonding, or the like. Many of the enclosure forming techniques and structures described herein with respect to other examples may be used to form enclosure 5401 of FIG. 54. Relevant description of such techniques and structures are not repeated in order to reduce redundancy.

The watch band 5408 may attach to the enclosure 5401 via the intermediate member 5406. In cases where the watch band 5408 is not removable, the watch band 5408 may be permanently attached to the intermediate member 5406. In other cases, such as where the watch band 5408 is removably coupled to the enclosure 5401, the intermediate member 5406 may include or define part of a channel, lug, or other feature or mechanism with which the watch band 5408 engages to removably couple the watch band 5408 to the enclosure 5401.

As with the other devices described herein, the watch 5400 may include one or more displays that are visible through all or some of the first glass member 5402 and through all or some of the second glass member 5404, including through the peripheral sides of the enclosure 5401. Additionally, the watch 5400 may include touch- and/or force-sensing systems that detect inputs applied to the major sides and/or the peripheral sides (or portions thereof) of the watch 5400. Such touch- and/or force-sensing systems may operate in accordance with capacitive sensing, inductive sensing, optical sensing, or other sensing techniques. The watch may be configured to produce a graphical output that is controlled or performed in accordance with instructions or programs executed by a processor and may be generally referred to as a smart watch, wearable computer, or other similar type of electronic device.

Also, similar to other examples provided herein, the graphical output of the display may be modified in accordance with an orientation of the watch 5400. Additionally, the graphical output and/or other operational characteristics of the watch 5400 may be modified in response to the watch 5400 being worn on a right wrist, a left wrist, resting on a surface, or mounted in a docking station or stand. The watch 5400 may modify the graphical output and/or other operational characteristics of the watch 5400 automatically, based sensor input(s), detected locations, or the like. For example, when a user lifts his or her wrist to view the watch, the watch 5400 may detect the motion and in response output a first type of graphical output (e.g., a watch face viewable through the first major side defined by the first glass member 5402). When the user places the watch 5400 on a night stand, desk, or other surface (and optionally on a charger), the watch 5400 may output a second type of graphical output (e.g., the time and an alarm status on a peripheral side of the watch 5400). Other types of graphical outputs and triggers (e.g., events, locations, sensed motion, etc.) are also contemplated. For example, the peripheral sides may be illuminated (e.g., with a solid color) to indicate events or provide other notifications (e.g., when a message has been received, when an alarm or timer has expired, or the like).

In some embodiments, graphical output from the display may be viewable through one or more additional faces depending on a wearing condition (left or right wrist), an orientation of the device, or placement in a docking station or stand. In some instances, the watch 5400 may be reversible and graphical output may be displayed through either of the major sides in accordance with a wearing condition.

Similar to other examples provided herein, the watch 5400 may provide graphical outputs that are viewable through the peripheral sides. Such graphical outputs may change based on a mode of the device or a manner in which the device is being used. For example, the graphical outputs on the peripheral sides may change in response to a user changing a user interface scheme, or in response to the watch detecting that the user is performing a particular activity. As one example of the former case, a user may manually switch the watch 5400 from a "home" user interface scheme to a "travel" user interface scheme. This may result in the graphical output on the peripheral sides transitioning from displaying weather information to displaying time zone information. Of course, other types of schemes and graphical outputs are also contemplated. As an example of the latter case, the watch 5400 may detect when a user is working out (e.g., based on biometric sensor data, accelerometer data, or the like) and automatically transition to a workout scheme in which heart rate, running/walking pace, elapsed time, or other information may be displayed on one or more peripheral sides.

Affordances may also be displayed on the peripheral sides of the watch 5400. For example, affordances such as volume buttons, power buttons, ring/silent buttons, or the like may be positioned on the peripheral side of the watch 5400, and touch- and/or force-sensing systems may detect inputs applied to those affordances and control the operation of the watch 5400 accordingly.

In addition to any touch- and/or force-sensing systems for detecting inputs applied to the glass members of the enclosure, the watch 5400 may include input devices such as a crown 5410 and/or a button 5412. The crown 5410 may be rotatable relative to the enclosure 5401, and may also be actuated axially (e.g., pressed towards the enclosure 5401, like a button). Rotation of the crown 5410 by a user may cause the watch 5400 to modify its operation. For example, the watch 5400 may scroll a user interface in accordance with a rotation of the crown (e.g., in a direction and at a speed that is indicated by the direction and speed of the crown's rotation). As another example, the rotation of the crown may change a time setting of the watch or a brightness level of a display (or other graphical or operational parameter(s) of the watch 5400). The crown 5410 may include a shaft that extends into the enclosure 5401 through an opening in the enclosure 5401, and the watch 5400 may detect the rotational and optional axial movement of the crown using optical sensors, encoders, Hall effect sensors, resolvers, dome switches, or any other suitable sensing system(s).

Figure 55:
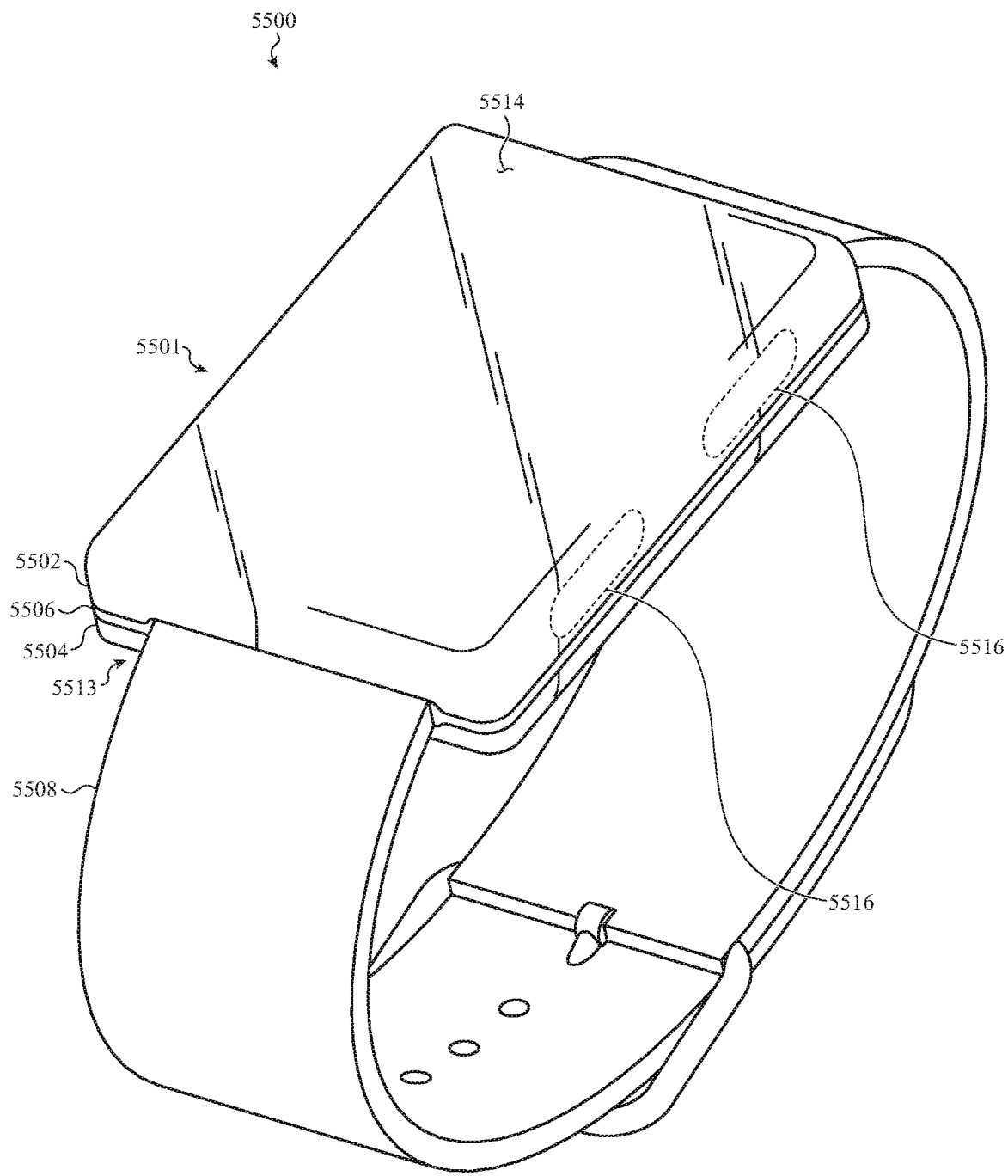
FIG. 55 depicts another example wearable electronic device using a glass enclosure.
Figure 56:
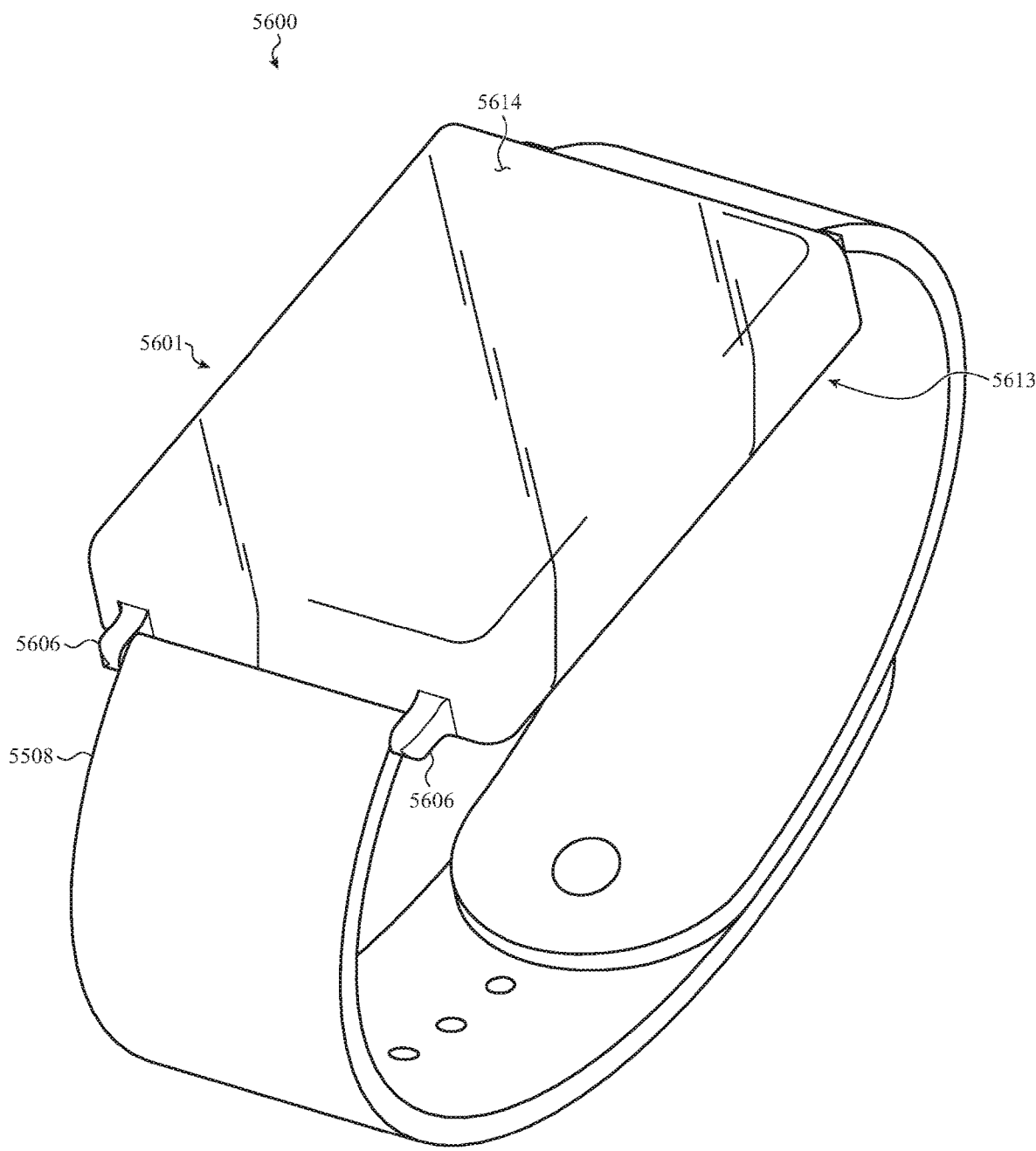
FIG. 56 depicts another example wearable electronic device using a glass enclosure.

The button 5412 may be pressed by a user (e.g., axially, towards the enclosure 5401) to provide inputs to the watch 5400. The button 5412 may include a shaft or other component or feature that extends into the enclosure 5401, through an opening in the enclosure 5401, to allow button inputs to be detected by the watch 5400 (e.g., by actuating a dome switch or other switch or sensing mechanism). The button 5412 and the crown 5410 may be configured to move relative to the enclosure 5401, or they may be fixed (e.g., non-moving), and inputs applied to the button 5412 and crown 5410 may be sensed using other techniques (e.g., capacitive sensing). In some cases, the watch 5400 may omit the button 5412 and/or the crown 5410, and other sensing systems may be used to detect inputs to the watch 5400 (e.g., touch- and/or force-sensing systems associated with the display(s) in the watch 5400). FIGS. 55 and 56 illustrate example watches with enclosures formed substantially entirely from glass and that lack externally-accessible mechanical input devices such as buttons or crowns.

The watch 5400 may include various additional components and/or systems, some of which may leverage the optical and radio-transparent properties of the first and second glass members 5402, 5404. For example, the watch may include a wireless (e.g., inductive) charging system that relies on inductive coupling between a receiving coil within the watch 5400 and a power coil external to the watch 5400 (e.g., in a charging dock). The high radio transparency of the glass material of the first and/or second glass members 5402, 5404 may facilitate the inductive coupling that enables wireless charging. As another example, the watch may include an optical sensor that leverages the optical transparency of the first and/or second glass members 5402, 5404 to facilitate certain sensing functions. More particularly, the watch 5400 may include an optical biometric sensor (e.g., a photoplethysmograph) that relies on the transparency of the second glass member 5404 to certain wavelengths of light to optically detect aspects of the wearer's skin for sensing heart rate or other biometric information. As yet another example, the radio-transparency of the first and/or second glass members 5402, 5404 may facilitate transmitting and receiving radio signals for cellular, WiFi, Bluetooth, or other wireless communications.

FIG. 55 illustrates another example wearable electronic device, and specifically a watch 5500 that does not include externally-accessible mechanical input devices such as a crown or button. The watch 5500 includes an enclosure 5501 in which a first major side 5514 (e.g., the face of the watch) and a second major side 5513 (e.g., the wrist-facing side of the watch), and substantially all of the peripheral sides are glass. The watch 5500 may also include a watch band 5508 attached to the enclosure 5501. The watch band 5508 may be permanently attached to the enclosure 5501, or it may be removable such that it can be replaced and/or swapped with other bands.

The enclosure 5501 may include a first glass member 5502 and a second glass member 5504. The first glass member 5502 defines the first major side 5514 and a portion of each of the peripheral sides of the enclosure 5501. The second glass member 5504 defines the second major side 5513 and another portion of each of the peripheral sides. The enclosure 5501 also includes an intermediate member 5506 between the first and second glass members 5502, 5504. The intermediate member 5506 may be metal, plastic, glass, or another suitable material, and may serve as a structural member of the device and may facilitate bonding between the first and second glass members 5502, 5504. Alternatively, the intermediate member may be cosmetic, and may contribute little or no structural strength or rigidity to the enclosure. The first and second glass members 5502, 5504 may be secured to the intermediate member 5506 in any suitable way, including mechanical interlocks, adhesives, epoxies, ultrasonic welding, frit bonding, or the like. Many of the enclosure forming techniques and structures described herein with respect to other examples may be used to form enclosure 5501 of FIG. 55. Relevant description of such techniques and structures are not repeated in order to reduce redundancy.

The watch band 5508 may attach to the enclosure 5501 via the intermediate member 5506. In cases where the watch band 5508 is not removable, the watch band 5508 may be permanently attached to the intermediate member 5506. In other cases, such as where the watch band 5508 is removably coupled to the enclosure 5501, the intermediate member 5506 may include or define part of a channel, lug, or other feature or mechanism with which the watch band 5508 engages to removably couple the watch band 5508 to the enclosure 5501.

As with the other devices described herein, the watch 5500 may include one or more displays that are visible through all or some of the first glass member 5502 and through all or some of the second glass member 5504, including through the peripheral sides of the enclosure 5501. Additionally, the watch 5500 may include touch- and/or force-sensing systems that detect inputs applied to the major sides and/or the peripheral sides (or portions thereof) of the watch 5500. Such touch- and/or force-sensing systems may operate in accordance with capacitive sensing, inductive sensing, optical sensing, or other sensing techniques.

Also, similar to other examples provided herein, the graphical output of the display may be modified in accordance with an orientation of the watch 5500. Additionally, the graphical output and/or other operational characteristics of the watch 5500 may be modified in response to the watch 5500 being worn on a right wrist, a left wrist, resting on a surface, or mounted in a docking station or stand. The watch 5500 may modify the graphical output and/or other operational characteristics of the watch 5500 automatically, based sensor input(s), detected locations, or the like. For example, when a user lifts his or her wrist to view the watch, the watch 5500 may detect the motion and in response output a first type of graphical output (e.g., a watch face viewable through the first major side defined by the first glass member 5502). When the user places the watch 5500 on a night stand, desk, or other surface (and optionally on a charger), the watch 5500 may output a second type of graphical output (e.g., the time and an alarm status on a peripheral side of the watch 5500). Other types of graphical outputs and triggers (e.g., events, locations, sensed motion, etc.) are also contemplated. For example, the peripheral sides may be illuminated (e.g., with a solid color) to indicate events or provide other notifications (e.g., when a message has been received, when an alarm or timer has expired, or the like).

In some embodiments, graphical output from the display may be viewable through one or more additional faces depending on a wearing condition (left or right wrist), an orientation of the device, or placement in a docking station or stand. In some instances, the watch 5500 may be reversible and graphical output may be displayed through either of the major sides in accordance with a wearing condition.

As noted above, the watch 5500 does not include externally-accessible mechanical input devices such as a crown or input button. Input functionality similar to that of a mechanical button or crown may be provided by other types of input devices and/or sensors of the watch 5500. For example, a touch- and/or force-sensing system of the watch 5500 may detect touch- and/or force-based inputs applied to a peripheral side (or a portion thereof) of the watch 5500. More particularly, an array of electrodes integrated with the enclosure 5501 may define one or more touch- and/or force-sensitive input regions along an exterior surface of the watch 5500 to define one or more virtual or programmable buttons, crowns, slides, or other similar input devices. (The array of electrodes may be part of a touch- and/or force-sensing system that also detects touch and/or force inputs applied to the first and/or second major sides of the enclosure.) FIG. 55 shows example touch- and/or force-sensitive input regions 5516 along a peripheral side, with which a user may interact to control operations of the watch 5500. The shapes and positions of the input regions 5516 are merely examples, and may have other shapes or positions in other embodiments.

A display within the enclosure 5501 may display affordances that coincide with the input regions 5516 or otherwise indicate that the user can interact with the input regions 5516 to control the watch 5500. The affordances, and the touch- and/or force-sensing functions, may be activated or deactivated depending on a mode of operation of the watch 5500. For example, in a first operating mode, the watch 5500 may display a crown-like affordance at one of the input regions 5516, and respond to inputs applied to the crown-like affordance. In a second operating mode, the crown-like affordance may not be displayed, and the input region 5516 may remain blank or include a different type of affordance or graphical output. For example, in a workout mode, the crown-like affordance may be replaced by a stopwatch start/stop button, an audio control, a lap or split button, or the like. Other modes of operation and associated affordances and/or graphical outputs are also contemplated.

FIG. 56 illustrates another example wearable electronic device, and specifically a watch 5600 that includes an enclosure 5601 formed entirely or substantially entirely of glass. Like the other enclosures described herein, the enclosure 5601 may define a first major side 5614 (e.g., the face of the watch), a second major side 5613 (e.g., the wrist-facing side of the watch), and substantially all of the peripheral sides are glass. Whereas the enclosures 5401 and 5501 included an intermediate member that may be formed of a non-glass material such as a polymer or a metal, the enclosure 5601 may lack non-glass elements that define exterior surfaces of the enclosure 5601 (or at least may lack the intermediate member). The enclosure 5601 may be formed using the techniques described above with respect to other types of electronic devices (including but not limited to those shown and described with respect to FIGS. 5A-9B, 10A-15, 18-25D). For example, multiple glass elements may be attached together using adhesives, glass frit bonding, or the like. As another example, a single glass structure may be molded or otherwise formed around the device components. As yet another example, an opening may be formed in an otherwise fully enclosed monolithic glass member, and components may be introduced into the glass structure through the opening (which may then be sealed, capped, or otherwise closed off, as described with respect to FIG. 40 for example). Further description of these and other techniques and structures are not repeated in order to reduce redundancy.

The enclosure 5601 may also define attachment features 5606 to which a watch band may be attached. The attachment features 5606 may be formed of glass, and may be part of a monolithic or unitary glass structure that defines the enclosure 5601 (or, in the case of a non-monolithic enclosure or enclosure member, they may be integral with one of multiple glass members that together define the enclosure 5601). In other examples, the attachment features 5606 may be formed separately from the enclosure 5601 and attached to the enclosure 5601. For example, the attachment features 5606 may be formed of a metal, polymer, or other suitable material, and adhered or otherwise affixed to the enclosure 5601. A watch band 5608 may be attached to the attachment features 5606, for example, by being looped around the attachment features 5606. The band 5608 may attach to the enclosure 5601 using other types of attachment features. For example, instead of the lug-like attachment features 5606 in FIG. 56, the watch 5600 may include slots or channels that may receive and engage the band 5608. In another example, a band 5608 may be affixed directly to the exterior glass surface of the enclosure 5601 using adhesives or any other suitable technique.

As with the other devices described herein, the watch 5600 may include one or more displays that are visible through all or some of the surfaces of the enclosure 5601. Additionally, the watch 5600 may include touch- and/or force-sensing systems that detect inputs applied to the major sides and/or the peripheral sides (or portions thereof) of the watch 5600. Such touch- and/or force-sensing systems may operate in accordance with capacitive sensing, inductive sensing, optical sensing, or other sensing techniques.

Also, similar to other examples provided herein, the graphical output of the display may be modified in accordance with an orientation of the watch 5600. Additionally, the graphical output and/or other operational characteristics of the watch 5600 may be modified in response to the watch 5600 being worn on a right wrist, a left wrist, resting on a surface, or mounted in a docking station or stand. The watch 5600 may modify the graphical output and/or other operational characteristics of the watch 5600 automatically, based sensor input(s), detected locations, or the like. For example, when a user lifts his or her wrist to view the watch, the watch 5600 may detect the motion and in response output a first type of graphical output (e.g., a watch face viewable through the first major side). When the user places the watch 5600 on a night stand, desk, or other surface (and optionally on a charger), the watch 5600 may output a second type of graphical output (e.g., the time and an alarm status on a peripheral side of the watch 5600). Other types of graphical outputs and triggers (e.g., events, locations, sensed motion, etc.) are also contemplated. For example, the peripheral sides may be illuminated (e.g., with a solid color) to indicate events or provide other notifications (e.g., when a message has been received, when an alarm or timer has expired, or the like).

In some embodiments, graphical output from the display may be viewable through one or more additional faces depending on a wearing condition (left or right wrist), an orientation of the device, or placement in a docking station or stand. In some instances, the watch 5600 may be reversible and graphical output may be displayed through either of the major sides in accordance with a wearing condition.

Similar to the watch 5500, the watch 5600 does not include externally-accessible mechanical input devices such as a crown or input button. Input functionality similar to that of a mechanical button or crown may be provided by other types of input devices and/or sensors of the watch 5600, as described above with respect to FIG. 55. Relevant description of such techniques and features are not repeated in order to reduce redundancy.

Figure 57:
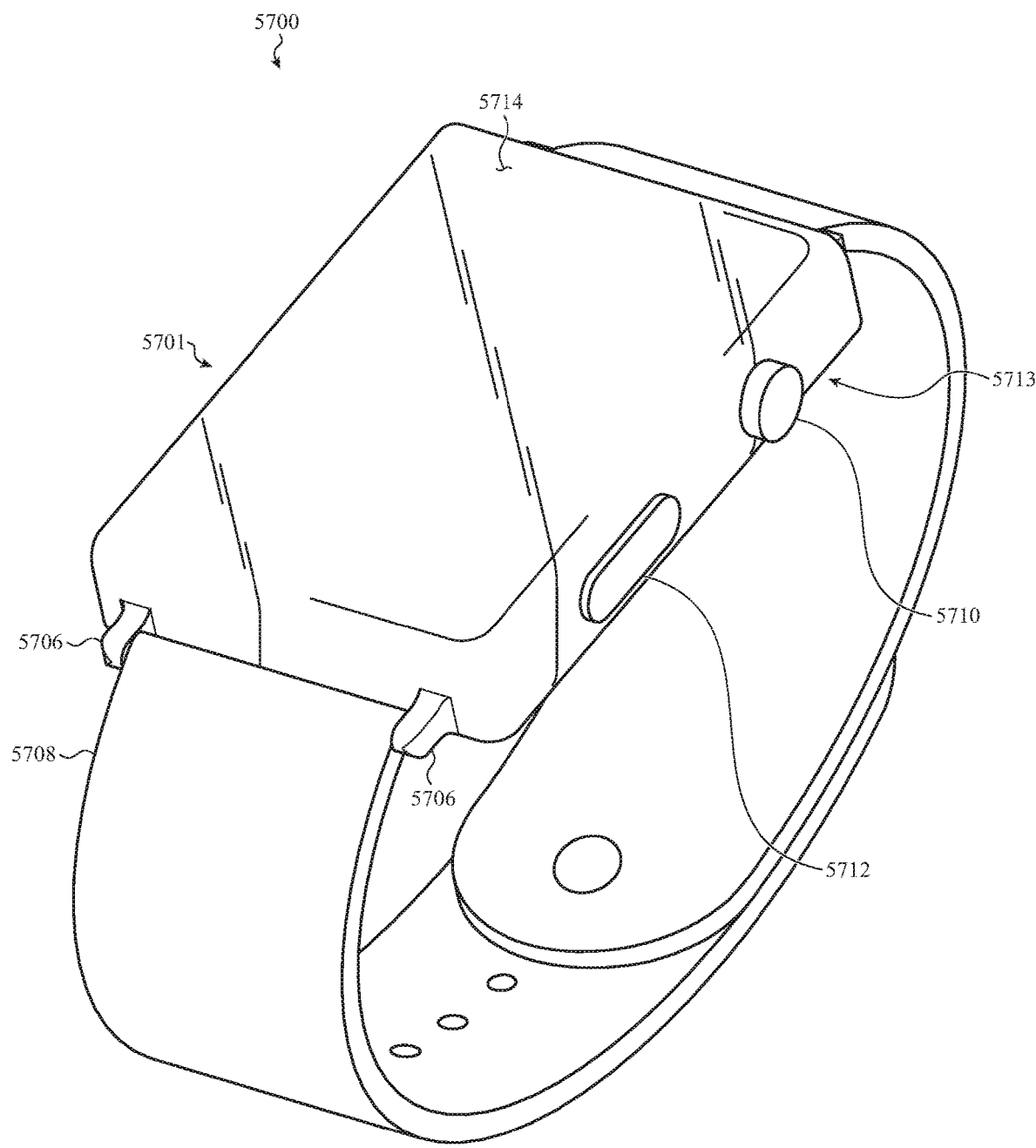
FIG. 57 depicts another example wearable electronic device using a glass enclosure.

FIG. 57 illustrates another example wearable electronic device, and specifically a watch 5700 that includes an enclosure 5701 formed entirely or substantially entirely of glass. The watch 5700 may be substantially similar to the watch 5600, except that the watch 5700 includes input devices such as a crown 5710 and/or a button 5712. Like the crown and button of the watch 5400, the crown 5710 may be rotatable relative to the enclosure 5701, and may also be actuated axially (e.g., pressed towards the enclosure 5701, like a button). Rotation of the crown 5710 by a user may cause the watch 5700 to modify its operation, as described above. The watch 5700 may detect the rotational and optional axial movement of the crown using optical sensors, encoders, Hall effect sensors, resolvers, dome switches, or any other suitable sensing system(s). The button 5712 may be pressed by a user (e.g., axially, towards the enclosure 5701) to provide inputs to the watch 5700.

Like the other enclosures described herein, the enclosure 5701 may define a first major side 5714 (e.g., the face of the watch), a second major side 5713 (e.g., the wrist-facing side of the watch), and substantially all of the peripheral sides are glass. The enclosure 5701 may also define attachment features 5706 to which a watch band may be attached. The attachment features 5706 may be similar to the attachment features 5606, described above.

The enclosure 5701 may be formed using the techniques described above with respect to other types of electronic devices (including but not limited to those shown and described with respect to FIGS. 5A-9B, 10A-15, 18-25D). For example, multiple glass elements may be attached together using adhesives, glass frit bonding, or the like. As another example, a single glass structure may be molded or otherwise formed around the device components. As yet another example, an opening may be formed in an otherwise fully enclosed monolithic glass structure, and components may be introduced into the glass structure through the opening (which may then be sealed, capped, or otherwise closed off, as described with respect to FIG. 40 for example). Further description of these and other techniques and structures are not repeated in order to reduce redundancy.

The crown 5710 may include a shaft that extends into the enclosure 5701 through an opening in the enclosure 5701. The button 5712 may include a shaft or other component or feature that extends into the enclosure 5701 through an opening in the enclosure 5701. In some cases, the openings through which portions of the crown 5710 and/or the button 5712 extend are used to insert components of the watch 5700 into the enclosure 5701. For example, components may be inserted into the enclosure 5701 through the crown and/or button openings using a technique similar to that described with respect to FIG. 40. In particular, components such as displays, batteries, processors, circuit boards, memory, sensors, support structures, and the like may be inserted into an internal volume of the enclosure 5701 through one of the openings. The components may be arranged inside the enclosure 5701 (optionally including unfolding or otherwise expanding or re-configuring components), and the openings may be closed by the crown and/or button. The openings for the crown and/or button may be formed after forming a completely enclosed glass enclosure. For example, the openings may be drilled, machined, or otherwise formed into the glass to provide access to the interior volume of the enclosure 5701. In some cases, the openings for the crown and/or button are the only openings in an otherwise continuous, monolithic glass enclosure 5701.

While the crown 5710 and the button 5712 are shown having an example size and shape, other sizes and shapes are also possible. Further, either the crown or button may be omitted, or other input devices may be included in addition to the crown and button. For example, the watch 5700 may include a single button that extends substantially the entire length of the peripheral side (e.g., 70% or greater of the length of the peripheral side). This may allow the opening to have a greater size than would be afforded if the watch used smaller buttons or crowns, and may help facilitate the manufacturability of the device.

Figure 58:
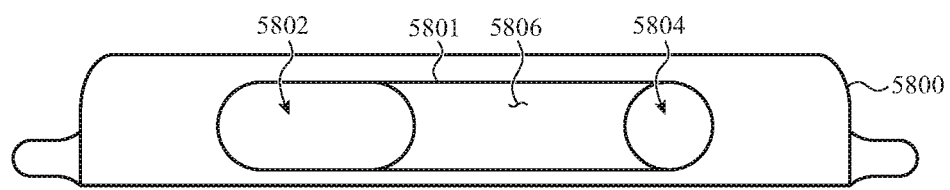
FIG. 58 depicts a side view of an example glass enclosure.

In some cases, a single opening may be formed to facilitate assembly of the internal components of a watch, and a partial cap may be added to cover at least part of the opening while leaving one or more openings for the input devices. FIG. 58 shows a partial side view of an example enclosure 5800, which may be an embodiment of the enclosure 5701 and which may use a partial cap to cover an opening in one of the walls of the enclosure 5701. The enclosure 5800 includes an opening 5801 in a peripheral side of the enclosure 5800. After components of the watch are inserted into the enclosure 5800 through the opening 5801, a partial cap 5806 may be attached to the enclosure 5800 to partially occlude the opening 5801. The cap 5806 may partially define one or more openings in the enclosure 5800, such as the opening 5802 and 5804. Components of a crown, button, or other input device (or any other suitable component) may extend into the interior volume of the enclosure 5800 through the openings 5802, 5804. The number, shape, and position of the openings 5802, 5804 are merely examples, and other configurations are also contemplated.

The partial cap 5806 may be formed from any suitable material. In some cases, the partial cap 5806 is formed of glass and is attached to the main body of the enclosure 5800 using an adhesive, glass frit bonding, fusion bonding, or any other suitable attachment technique. In other cases the partial cap 5806 may be formed form a polymer, crystal, metal, or the like.

The foregoing descriptions of the watches 5400, 5500, 5600, 5700, and 5800 illustrate some specific features that may be present in watches that include enclosures formed entirely or substantially entirely of glass. Other variations and embodiments are also contemplated. For example, any and all other features described herein with reference to other types of devices, including but not limited to other embodiments of enclosures, displays, user interfaces, operational modes, as well as materials and manufacturing and/or assembly techniques, may be applied to the watches 5400, 5500, 5600, 5700, and 5800 as well. Further, components, functions, structures, or other descriptions of any given watch described herein may apply equally or by analogy to other watches described herein.

The foregoing description describes concepts with reference to various example embodiments, and it will be understood that concepts described with respect to one particular embodiment, form factor, implementation, or device is applicable to other embodiments, form factors, implementations, or devices as well. For example, components, assemblies, construction techniques, assembly techniques, user interfaces, or any other concepts that are described with respect to a device having a shape of a rectangular prism apply equally and/or by analogy to devices having other shapes (e.g., cylinders, triangular prisms, octagonal prisms, hexagonal prisms, or the like). Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A wearable electronic device comprising:
an enclosure defining an interior volume and comprising:
a first glass member defining:
a front surface of the enclosure; and
a first portion of a side surface of the enclosure;
a second glass member defining:
a back surface of the enclosure; and
a second portion of the side surface of the enclosure;
an intermediate member formed of metal and positioned between the first and second glass members and coupled to the first and second glass members, the intermediate member defining a third portion of the side surface of the enclosure;
a watch band coupled to the enclosure;
a sensing system comprising a motion sensing system and a biometric sensing system and configured to detect first information from the motion sensing system and second information from the biometric sensing system; and
a touch-sensitive display within the interior volume and positioned below the front surface and configured to:

display a graphical output through the front surface of the enclosure;

display a first input object along the first portion of the side surface of the enclosure; and while the first input object is displayed along the first portion of the side surface of the enclosure and in response to the sensing system detecting a change in a use condition of the wearable electronic device based at least in part on the first information from the motion sensing system and the second information from the biometric sensing system, cease displaying the first input object and display a second input object, different from the first input object, along the first portion of the side surface of the enclosure.

2. The wearable electronic device of claim 1, wherein:
the side surface is a first side surface;
the first glass member further defines:
   a first portion of a second side surface;
   a first portion of a third side surface; and
   a first portion of a fourth side surface; and
the second glass member further defines:
   a second portion of the second side surface;
   a second portion of the third side surface; and
   a second portion of the fourth side surface.

3. The wearable electronic device of claim 2, wherein the intermediate member further defines:
a third portion of the second side surface;
a third portion of the third side surface; and
a third portion of the fourth side surface.

4. The wearable electronic device of claim 1, wherein the watch band is coupled to the intermediate member.

5. The wearable electronic device of claim 1, further comprising a crown positioned along the side surface of the enclosure, the crown configured to detect rotational inputs and translational inputs.

6. The wearable electronic device of claim 1, wherein the side surface of the enclosure defines a continuous curvature extending from the front surface to the back surface.

7. The wearable electronic device of claim 1, wherein the biometric sensing system is positioned at least partially within the interior volume and comprises an optical receiver configured to receive an optical signal through the back surface of the enclosure.

8. An electronic watch comprising:
an enclosure defining an interior volume and comprising:
   a first glass member defining a front surface of the enclosure and a first portion of a side surface of the enclosure;
   a second glass member defining a back surface of the enclosure and a second portion of the side surface of the enclosure; and
   an intermediate member formed of metal and positioned between the first and second glass members and defining a third portion of the side surface of the enclosure;
a biometric sensing system positioned at least partially within the interior volume and configured to determine biometric information of a wearer based at least in part on an optical signal received through the back surface of the enclosure;
a touch-sensitive display within the interior;
a motion sensing system configured to detect motion of the electronic watch;
a processing system operatively coupled to the touch-sensitive display, the biometric sensing system, and the motion sensing system and configured to:
   cause the touch-sensitive display to display a first input object along the first portion of the side surface of the enclosure;
   while the first input object is displayed along the first portion of the side surface of the enclosure, detect a change in a use condition of the electronic watch based at least in part on first information from the motion sensing system and second information from the biometric sensing system; and
   in response to determining the change in the use condition, cause the touch-sensitive display to cease displaying the first input object and display, along the first portion of the side surface of the enclosure, a second input object different from the first input object; and
a watch band coupled to the enclosure and configured to attach the electronic watch to a body of a user.

9. The electronic watch of claim 8, wherein:
the biometric sensing system is configured to:
   emit light through the back surface of the enclosure; and
   receive reflected light through the back surface of the enclosure; and
the biometric sensing system is configured to determine the biometric information based at least in part on the received reflected light.

10. The electronic watch of claim 8, wherein:
the intermediate member defines an attachment feature; and
the watch band engages the attachment feature, thereby coupling the watch band to the enclosure.

11. The electronic watch of claim 8, wherein the touch-sensitive display is configured to display a graphical output visible through the front surface of the enclosure.

12. The electronic watch of claim 8, wherein:
user selection of the first input object causes the electronic watch to perform a first operation; and
user selection of the second input object causes the electronic watch to perform a second operation different from the first operation.

13. The electronic watch of claim 8, wherein:
the first input object includes a representation of a watch crown; and
the second input object includes a representation of a button.

14. The electronic watch of claim 8, wherein the motion sensing system is configured to determine at least one of a movement or an orientation of the electronic watch.

15. The electronic watch of claim 8, further comprising a location sensing system configured to determine a location of the electronic watch.

16. The electronic watch of claim 8, wherein:
the first portion of the side surface of the enclosure extends a first distance from the front surface to the intermediate member; and
the second portion of the side surface of the enclosure extends a second distance, less than the first distance, to the intermediate member.

17. A portable electronic device comprising:
an enclosure comprising:
   a first glass member defining:
      a first wall defining a front surface of the enclosure; and
      a second wall extending from the first wall and defining a first portion of each of four side surfaces of the enclosure;

a second glass member defining:
   a third wall defining a back surface of the enclosure; and
   a fourth wall extending from the third wall and defining a second portion of each of the four side surfaces of the enclosure; and
an intermediate member positioned between the first glass member and the second glass member and defining a third portion of each of the four side surfaces of the enclosure;
a sensing system comprising a motion sensing system and a biometric sensing system and configured to detect first information from the motion sensing system and second information from the biometric sensing system; and
a touch-sensitive display within the enclosure and configured to:
   display a first input object visible through a portion of the second wall; and
   while the first input object is displayed and in response to the sensing system detecting a change in a use condition of the wearable electronic device based at least in part on the first information from the motion sensing system and the second information from the biometric sensing system, cease displaying the first input object and display a second input object, different from the first input object, visible through the portion of the second wall.

18. The portable electronic device of claim 17, wherein:
the second wall extends around an entire periphery of the first wall; and
the fourth wall extends around an entire periphery of the second wall.

19. The portable electronic device of claim 17, wherein:
the intermediate member defines a band attachment feature; and
the portable electronic device further comprises a watch band engaged with the band attachment feature, thereby coupling the watch band to the enclosure.

20. The portable electronic device of claim 17, wherein the portable electronic device is configured to:
   in response to detecting a user selection of the first input object, perform a first operation; and
   in response to detecting a user selection of the second input object, perform a second operation different from the first operation.

\* \* \* \* \*